(12) United States Patent
Sheldon-Coulson et al.

(10) Patent No.: US 12,227,861 B2
(45) Date of Patent: Feb. 18, 2025

(54) SYSTEMS AND METHODS FOR REMOVAL AND SEQUESTRATION OF ACIDITY FROM SURFACE SEAWATER

(71) Applicant: LONE GULL HOLDINGS, LTD., Portland, OR (US)

(72) Inventors: Garth Alexander Sheldon-Coulson, Portland, OR (US); Brian Lee Moffat, Portland, OR (US)

(73) Assignee: LONE GULL HOLDINGS, LTD., Portland, OR (US)

( * ) Notice: Subject to any disclaimer, the term of this patent is extended or adjusted under 35 U.S.C. 154(b) by 0 days.

(21) Appl. No.: 18/641,081

(22) Filed: Apr. 19, 2024

(65) Prior Publication Data

US 2024/0360571 A1    Oct. 31, 2024

Related U.S. Application Data

(60) Provisional application No. 63/462,246, filed on Apr. 26, 2023.

(51) Int. Cl.
| | | |
|---|---|---|
| *C25B 9/65* | (2021.01) | |
| *C01B 7/01* | (2006.01) | |
| *C25B 1/04* | (2021.01) | |
| *C25B 1/26* | (2006.01) | |

(Continued)

(52) U.S. Cl.
CPC ............... *C25B 9/65* (2021.01); *C01B 7/012* (2013.01); *C25B 1/04* (2013.01); *C25B 1/26* (2013.01); *C25B 15/081* (2021.01); *F03B 13/14* (2013.01); *F05B 2220/706* (2013.01)

(58) Field of Classification Search
CPC .... C25B 9/65; C25B 1/04; C25B 1/26; C01B 7/012; F03B 13/14
See application file for complete search history.

(56) References Cited

U.S. PATENT DOCUMENTS

| | | | | |
|---|---|---|---|---|
| 2011/0061376 A1* | 3/2011 | McAlister | ................ | C25B 9/17 |
| | | | | 60/497 |
| 2017/0198401 A1* | 7/2017 | Phillips | .................. | H02K 35/02 |

FOREIGN PATENT DOCUMENTS

| | | | | |
|---|---|---|---|---|
| CN | 216845714 U | * | 6/2022 | |
| CN | 114807964 A | * | 7/2022 | ............... C25B 1/04 |
| WO | WO 2011/028402 A2 | * | 3/2011 | ............... F03G 7/05 |

OTHER PUBLICATIONS

Alexander A. Temeev et al, "An integrated system of the floating wave energy converter and electrolytic hydrogen producer", Renewable Energy 31 (2006) 225-239.*

* cited by examiner

*Primary Examiner* — Wayne A Langel
(74) *Attorney, Agent, or Firm* — Fulwider Patton LLP

(57) ABSTRACT

A method by which an environmental energy (e.g., wave energy) is harvested, converted into electrical power, and thereafter used to electrolyze seawater into hydrogen and chlorine gases. Those gases are recombined into hydrogen chloride from which is formed hydrochloric acid solution which is diluted and deposited at a depth sufficient to ensure its neutralization and sequestration for a significant period of time (e.g., for over a millennium). By removing chloride ions from a portion of the sea adjacent to its upper surface and depositing them into a portion of the sea more adjacent to its bottom, acidity is shifted from the surface to base of the sea, and the surface ocean is given a greater ability to absorb and buffer atmospheric carbon dioxide without a corresponding increase in acidity.

23 Claims, 72 Drawing Sheets

(51) Int. Cl.
*C25B 15/08* (2006.01)
*F03B 13/14* (2006.01)

SYSTEMS AND METHODS FOR REMOVAL AND SEQUESTRATION OF ACIDITY FROM SURFACE SEAWATER

CROSS-REFERENCES TO RELATED APPLICATIONS

This application is based upon and claims priority from U.S. Provisional Application No. 63/462,246, filed Apr. 26, 2023, which is incorporated by reference in its entirety.

BACKGROUND

Increasing concentrations of carbon dioxide in the Earth's atmosphere have led to an increasing acidity in the surface waters of the world's oceans. The dissolution of carbon dioxide into surface ocean waters increases the acidity of those waters. Our environment, and our lives, would benefit from an increase in the rate at which carbon dioxide is removed from the atmosphere. The rate at which carbon dioxide is absorbed by the surface waters of the world's oceans is correlated with the total alkalinity of those surface waters. Therefore, decreasing the acidity and/or increasing the alkalinity of the surface waters of the world's oceans will enable those surface waters to absorb more carbon dioxide, which, in turn, will act to restore more natural levels of carbon dioxide in the atmosphere. The present invention removes acidity from the surface waters of an ocean and sequesters it in the more alkaline waters found at depth, far below the surface.

SUMMARY OF THE INVENTION

Disclosed are novel environmentally-powered systems for removing acidity from the upper reaches of an ocean and transferring it to the ocean's lower reaches, thereby reducing acidity at the surface, and allowing ancient calcareous deposits and deep, relatively alkaline waters to neutralize that acid immediately, instead of, as would otherwise happen naturally, over the course of millennia. Furthermore, by removing acidity from those portions of an ocean adjacent to the atmosphere, the ability of those portions of an ocean to absorb carbon dioxide from the atmosphere is enhanced. Thus, by removing acidity from the surface of a sea, and transferring it to depth where it is neutralized, the sea is made able to absorb an increased amount of carbon dioxide from the atmosphere, thereby reducing the rate of the world's warming, and limiting, if not decreasing, the rate of the ocean's acidification.

DETAILED DESCRIPTIONS OF THE EMBODIMENTS

Figure 1:
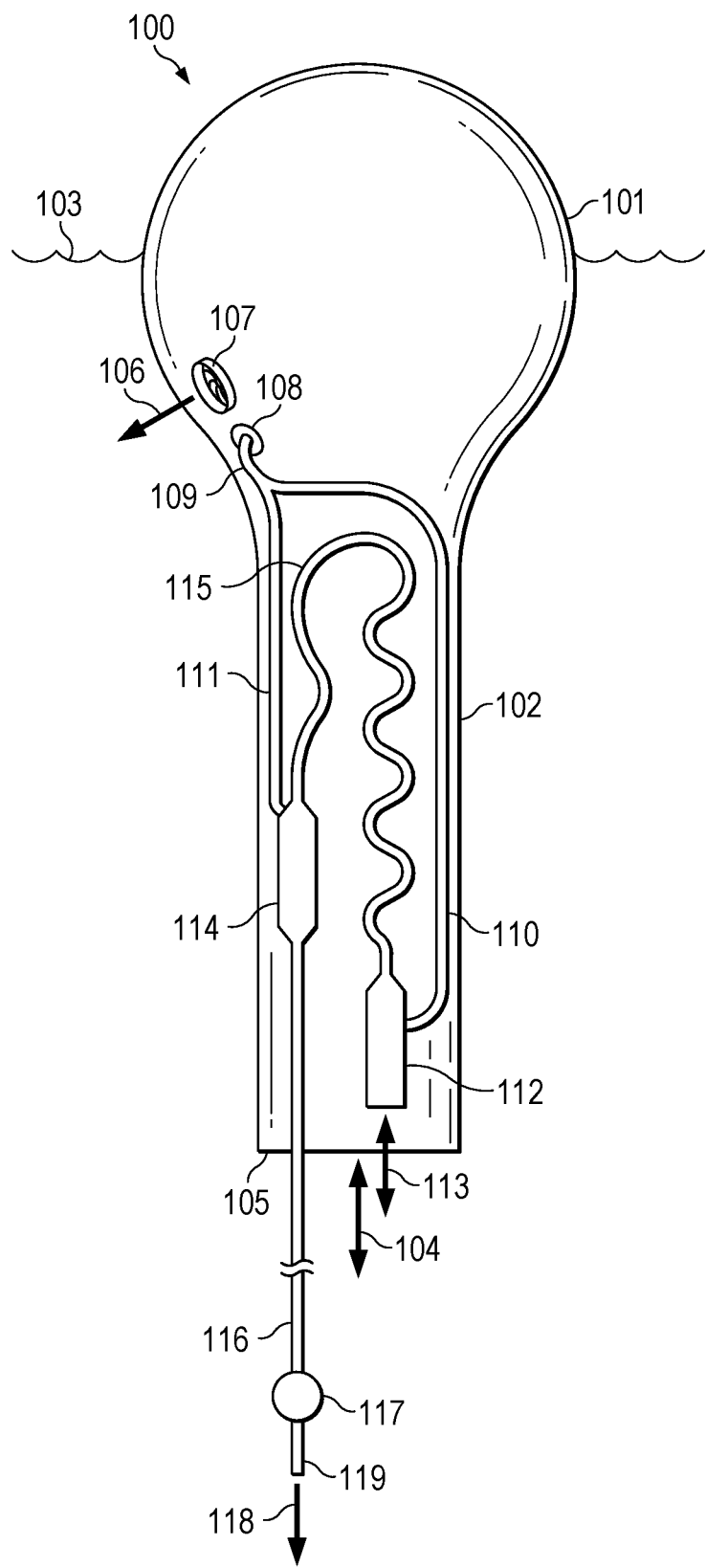
FIG. 1 is a side view of a first embodiment of the present invention.

For a fuller understanding of the nature and objects of the inventions, reference should be made to the preceding Summary of the Invention, taken in connection with the accompanying drawings. The following figures offer explanatory illustrations. The following figures, and the illustrations offered therein, in no way constitute limitations, either explicit or implicit, on and/or of the present inventions. Various embodiments or aspects of the disclosure are described herein. In some implementations, the different embodiments are practiced separately. However, embodiments are not limited to embodiments being practiced in isolation. For example, two or more different embodiments can be combined together in order to be practiced as a single device, process, structure, or the like. The entirety of various embodiments can be combined together in some instances. In other instances, portions of a first embodiment can be combined with portions of one or more different embodiments. For example, a portion of a first embodiment can be combined with a portion of a second embodiment, or a portion of a first embodiment can be combined with a portion of a second embodiment and a portion of a third embodiment.

The embodiments illustrated and discussed in relation to the figures included herein are provided for the purpose of explaining some of the basic principles of the disclosure. However, the scope of this disclosure covers all related, potential, and/or possible, embodiments, even those differing from the idealized and/or illustrative examples presented. This disclosure covers even those embodiments which incorporate and/or utilize modern, future, and/or as of the time of this writing unknown, components, devices, systems, etc., as replacements for the functionally equivalent, analogous, and/or similar, components, devices, systems, etc., used in the embodiments illustrated and/or discussed herein for the purpose of explanation, illustration, and example.

As used herein, "fluidly connected" may refer to two components that are configured to allow for the transfer of one or more fluids (e.g., gas and/or liquid) between the two components. For example, a first chamber may be fluidly connected to a second chamber, when a gas from the first chamber is capable of flowing (either actively (e.g., through pumping) or passively (e.g., through pressure differentials)) from the first chamber to the second chamber and/or from the second chamber to the first chamber. Fluidly connected components may be directly connected to each other. That is, there may not be any intervening components between the first component and the second component. In other instances, one or more additional intervening components (e.g., pipes, valves, chambers, reactors, etc.) may be provided between the first component and the second component so long as the one or more fluids are capable of being transferred between the first chamber and the second chamber along a path that includes the one or more intervening components. Additionally, while "components" may be fluidly connected with each other, the concept of being fluidly connected is not limited to structures such as chambers, containers, and the like. That is, a first volume of a liquid or gas may be fluidly connected to a second volume of a liquid or gas even if one or both of the first volume and the second volume are not confined by any specific structure. For example, a volume of fluid within a buoyant chamber may be fluidically coupled to a generally unconfined volume (e.g., a body of water or the atmosphere surrounding the buoyant chamber) through a pipe, tube, port, opening or other passage through a surface of the buoyant chamber.

The present invention includes, but is not limited to, embodiments that incorporate, utilize, and/or include, seawater electrolyzers that execute, implement, and/or manifest, processes that produce hydrogen and chlorine gases from seawater. In an electrolytic cell, apparatus, and/or device, of the type used to electrolyze seawater, and such as the kind used by some embodiments of the present invention, a direct (DC) electrical current is passed through a reservoir, volume, and/or quantity, of seawater. The current is applied to the seawater reservoir by, and/or between, two electrodes: a negatively-charged cathode, and a positively-charged anode, resulting in the evolution of said gases.

The present invention includes, but is not limited to, embodiments that incorporate, utilize, and/or include, seawater diaphragm-cell electrolyzers. The present invention includes, but is not limited to, embodiments that incorporate, utilize, and/or include, electrolyzers which incorporate, utilize, and/or include, diaphragms comprised of porous mixtures of asbestos and polymers. The present invention includes, but is not limited to, embodiments that do not include any diaphragm or membrane between anode and cathode elements.

The evolution of the anode-reduced chlorine atoms as a chlorine gas is also promoted, and/or its efficiency is increased, by creating a flow of seawater, within and/or through a seawater electrolyzer, that originates at the anode and then flows to the cathode, thus inhibiting a counterflow of hydroxide ions from the cathode to the anode which might reduce an amount of chlorine gas produced by a seawater electrolyzer (as such hydroxide ions chemically reacted with dissolved chlorine to produce oxygenated compounds of chlorine). The present invention includes, but it not limited to, embodiments that create a pumping action and/or electrolyte flow manifesting this anode-to-cathode flow pattern, with or without a diaphragm or other cell separator.

The present invention includes, but is not limited to, embodiments that incorporate, utilize, and/or include, an electrolyzer cathode comprised of steel. The present invention includes, but is not limited to, embodiments that incorporate, utilize, and/or include, electrolyzers incorporating, utilizing, and/or including steel cathodes having exterior coatings of nickel. The present invention includes, but is not limited to, embodiments that incorporate, utilize, and/or include, an electrolyzer cathode comprised of a flat hollow steel mesh or perforated steel sheet covered with asbestos fibers and fibrous polytetrafluoro-ethylene (PFTE), wherein the asbestos fibers and fibrous PFTE function as the electrolyzer diaphragm. The present invention includes, but is not limited to, embodiments that incorporate, utilize, and/or include, electrolyzer cathodes coated with a catalyst such as, but not limited to, nickel-sulfur, nickel-aluminum, nickel-nickel-oxide, platinum-group metals, to increase the cathode's surface area and reduce the hydrogen evolution potential.

The present invention includes, but is not limited to, embodiments that incorporate, utilize, and/or include, electrolyzer anodes comprised of titanium plates covered with layers of Group VIII oxides with metal conductivity (e.g., covered with exterior coatings of ruthenium oxide and/or titanium oxide), and sometimes including iridium oxide.

The present invention includes, but is not limited to, embodiments that incorporate, utilize, and/or include, electrolyzers through which seawater flows continuously, and/or steadily, into respective anode chambers and, from inside those respective anode chambers, then flows to and/or through respective electrolyzer diaphragms to respective cathode chambers.

The present invention includes, but is not limited to, embodiments that incorporate, utilize, and/or include, electrolyzers in which chlorine gas forms at respective anodes, and sodium hydroxide solution and hydrogen gas form directly at respective cathodes. The present invention includes, but is not limited to, embodiments that incorporate, utilize, and/or include, electrolyzers in which respective diaphragms prevent mixing of the electrolytic, and/or cathodic and anodic, products of hydrogen and chlorine thereby promoting the separate and/or separated evolution of those respective gases. The present invention includes, but is not limited to, embodiments that incorporate, utilize, and/or include, electrolyzers in which respective diaphragms limit the back-diffusion of hydroxide ions formed at respective cathodes to respective anodes, which thereby promotes the evolution of anode-reduced chlorine as a gas rather than as a hypochlorite solution.

The present invention includes, but is not limited to, embodiments that incorporate, utilize, and/or include, combustion chambers in which hydrogen and chlorine gases produced by respective seawater electrolyzers are ignited and thereby caused to chemically react and produce hydrogen chloride gases. The present invention includes, but is not limited to, embodiments that incorporate, utilize, and/or include, acid reservoirs, containing seawater, into which hydrogen chloride gases dissolve thereby dissociating into hydrochloric acids. Such acid reservoirs become increasingly acidic as they absorb more and more hydrogen chloride gas and incorporate more and more concentrated solutions of hydrochloric acid.

While not shown in the sample embodiments illustrated herein, the present invention includes, but is not limited to, embodiments that incorporate, utilize, and/or include, electrolyzers fluidly connected, e.g., by "descaling" valves, to respective hydrochloric acid reservoirs, e.g., within respective combustion chambers. Periodically, an embodiment control system opens a respective descaling valve and thereby permits a relatively small amount and/or quantity of hydrochloric acid solution to flow from a respective hydrochloric acid solution reservoir into the respective cathodic portion and/or chamber of the respective seawater electrolyzer thereby dissolving and/or flushing from the cathodic chamber any precipitates of calcium hydroxide and/or magnesium hydroxide. The illustrations and discussions of the sample embodiments herein omit, for the sake of clarity, such obvious and mundane precipitant-flushing mechanisms, devices, and/or systems.

The present invention includes, but is not limited to, embodiments that incorporate, utilize, and/or include, seawater electrolyzer chambers and/or housings comprised, at least in part, of polyvinyl chlorides, and/or PVCs, as materials of construction and/or fabrication.

The present invention includes, but is not limited to, embodiments that are moored, as well as those that are free-floating and self-propelled. The illustrations and discussions of the sample embodiments herein omit, for the sake of clarity, the obvious and mundane features and mechanisms required of moored embodiments, as well as the obvious and mundane features and mechanisms required of self-propelled embodiments. For instance, the present invention includes, but is not limited to, embodiments that incorporate, utilize, and/or include, propellers rotated by electrical motors that are energized, at least in part, by electrical power produced by respective embodiments; rigid sails rotatably connected to upper parts of respective embodiments and rotated by electrical motors that are energized, at least in part, by electrical power produced by respective embodiments; and, two or more adjacent effluent channels the effluence flowing from which produces a thrust that propels a respective embodiment, and into which, and/or from which, a rate of effluence may be altered so as to produce a torque that rotates a respective embodiment thereby thus enabling a steering of a respective embodiment.

The present invention includes, but is not limited to, embodiments that discharge an acidic solution into the depths of an ocean upon which they float and produce electrical power and hydrochloric acid solutions. The present invention includes, but is not limited to, embodiments that store hydrochloric acid solutions within storage tanks and/or chambers within, on, affixed to, and/or connected to, those respective embodiments, with those storage tanks adapted to facilitate a removal of hydrochloric acid from those storage tanks by other vessels and/or facilities.

The present invention includes, but is not limited to, embodiments that produce hydrochloric acid, and/or other acids, by means of a chemical process and/or electrolysis acting upon seawater and energized by electrical power produced by the respective embodiments through their extraction and conversion of energies harvested from ambient winds and/or waves. The present disclosure includes embodiments that produce hydrochloric acid, and/or other acids, from seawater, utilizing methods, processes, and/or apparatuses, not specified, enumerated, and/or included within the present disclosure. The present disclosure includes embodiments that transfer, move, and/or transport hydrochloric acid, and/or other acids, to parts and/or portions of an ocean far below the surface utilizing methods, processes, and/or apparatuses, not specified, enumerated, and/or included within the present disclosure.

A portion of some embodiments of the present disclosure include, incorporate, and/or utilize, at least one buoyant portion, buoy, vessel, and/or module. These buoyant portions may be referred to as hollow flotation modules, buoys, buoyant capsules, buoyant chambers, buoyant compartments, buoyant enclosures, buoyant vessels, hollow balls, and/or hollow spheroids. Many terms, names, descriptors, and/or labels, could adequately distinguish an embodiment's buoyant portion from among its other components, features, and/or elements, and the scope of the present disclosure incorporates any naming convention and/or choice, and is not limited by the nomenclature used to describe an embodiment or its parts.

FIG. 1 shows a side view of a first embodiment 100 of the present disclosure. The embodiment comprises, in part, a wave energy converter (WEC) 101/102 that is an embodiment of an inertial hydrodynamic wave engine of the type disclosed in U.S. patent Ser. No. 16/789,205. The WEC produces electrical power in response to wave motion as explained in U.S. patent Ser. No. 16/789,205. In some instances, a WEC may also be referred to as a power-take-off device or a power-take-off system.

In summary, as the WEC 101/102 floats at the surface 103 of a body of water, and moves up and down in response to waves moving across the surface of that body of water, water within the WEC's hollow tube 102 moves 104 in and out of a hollow tube 102 via a lower mouth 105 or aperture at a lower end of the tube. Periodically, water moving up within the tube 102 encounters a constriction therein and a resulting increase in fluid pressure causes an ejection of pressurized water up and into a pressurized reservoir within the WEC's pressurized upper hollow spherical buoy 101. Pressurized water from the WEC's reservoir flows out 106, and back into the body of water, through a water turbine 107. And, a generator (not shown), operatively connected to the water turbine, produces electrical power in response to an outflow 106 of water and a consequent rotation of the water turbine.

In some embodiments, the first embodiment 100 may include buoyant chamber 101 with a diameter that is approximately 20 meters or smaller, approximately, 10 meters or smaller, or approximately 1 meter or smaller. Though, larger diameters may also be used. A length of the tube 102 may be approximately 100 meters or less, approximately 50 meters or less, approximately 20 meters or less, or approximately 1 meter or less. Though, larger lengths may also be used in some embodiments. More generally, a length of the tube 102 may be related to a diameter of the buoyant chamber 101 by a ratio of (tube length:chamber diameter) that is 3:1 or greater, 5:1 or greater, or 10:1 or greater. Though, smaller ratios may also be used in some embodiments. The buoyant chamber 101 may be spherical, spheroidal, or spherical segments. However, in other instances the buoyant chamber 101 may comprise different geometries, such as cuboidal, pyramidal, conical, frusto-conical, or any other three-dimensional chamber. The buoyant chamber 101 may sometimes be referred to as a hull. The buoyant chamber 101 and the tube 102 may comprise any suitable material or materials, such as metals (e.g., corrosion resistant metals), or the like.

Thrust produced by the outflow 106 of effluent from the WEC 101/102 tends to propel the WEC in an opposite direction.

A portion of the electrical power produced by the embodiment's generator (not shown) passes from an interior of the WEC 101/102 to an exterior of the WEC through a bulkhead connector 108. The electrical conductor 109, cable, and/or assembly of wires, which exits the interior of the WEC splits into two electrically connected electrical cables 110 and 111.

Electrical cable 110 electrically connects an electrical output of the generator (not shown) to an electrolyzer cathode (not visible), and an electrolyzer anode (not visible), positioned within an electrolysis chamber 112 where the electrical power supplied by the embodiment's generator causes hydronium ($H_3O+$) ions (and/or protons $H+$) dissolved within the body of seawater 103 to be reduced at a cathode of the electrolyzer, thereby producing bubbles of hydrogen gas ($H_2$), and causes chloride ($Cl-$) ions dissolved within the body of seawater to be oxidized at an anode of the electrolyzer, thereby producing bubbles of chlorine gas ($Cl_2$).

As the WEC 101/102 is moved up and down in response to wave motion at the surface 103 of the body of water on which it floats, seawater tends to flow 113 in and out of the cathodic and anodic chambers of the electrolysis chamber 112 thereby ensuring that fresh seawater, i.e., seawater with undepleted concentrations of chloride ions, is continuously available for oxidation at the anode of the electrolyzer, and that hydroxide produced at the cathode is frequently, if not continuously, removed from the cathodic chamber of the electrolyzer.

Electrical cable 111 electrically connects an electrical output of the embodiment's 100 generator (not shown) to an ultraviolet light source, e.g., an LED, and an electrical-spark generator, within a combustion chamber 114. A control unit electrically connected to the combustion chamber periodically illuminates the ultraviolet light source, and/or creates a voltage, and a consequent spark, across the electrical-spark electrodes, thereby causing a mixture of hydrogen and chlorine gases within the combustion chamber to ignite, react, and/or combine, such that those gases tend to be converted into a hydrogen chloride gas, which tends to dissolve into, and form hydrochloric acid within, an acid reservoir within the combustion chamber when that hydrogen chloride gas comes into contact with a free surface of the seawater within the acid reservoir.

Other embodiments of the present disclosure similar to the embodiment illustrated in FIG. 1 trigger an ignition, combustion, and/or reaction, of hydrogen and chlorine gases within their respective combustion chambers, using light sources of wavelengths other than ultraviolet, other electrical phenomena, and other catalysts of the exothermic hydrogen and chlorine chemical reaction. The scope of the present disclosure includes embodiments incorporating, utilizing, and/or including, any and all means, devices, signals, triggers, and/or physical phenomena, which are able to cause hydrogen and chlorine gases to react and thereby form hydrogen chloride gas.

Hydrogen and chlorine gases produced, synthesized, and/or created, within the electrolysis chamber 112 tend to bubble up into, and then through, a gas tube 115 which carries the gas to the combustion chamber 114 where it is periodically ignited and thereby converted into hydrogen chloride gas, which upon dissolution in seawater within an acid reservoir therein, becomes hydrochloric acid, thereby acidifying the acid reservoir.

In a preferred embodiment, the combustion chamber 114 is positioned at a lesser depth than is the electrolysis chamber 112 so that hydrogen and chlorine gases that accumulate within the gas tube 115 tend to enter the combustion chamber before those accumulated gases reach and displace water from the electrolysis chamber. In other words, the pocket of accumulated gases contained within the embodiment's gas tube will tend to have a free surface, separating the accumulated gas from the liquid in the gas tube, on the side of the gas tube proximate to the combustion chamber, and another free surface, separating the accumulated gas from the liquid in the gas tube, on the side of the gas tube proximate to the electrolysis chamber. When the depth of the combustion chamber is less than the depth of the electrolysis chamber, then a sufficient amount of gas within the gas tube will tend to extend the free surface of that gas into the combustion chamber before the complementary free surface extends into the electrolysis chamber.

The acid reservoir of embodiment 100 is fluidly connected to an acid-resistant and flexible acid discharge hose 116. Hydrogen chloride gas produced within the combustion chamber 114 is able to fluidly communicate with, and to mix with, seawater within the discharge hose. And, the fluid connection of the interior of the discharge hose to the body of seawater 103 on which the embodiment floats, and the seawater which flows up and into the discharge hose as a consequence of its fluid connection to that body of water, causes the seawater within the discharge hose to serve as, and/or constitute, a portion of the acid reservoir into which the hydrogen chloride produced within the combustion chamber dissolves and wherein it is transformed into hydrochloric acid.

The density of an acidified hydrochloric acid solution is greater than that of seawater. And hydrochloric acid has an affinity for water. For at least these reasons, hydrochloric acid dissolved within the acidified seawater within the acid discharge hose is continually drawn down through, and continually flows out of, the distal end of the acid discharge hose. Seawater continually dilutes the hydrochloric acid dissolved within the seawater within the discharge hose.

Hydrogen chloride gas produced within the combustion chamber 114 flows within the combustion chamber until it comes into contact with a free surface of seawater within the acid-resistant and flexible acid discharge hose 116. A lower end of the acid discharge hose is held down, and its tendency to drift laterally is inhibited, by a hose weight 117 attached, connected, and/or integrated within, a lower end of the acid discharge hose. Another embodiment with a sufficiently dense acid discharge hose does not include a hose weight.

Hydrochloric acid deposited into an upper end of the acid discharge hose 116, e.g., from within the combustion chamber 114, flows 118 out of a mouth, and/or aperture, at a lower and/or distal end 119 of the acid discharge hose. The length of the acid discharge hose, and therefore the depth at which the hydrochloric acid therein flows into the body of water 103, is configured so as to be sufficient to cause the hydrochloric acid solution flowing out of the lower mouth 119 of the acid discharge hose 116 to be deposited into a portion of the body of water, e.g., a portion of sufficient depth, wherein the discharged hydrochloric acid is rapidly neutralized, and the chloride ions thereby sequestered, for a significant period of time, if not forever. For example, in one embodiment similar to the one illustrated in FIG. 1, the length of the acid discharge hose, and the depth at which hydrochloric acid flowing therefrom is deposited, is 3 km. The length of the acid discharge hose of another embodiment, and the depth at which hydrochloric acid flowing therefrom is deposited, is 2 km. And, the length of the acid discharge hose of another embodiment, and the depth at which hydrochloric acid flowing therefrom is deposited, is 4 km. In one instance, the length of the acid discharge hose is sufficient to discharge the hydrochloric acid at a depth deeper than a draft of the embodiment 100. In one instance the length of the acid discharge hose is sufficient to discharge the hydrochloric acid at a depth of 500 meters or more. The ability to move acidic solution to depths of the body of water allows for improved carbon sequestration, as described in greater detail herein. As such, some instances may refer to the embodiment 100 (or similar embodiments described herein) as a carbon-sequestration accelerator.

Figure 2:
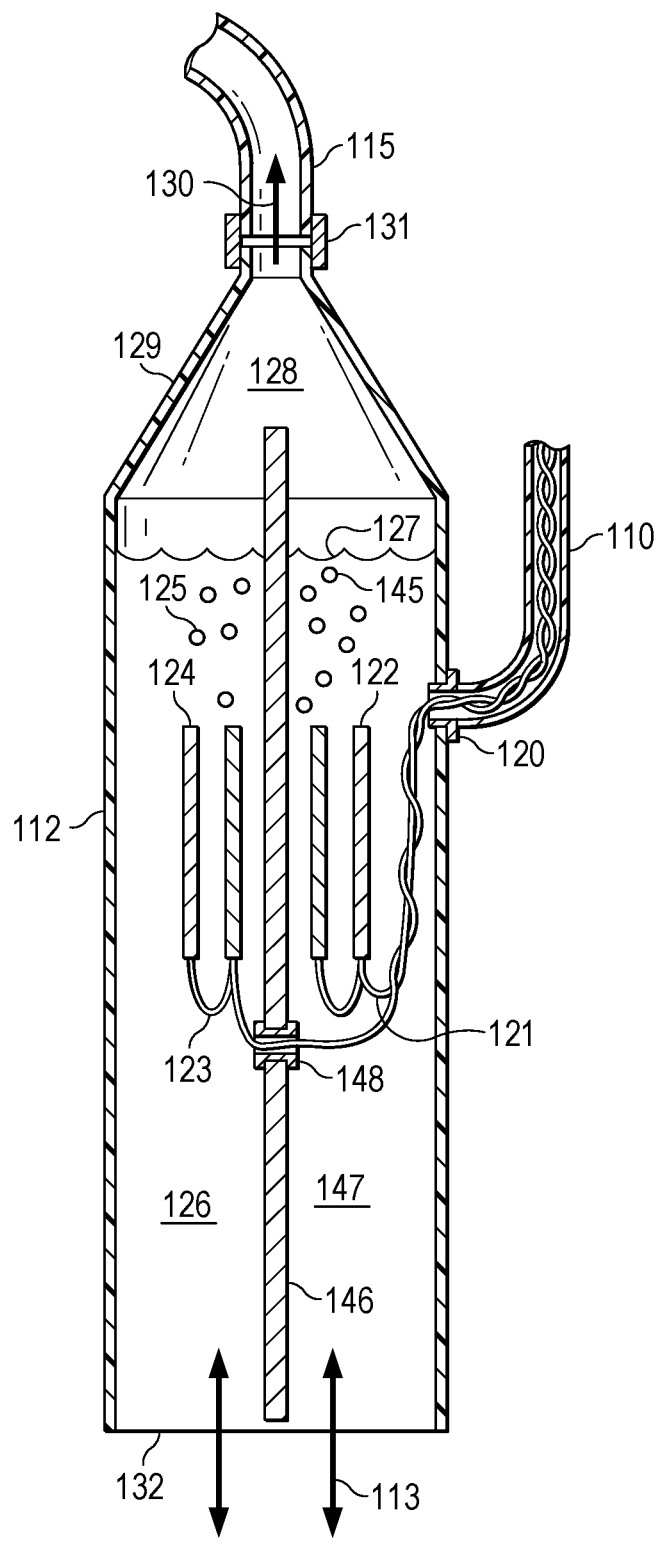
FIG. 2 is a side sectional view of a first component of the first embodiment.

FIG. 2 shows a side sectional view of the electrolysis chamber 112 of the first embodiment 100. Electrical cable 110 brings and/or transmits electricity from the embodiment's generator (not shown) to the electrolysis chamber. The electrical cable passes through a wall of the electrolysis chamber through a bulkhead connector 120. One wire 121 of the electrical cable, exhibiting a positive charge, is connected to a pair of anodic electrodes, e.g., 122, each of which is fabricated of titanium. In this and some other embodiments, anodes are "dimensionally stable" anodes coated with a mixed metal oxide surface layer. Another wire 123 of the electrical cable, exhibiting a negative charge, is connected to a pair of cathodic electrodes, e.g., 124, each of which is fabricated of steel.

The pair of cathodic electrodes, e.g., 124, and the cathodic side 126 and/or chamber of the electrolyzer 112, is separated from the pair of anodic electrodes, e.g., 122, and the anodic side 147 and/or chamber of the electrolyzer, by a semipermeable, microporous diaphragm 146, through which ions may pass, e.g., so as to enable, facilitate, and/or manifest, an electrical current through the seawater and between the cathodic and anodic electrodes, thereby facilitating electrolysis of the seawater within the electrolysis chamber. However, the diaphragm inhibits the movement of hydroxide ions (OH−) from the cathodic chamber to the anodic chamber thereby inhibiting the conversion of oxidized chlorine into hypochlorite before it can form a gas and bubble, e.g., 145, out of the seawater 147. The electrical cable and/or wire 123 conducting a negative DC voltage to the cathodic electrodes, e.g., 124, passes through the diaphragm via a bulkhead connector 148.

When energized with electrical power produced by the embodiment's generator (not shown) and altered by the embodiment's power electronics (not shown), the pair of cathodic electrodes, e.g., 124, reduce hydronium ions (and/or protons) and produce hydrogen gas, which bubbles, e.g., 125, upward within the electrolyzer's cathodic chamber 126. Similarly, when energized with electrical power produced by the embodiment's generator (not shown) and altered by the embodiment's power electronics (not shown), the complementary pair of anodic electrodes oxidize chloride ions and produce chlorine gas, which bubbles, e.g., 145, upward within the electrolyzer's anodic chamber 147.

When the electrolyzer's cathodic, e.g., 124, and anodic, e.g., 122, electrodes are sufficiently and properly energized, they give rise to bubbles of hydrogen gas, e.g., 125, and chlorine gas, e.g., 145, respectively, which bubbles tend to move in an upward direction eventually passing out of the seawater 126 and 147 surrounding the electrolyzer electrodes and through a surface 127 of that water within the electrolyzer 112, thereafter tending to mix and accumulate as and/or within a pocket of gas 128 within an upper portion 129 of the electrolyzer chamber 112.

The mixture of hydrogen and chlorine gases within the pocket of gas 128, and/or bubbles of those gases, tends to flow 130 up, into, and through the gas tube 115, a proximal end of which is fluidly connected to an interior of the electrolysis chamber 112 by a hose coupling 131. The hydrogen and chlorine gases that flow into the gas tube flow through that gas tube to the combustion chamber (114 in FIG. 1).

The conversion of hydronium and chlorine ions into corresponding hydrogen and chlorine gases tends to deplete the concentration of chloride ions within the seawater 147 surrounding the anodic electrodes, e.g., 122, and tends to increase the concentration of hydroxide ions within the seawater 126 surrounding the cathodic electrodes, e.g., 124, and/or tends to increase the ratio of conservative positive ions (e.g. $Ca^{2+}$) to conservative negative ions (e.g. Cl–) within said seawater, increasing the total alkalinity of said seawater. However, as a result of the up and down motions induced in the embodiment (100 in FIG. 1) by passing waves at the surface (103 in FIG. 1) of the body of seawater on which the embodiment floats, seawater tends to flow 113 in and out of both sides 126 and 147 of the electrolysis chamber through a shared mouth 132 and/or aperture at a lower end of the electrolysis chamber 112, thereby tending to the refresh the seawater 126 and 147 on each side of the electrolysis chamber, and to maintain relatively stable concentrations of chloride ions adjacent to the respective anodic electrodes 122, and to maintain relatively stable concentrations of hydroxide ions adjacent to the respective cathodic electrodes 124.

Figure 3:
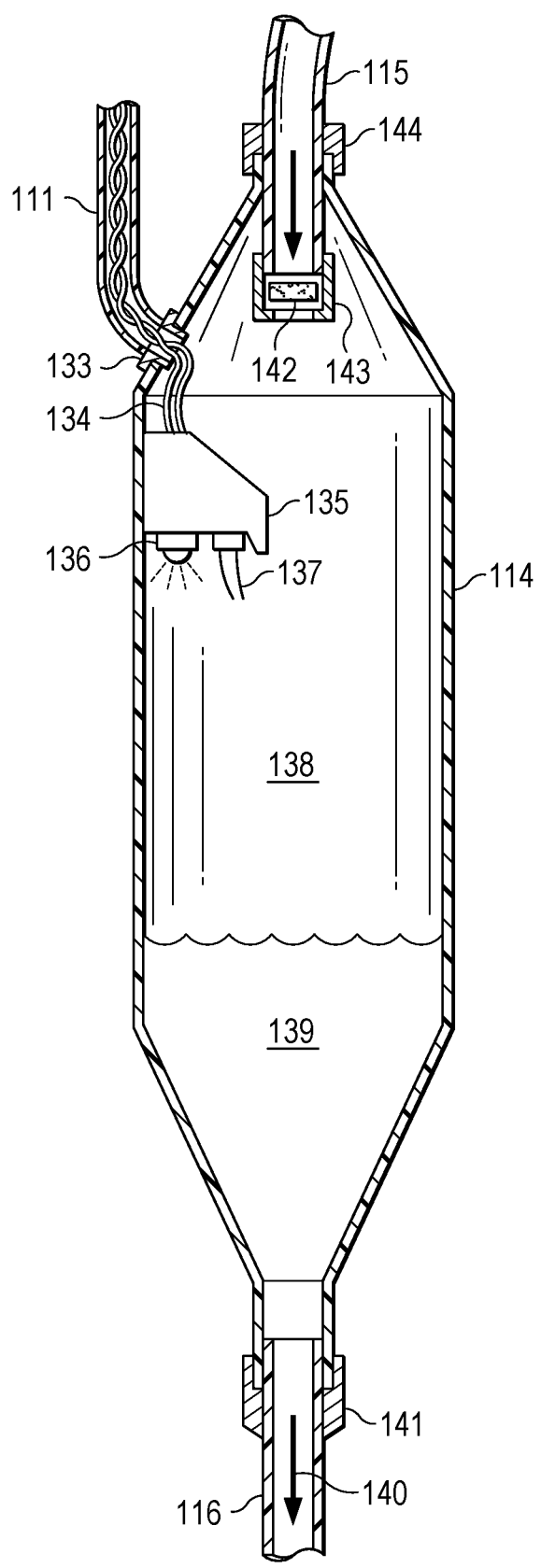
FIG. 3 is a side sectional view of a second component of the first embodiment.

FIG. 3 shows a side sectional view of the combustion chamber 114 of the first embodiment 100. Electrical cable 111 brings and/or transmits electricity from the embodiment's generator (not shown). The electrical cable passes through a wall of the combustion chamber through a bulkhead connector 133.

Electrical power-carrying wires 134 provide energy to an ignition control circuit 135. After receiving a signal from the embodiment's power electronics (not shown) through electrical wires 134 indicating that the amount of energy produced by the generator, and therefore consumed by the electrolyzer electrodes during their production of hydrogen and chlorine gases, has reached and/or exceeded a threshold amount, the ignition control circuit illuminates a light source 136, e.g., a source of ultraviolet light, and/or creates an electrical spark across the electrodes of an electrical spark generator 137, thereby tending to ignite the mixture of hydrogen and chlorine gases contained within an upper part 138 of an interior of the combustion chamber 114. The ignition of the mixture of hydrogen and chlorine gases within the combustion chamber tends to result in a production of hydrogen chloride gas therein. And the hydrogen chloride so produced tends to combine with, and/or dissolve into, water within a reservoir 139 in a lower part of the interior of the combustion chamber to form an acidified pool and/or solution 139 of hydrochloric acid.

Hydrochloric acid accumulated and trapped within acidified pool 139 tends to flow 140 downward into and through the acid discharge hose 116 a proximal end of which is fluidly connected to a lower end of the combustion chamber 114 by a discharge hose connector 141.

A flashback arrestor 142, which is attached and/or connected to a proximal end of gas tube 115 by an arrestor connector 143, tends to prevent a combustion of hydrogen and chlorine gases within an interior 138 of the combustion chamber from extending into, and thereafter throughout, the gas tube, and from similarly combusting hydrogen and chlorine gases still within the gas tube, with such an unwanted combustion potentially propagating all the way back to an interior of the electrolysis chamber (112 in FIG. 1). The gas tube is attached and/or connected to the combustion chamber 114 by a gas hose connector 144.

Embodiments of the present disclosure that are similar to the one illustrated in FIGS. 1-3, incorporate, utilize, and/or include, seawater diaphragm-cell electrolyzers. Embodiments of the present disclosure that are similar to the one illustrated in FIGS. 1-3, incorporate, utilize, and/or include, electrolyzers which incorporate, utilize, and/or include, diaphragms comprised of porous mixtures of asbestos and polymers. Embodiments of the present disclosure that are similar to the one illustrated in FIGS. 1-3, do not include any diaphragm or membrane between anode and cathode elements.

Embodiments of the present disclosure that are similar to the one illustrated in FIGS. 1-3, incorporate, utilize, and/or include, an electrolyzer cathode comprised of steel. Embodiments of the present disclosure that are similar to the one illustrated in FIGS. 1-3, incorporate, utilize, and/or include, electrolyzers incorporating, utilizing, and/or including steel cathodes having exterior coatings of nickel. Embodiments of the present disclosure that are similar to the one illustrated in FIGS. 1-3, incorporate, utilize, and/or include, an electrolyzer cathode comprised of a flat hollow steel mesh or perforated steel sheet covered with asbestos fibers and fibrous polytetrafluoro-ethylene (PFTE), wherein the asbestos fibers and fibrous PFTE function as the electrolyzer diaphragm. Embodiments of the present disclosure that are similar to the one illustrated in FIGS. 1-3, incorporate, utilize, and/or include, electrolyzer cathodes coated with a catalyst such as, but not limited to, nickel-sulfur, nickel-aluminum, nickel-nickel-oxide, platinum-group metals, to increase the cathode's surface area and reduce the hydrogen evolution potential.

Embodiments of the present disclosure that are similar to the one illustrated in FIGS. 1-3, incorporate, utilize, and/or include, electrolyzer anodes comprised of titanium plates covered with layers of Group VIII oxides with metal conductivity (e.g., covered with exterior coatings of ruthenium oxide and/or titanium oxide), and sometimes including iridium oxide.

Embodiments of the present disclosure that are similar to the one illustrated in FIGS. 1-3, incorporate, utilize, and/or include, electrolyzers in which respective diaphragms prevent mixing of the electrolytic, and/or cathodic and anodic, products of hydrogen and chlorine thereby promoting the separate and/or separated evolution of those respective gases. Embodiments of the present disclosure that are similar to the one illustrated in FIGS. 1-3, incorporate, utilize, and/or include, electrolyzers in which respective diaphragms limit the back-diffusion of hydroxide ions formed at respective cathodes to respective anodes, which thereby promotes the evolution of anode-reduced chlorine as a gas rather than as a hypochlorite solution.

Embodiments of the present disclosure that are similar to the one illustrated in FIGS. 1-3, incorporate, utilize, and/or include, electrolyzers fluidly connected, e.g., by "descaling" valves, to their respective hydrochloric acid reservoirs, e.g., within respective combustion chambers. Periodically, the control systems of these embodiments open a respective descaling valve and thereby permits a relatively small amount and/or quantity of hydrochloric acid solution to flow from a respective hydrochloric acid solution reservoir into the respective cathodic portion 126 and/or chamber of the respective seawater electrolyzer thereby dissolving and/or flushing from the cathodic chamber any precipitates of calcium hydroxide and/or magnesium hydroxide, e.g., such as those that might form on the cathodic electrodes 124. The illustrations and discussions of FIGS. 1-3 omit, for the sake of clarity, such obvious and mundane precipitant-flushing mechanisms, devices, and/or systems.

Embodiments of the present disclosure that are similar to the one illustrated in FIGS. 1-3, incorporate, utilize, and/or include, seawater electrolyzer chambers and/or housings comprised, at least in part, of polyvinyl chlorides, and/or PVCs, as materials of construction and/or fabrication.

Embodiments of the present disclosure that are similar to the one illustrated in FIGS. 1-3 are moored, and other embodiments of the present disclosure that are similar to the one illustrated in FIGS. 1-3 are free-floating and self-propelled. The scope of the present disclosure is not limited to the positions, and/or movements, characteristic of an embodiment, and/or of which an embodiment is capable. The illustrations and discussions of FIGS. 1-3 omit, for the sake of clarity, the obvious and mundane features and mechanisms required of moored embodiments, e.g., cables, anchors, tethers, etc., as well as the obvious and mundane features and mechanisms required of self-propelled embodiments, e.g., propellers, rigid sails, ducted fans, etc. Embodiments of the present disclosure that are similar to the one illustrated in FIGS. 1-3, incorporate, utilize, and/or include, propellers rotated by electrical motors that are energized, at least in part, by electrical power produced by generators of those respective embodiments; rigid sails rotatably connected to upper parts of those respective embodiments and rotated by electrical motors that are energized, at least in part, by electrical power produced by the generators of those respective embodiments; and, the incorporation and control of two or more adjacent effluent channels within a respective embodiment, the effluence flowing from which produces a thrust that propels the respective embodiment, and into which, and/or from which, a rate of effluence may be altered so as to produce a torque that rotates the respective embodiment thereby enabling a means of a respective embodiment's control system to steer the respective embodiment.

Embodiments of the present disclosure that are similar to the one illustrated in FIGS. 1-3, store hydrochloric acid solutions within storage tanks and/or chambers within, on, affixed to, and/or connected to, the respective embodiments, wherein those storage tanks are adapted to facilitate a removal of hydrochloric acid solution from those storage tanks by other vessels and/or facilities.

Embodiments of the present disclosure that are similar to the one illustrated in FIGS. 1-3, produce hydrochloric acid, and/or other acids, from seawater, utilizing methods, processes, and/or apparatuses, not specified, enumerated, and/or included within the present disclosure. Embodiments of the present disclosure that are similar to the one illustrated in FIGS. 1-3, transfer, move, and/or transport hydrochloric acid, and/or other acids, to parts and/or portions of an ocean far below the surface utilizing methods, processes, and/or apparatuses, not specified, enumerated, and/or included within the present disclosure.

Figure 4:
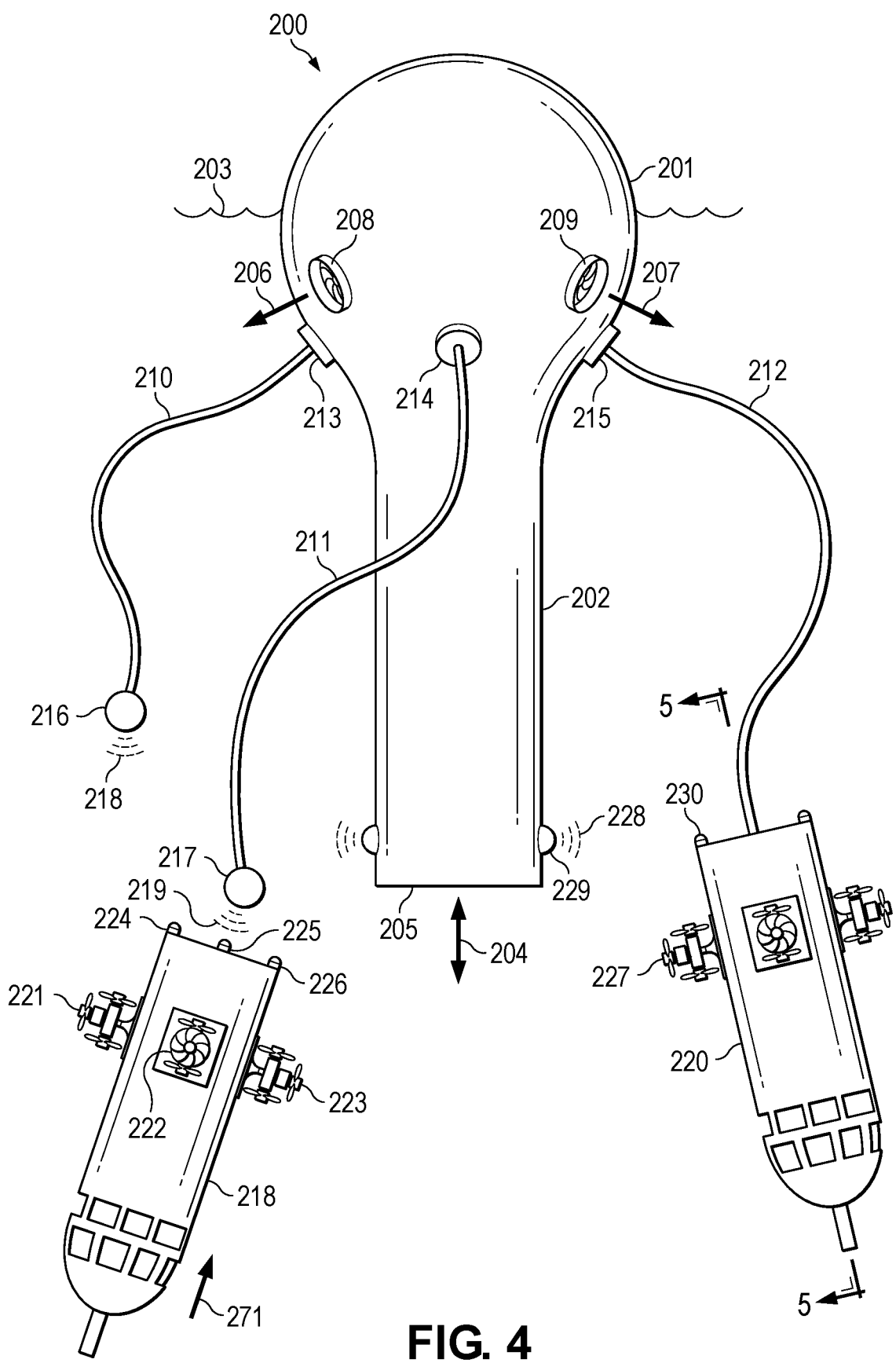
FIG. 4 is a side view of a first configuration of a second embodiment of the present invention.

FIG. 4 shows a side view of a second embodiment 200 of the present invention. A WEC 201/202, similar to the embodiment 100 illustrated in FIG. 1, and consistent with the hydrodynamic wave engine specified and disclosed in U.S. patent Ser. No. 16/789,205, floats adjacent to an upper surface 203 of a body of water over which waves pass. As the WEC 201/202 moves up and down in response to wave motion, water within the WEC's hollow reaction tube 202 moves up and down within the reaction tube, and water flows 204 in and out of the reaction tube through a mouth 205 and/or aperture at a lower end of the reaction tube. Occasionally, water moving upward within the reaction tube interacts with a constriction in an upper portion of that reaction tube, which tends to cause an increase in the pressure within a portion of the water within the reaction tube's constriction. This periodic increase in water pressure within the constricted portion of the WEC's reaction tube tends to be associated with periodic ejections of pressurized water up to and into a pressurized interior of the WEC's upper hollow spherical portion 201 and/or buoy which tends to result in an accumulation and/or reservoir of pressurized water therein.

Pressurized water (not shown) within the interior of the WEC's 201/202 upper hollow spherical portion 201 tends to flow, e.g., 206 and 207, out of the WEC's four water turbines, two 208 and 209 of which are visible in the illustration of FIG. 4. Electrical power produced by the embodiment's water turbines, and respective operatively connected generators (not shown), may be transmitted to any and/or all of four electrical power tethers, e.g., 210-212. Three 210-212 of the embodiment's four electrical power tethers are visible in the illustration shown in FIG. 4. Each electrical power tether passes through the WEC's hull 201 thereby transitioning from the WEC's interior to the body of water 203 through respective bulkhead connectors, e.g., 213-215. At a distal end of each electrical power tether is an electrical power transmission node, e.g., 216 and 217. Each electrical power transmission node that is not electrically connected to an electrical power consuming mechanism, e.g., 220, emits a distinctive acoustic signal and/or "ping," e.g., 218 and 219, each emission of which facilitates the homing, and electrical connection thereto, of a self-propelled autonomous vessel, e.g., 218. The electrical power transmission nodes 216 and 217 are emitting respective acoustic signals, and/or pings, 218 and 219. While the transmission node (not visible) connected to autonomous vessel 220 is silent.

The embodiment 201/202 is able to control, regulate, and/or adjust (e.g., via a control system (not shown) selectively energizing through adjustable turbine-specific valves) the rate at which water effluent flows from each of its four water turbines, e.g., the rate at which effluents 206 and 207 flow from respective water turbines 208 and 209. The effluent from each of the embodiment's four water turbines produces a thrust that propels the embodiment in a respectively opposite direction. And, through a control of the differential rates at which water effluent flows from each of its four water turbines, the embodiment is able to produce a net and/or a directional thrust, and thereby self-propel itself across the surface 203 of the body of water on which the embodiment floats. Similarly, when the embodiment's control system equilibrates and/or equalizes the rate at which the effluent from each of the embodiment's four water turbines flows, then the embodiment tends to remain motionless and/or to passively drift with the ambient wind and water currents.

The embodiment 200 illustrated in FIG. 4 comprises, includes, incorporates, and/or utilizes, not only the electrical power producing WEC 201/202, it also comprises, includes, incorporates, and/or utilizes, a plurality, e.g., four, of autonomous hydrochloric acid production and sequestration shuttles, e.g., 218 and 220. Autonomous hydrochloric acid production and sequestration shuttle 218 is using its four thruster assemblies, three 221-223 of which are visible in the illustration of FIG. 4, in conjunction with its acoustic homing microphone array, e.g., 224-226, in order to locate and approach the relative position of one 217 of the WEC's pinging 219 electrical power transmission nodes. In response to the relative latencies with which the acoustic homing microphones of the acoustic homing microphone array of the autonomous hydrochloric acid production and sequestration shuttle detect the pinging 219 of the electrical power transmission node, the autonomous hydrochloric acid production and sequestration shuttle steers and propels itself toward that electrical power transmission node until it is adjacent to the electrical power transmission node.

The acoustic homing microphone array of the autonomous hydrochloric acid producing and sequestration shuttle 218 is comprised of four microphones, three 224-226 of which are visible in the illustration in FIG. 4, as well as an acoustic analysis control circuit (not shown). The acoustic analysis control circuit analyzes the relative latencies between the acoustic detection of each ping 219 by each respective microphone in the acoustic homing microphone array. Based, at least in part, on these relative acoustic signal detection latencies, the acoustic analysis control circuit makes alterations to the direction and magnitude of the thrust(s) produced by each of the autonomous hydrochloric acid producing and sequestration shuttle's four thruster assemblies, e.g., 221-223, so as to move a forward end (i.e., the end at which the microphones are connected, attached, and/or mounted) of the autonomous hydrochloric acid producing and sequestration shuttle toward the respective electrical power transmission node 217 (thereby tending to reduce both the absolute and relative latencies of the microphone-enabled acoustic signal detections to approximately zero).

An embodiment of the present disclosure utilizes electrical power transmission nodes, e.g., 217, each of which emits an acoustic signal, e.g., 219, of a unique frequency. Another embodiment of the present disclosure utilizes electrical power transmission nodes each of which emits acoustic signals of a unique acoustic pattern, e.g., each pattern comprised of a repeating mixture of relatively short "dots" and relatively long "dashes." And another embodiment of the present disclosure utilizes electrical power transmission nodes each of which emits acoustic signals at regular intervals but each of which offsets its acoustic signal by a phase offset, and/or interval, which temporally isolates its acoustic signal from the signals of its siblings and/or fellow embodiment-specific electrical power transmission nodes.

Autonomous hydrochloric acid producing and sequestration shuttle 220 is docked, attached, and/or electrically connected, to an electrical power transmission node (not visible) connected to the distal end of electrical power tether 212. The autonomous hydrochloric acid producing and sequestration shuttle uses its thruster assemblies, e.g., 227, in conjunction with an accelerometer and an inertial position sensor (not shown), in order to maintain an upright orientation (i.e., oriented such that its acoustic homing microphone array is upward). The autonomous hydrochloric acid producing and sequestration shuttle 220 also utilizes a strain and/or tension sensor to monitor the tension between the hydrochloric acid producing and sequestration shuttle and the electrical power transmission node to which it is connected. The hydrochloric acid producing and sequestration shuttle then uses its thruster assemblies so as to move toward the electrical power transmission node to which it is connected when the tension exceeds a threshold tension, and by moving and altering its relative position to the WEC 201/202, thereby reducing or eliminating such tension.

After it has physically and electrically connected to the "parent" WEC 201/202, the autonomous hydrochloric acid producing and sequestration shuttle 220 uses its acoustic homing microphone array, e.g., microphone 230, to determine a baseline relative volume of each WEC 201/202 reaction tube acoustic signal, e.g., 228, emitted by each of the WEC's respective acoustic pingers, e.g., 229, at the time that the autonomous hydrochloric acid producing and sequestration shuttle connects to a respective electrical power transmission node. Afterwards, if the relative volume of any of those reaction tube acoustic signals becomes louder than when the autonomous hydrochloric acid producing and sequestration shuttle connected to the electrical power transmission node, the autonomous hydrochloric acid producing and sequestration shuttle will use its thruster assemblies, e.g., 227, and its detection of the relative direction of the WEC based on the differential acoustic latencies detected by its acoustic homing microphone array, to move away from the source of the reaction tube acoustic signal, i.e., to move away from the WEC's reaction tube 202, thereby reducing the risk of a collision between the autonomous hydrochloric acid producing and sequestration shuttle and the WEC. On the other hand, if the relative volume of any of those reaction tube acoustic signals becomes more muted, weaker, and/or softer than when the autonomous hydrochloric acid producing and sequestration shuttle connected to the electrical power transmission node, and/or if a tension between the autonomous hydrochloric acid producing and sequestration shuttle and the electrical power transmission node to which it is connected increases to and/or beyond a threshold tension level, then the autonomous hydrochloric acid producing and sequestration shuttle will use its thruster assemblies, e.g., 227, to move closer to the source of the reaction tube acoustic signal, i.e., to move closer to the WEC's reaction tube.

Figure 5:
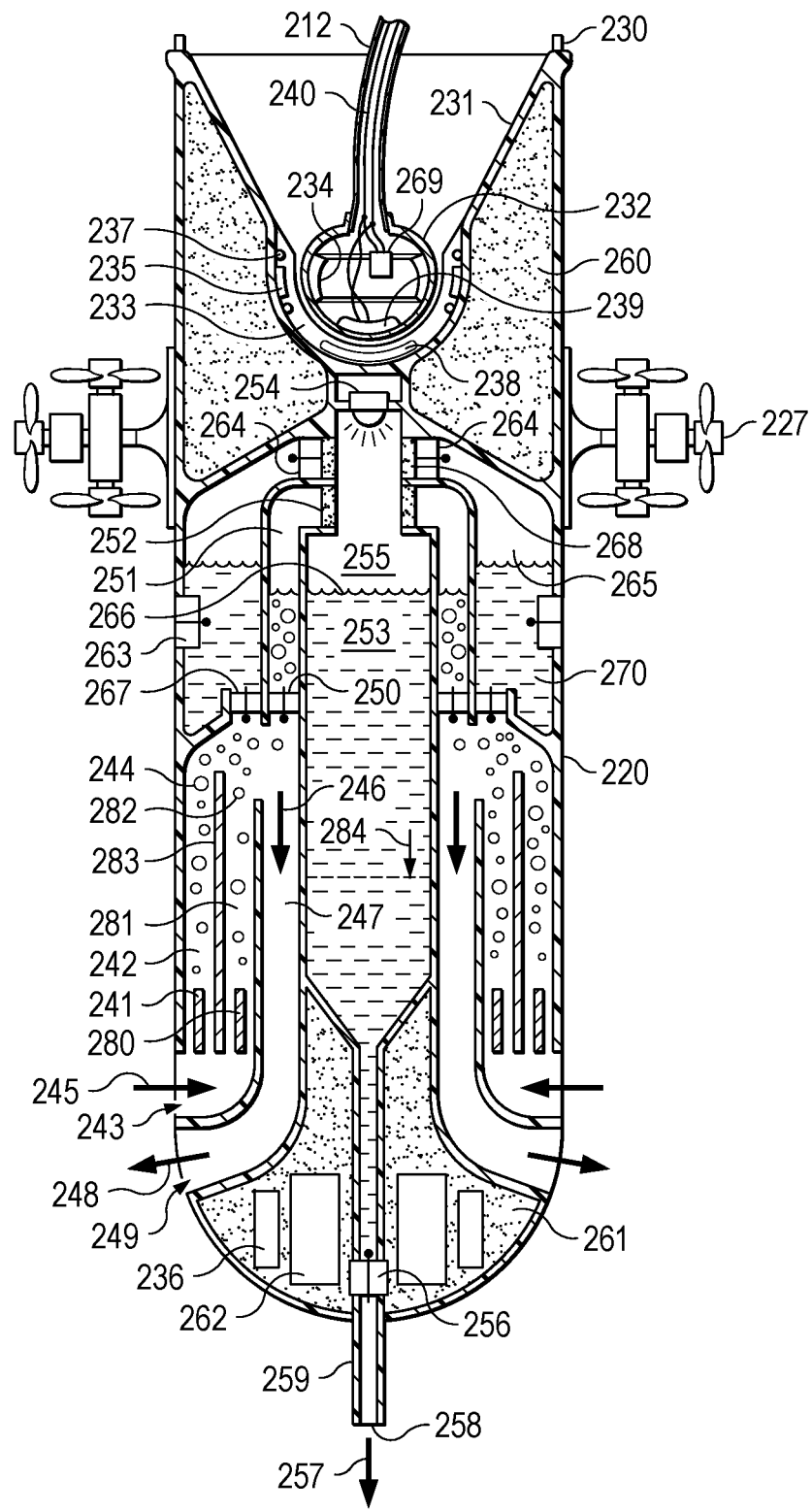
FIG. 5 is a side sectional view of an autonomous hydrochloric acid sequestration shuttle of the second embodiment.

FIG. 5 shows a side sectional view of an autonomous hydrochloric acid producing and sequestration shuttle 220 (i.e., the "shuttle" 220 in FIG. 4) of the second embodiment (200 in FIG. 4). The section plane is taken along section line 5-5 of FIG. 4.

The shuttle 220 has a frustoconical inclusion, recession, funnel, and/or scoop 231, into which an electrical power transmission node 232 (e.g., 217 in FIG. 4) can be captured by an "advancing" and/or "homing" (271 in FIG. 4) shuttle (i.e., a shuttle moving upwards with respect to the orientation of the illustration in FIG. 5) after the advancing shuttle "homes in" on the "pinging" sound emitted by the transmission node's internal pinger 269.

When an electrical power transmission node, e.g., 232, enters the shuttle's scoop 231, it comes to rest against a thin-walled magnetically-conductive node housing, "liner" and/or surface 233. An annular and/or equatorial ferrous ring 234 within the transmission node is attracted to a complementary annular and/or equatorial array of magnets 235 within the shuttle 220, and on an opposite side of the housing liner, which tends to stabilize the position and orientation of the electrical power transmission node against the housing liner 233 within the node housing.

The shuttle's 220 control system 236 is able to transmit signals to the respective WEC (201/202 in FIG. 4) through its energizing and deenergizing of a transformer coil of wire 238 the magnetic emanations of which create complementary patterns of energizing and deenergizing within a complementary, and operatively connected, transformer coil of wire 239 connected to electrical conductors and/or wires 240 inside the electrical power tether 212 that connects the electrical power transmission node 232 to the WEC and/or its control system (not shown).

Upon being notified by a signal from the shuttle 220, that the shuttle is electrically connected to the respective electrical power transmission node 232, the control system (not shown) of the WEC (201/202 in FIG. 4) enables the transmission of an alternating-current electrical power from the WEC, its power electronics (not shown), and/or its control system (not shown), into and/or through the electrical conductors of the respective electrical power tether 212 wherefrom they energize the transformer coil of wire 239 within the electrical power transmission node. In response to its energizing by the WEC, the transformer coil of wire 239 of the electrical power transmission node begins to emanate oscillating magnetic fields which interact with the shuttle's operatively-connected transformer coil of wire 238, thereby inducing an electrical power within that transformer coil of wires, and thereby energizing the shuttle (via the equivalent of an electrical transformer).

A portion of the electrical power supplied to the transformer coil of wire 238 of the shuttle 220 by the WEC (201/202 in FIG. 4) through the transformer coil of wires 239 of its respective electrical power transmission node 232, is transmitted to, and consumed by, electrolyzer electrodes, e.g., by a negatively-charged cathode 241, positioned within an outer 242 annular electrolysis chamber, and by a positively-charged anode 280, positioned within an inner 281 annular electrolysis chamber. Both the inner and outer annular electrolysis chambers are fluidly connected to the body of water (203 in FIG. 4) in which the shuttle floats, moves, and/or hovers through a first upper series of annular apertures, e.g., 243. The inner and outer electrolysis chambers are separated by a semi-permeable and microporous diaphragm 283. By the time the seawater from each of the inner and outer annular electrolysis chambers mixes and/or combines, a portion of evolved chlorine has manifested as bubbles of gas 282.

The electrodes of the shuttle's electrolyzer give rise to bubbles. Bubbles, e.g., 244, of hydrogen gas evolve at, and/or rise from, the cathodic electrode, 241. Bubbles, e.g., 282, of chlorine gas evolve at, and/or rise from, the anodic electrode, 280. As these bubbles rise, they create a rising buoyancy-driven water current within the seawater within the inner and outer annular electrolysis chambers 242 and 281 in the manner of an airlift pump. The bubble-driven water current within the annular electrolysis chambers causes fresh seawater, from the body of water (203 in FIG. 4), to be drawn 245 into the annular electrolysis chambers through the first upper series of annular apertures, e.g., 243, and to therefrom flow upward. And, the resulting inward and upward flow of seawater within the outer annular electrolysis chamber 242, causes any electrolysis-produced surplus of hydroxide ions in the seawater around the cathode to be diluted and removed from the shuttle before it can combine with any of the elemental and/or monatomic chlorine produced by the anodes. Likewise, the resulting inward and upward flow of seawater within the inner annular electrolysis chamber 281, causes any electrolysis-produced deficit of chloride ions to be corrected and replaced via the inflow of fresh seawater.

The bubble-driven water current within the inner 281 and outer 242 annular electrolysis chambers causes the seawater within the shuttle to flow vertically up and out of the annular electrolysis chambers, and to then flow horizontally around and/or over a bend in the annular electrolysis tank 247 and to then and/or therein flow 246 downward through an inner extension 247 of the consolidated annular electrolysis tank, and to thereafter flow 248 out of the annular electrolysis tank, and back into the body of water from whence it came through a second lower series of annular apertures, e.g., 249, in the annular electrolysis tank.

When an intake valve, e.g., 250, is open, hydrogen and chlorine gases produced by the electrolyzer electrodes 241 and 280 will flow into an annular intake duct 251, and therethrough flow through an annular ring of flashback arrestors, e.g., 252, (which inhibit the passage of an ignition event), and into an upper portion of a central ignition chamber 255. When initiated by the shuttle's control system 236, an ignition light source 254, e.g., an ultraviolet light source, is energized. The light produced and/or emitted by the ignition light source is of a frequency and/or wavelength sufficient to ignite the mixture of hydrogen and chlorine gases accumulated within an upper portion of the shuttle's 200 ignition chamber 255, thereby igniting those gases after which the resulting hydrogen chloride gas will enter a reservoir 253, positioned within a lower portion of that ignition chamber, thereby forming and/or increasing, the acidity of that reservoir, through a serial addition of hydrochloric acid thereto.

When the shuttle's control system 236 initiates a detachment of the shuttle from the WEC's electrical power transmission node 232 and prepares to initiate an increase in the depth of the shuttle, it first energizes a set of looped-wire electromagnets, e.g., 237, which counter the magnetic polarity of each respective magnet, e.g., 235, positioned within each respective looped-wire electromagnet, thereby producing a magnet polarity opposite that of the respective magnet, and thereby neutralizing the effective magnetic attraction of each respective magnet with its complementary and proximate portion of the electrical power transmission node's annular and/or equatorial ferrous ring 234, thereby releasing the respective electrical power transmission node, e.g., 232, from its magnetic attachment to the shuttle.

After separating from the electrical power transmission node 232 and descending to a greater depth (e.g., as determined by a pressure sensor, not shown), and a depth sufficient to rapidly neutralize and/or sequester the reservoir of hydrochloric acid solution for a long period of time, e.g., millennia, the shuttle's control system 236 opens discharge valve 256. The annularly-arrayed intake valves, e.g., 250, should still be open after the shuttle's descent. However, if they are closed, then the shuttle's control system opens one or more of them thereby enabling seawater within the annular electrolysis tank 242/281/247 to flow into the central ignition chamber 253/255. As a result of it having a greater density than seawater, and as a result of its hydroscopic character, the volume, pool, and/or reservoir 253, of hydrochloric acid within the shuttle's central ignition chamber 253/255 flows 257 down and out of the shuttle through an aperture 258 at a lower and/or distal end of an acid discharge tube 259.

The shuttle 220 comprises, includes, incorporates, and/or utilizes, foam-filled voids and/or chambers, e.g., 260 and 261, which provide buoyancy to offset the mass and/or weight of the submerged shuttle. The shuttle also comprises, includes, incorporates, and/or utilizes, batteries, e.g., 262, which it recharges when electrically connected to, and/or drawing electrical power from, the WEC (201/202 in FIG. 4) via one of the WEC's electrical power transmission nodes, e.g., 232.

After discharging its reservoir 253 of hydrochloric acid, and replacing that reservoir with seawater from the body of seawater (203 in FIG. 4), the shuttle's control system 236 opens an annularly-arrayed upper, e.g., 264, and lower, e.g., 263, ballast valves, which allow any gas trapped within the annular ballast chamber 265 to be evacuated into the central ignition chamber 255, after which the control system energizes the ignition light source 254 thereby igniting any such gas evacuated and/or purged from the annular ballast chamber, which converts that gas to additional hydrochloric acid thereby removing the gas, and eliminating the additional buoyancy of the gas. The buoyancy provided by the shuttle's foam-filled voids and/or chambers, e.g., 260 and 261, is sufficient to offset the mass and/or weight of the submerged shuttle and provide it with a neutral or positive buoyancy sufficient to permit the shuttle to rise and/or to control its position and orientation, through a use of its thruster assemblies, e.g., 227.

After discharging its reservoir 253 of hydrochloric acid, the shuttle 220 travels back toward the surface (203 in FIG. 4) of the body of water on which the WEC (201/202 in FIG. 4) floats, while guiding its ascent using its thrust assemblies, e.g., 227, so as to locate, and physically and electrically connect with, another (or the same) electrical power transmission node, e.g., 232, after which it will produce more hydrogen and chlorine gases, ignite them, and thereby convert another reservoir of seawater to one of a hydrochloric acid solution.

When the shuttle 220 connects to an electrical power transmission node, e.g., 232, after its ascent from a deep-water discharge of hydrochloric acid solution, its control system 236 will leave open discharge valve 256, and one or more of the annularly-arrayed intake valves, e.g., 250, thereby fluidly connecting the central ignition chamber 253 to the body of water (203 in FIG. 4) outside the shuttle. It will then produce enough hydrogen and chlorine gas 255 to lower an upper free surface 266 of seawater within the central ignition chamber down to a threshold initial reservoir level 284. When the reservoir is initialized with seawater up to, and/or at, level 284, then when its volume has been increased through an addition of hydrochloric acid, its final acid concentration will be approximately 36% by weight (i.e., wt %). At level 284, the water within the free surface between the gas and the seawater will be positioned above the upper ends, and/or tops, of the electrolyzer electrodes 241 and 280. After driving the level of seawater within the central ignition chamber down to level 284, the shuttle's control system closes the discharge valve 256 thereby preventing the escape of any additional seawater from the ignition chamber and thereby trapping therein the reservoir of seawater, and the ensuing acidified reservoir of hydrochloric acid solution, that the shuttle will produce.

The central ignition chamber 255/253 is fabricated and/or lined with an acid-resistant material, coating, and/or substance. The material, coating, and/or substance, of which the central ignition chamber is fabricated and/or comprised is thermally conductive so that heat created by, and/or resulting from, the repeated combustions of hydrogen and chlorine gases, as well as the subsequent heats of dissolution of the hydrogen chloride gases into solution, may be conducted, transmitted, and/or transferred, to the seawater flowing through the annular electrolysis tank 247, thus carrying that thermal energy into the body of water (203 in FIG. 4) outside the shuttle.

Other shuttle embodiments similar to the embodiment illustrated in FIGS. 4 and 5 will initialize their respective water reservoirs so as to produce, and subsequently discharge at depth, filled acidic reservoirs of other acid concentrations, e.g., of 24 wt %, 30 wt %, and 38 wt %. The scope of the present disclosure is not limited by the concentration of hydrochloric acid solution produced and/or discharged at depth.

As the shuttle produces and accumulates hydrochloric acid within its ignition-chamber reservoir 253, the density of the increasingly acidic reservoir 253 of hydrochloric acid solution exceeds that of the original reservoir of unadulterated seawater by an ever-increasing degree. And, the density and weight of its reservoir of hydrochloric acid solution increases to ever greater degrees, so too the density and weight of the shuttle increases to ever greater degrees. If uncorrected, a shuttle's increasingly negative density could require an increasingly great expenditure of electrical power by its thruster assemblies, e.g., 227, in order to maintain its relative position with respect to a respective WEC (201/202 in FIG. 4) and with respect to a respective electrical power transmission node, e.g., 232.

In order to moderate the destabilizing effects of an increasingly dense and heavy reservoir 253 of hydrochloric acid solution on the buoyancy of the shuttle, the shuttle's control system 236 will occasionally, and/or as needed in response to an increase in required thruster activity, initiate a "deballasting operation."

At the initiation of, and during, a deballasting operation, the shuttle's control system 236 will ensure that, and/or cause, the shuttle's 220 ignition light source 254 to remain unenergized and/or "dark", thereby preventing an ignition of hydrogen and chlorine gases produced by the shuttle's electrolyzer electrodes 241 and 281, and of the hydrogen and chlorine gases accumulated within the central ignition chamber 255.

At the initiation of, and during, a deballasting operation, the shuttle's control system 236 will also open the intake valves, e.g., 250, and/or ensure that those valves are and remain open, thereby permitting bubbles, e.g., 244 and 282, of hydrogen and chlorine gases, to flow from the annular electrolysis chambers 242 and 281 into the annular intake duct 251.

At the initiation of, and during, a deballasting operation, the shuttle's control system 236 will also open the annularly-arrayed upper ballast valves, e.g., 264, which fluidly connect the annular ballast chamber 265 to the central ignition chamber 255, and/or ensure that those valves are and remain open, thereby permitting hydrogen and chlorine gases within the central ignition chamber to flow from the central ignition chamber and into the annular ballast chamber.

At the initiation of, and during, a deballasting operation, the shuttle's control system 236 will also close the annularly-arrayed lower ballast valves, e.g., 263, connecting the annular ballast chamber 265 to the body of water (203 in FIG. 4) outside the shuttle 220, and/or ensure that those valves are and remain closed, thereby preventing hydrogen and chlorine gases within the annular ballast chamber to flow out of that annular ballast chamber and into the body of water.

At the initiation of, and during, a deballasting operation, the shuttle's control system 236 will also open the annularly-arrayed deballasting valves, e.g., 267, and/or ensure that those valves are and remain open, thereby permitting seawater 270 within the annular ballast chamber 265 to flow from the annular ballast chamber and down and into the annular electrolysis tank 242/281/247 as hydrogen and chlorine gases are added to the annular ballast chamber (while also permitting bubbles, e.g., 244 and 282, of hydrogen and chlorine gases produced by the electrolyzer electrodes 241 and 280 to flow directly from the annular electrolysis chambers 242 and 281 into the annular ballast chamber) via those open annularly-arrayed deballasting valves.

When the control system 236 determines that the hydrogen and chlorine gases accumulated within the annular ballast chamber 265 are sufficient to adequately equilibrate the shuttle's 220 buoyancy, and to thereby re-establish a sufficiently neutral shuttle buoyancy, then the shuttle's control system will close the annularly-arrayed ballast valves, e.g., 264, connecting the annular ballast chamber 265 to the central ignition chamber 255; and close the annularly-arrayed deballasting valves, e.g., 267, thereby preventing a further inflow of hydrogen and chlorine gas bubbles, e.g., 244 and 282, from, and a further outflow of seawater 270 to, the annular electrolysis tank 247.

Any inadvertent ignition of the gas 255 within the central ignition chamber during a deballasting operation, i.e., while any one of the annularly-arrayed ballast valves, e.g., 264, is open, and hydrogen and chlorine gases are present within the annular ballast chamber 265, might damage that annular ballast chamber (and/or require the cost and/or expenditure of additional monies over-building its walls to withstand such a blast). To prevent an inadvertent ignition of hydrogen and chlorine gases within the annular ballast chamber, e.g., during a deballasting operation, each of the annularly-arrayed ballast valves is provided, outfitted, and/or equipped, with a flashback arrestor, e.g., 268, to prevent any ignition of gases 255 within the central ignition chamber from propagating into, and igniting, gases within the annular ballast chamber.

At the moment that a shuttle 220 discharges its reservoir 253 of hydrochloric acid solution, its annular ballast chamber 265 will nominally contain enough gas to at least partially offset the added weight and density of the discharged hydrochloric acid. And, at the time of discharge, especially given the absence of fluid communication with the body of water (203 in FIG. 4) outside the shuttle, and the head pressure thereof, the annular ballast chamber will typically contain its maximum amount of gas and provide its maximal amount of positive buoyancy.

At the moment of hydrochloric-acid discharge, or soon thereafter, the shuttle's control system 236 initiates a "re-ballasting operation" in which it opens the annularly-arrayed upper, e.g., 264, and lower, e.g., 263, ballast valves, as well as the annularly-arrayed deballasting valves, e.g., 267, thereby allowing seawater to flow from the water outside the shuttle and into the annular ballast chamber 265, thereby causing any hydrogen and chlorine gases trapped therein to flow, and/or to be evacuated, into the central ignition chamber 255. While forcing gases within the annular ballast chamber to flow into the central ignition chamber, and while gases within the annular intake duct 251 remain free to passively flow into the central ignition chamber, the shuttle's control system 236 energizes the ignition light source 254 thereby igniting hydrogen and chlorine gases present within the central ignition chamber, as well as those gases which flow into it from the annular ballast chamber and the annular intake duct, thereby eliminating most, if not all, of those gases, and eliminating their buoyancy.

The re-ballasting operation tends to remove all significant amounts of hydrogen and chlorine gases from the shuttle thereby restoring its nominal, e.g., "non-acidified," neutral, and/or positive buoyancy prior to, and/or during, its ascent. Another embodiment similar to the one illustrated in FIGS. 4 and 5 preserves all, or a portion, of the gases within its annular ballast chamber 265 after a discharge of its hydrochloric acid in order to speed its ascent, for a part and/or for all of its ascent.

Likewise, another shuttle embodiment, similar to the one illustrated in FIGS. 4 and 5, performs a re-ballasting operation prior to, and/or during, its descent, i.e., while its buoyancy is offset, and made maximally negative, by the added weight of its load of hydrochloric acid, thereby removing the buoyancy-neutralizing and/or buoyancy-restoring effect of its gas-filled, and positively buoyant, annular ballast chamber, thereby speeding its descent, for part and/or for all of its descent.

Autonomous hydrochloric acid producing and sequestration shuttles, e.g., 220, of the present disclosure that are similar to the ones illustrated in FIGS. 4 and 5 trigger an ignition, combustion, and/or reaction, of hydrogen and chlorine gases within their respective combustion chambers 255, using light sources of wavelengths other than ultraviolet, other electrical phenomena, and other catalysts of the exothermic hydrogen and chlorine chemical reaction. The scope of the present disclosure includes embodiments incorporating, utilizing, and/or including, any and all means, devices, signals, triggers, and/or physical phenomena, which are able to cause hydrogen and chlorine gases to react and thereby form hydrogen chloride gas.

Autonomous hydrochloric acid producing and sequestration shuttles, e.g., 220, of the present disclosure that are similar to the ones illustrated in FIGS. 4 and 5, incorporate, utilize, and/or include, electrolyzers which incorporate, utilize, and/or include, diaphragms comprised of porous mixtures of asbestos and polymers. Autonomous hydrochloric acid producing and sequestration shuttles of the present disclosure that are similar to the ones illustrated in FIGS. 4 and 5, do not include any diaphragm or membrane between anode and cathode elements.

Autonomous hydrochloric acid producing and sequestration shuttles, e.g., 220, of the present disclosure that are similar to the ones illustrated in FIGS. 4 and 5, incorporate, utilize, and/or include, an electrolyzer cathode comprised of steel. Autonomous hydrochloric acid producing and sequestration shuttles of the present disclosure that are similar to the ones illustrated in FIGS. 4 and 5, incorporate, utilize, and/or include, electrolyzers incorporating, utilizing, and/or including steel cathodes having exterior coatings of nickel. Autonomous hydrochloric acid producing and sequestration shuttles of the present disclosure that are similar to the ones illustrated in FIGS. 4 and 5, incorporate, utilize, and/or include, an electrolyzer cathode comprised of a flat hollow steel mesh or perforated steel sheet covered with asbestos fibers and fibrous polytetrafluoro-ethylene (PFTE), wherein the asbestos fibers and fibrous PFTE function as the electrolyzer diaphragm. Autonomous hydrochloric acid producing and sequestration shuttles of the present disclosure that are similar to the ones illustrated in FIGS. 4 and 5, incorporate, utilize, and/or include, electrolyzer cathodes coated with a catalyst such as, but not limited to, nickel-sulfur, nickel-aluminum, nickel-nickel-oxide, platinum-group metals, to increase the cathode's surface area and reduce the hydrogen evolution potential.

Autonomous hydrochloric acid producing and sequestration shuttles, e.g., 220, of the present disclosure that are similar to the ones illustrated in FIGS. 4 and 5, incorporate, utilize, and/or include, electrolyzer anodes comprised of titanium plates covered with layers of Group VIII oxides with metal conductivity (e.g., covered with exterior coatings of ruthenium oxide and/or titanium oxide), and sometimes including iridium oxide.

Autonomous hydrochloric acid producing and sequestration shuttles, e.g., 220, of the present disclosure that are similar to the ones illustrated in FIGS. 4 and 5, incorporate, utilize, and/or include, electrolyzers fluidly connected, e.g., by "descaling" valves, to respective hydrochloric acid reservoirs, e.g., within respective combustion chambers. Periodically, an embodiment control system opens a respective descaling valve and thereby permits a relatively small amount and/or quantity of hydrochloric acid solution to flow from a respective hydrochloric acid solution reservoir into the respective cathodic portion and/or chamber of the respective seawater electrolyzer thereby dissolving and/or flushing from the cathodic chamber any precipitates of calcium hydroxide and/or magnesium hydroxide. The illustrations and discussions of FIGS. 4 and 5 omit, for the sake of clarity, such obvious and mundane precipitant-flushing mechanisms, devices, and/or systems.

Autonomous hydrochloric acid producing and sequestration shuttles, e.g., 220, of the present disclosure that are similar to the ones illustrated in FIGS. 4 and 5, incorporate, utilize, and/or include, seawater electrolyzer chambers and/or housings comprised, at least in part, of polyvinyl chlorides, and/or PVCs, as materials of construction and/or fabrication.

Autonomous hydrochloric acid producing and sequestration shuttles, e.g., 220, of the present disclosure that are similar to the ones illustrated in FIGS. 4 and 5, are moored, as well as those that are free-floating and self-propelled. The illustrations and discussions of FIGS. 4 and 5 omit, for the sake of clarity, the obvious and mundane features and mechanisms required of moored embodiments, as well as the obvious and mundane features and mechanisms required that may be used in an embodiment in order to increase its ability to self-propel. For instance, the present invention includes, but is not limited to, embodiments, similar to the one illustrated in FIGS. 4 and 5, that incorporate, utilize, and/or include, propellers rotated by electrical motors that are energized, at least in part, by electrical power produced by respective embodiments; and, rigid sails rotatably connected to upper parts of respective embodiments and rotated by electrical motors that are energized, at least in part, by electrical power produced by respective embodiments.

Autonomous hydrochloric acid producing and sequestration shuttles, e.g., 220, of the present disclosure that are similar to the ones illustrated in FIGS. 4 and 5, store hydrochloric acid solutions within storage tanks and/or chambers within, on, affixed to, and/or connected to, those respective embodiments, with those storage tanks adapted to facilitate a removal of hydrochloric acid from those storage tanks by other vessels and/or facilities.

Autonomous hydrochloric acid producing and sequestration shuttles, e.g., 220, of the present disclosure that are similar to the ones illustrated in FIGS. 4 and 5, produce hydrochloric acid, and/or other acids, by means of a chemical process and/or electrolysis acting upon seawater and energized by electrical power produced by the respective embodiments through their extraction and conversion of energies harvested from ambient winds and/or waves. Autonomous hydrochloric acid producing and sequestration shuttles of the present disclosure that are similar to the ones illustrated in FIGS. 4 and 5, produce hydrochloric acid, and/or other acids, from seawater, utilizing methods, processes, and/or apparatuses, not specified, enumerated, and/or included within the present disclosure. Autonomous hydrochloric acid producing and sequestration shuttles, e.g., 220, of the present disclosure that are similar to the ones illustrated in FIGS. 4 and 5, transfer, move, and/or transport hydrochloric acid, and/or other acids, to parts and/or portions of an ocean far below the surface utilizing methods, processes, and/or apparatuses, not specified, enumerated, and/or included within the present disclosure.

Figure 6:
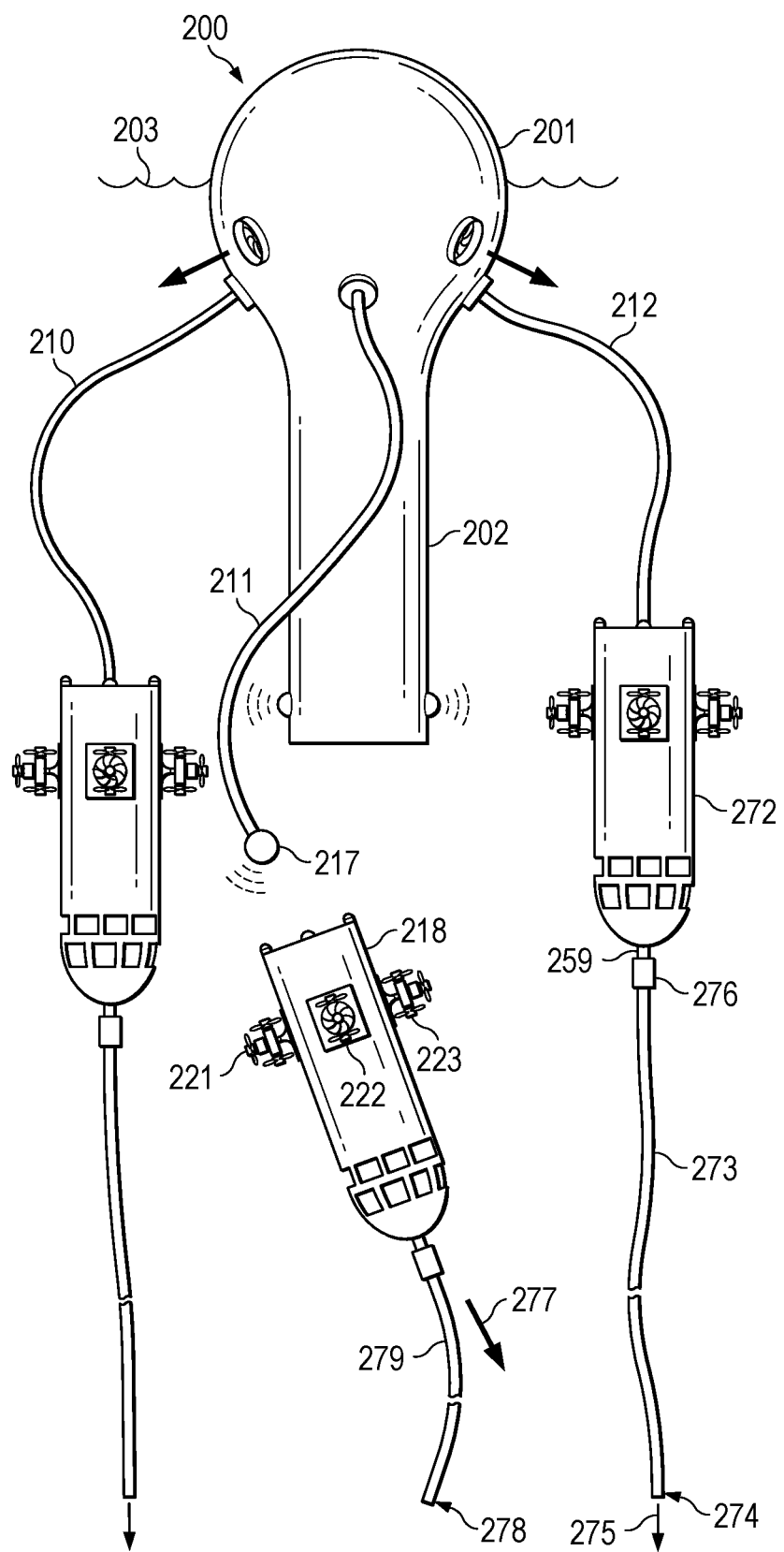
FIG. 6 is a side view of a second configuration of the second embodiment of the present invention.

FIG. 6 shows a perspective side view of a hydrochloric-acid producing and sequestration embodiment 200 similar, if not identical, to the one that is illustrated in FIGS. 4 and 5. However, unlike the embodiment of FIGS. 4 and 5, the embodiment illustrated in FIG. 6 is configured and/or adapted to maintain relatively longer-term electrical connections to its respective shuttles, e.g., 272, and its respective shuttles are adapted and/or configured to periodically discharge to depth their reservoirs of hydrochloric acid solution through permanently attached and/or fluidly connected flexible acid-resistant acid discharge hoses, e.g., 273, instead of, as in the case of the embodiment illustrated in FIGS. 4 and 5, by disconnecting the shuttles and moving those shuttles to depth such that those shuttles directly discharge their hydrochloric acid solutions into deep alkaline water.

The shuttles of both the first configuration, illustrated in FIGS. 4 and 5, and the second configuration, illustrated in FIG. 6, utilize the energy provided to them by a respective WEC 201/202 to electrolyze seawater, and to thereby produce hydrochloric acid, which they then store within respective internal hydrochloric acid reservoirs (253 of FIG. 5).

The shuttles (e.g., 220 of FIG. 4) of the first configuration, illustrated in FIGS. 4 and 5, disconnect from their respective electrical power transmission nodes (e.g., 217 of FIG. 4), when their respective reservoirs (253 of FIG. 5) of hydrochloric acid solution are sufficiently full, and/or when their acidity is within a preferred range of pH, and they then descend to a depth no less than a depth required to sequester and/or neutralize their payloads of hydrochloric acid solution following discharge. After they arrive at a sufficiently great depth, the shuttles of the first configuration, illustrated in FIGS. 4 and 5 discharge their respective reservoirs of hydrochloric acid solution into the ambient seawater (thereby sequestering and neutralizing the acidity of the discharged hydrochloric acid solution) and they then return to a lesser depth and reconnect to an available electrical power transmission node (e.g., 217 of FIG. 4) of the same or another WEC 201/202 to begin another hydrochloric-acid production and sequestration cycle.

By contrast, the shuttles, e.g., 272, of the second configuration, illustrated in FIG. 6, remain operatively and electrically connected to respective electrical power transmission nodes, e.g., 217, of a respective WEC 201/202, for a relatively long period of time, i.e., they do not disconnect from their respective electrical power transmission node in order to discharge a filled and/or full reservoir of hydrochloric acid solution to a sufficiently great depth. When a shuttle, e.g., 272, of the second configuration, illustrated in FIG. 6, fills its reservoir (253 of FIG. 5) with hydrochloric acid solution, and/or when that reservoir of hydrochloric acid solution has reaches a pH within a range of desirable discharge pH, instead of disconnecting from its respective electrical power transmission node, e.g., 217, descending to depth, and there discharging its acidic contents, it instead remains attached, and/or electrically connected, to its respective electrical power transmission node, and while connected to its respective electrical power transmission node, the shuttle discharges its reservoir of hydrochloric acid solution into an acid discharge hose, e.g., 273. The distal end, e.g., 274, of which is positioned at a significant and sufficient depth, e.g., a depth of approximately 3 kilometers, thereby causing the hydrochloric acid solution discharged, e.g., 275, from an aperture and/or mouth, e.g., 274, at the distal and/or lower end of the acid discharge hose to be sequestered, and/or neutralized, in those nominally alkaline deep-sea waters.

An acid discharge hose, e.g., 273, is attached, fluidly connected, and/or operatively connected, to a shuttle's discharge tube (259 in FIG. 5) by an acid discharge hose connector, e.g., 276.

The pattern of operations characteristic of a shuttle, e.g., 272, of the second configuration, illustrated in FIG. 6, is similar to that of a shuttle, e.g., 220 of FIG. 4, of the first configuration, with the exception that a shuttle of the second configuration does not detach from its respective WEC 201/202, and transit to a significant depth, in order to discharge its reservoir of hydrochloric acid solution.

Instead, a shuttle, e.g., 272, of the second configuration remains at a relatively shallow depth, and remains electrically connected to a respective electrical power transmission node, e.g., 217, and therefrom discharges its respective filled reservoirs of hydrochloric acid solution. The hydrochloric acid solutions discharged by a shuttle of the second configuration flow into, through, and out from, e.g., 275, a lower end, e.g., 274, of an acid discharge hose, e.g., 273, thereby obviating the need for the shuttle to descend so as to directly discharge its reservoirs of hydrochloric acid solution at the same or similar depth from which the reservoir of hydrochloric acid solution will be discharged upon its outflow from the lower end of a respective acid discharge hose.

When a shuttle, e.g., 272, of the second configuration, illustrated in FIG. 6, during its execution of an "acidification operation" has filled its reservoir of hydrochloric acid solution to a sufficient degree, and/or lowered the pH of that reservoir to a sufficient acidity level, then it initiates a "hose discharge operation."

In preparation for a hose discharge operation, the shuttle's control system 236 opens its discharge valve (256 in FIG. 5), thereby permitting hydrochloric acid solution within its hydrochloric acid reservoir (253 of FIG. 5) to flow into and through the shuttle's discharge tube (259 in FIG. 5), and therethrough out of an aperture (258 in FIG. 5) at a lower and/or distal end of that discharge tube, and therethrough into and through the shuttle's acid discharge hose connector, e.g., 276, and therethrough into and through the shuttle's acid discharge hose 273, and therethrough out of 275 an aperture at the distal end, e.g., 274, of the acid discharge tube. Furthermore, during a hose discharge operation, the shuttle's control system leaves "dark" and unenergized the ignition light source (254 in FIG. 5) allowing hydrogen and chlorine gases produced by the shuttle's electrolyzer electrodes (e.g., 241 in FIG. 5) to accumulate within an upper portion of the shuttle's ignition chamber (255 in FIG. 5). In order to facilitate a migration of hydrogen and chlorine gases produced by the shuttle's electrolyzer electrodes into the shuttle's ignition chamber, the shuttle's control system opens, and/or keeps open, the shuttle's intake valves (e.g., 250 in FIG. 5).

As hydrogen and chlorine gases are produced by the shuttle's electrolyzer electrodes (241 and 280 in FIG. 5), and as they accumulate within the shuttle's ignition chamber (255 in FIG. 5), the hydrochloric acid solution within the shuttle's hydrochloric acid reservoir (253 of FIG. 5) is gradually displaced downward and caused to flow into and through the shuttle's acid discharge tube (259 in FIG. 5). As the hydrochloric acid reservoir empties into the acid discharge hose, and therethrough into the depths of the ocean below the shuttle, the buoyancy of the shuttle will steadily increase, requiring the shuttle to expend an increasingly great amount of energy (transmitted electrically from the respective WEC 201/202) powering its thrusters, e.g., 221-223, in order to maintain the shuttle's nominal position and orientation adjacent to its respective WEC.

As hydrogen and chlorine gases produced by the shuttle's electrolyzer electrodes (e.g., 241 in FIG. 5) accumulate within the shuttle's hydrochloric acid reservoir (255 of FIG. 5), and the hydrochloric acid solution therein is pushed downward, the opened intake valves (e.g., 250 in FIG. 5) permit the hydrogen and chlorine gases to accumulate to an equivalent depth, level, and/or height, within the shuttle's annular intake duct (251 in FIG. 5), and within the annular electrolysis tank 242/247.

An upper pressure sensor (not shown) in an upper portion of the interior of the shuttle's hydrochloric acid reservoir tank, and a complementary lower pressure sensor (not shown) in a lower portion of the interior of the shuttle's hydrochloric acid reservoir tank, provide pressure data that permits the shuttle's control system (236 in FIG. 5) to determine the position, level, height, and/or depth, of the free surface (266 in FIG. 5) of the hydrochloric acid solution within the shuttle's hydrochloric acid reservoir (253 of FIG. 5). When, during the execution of a hose discharge operation, the level of the free surface of the hydrochloric acid solution within the shuttle's hydrochloric acid reservoir has reached a threshold level that is below the level of the intake valves (e.g., 250 in FIG. 5), but above the top of an electrode (e.g., 241 in FIG. 5) within the shuttle's annular electrolysis tank, then the shuttle's control system halts the hose discharge operation, and initiates a "discharge dilution operation," in order to maintain a complete seawater immersion of the electrodes in the shuttle's annular electrolysis tank. This discharge dilution operation results in a temporary cessation of any further discharge of hydrochloric acid solution, and results in an addition of seawater to the interior of the central ignition chamber (255 in FIG. 5) which dilutes and/or diminishes the acidity of the remaining hydrochloric acid solution therein.

In preparation for a discharge dilution operation, the shuttle's control system (236 in FIG. 5) closes the discharge valve (256 in FIG. 5) thereby halting the further discharge of hydrochloric acid solution from the shuttle's hydrochloric acid reservoir (253 of FIG. 5). The shuttle's control system ensures that the annularly-arrayed deballasting valves (e.g., 267 in FIG. 5) are closed. The shuttle's control system closes the intake valves (e.g., 250 in FIG. 5), and opens the annularly-arrayed upper (e.g., 264 in FIG. 5), and lower (e.g., 263 in FIG. 5), ballast valves. The shuttle's control system then activates, and/or energizes, the ignition light source (254 in FIG. 5) in order to create a flash of ultraviolet light, thereby combusting the hydrogen and chlorine gases within the central ignition chamber (255 in FIG. 5), i.e., combusting the gases that the control system routed to, and accumulated within, the central ignition chamber (255 in FIG. 5) while pushing hydrochloric acid solution from the hydrochloric acid reservoir (253 in FIG. 5) and into the acid discharge hose, e.g., 273.

The hydrogen chloride gas resulting from the combustion of the hydrogen and chlorine gases within the central ignition chamber (255 in FIG. 5) makes contact with, and is absorbed and/or dissolved into, the hydrochloric acid solution remaining within the hydrochloric acid reservoir (253 in FIG. 5) and positioned in a lower portion of the central ignition chamber (255 in FIG. 5), the combustion of the hydrogen and chlorine gases within the central ignition chamber creates a partial vacuum therein. This partial vacuum draws into an upper portion of the central ignition chamber (255 in FIG. 5), first hydrogen and chlorine gases located within an upper portion of the annular ballast chamber (265 in FIG. 5), gases that were protected from combustion by the flashback arrestors (e.g., 268 in FIG. 5), and then seawater within that annular ballast chamber. As gases and seawater flow from the annular ballast chamber into the central ignition chamber, the annular ballast chamber becomes substantially, if not completely, filled with seawater, including seawater drawn into the annular ballast chamber through the shuttle's annularly-arrayed lower ballast valves (e.g., 263 in FIG. 5). This replacement of hydrogen and chlorine gases within the annular ballast chamber (265 in FIG. 5) with seawater helps to balance the buoyancy of the shuttle following the discharge of hydrochloric acid solution from its hydrochloric acid reservoir (253 in FIG. 5).

As (the relatively modest) volume of hydrogen and chlorine gases, and the virtually endless supply of seawater, are transferred from the annular ballast chamber (265 in FIG. 5) to the central ignition chamber (255 in FIG. 5), the free surface (266 in FIG. 5) of the hydrochloric acid solution within the shuttle's hydrochloric acid reservoir (253 of FIG. 5) tends to rise. When the data and/or sensor readings provided to the shuttle's control system (236 in FIG. 5) by the shuttle's upper (not shown) and lower (not shown) ignition-chamber pressure sensors indicate that the free surface of the hydrochloric acid reservoir has risen to a level near, but still below, the annular ring of flashback arrestors (e.g., 252 in FIG. 5), and/or the annularly-arrayed upper ballast valves (e.g., 264 in FIG. 5), that fluidly connect the central ignition chamber to the annular ballast chamber (265 in FIG. 5), then the shuttle's control system closes the annularly-arrayed upper (e.g., 264 in FIG. 5), and lower (e.g., 263 in FIG. 5), ballast valves; re-opens the intake valves (e.g., 250 in FIG. 5); and leaves "dark" and/or unenergized the ignition light source (254 in FIG. 5).

The hydrogen and chlorine gases accumulated within the annular electrolysis tank (242/281/247 in FIG. 5) during the initial phase of the hose discharge operation, and trapped therein while the intake valves (e.g., 250 in FIG. 5) were closed, are now released and flow upward into and through the annular intake duct (251 in FIG. 5), and therethrough into the central ignition chamber (255 in FIG. 5), thereby tending to pressurize the now-significantly-diluted hydrochloric acid solution within the shuttle's hydrochloric acid reservoir (253 of FIG. 5).

The shuttle's control system (236 in FIG. 5) reinitiates the hose discharge operation by reopening the discharge valve (256 in FIG. 5), thereby permitting the pressurized hydrochloric acid solution within the shuttle's hydrochloric acid reservoir (253 of FIG. 5) to again flow downward through the shuttle's discharge tube (259 in FIG. 5), and therefrom into and through the shuttle's acid discharge hose, e.g., 273. And, as the shuttle continues to produce hydrogen and chlorine gases, and as those gases continue to accumulate within the central ignition chamber (255 in FIG. 5), the diluted hydrochloric acid solution within the shuttle's hydrochloric acid reservoir (253 of FIG. 5) will be pushed down and out of the central ignition chamber.

When the shuttle's control system (236 in FIG. 5) again determines that the free surface (266 in FIG. 5) of the hydrochloric acid solution within the shuttle's hydrochloric acid reservoir (253 of FIG. 5) has again fallen to a level approaching that of the top of one of the electrodes (e.g., 241 and 280 in FIG. 5) within the annular electrolysis chambers (242 and 281 in FIG. 5), then the control system halts the hose discharge operation, and initiates and executes another discharge dilution operation.

When, during a hose discharge operation, the shuttle's control system (236 in FIG. 5) determines that no subsequent discharge dilution operation is required before initiating another acidification operation (e.g., because the hydrochloric acid solution is sufficiently dilute and/or of sufficiently neutral pH and/or acidity), it initiates and executes an "initialization operation." This operation is similar to a hose discharge operation, and, during an initialization operation, the shuttle pumps diluted hydrochloric acid solution from the shuttle's hydrochloric acid reservoir (253 of FIG. 5) as it would during any other hose discharge operation. However, during an initialization operation, the discharge of fluid from the shuttle's hydrochloric acid reservoir is halted when the free surface (266 in FIG. 5) of the fluid within the hydrochloric acid reservoir reaches the level (284 in FIG. 5) marking the height of the reservoir free surface appropriate to the start of an acidification operation.

In other words, instead of halting a hose discharge operation, and initiating a discharge dilution operation, when the shuttle's control system (236 in FIG. 5) determines that the free surface (266 in FIG. 5) of the hydrochloric acid solution within the shuttle's hydrochloric acid reservoir (253 of FIG. 5) has fallen to a first level approaching that of the top of one of the electrodes (e.g., 241 and 280 in FIG. 5), the control system instead halts the executing hose discharge operation, and initiates an initialization operation, when the shuttle's control system determines that the free surface of the (diluted) hydrochloric acid solution within the shuttle's hydrochloric acid reservoir (253 of FIG. 5) has fallen to a second level (284 in FIG. 5), wherein the second level denotes a nominal, desired, and/or threshold, level of the free surface of the (diluted) hydrochloric acid solution within the shuttle's hydrochloric acid reservoir suitable for the addition of an amount of hydrochloric acid required to acidify the fluid within the hydrochloric acid reservoir to the desired pH and/or acidity with the resulting properly acidified hydrochloric acid solution having a volume not in excess of the volume provided by the central ignition chamber (255 in FIG. 5).

The control system (236 in FIG. 5) halts the hose discharge operation when the free surface (266 in FIG. 5) of the hydrochloric acid solution within the shuttle's hydrochloric acid reservoir (253 of FIG. 5) has fallen to the second level (284 in FIG. 5) so that the increase in the volume of the fluid within the hydrochloric acid reservoir that will occur during its acidification, during an acidification operation, will bring the free surface of the fully acidified hydrochloric acid solution within the shuttle's hydrochloric acid reservoir (253 of FIG. 5) to a nominal, desired, and/or threshold, level, where it will be appropriate to initiate another hose discharge operation.

When the initialization operation has brought the level (266 of FIG. 5) of the fluid within the hydrochloric acid reservoir (253 of FIG. 5) to the second level (284 in FIG. 5), the shuttle's control system (236 in FIG. 5) closes the discharge valve and initiates and/or resumes an acidification operation.

The operation of shuttles, e.g., 272, of the second configuration, as illustrated in FIG. 6, are characterized by four operational modalities. When such a shuttle initiates and executes an acidification operation, it uses energy extracted from the motion of ocean waves to convert hydronium (H3O+) and chloride (Cl−) ions in seawater into hydrogen and chlorine gases. It then combusts those gases to convert them into hydrogen chloride gas which then dissolves into aqueous solution to form hydrochloric acid. When the resulting reservoir of hydrochloric acid solution in such a shuttle has reached a requisite volume and/or a requisite pH and/or acidity, the shuttle initiates and executes a hose discharge operation. And, when, during that hose discharge operation, a requisite and/or threshold volume of hydrochloric acid solution has been discharged (and before the electrodes (e.g., 241 and 280 in FIG. 5) are exposed to gas, and/or removed from their respective seawater baths) the shuttle initiates and executes a discharge dilution operation to restore the free surface (266 of FIG. 5) of the fluid within the hydrochloric acid reservoir (253 of FIG. 5) to a level greater than the first and/or second levels (i.e., level 284 in FIG. 5, that denotes, marks, and/or specifies, a fluid volume great enough to permit a continuation of a hose discharge operation or of an initialization operation). The shuttle may then conduct one or more, or none, additional hose-discharge and discharge-dilution pairs of operations. On what would otherwise be a last iteration of a hose discharge operation, the control system initiates and executes an initialization operation in which it halts the discharge of fluid from the shuttle's hydrochloric acid reservoir (253 of FIG. 5) so that the resulting level (284 of FIG. 5) of the free surface (266 in FIG. 5) of the fluid remaining in the hydrochloric acid reservoir is appropriate for the initiation and execution of another acidification operation.

Periodically, e.g., once every year, a shuttle, e.g., 218, of the second configuration, illustrated in FIG. 6, will initiate and execute a "hose replacement operation," which it will initiate by disconnecting from its respective electrical power transmission node, e.g., 217, and using its thrusters, e.g., 221-223, to move, e.g., 277, away from the respective WEC 201/202. When it disconnects from the WEC, its access to electrical power produced by the WEC will end and it will rely on its internal batteries (e.g., 262 in FIG. 5) to power its thrusters. During a hose replacement operation, the shuttle will stop producing hydrogen and chlorine gases by electrolysis of seawater. And, during a hose replacement operation there will be no active pumping of hydrochloric acid solution from the distal and/or lower end, e.g., 278, of its respective acid discharge hose, e.g., 279.

During a hose replacement operation, the shuttle will travel to a support vessel, a port facility, a sea platform, etc., wherefrom it can be fitted with a new acid discharge hose, e.g., 279, and whereat it can be examined, tested, repaired, and/or rebuilt, as needed. After which, the shuttle, e.g., 218, will travel to the same, or to a new, WEC 201/202 having an available, open, and/or unoccupied, electrical power transmission node, e.g., 217, and will there connect to that available electrical power transmission node and initiate an acidification operation.

Figure 7:
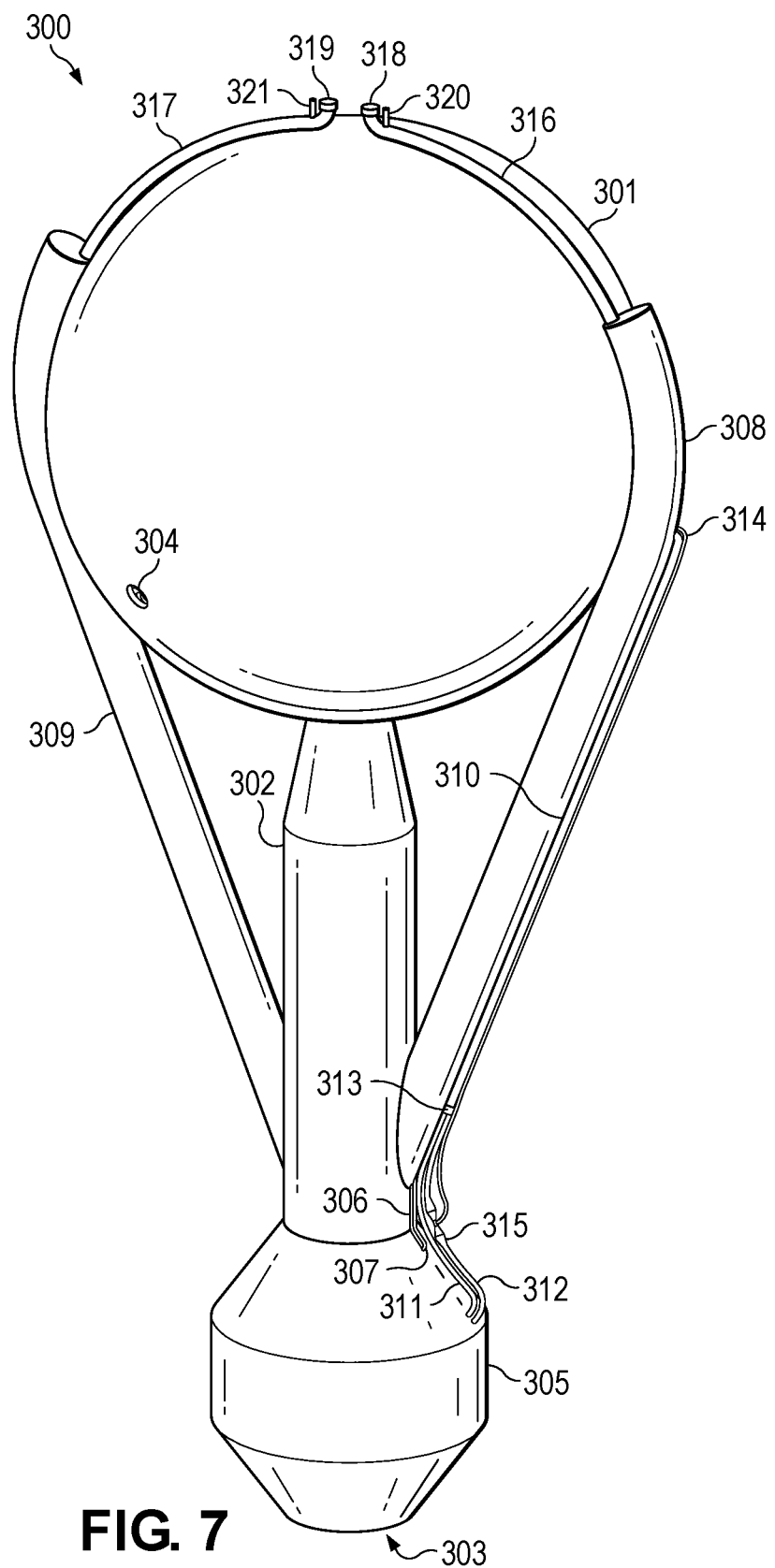
FIG. 7 is a side perspective view of a third embodiment of the present invention.

FIG. 7 shows a perspective side view of a third embodiment 300 of the present disclosure. The embodiment comprises, in part, a wave energy converter (WEC) 301/302 that is an embodiment of the type of inertial hydrodynamic wave engine disclosed in U.S. patent Ser. No. 16/789,205. The WEC produces electrical power in response to wave motion as explained in U.S. patent Ser. No. 16/789,205.

In summary, as the WEC floats at the surface of a body of water (not shown), and moves up and down in response to waves moving across the surface of that body of water, water within the WEC's hollow reaction tube 302 moves up and down within the reaction tube, and concomitantly water moves in and out of the tube via a lower tube mouth 303 or aperture at a lower end of the reaction tube. Periodically, water moving up within the reaction tube encounters and flows into and through a constriction therein, causing a resultant increase in fluid pressure and a subsequent ejection of pressurized water up and into a pressurized reservoir (not visible) within the WEC's pressurized upper hollow spherical buoy 301. Pressurized water from the WEC's reservoir flows out, and back into the body of water, through a pair of water turbines, e.g., 304, thereby causing a rotation of those water turbines. A pair of generators (not shown), each of which is operatively connected to a respective one of the pair of water turbines, produces electrical power in response to the rotations of the water turbines caused by the outflow of water therethrough. The water turbines of the embodiment illustrated in FIG. 7 are separated by approximately 180 degrees, and/or are on opposite sides of the upper hollow spherical buoy 301.

An embodiment similar to the one illustrated in FIG. 7 has its pair of water turbines placed, and/or positioned, at an angular separation of about 90 degrees. That embodiment's control system regulates, through its control of inlet valves to the respective water turbines, the rate of pressurized-water outflow from each water turbine. Through its appropriate regulation and/or control of the rate of effluence from each of its two adjacent water turbines, that embodiment is able to propel itself in a forward direction (opposite the turbine effluence) and to turn and thereby steer a course.

An annular electrolysis chamber 305 attached to a lower portion of the embodiment's reaction tube 302 houses, incorporates, encloses, and/or includes, a seawater electrolyzer (not visible) which receives electrical power from the generators (not shown) operatively connected to respective water turbines. At a cathodic electrode, the seawater electrolyzer reduces hydronium ions (H3O+) to produce hydrogen gas ($H_2$). And, at an electrically connected anodic electrode, the seawater electrolyzer oxidizes chloride ions (Cl-) to produce chlorine gas ($Cl_2$). The hydrogen and chlorine gases flow upward from the seawater electrolyzer and into and through respective hydrogen 306 and chlorine 307 gas tubes.

One 308 of a pair of fluidly connected, and/or interconnected, hydrochloric acid storage tanks, chambers, and/or vessels 308 and 309 contains, includes, and/or incorporates, a combustion chamber (not visible) into which hydrogen and chlorine gases produced by the seawater electrolyzer (not visible), are received from respective hydrogen and chlorine gas tubes 306 and 307. An ultraviolet-light emitting ignition source (not visible) within the combustion chamber causes hydrogen and chlorine gases therein to ignite, burn, combust, ignited, and/or react. Hydrogen chloride gas resulting from a combustion of the hydrogen and chlorine gases combines with seawater and/or hydrochloric acid solution within the hydrochloric acid storage tanks thereby dissolving as hydrochloric acid and thereby increasing the acidity of that solution.

The embodiment's seawater electrolyzer (not visible) receives seawater from a pressurized reservoir (not visible) of seawater within a hollow interior of the embodiment's buoy portion 301. Seawater from the pressurized reservoir flows into an internal portion of a feed pipe 310 and then into a heat exchanger (not visible) contained, positioned, and/or incorporated within, the embodiment's combustion chamber (not visible), which, in turn, is contained, positioned, and/or incorporated within one of the embodiment's hydrochloric acid storage tanks 308.

As seawater from the embodiment's pressurized reservoir (not visible) flows through the feed pipe 310, which passes through a heat exchanger (not visible) within the combustion chamber (not visible), it receives, through a wall of the thermally conductive feed pipe, a portion of the thermal energy and/or heat produced by hydrogen and chlorine gases burning therein, as well a portion of the thermal energy and/or heat produced when the reaction product hydrogen chloride gas, that results from the combustion of the hydrogen and chlorine gases within the combustion chamber, comes into contact with, dissolves into, and/or enters solution within, a relatively smaller "receiving" reservoir within the combustion chamber, the receiving reservoir being fluidly connected to the relatively larger reservoir, nominally acidified with hydrochloric acid, positioned and/or contained within the hydrochloric acid storage tanks 308 and 309.

The feed pipe 310 then passes out of the combustion chamber and the warmed and pressurized seawater therein flows out of the respective hydrochloric acid storage tank 308 and into an external portion of the feed pipe. That warmed seawater flowing through feed pipe 310 is then split at a fluidic junction 313 into two subsidiary and/or secondary streams, one of which flows into and/or through a cathodic feed pipe 311, and another which flows into and/or through an anodic feed pipe 312.

A portion of the hydrochloric acid solution produced within the combustion chamber (not visible) flows from the combustion chamber and into the warmed seawater flowing through the anodic feed pipe 312. The hydrochloric acid solution flows from the combustion chamber into and through acidification pipe 314. Hydrochloric acid solution from the acidification pipe is drawn into the warmed seawater flowing through the anodic feed pipe through the use of a constricted portion (e.g., a Venturi tube) 315 of the anodic feed pipe. The static pressure of the flowing warmed seawater is reduced when, and/or as, it flows through the constricted portion of the anodic feed pipe. And, that localized reduction in static pressure causes the relatively more highly pressurized hydrochloric acid solution to be injected, and/or drawn, into the flowing warmed seawater.

Hydrochloric acid solution is periodically removed from the fluidly connected hydrochloric acid storage tanks 308 and 309 via and/or through respective offtaking replacement 316 and effluent 317 pipes, and via and/or through respective offtaking replacement 318 and effluent 319 valves, e.g., by an adjacent vessel (not shown) that makes a fluid connection to those offtaking pipes. Gas (e.g., air) vents 320 and 321 allow the volume of hydrochloric acid solution within the hydrochloric acid storage tanks to change while keeping the pressure of any gases within those tanks (e.g., the air, if any, above the hydrochloric acid solution within the hydrochloric acid storage tanks) equilibrated with an atmospheric pressure.

The hydrochloric acid storage tanks 308 and 309 provide structural support and strength to the embodiment, as well as storing hydrochloric acid solutions therein.

Figure 8:
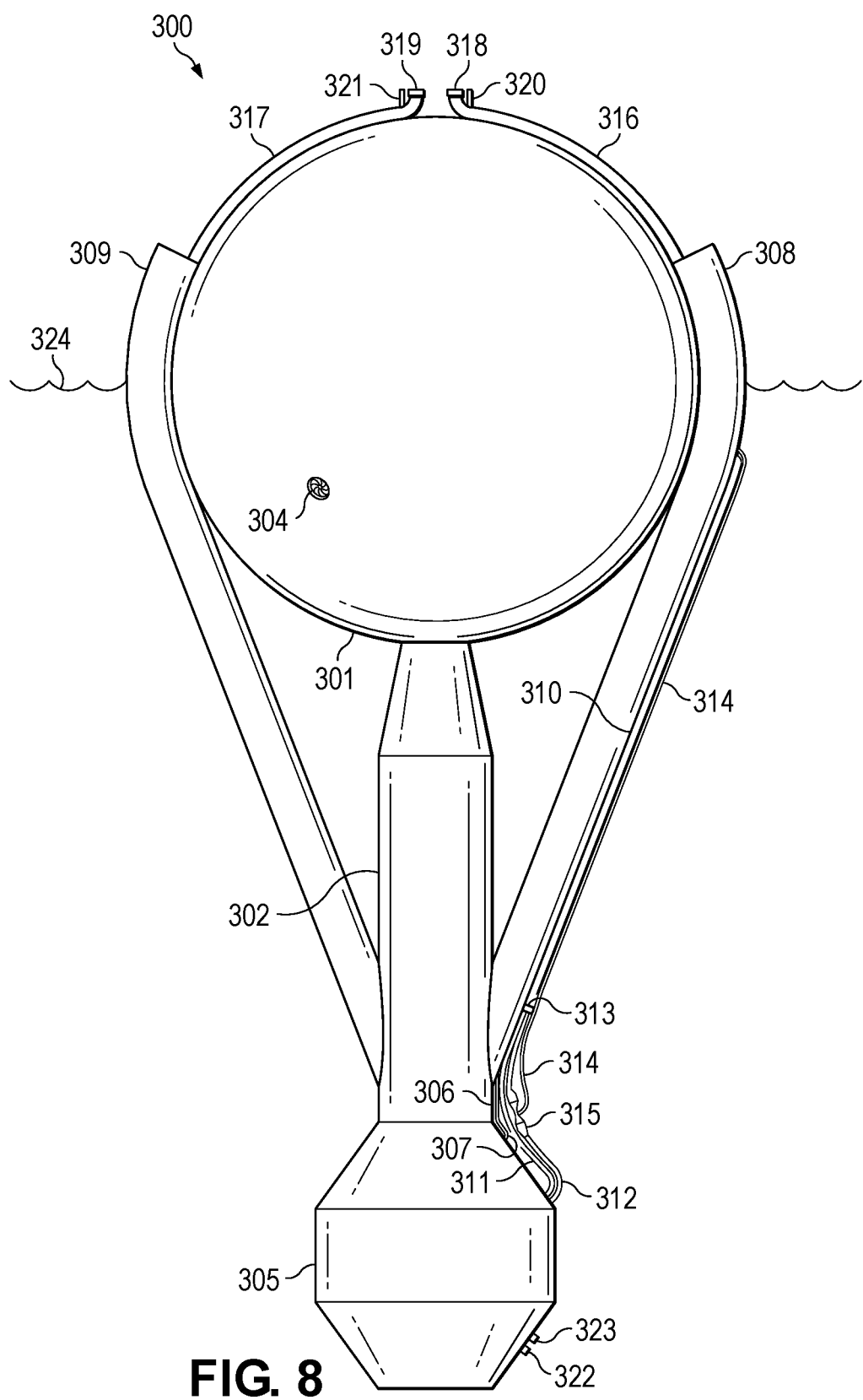
FIG. 8 is a side view of the third embodiment.

FIG. 8 shows a side view of the same embodiment 300 that is illustrated in FIG. 7. The embodiment 300 floats adjacent to an upper surface 324 of a body of seawater over which waves tend to pass. And the embodiment extracts energy from such waves, it converts a portion of that incident wave energy into electrical power which it then uses to electrolyze seawater into hydrogen and chlorine gases. The embodiment then reacts those gases within its combustion chamber (not visible) thereby producing hydrogen chloride gas, a solution of which it captures (as hydrochloric acid), stores, caches, and/or accumulates, within hydrochloric acid storage tanks 308 and 309.

After flowing through the embodiment's seawater electrolyzer (not visible) water (e.g., of increased alkalinity and reduced chloride ion content) flows out of the electrolysis chamber, and back into the body of seawater 324, through a cathodic effluent pipe 322 and an anodic effluent pipe 323.

Figure 9:
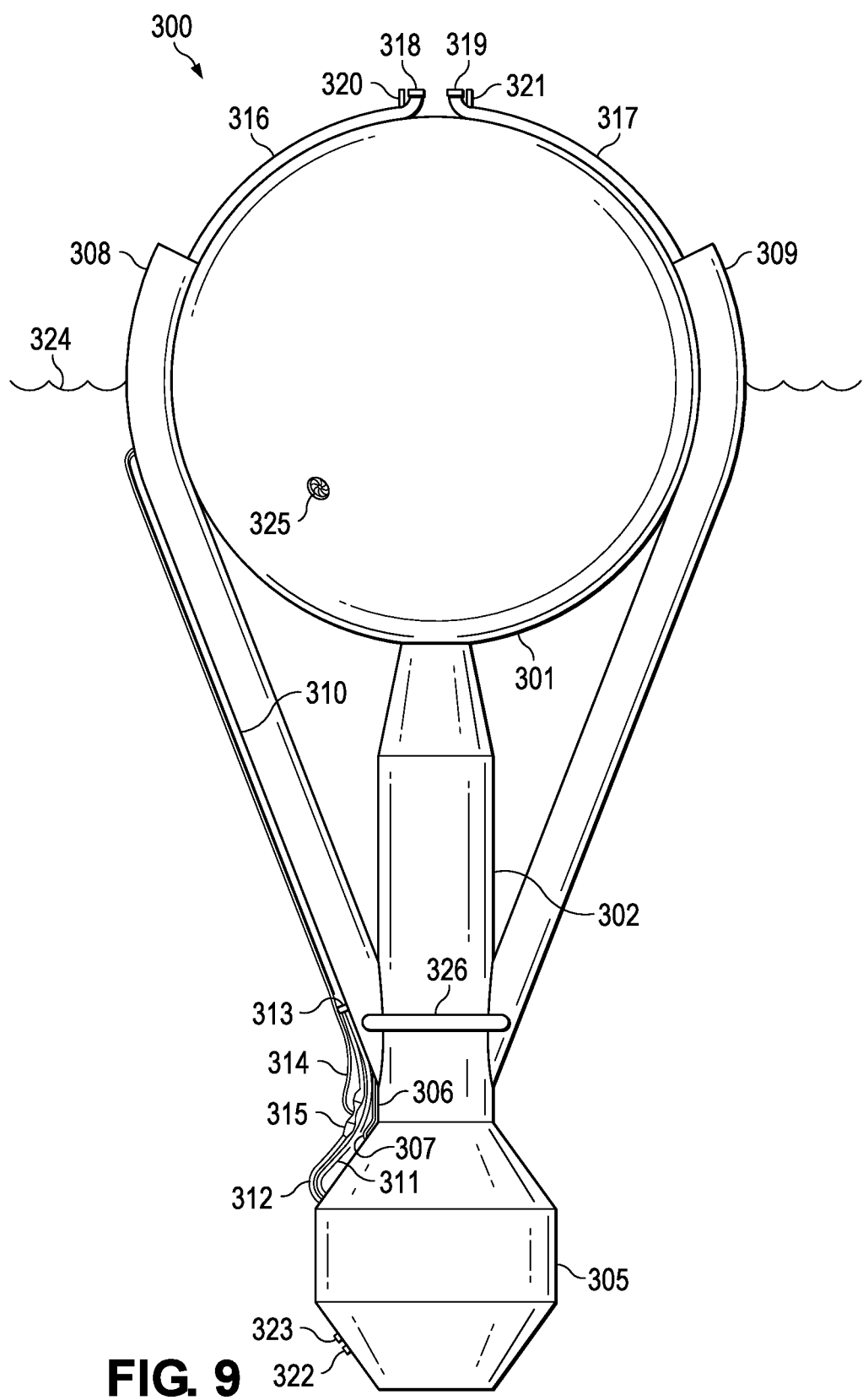
FIG. 9 is a side view of the third embodiment.

FIG. 9 shows a side view of the same embodiment 300 that is illustrated in FIGS. 7 and 8. The side view of FIG. 9 is of the side of the embodiment opposite that of the side illustrated in FIG. 8. And, while the embodiment's first water turbine 304 is visible in the views of FIGS. 7 and 8, the embodiment's second water turbine 325 is visible in the view of FIG. 9.

Hydrochloric acid storage tanks 308 and 309 are fluidly connected and/or interconnected via a tank connecting pipe 326.

Figure 10:
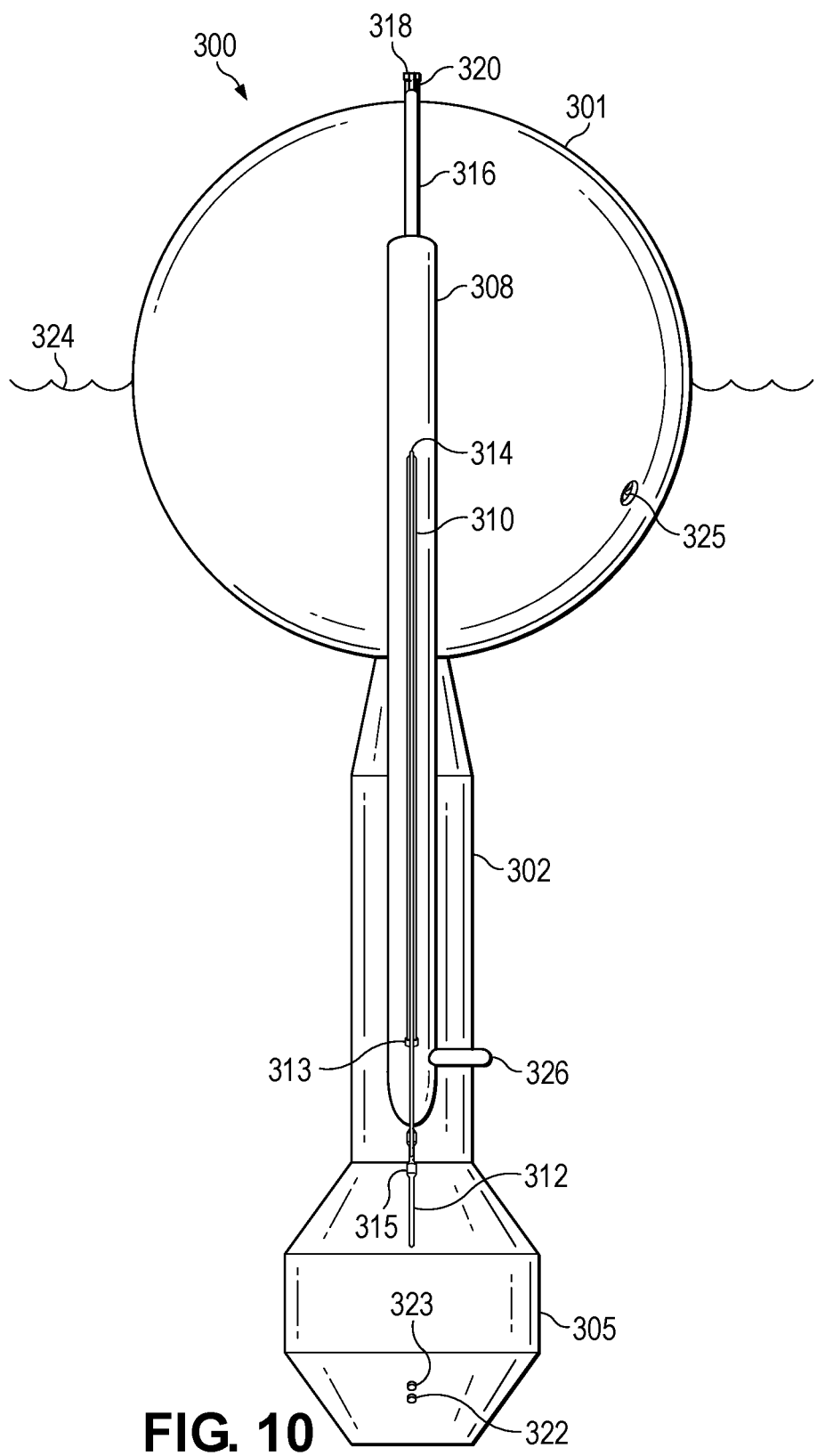
FIG. 10 is a side view of the third embodiment.

FIG. 10 shows a side view of the same embodiment 300 that is illustrated in FIGS. 7-9.

Figure 11:
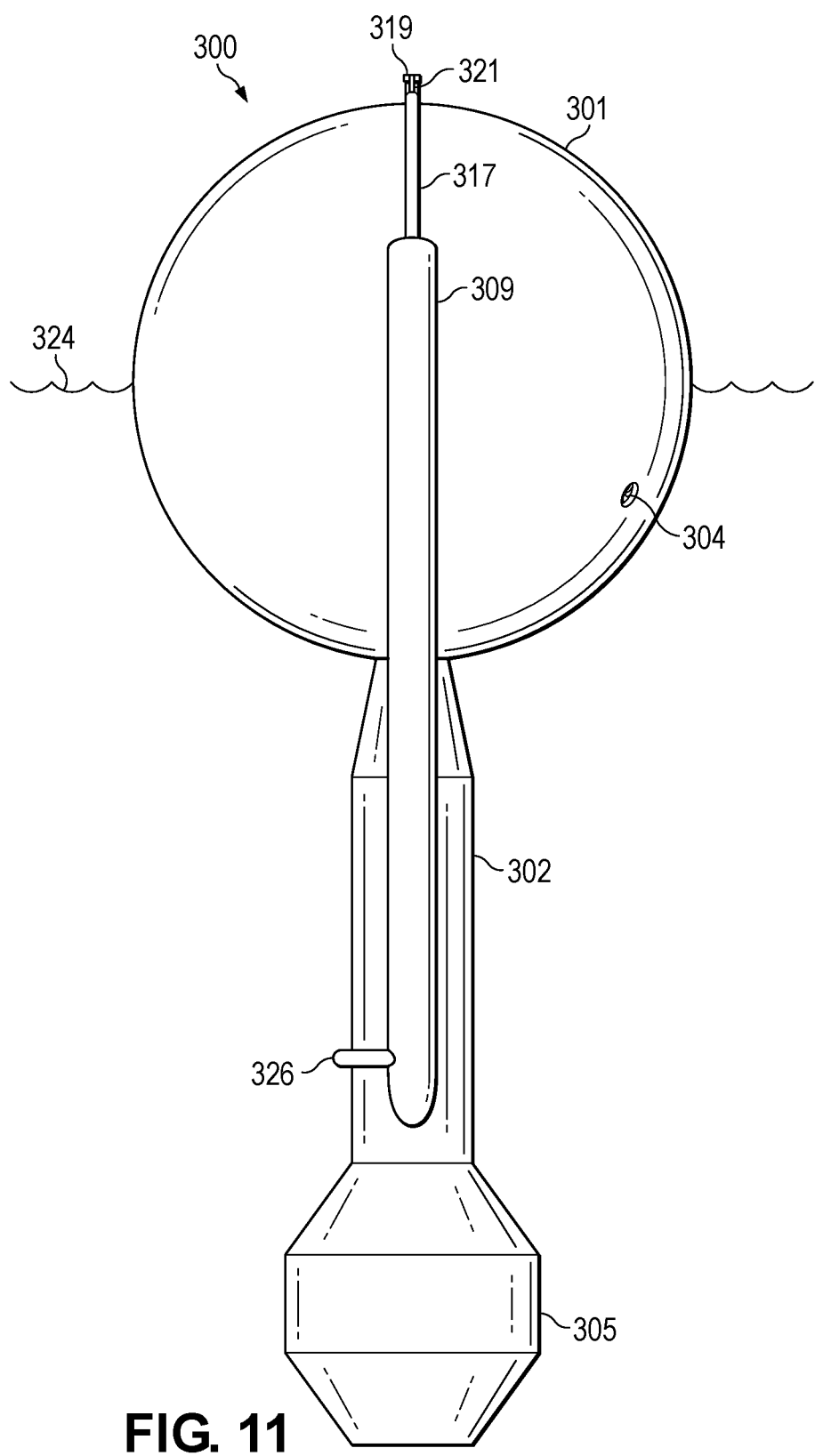
FIG. 11 is a side view of the third embodiment.

FIG. 11 shows a side view of the same embodiment 300 that is illustrated in FIGS. 7-10.

Figure 12:
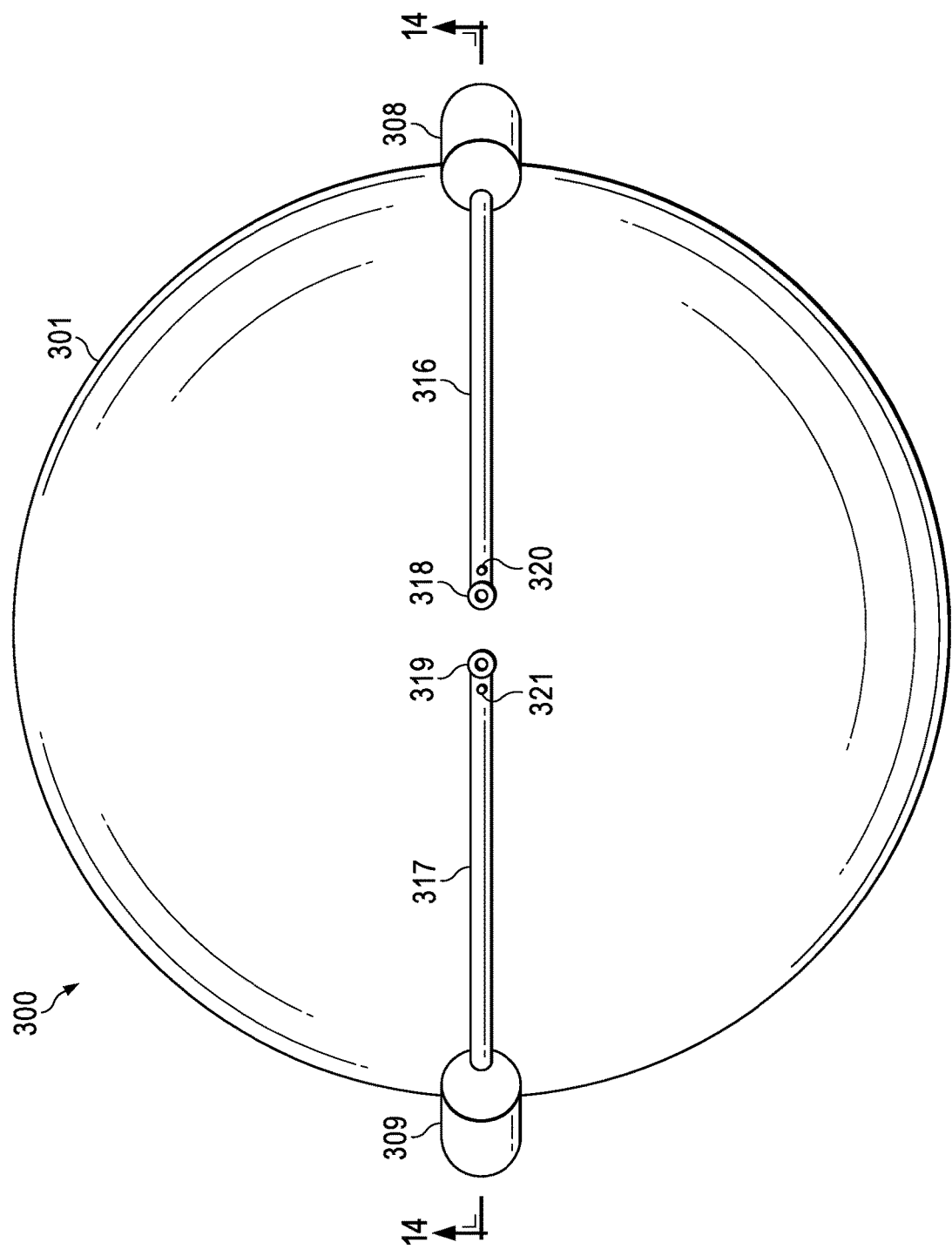
FIG. 12 is a top-down view of the third embodiment.

FIG. 12 shows a top-down view of the same embodiment 300 that is illustrated in FIGS. 7-11.

Figure 13:
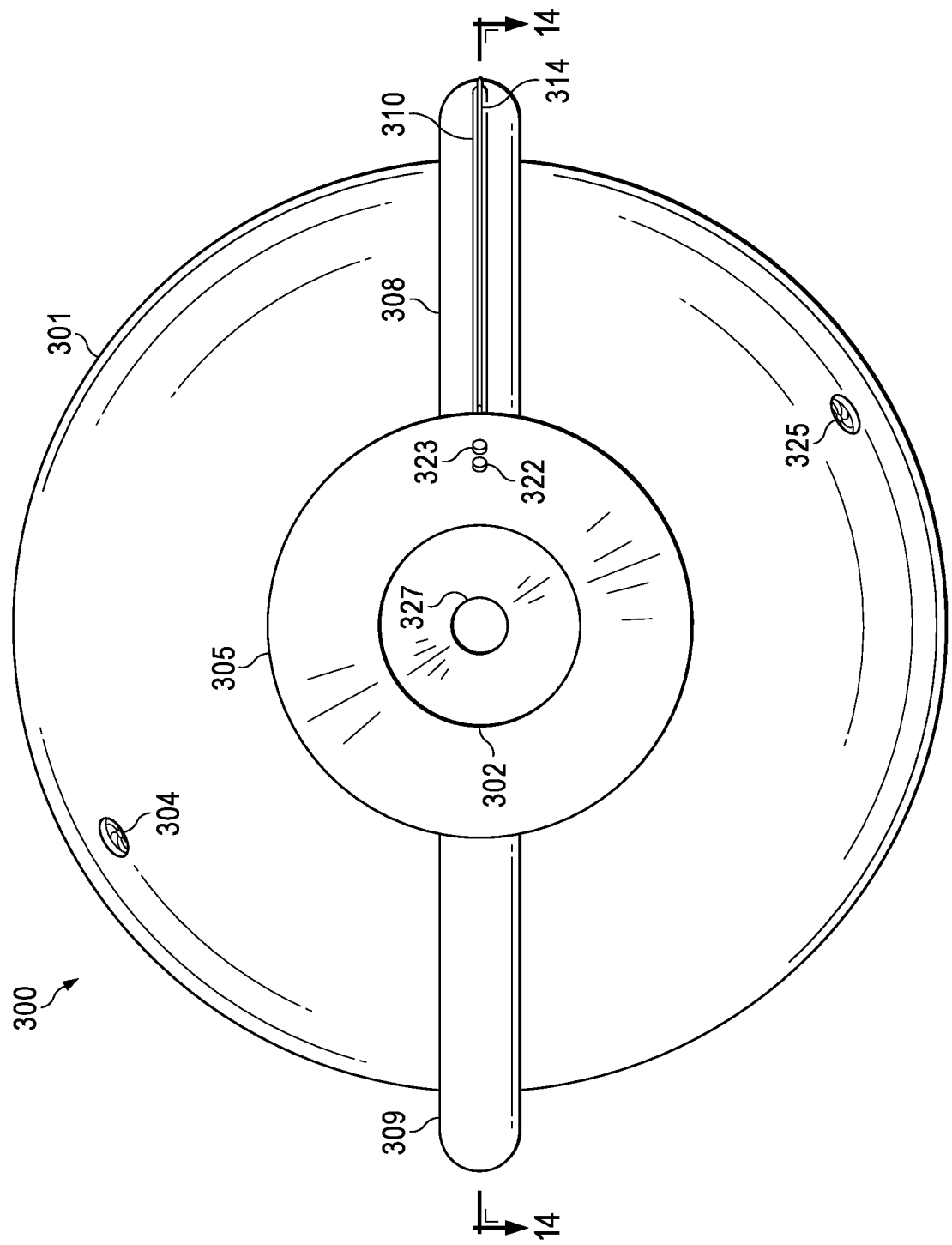
FIG. 13 is a bottom-up view of the third embodiment.

FIG. 13 shows a bottom-up view of the same embodiment 300 that is illustrated in FIGS. 7-12. Visible within the interior of the embodiment's reaction tube 302 is an upper mouth 327 of that reaction tube, positioned within the embodiment's hollow buoy 301, through which water is periodically, intermittently, and/or occasionally, ejected and deposited into the pressurized reservoir (not visible) within the interior of the hollow buoy 301.

Figure 14:
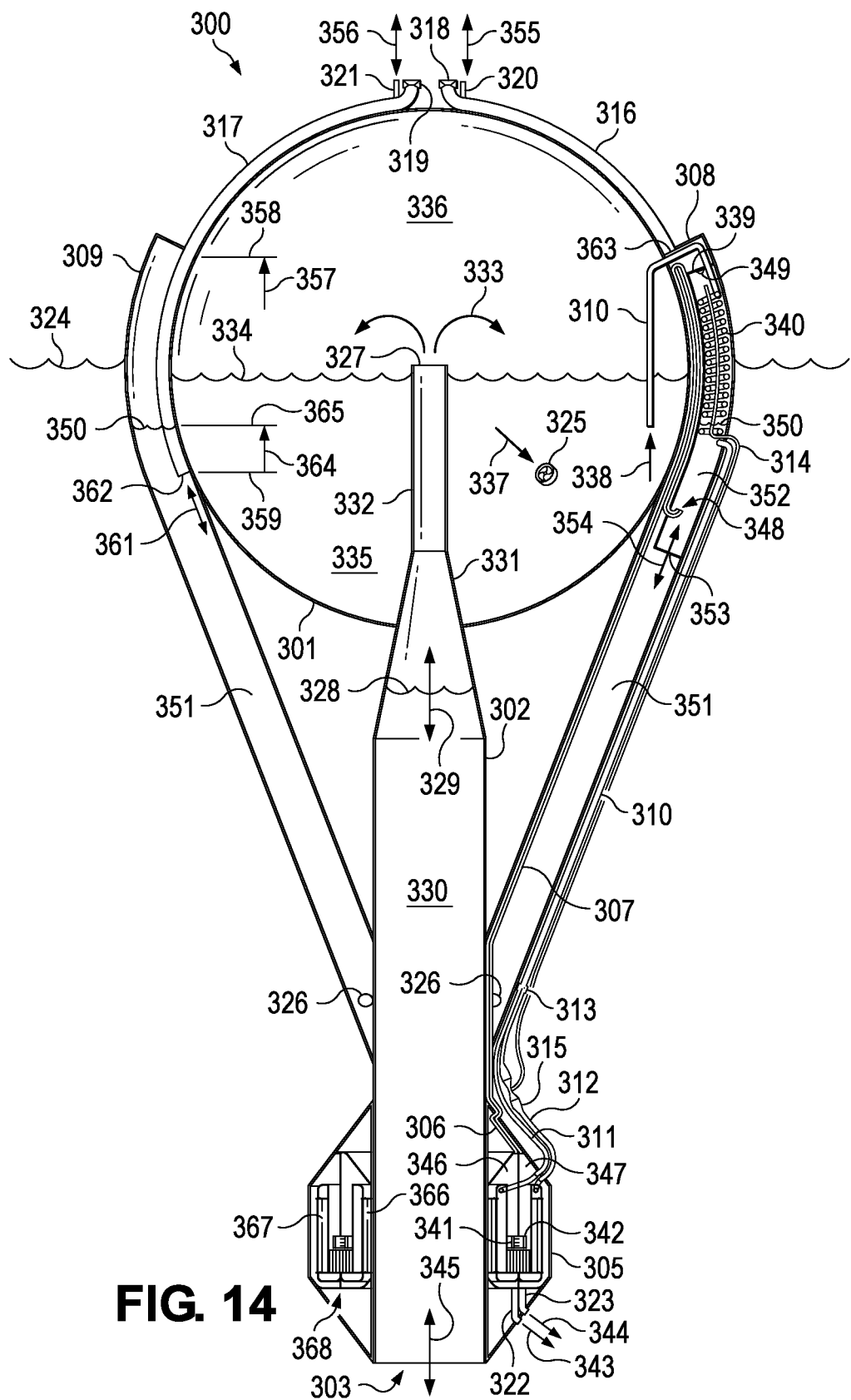
FIG. 14 is a side sectional view of the third embodiment.

FIG. 14 shows a side sectional view of the same embodiment 300 that is illustrated in FIGS. 7-13. The section plane is taken along section line 14-14 of FIGS. 12 and 13.

As explained in detail in U.S. patent Ser. No. 16/789,205, the inertial hydrodynamic wave engine portion of the embodiment 300 illustrated in FIGS. 7-13 moves up and down in response to waves moving across the surface 324 of the body of water on which the embodiment nominally floats. As the embodiment moves up and down in response to wave action at the embodiment, an upper surface 328 of water within the embodiment's reaction tube 302 tends to move 329 up and down as well (typically out of phase with the movements of the embodiment). As the water 330 within the embodiment's reaction tube moves up and down, water tends to move between the interior of the reaction tube and the body of water by flowing 345 in and out of a lower mouth 303 of the reaction tube, with a net upward flow.

Occasionally, an upward welling and/or flowing of water 330 within the reaction tube interacts with a constricted portion 331 of the reaction tube, which tends to pressurize a portion of that upwelling water and cause it to be forced and/or accelerated upward through an upper cylindrical portion 332 of the reaction tube, and then up to and through an upper mouth 327 of the reaction tube, resulting in an ejection 333 of a portion of that water from the reaction tube, whereafter the ejected water tends to fall down, onto, and through, an upper surface 334 of a reservoir 335 of water, and thereby to be deposited into that reservoir. A pressurized pocket of air 336 above, and fluidly continuous with, the reservoir tends to increase the pressure (e.g., head pressure) of the reservoir thereby imparting to that water a pressure potential energy relative to the body of water 324 outside the embodiment. Not shown is a valve and an associated pump with which the embodiment (through a pressure sensor and a control circuit, also not shown) regulates the pressure and volume of the gas(es) in the air pocket 336.

Pressurized water within the reservoir 335 flows 337 out of the reservoir through a pair of water turbines, e.g., 325, only one 325 of which is visible in the sectional view of FIG. 14, thereby tending to cause the water turbines to rotate. A pair of generators, each operatively connected to a respective water turbine, produce electrical power in response to outflows of water through, and consequent rotations of, their respective water turbines.

Water from the pressurized reservoir 335 flows 338 into a mouth and/or aperture at a lower end of feed pipe 310 positioned within the reservoir. The feed pipe, and the water flowing therein, then enters an upper portion of hydrochloric acid storage tank 308. Within the hydrochloric acid storage tank, the feed pipe, and the water flowing therein, then enters an interior of a combustion chamber 339 positioned within the hydrochloric acid storage tank, whereupon the feed pipe is configured in a spiral fashion to act as a heat exchanger 340 causing it to facilitate the transfer of heat generated and/or present within the combustion chamber to the water flowing through the heat-exchanging portion of the thermally-conductive feed pipe. Water flowing within the feed pipe 310 is, in this heat-exchanger region, kept separate from liquid and gas in hydrochloric acid storage tank 308 by the walls of feed pipe 310.

Hydrogen and chlorine gases combusted within the combustion chamber 339 form hydrogen chloride gas which then tends to come into contact with a fluid reservoir 352 within a lower portion of the combustion chamber. Upon contact with the fluid reservoir 352, the hydrogen chloride gas tends to dissolve into that fluid reservoir and upon its dissolution release a latent heat of dissolution which tends to warm and/or heat the fluid reservoir 352. Due to its relative separation from the solution 351 within the hydrochloric acid storage tank 308, the increase in the temperature of the fluid reservoir 352 caused by both the combustion of the hydrogen and chlorine gases, as well as the subsequent hydrogen-chloride's heat of dissolution, tends to warm and/or heat the hydrogen and chlorine gases waiting for combustion within the upper portion of the combustion chamber. Thus, the heat exchanger 340 within the combustion chamber tends to warm the water flowing through the heat-exchanging portion of the thermally-conductive feed pipe through thermal contributions produced by the both the combustion of the hydrogen and chlorine gases, and the dissolution of the combustion-produced hydrogen chloride gas.

The feed pipe 310 then exits the combustion chamber 339 and the respective hydrochloric acid storage tank 308, and travels, adjacent to an outer surface and/or wall of the of the hydrochloric acid storage tank 308, down to a fluidic junction 313, flow-splitter, and/or flow manifold. At the fluidic junction, the feed pipe, and the stream of warmed pressurized seawater flowing therethrough, splits into two subordinate and/or secondary feed pipes, and into two subordinate and/or secondary streams of warmed pressurized seawater. A first subordinate feed pipe, i.e., the cathodic feed pipe 311, carries warmed reservoir water into a first and/or innermost annular portion 346 of the embodiment's seawater electrolyzer 368 (within the electrolysis chamber 305) which surrounds the cathodic electrode 341 of the seawater electrolyzer from which hydrogen gas is evolved and/or produced. A second subordinate feed pipe, i.e., the anodic feed pipe 312, carries warmed reservoir water into a second and/or outermost annular portion 347 of the embodiment's seawater electrolyzer (within the electrolyzer chamber) which surrounds the anodic electrode 342 of the seawater electrolyzer from which chlorine gas is evolved and/or produced.

An acidification pipe 314 has an open upper end into which hydrogen and chlorine gases may flow, even as an upper portion of the combustion chamber 339 fills with hydrogen and chlorine gases prior to a combustion event, causing a subsequent reaction of such gases to produce hydrogen chloride within an upper portion of that acidification pipe. When combined with the humidity present within the combustion chamber as a consequence of the warm fluid reservoir therein, the hydrogen chloride present within the upper portion of that acidification pipe tends to become a highly concentrated solution of hydrochloric acid. If there is insufficient humidity to immediately dissolve the hydrogen chloride gas formed within the acidification pipe, or even if there is sufficient humidity to dissolve a portion of that gas, a portion, if not all, of the hydrogen chloride gas formed within an upper portion of the acidification pipe is able to flow down through the acidification pipe to the Venturi injector 315 of the anodic feed pipe 312 where it will be exposed to, and dissolve into, the warmed reservoir water flowing therethrough.

This supply, source, and/or stream of hydrogen chloride gas, and/or hydrochloric acid solution, tends to flow down through the acidification pipe and to be drawn into the warmed reservoir water flowing through the anodic feed pipe 312 by a constricted and/or venturi tube segment 315 of and/or within the anodic feed pipe. Thus, the acidity of the warmed reservoir water flowing to the anodic electrode 342 of the seawater electrolyzer 368 (within the electrolysis chamber 305) is increased, and/or the pH of that water is reduced, which tends to facilitate the production of chlorine gas at the anodic electrode, e.g., by inhibiting, if not eliminating, the conversion of chlorine in solution into hypochlorite within the anodic, second, and/or outermost, annular portion 347 of the seawater electrolyzer 368.

Water flowing into the first 346 and second 347 annular portions of the seawater electrolyzer 368 (within the electrolysis chamber 305) flows past respective heat-exchanging panels 366 and 367 which facilitate the transfer of some of the heat and/or thermal energy within the effluent of the respective cathodic 341 and anodic 342 electrodes to, and/or into, the pressurized reservoir water flowing to those respective electrodes.

Effluent from the cathodic electrode 341 flows 343 out of the seawater electrolyzer 368 (within the electrolysis chamber 305), and back into the body of water 324 from which it was captured, through the cathodic effluent pipe 322. Effluent from the anodic electrode 342 flows 344 out of the seawater electrolyzer (within the electrolysis chamber 305), and back into the body of water 324 from which it was captured, through the anodic effluent pipe 323.

Hydrogen gas is produced at the cathodic electrode 341 in response to a provision by either or both of the embodiment's generators (not shown) of electrical energy, e.g., a direct current (DC) voltage and current, to the electrode. Bubbles of hydrogen gas produced at the cathodic electrode tend to rise within the water surrounding the cathodic electrode and are collected and/or gathered in a hydrogen collection baffle 346 of the respective first portion of the embodiment's seawater electrolyzer 368 (within the electrolysis chamber 305) which surrounds the cathodic electrode of the seawater electrolyzer. Hydrogen gas that rises to, and accumulates within, the top of the upper portion of the respective first portion of the embodiment's seawater electrolyzer thereafter tends to flow up and through the respective hydrogen gas tube 306.

Chlorine gas is produced at the anodic electrode 342 in response to a provision by either or both of the embodiment's generators (not shown) of electrical energy to the electrode. Bubbles of chlorine gas produced at the anodic electrode tend to rise within the water surrounding the anodic electrode and are collected and/or gathered in a chlorine collection baffle 347 of the respective second portion of the embodiment's seawater electrolyzer 368 (within the electrolysis chamber 305) which surrounds the anodic electrode of the seawater electrolyzer. Chlorine gas that rises to, and accumulates within, the top of the upper portion of the respective second portion of the embodiment's seawater electrolyzer thereafter tends to flow up and through the respective chlorine gas tube 307.

The hydrogen 306 and chlorine 307 gas tubes pass out of the electrolysis chamber 305 and then pass into the hydrochloric acid storage tank 308 which contains the combustion chamber 339. The hydrogen and chlorine gas tubes travel up through an interior of the hydrochloric acid storage tank to a position at an upper end of that hydrochloric acid storage tank. They then bend by about 180 degrees and travel downward to positions adjacent to a lower end of the combustion chamber where they enter the combustion chamber and there release any respective gases that reach those distal ends 348 of the respective gas tubes.

Hydrogen and/or chlorine gases released within the combustion chamber 339 from their respective hydrogen and/or chlorine gas tubes will tend to bubble up toward an upper portion of the interior of the combustion chamber and there accumulate. An ultraviolet lamp 349 positioned at an upper interior position within the combustion chamber is periodically illuminated, thereby periodically tending to ignite any mixture of hydrogen and chlorine gases adjacent to the lamp and/or accumulated within an upper portion of the interior of the combustion chamber. The hydrogen chloride gas resulting from an ignition and/or combustion of a mixture of hydrogen and chlorine gases adjacent to the ultraviolet lamp tends to reach an upper surface 350 of the water 352 present within the combustion chamber and therein dissolve thereby changing, forming, and/or separating, so as to form hydrochloric acid. An aperture 353 at a bottom wall of the combustion chamber provides fluid communication of the solution 352 within the combustion chamber and the solution 351 within the hydrochloric acid storage tanks 308 and 309.

In another embodiment, a spark ignition source is used instead of a lamp. And in another embodiment, a heat ignition source is used instead of a lamp. And, in another embodiment, an ultraviolet lamp is continuously illuminated. And, in another embodiment, a lamp emitting electromagnetic radiation of a wavelength other than ultraviolet is used to ignite the hydrogen and chlorine gases.

Acids within, and/or added to, water 352 within the combustion chamber tend to be exchanged 354, and/or to equilibrate with, the water 351 outside the combustion chamber via an aperture 353 in a lower portion of the wall of the combustion chamber 339.

As the embodiment 300 extracts energy from passing waves, and uses that energy to produce hydrochloric acid, the volume of the increasingly acidic solution 351 within the embodiment's hydrochloric acid storage tanks 308 and 309 increases. As the volume of acidic solution within the hydrochloric acid storage tanks increases, gas may be expelled 355 and 356 from those tanks through respective gas vents 320 and 321 thereby maintaining an atmospheric pressure in the gas pocket (if any) at the upper end of each respective hydrochloric acid storage tank.

When, or before, the volume of acidic solution fills the hydrochloric acid storage tanks 308 and 309, e.g., by an upper surface 350 of that acidic solution reaching 357 a resting level 358, an offtaking vessel (not shown) may connect an offtaking replacement hose (not shown) to offtaking replacement valve 318 and an offtaking effluent hose (not shown) to offtaking effluent valve 319.

With respect to the embodiment illustrated in FIGS. 7-14, the offtaking vessel (not shown) pumps and/or draws 361 hydrochloric acid solution from, and/or out of, the second offtaking hose that is connected to offtaking effluent valve 319, thereby drawing hydrochloric acid solution into a lower mouth and/or aperture 362 of the second offtaking effluent pipe 317 and thereby removing hydrochloric acid solution from the fluidly connected hydrochloric acid storage tanks 308 and 309.

And, with respect to the embodiment illustrated in FIGS. 7-14, the offtaking vessel (not shown) pumps a replacement fluid (e.g., fresh water or seawater) into and through the first offtaking replacement hose (not shown) that is connected to offtaking replacement valve 318, thereby pumping the replacement fluid into the first offtaking replacement pipe 316 and into the hydrochloric acid storage tank 308 through a lower mouth and/or aperture 363 of the offtaking replacement pipe, thereby replacing the acidic fluid that is being, and/or has been, removed through offtaking effluent valve 319 with the added replacement fluid. Thus, by pumping a replacement fluid (e.g., seawater) into the hydrochloric acid storage tanks 308 and 309 via offtaking replacement valve 318, hydrochloric acid solution may be "pushed" through the fluid circuit that includes tanks 308 and 309, and tank connecting pipe 326, and retrieved as it leaves said tanks via an offtaking effluent hose (not shown) connected to offtaking effluent valve 319.

When a sensor on the offtaking vessel (not shown) detects that the acidity of the fluid being removed from the embodiment 300 through offtaking effluent valve 319 has fallen to, or below, a threshold value (e.g., because it has begun removing replacement fluid rather than acidic solution, and/or because it has begun removing an acidic solution that has been progressively diluted through the addition of replacement fluid), then the offtaking vessel opens the offtaking replacement hose and/or the offtaking replacement valve 318 to the atmosphere (or begins pumping air into that offtaking replacement hose) while continuing to remove fluid from and/or through the offtaking effluent hose and offtaking effluent valve 319. The replacement of removed fluid with a gas (e.g., with air) tends to lower the level of fluid within the hydrochloric acid storage tanks 308 and 309 to a level 359 approximately equal to the level of the lower mouth 362 of the offtaking effluent pipe 317, leaving the portions of the hydrochloric acid storage tanks above that level filled with the gas (e.g., air or nitrogen) introduced by the offtaking vessel.

After an offtaking vessel (not shown) has disconnected its offtaking hoses from the embodiment, and/or from the respective offtaking replacement 318 and effluent 319 valves, the embodiment will continue its production of hydrochloric acid, thereby progressively increasing both the acidity and the volume of the acidic solution stored within the hydrochloric acid storage tanks 308 and 309, and thereby progressively raising 364 the level 365 of an upper surface 350 of the fluid within the hydrochloric acid storage tanks.

The tubular connection 326 that fluidly connects the interiors of the embodiment's two hydrochloric acid storage tanks 308 and 309 can be seen in FIG. 14 as a pair of complementary apertures 326 within the respective hydrochloric acid storage tanks.

Another embodiment similar to the one illustrated in FIGS. 7-14 includes a third offtaking pipe fluidly connected to tank connecting pipe 326. With respect to this other embodiment, an offtaking vessel (not shown) initially pumps out hydrochloric acid solution from the hydrochloric acid storage tanks 308 and 309 via the third offtaking pipe via the tank connecting pipe. And, after the desired amount of hydrochloric acid solution has been removed from the hydrochloric acid storage tanks, a replacement fluid (e.g., seawater) is pumped into offtaking pipes 316 and 317.

Figure 15:
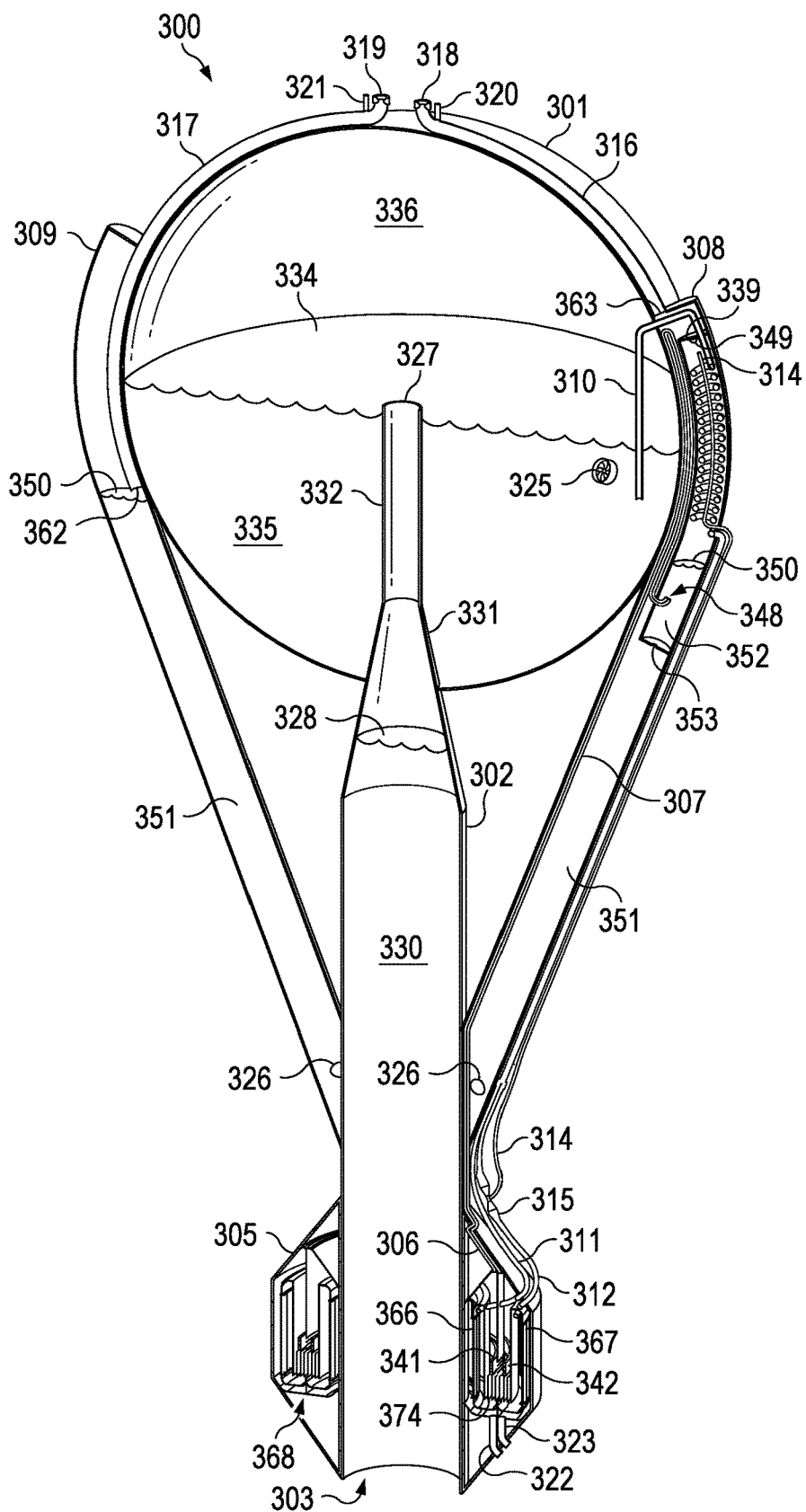
FIG. 15 is a perspective view of the side sectional view of FIG. 14.

FIG. 15 is a perspective view of the side sectional view of FIG. 14.

Figure 16:
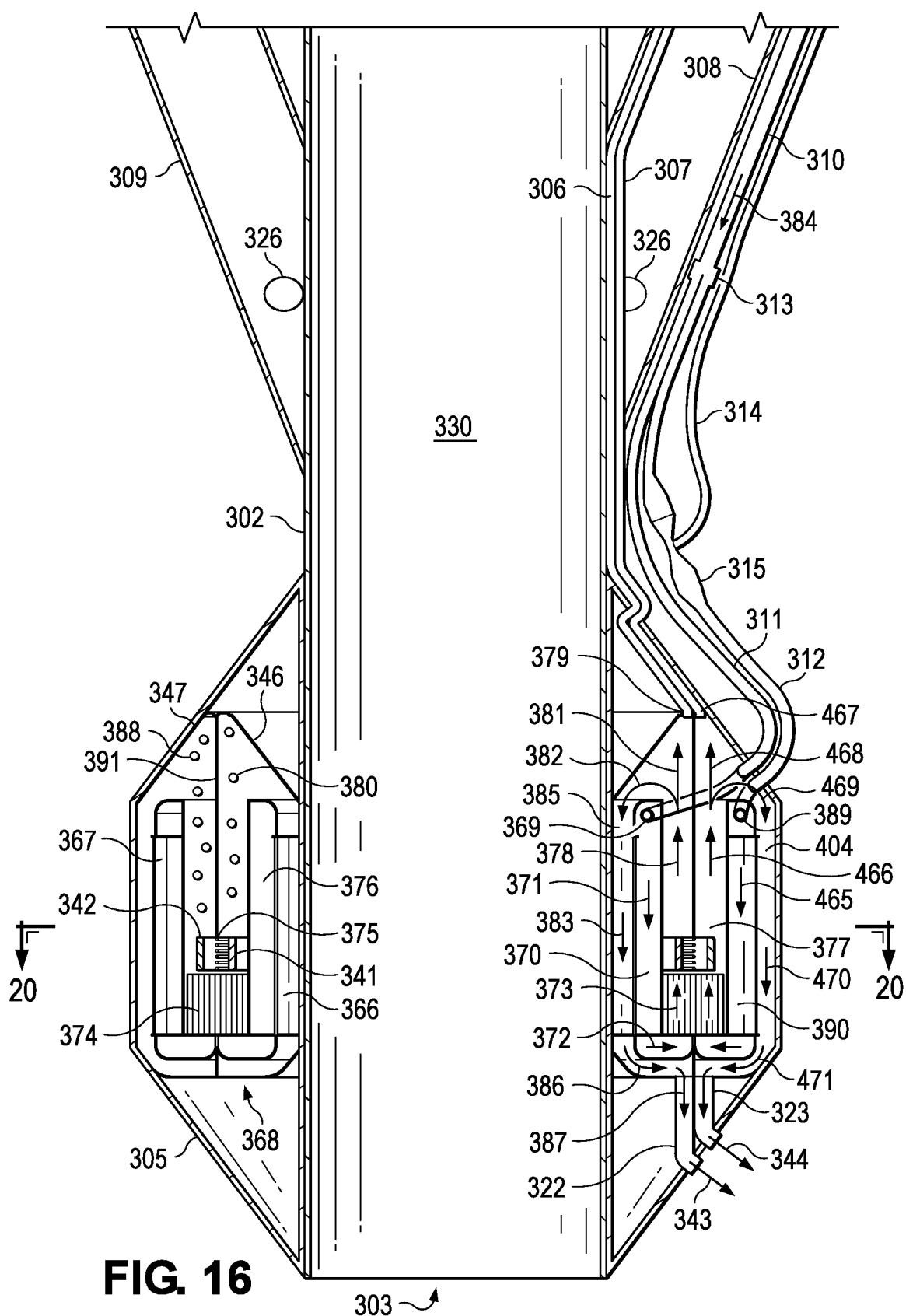
FIG. 16 is a close-up view of a portion of the side sectional view of FIG. 14.

FIG. 16 is a close-up sectional view of the seawater electrolyzer 368 of the same embodiment that is illustrated in FIGS. 7-15. The section plane is taken along section line 14-14 of FIGS. 12 and 13.

Pressurized water from the embodiment's reservoir (not visible, 335 in FIG. 14) flows 384 into and through feed pipe 310 to the fluidic junction 313 where the stream is split with one split stream flowing into the cathodic feed pipe 311 and the other split stream flowing into the anodic feed pipe 312. The water flowing through the anodic feed pipe passes and/or flows through a constricted tube segment 315 and/or venturi tube with the drop in the water's static pressure therein causing an acidic solution to be drawn into that flow from acidification pipe 314.

Warmed reservoir water flows out of the cathodic feed pipe 311 through cathodic-feed-pipe mouth and/or aperture 369 and enters an annular pre-cathodic channel and/or conduit 370 through which it flows 371 downward and away from the cathodic-feed-pipe mouth. At a distal and/or lower end of the annular cathodic channel, the water flows 372 radially outward, and/or away from the embodiment's reaction tube 302, through a horizontal portion of the annular cathodic channel and then flows 373 upward toward the cathodic electrode 341 of the seawater electrolyzer 368, and flows through a flow-straightener 374 therein comprised of a plurality of coaxial cylindrical surfaces which both reduces turbulence in the flowing 373 water and which maintains a separation of the adjacent cathodic and anodic water streams.

The warmed reservoir water then flows over, past, and/or around the seawater electrolyzer's 368 cathode 341. Note that the cathodic and anodic electrodes are separated by a semi-permeable microporous mesh diaphragm 375 which tends to permit the passage of certain dissolved ions while inhibiting a more substantial and/or liberal exchange of water (and ions) between the annular cathodic 376 and anodic 377 flow channels. This diaphragm inhibits a migration of hydroxide ions created at or by the cathode 342 to the anode 341, and thereby inhibits the conversion of freshly-oxidized chlorine atoms into hypochlorite rather than chlorine gas.

Another embodiment similar to the one illustrated in FIGS. 7-16, incorporates, utilizes, and/or includes, a semi-permeable membrane rather than a diaphragm. And this embodiment relies upon the membrane to inhibit a migration of hydroxide ions from the annular cathodic 376 and anodic 377 flow channels.

After flowing past the cathodic electrode 341, the water and/or cathodic effluent flows 378 upward, within the cathodic flow channel 376, toward the inlet 379 to the hydrogen gas tube 306. Upon entering the hydrogen collection baffle 346 of the seawater electrolyzer 368, bubbles of hydrogen gas, e.g., 380, flow and/or rise 381 upward toward the inlet to the hydrogen gas tube, and thereafter flow into and through the hydrogen gas tube to the combustion chamber (not visible, 339 in FIG. 14). The bulk of the upward-flowing 378 cathodic effluent flows 382 radially across, over, and around an upper end of the annular pre-cathodic channel 370. The cathodic effluent then flows 383 downward through an annular post-cathodic channel 385 and adjacent to an annular cathodic heat-exchanging panel 366 which facilitates a transfer of heat and/or thermal energy from the cathodic effluent flowing 383 away from the cathodic electrode to the water flowing 371 through the annular pre-cathodic channel 370 toward the cathodic electrode 341.

The downward-flowing 383 cathodic effluent flows 386 radially across, over, and around a lower end of the annular pre-cathodic channel 370. The cathodic effluent then flows 387 into and through cathodic effluent pipe 322 from where it flows 343 into the body of water on which the embodiment floats.

In similar fashion to the manner and mechanism by which water from the cathodic feed pipe 311 flows out of the cathodic-feed-pipe mouth and/or aperture 369 and then flows to and through the cathodic electrode 341, so too does water from the anodic feed pipe 312 flow out of the anodic-feed-pipe mouth and/or aperture 389 to and through the anodic electrode 342, thereby giving rise to bubbles of chlorine, e.g., 388, which rise upward to, into, and through the chlorine gas tube 307 after which they flow to and enter the combustion chamber (not visible, 339 in FIG. 14).

The anodic effluent flows adjacent to an annular anodic heat-exchanging panel 367 which facilitates a transfer of heat and/or thermal energy from the anodic effluent flowing away from the anodic electrode to the water flowing out of the anodic feed pipe 312 and into and through the annular pre-anodic channel 390 toward the anodic electrode. Finally, the anodic effluent flows into and through anodic effluent pipe 323 and therethrough flows 344 into the body of water on which the embodiment floats.

Warmed and acidified reservoir water flows out of the anodic feed pipe 312 through anodic-feed-pipe mouth and/or aperture 389 and enters an annular pre-anodic channel and/or conduit 390 through which it flows 465 downward and away from the anodic-feed-pipe mouth. At a distal and/or lower end of the annular anodic channel, the water flows radially inward, and/or toward the embodiment's reaction tube 302, through a horizontal portion of the annular anodic channel and then flows upward toward the anodic electrode 342 of the seawater electrolyzer 368, and flows through a flow-straightener 374 therein comprised of a plurality of coaxial cylindrical surfaces which both reduces turbulence in the flowing water and which maintains a separation of the adjacent anodic and cathodic water streams.

The warmed and acidified reservoir water then flows over, past, and/or around the seawater electrolyzer's 368 anode 342. Note that the anodic and cathodic electrodes are separated by a permeable mesh or diaphragm 375 which tends to permit the passage of ions while inhibiting a more substantial and/or liberal exchange of water and/or gas between the annular anodic 377 and cathodic 376 flow channels. Above the permeable mesh, the anodic 377 and cathodic 376 flow channels are separated by a medial wall 391 that prevents any flow between the flow channels.

After flowing past the anodic electrode 342, the water and/or anodic effluent flows 466 upward, within the anodic flow channel 377, toward the inlet 467 to the chlorine gas tube 307. Upon entering the chlorine collection baffle 347 of the seawater electrolyzer 368, bubbles of chlorine gas, e.g., 388, flow 468 and/or rise upward toward the inlet to the chlorine gas tube, and thereafter flow into and through the chlorine gas tube to the combustion chamber (not visible, 339 in FIG. 14). The bulk of the upward-flowing anodic effluent flows 469 radially across, over, and around an upper end of the annular pre-anodic channel 390. The anodic effluent then flows 470 downward through an annular post-anodic channel 404 and adjacent to an annular anodic heat-exchanging panel 367 which facilitates a transfer of heat and/or thermal energy from the anodic effluent flowing away from the anodic electrode to the water flowing through the annular pre-anodic channel 390 toward the anodic electrode 342.

The anodic effluent flowing downward through the annular post-anodic channel 404 then flows 471 radially across, over, and around a lower end of the annular pre-anodic channel 390. The anodic effluent then flows into and through anodic effluent pipe 323 from where it flows 344 into the body of water on which the embodiment floats.

The cathodic and anodic channels of the seawater electrolyzer 368 are separated by a wall 391, and an embedded diaphragm 375, which keeps the water flowing to, through, and away from each electrode separated except to the degree that water, and/or ions therein, are exchanged through the semi-permeable mesh diaphragm.

With the exception of pipes fluidly connected to the seawater electrolyzer 368, the seawater electrolyzer is substantially axisymmetric and is arrayed about the reaction tube 302 of the embodiment in an annular fashion.

Figure 17:
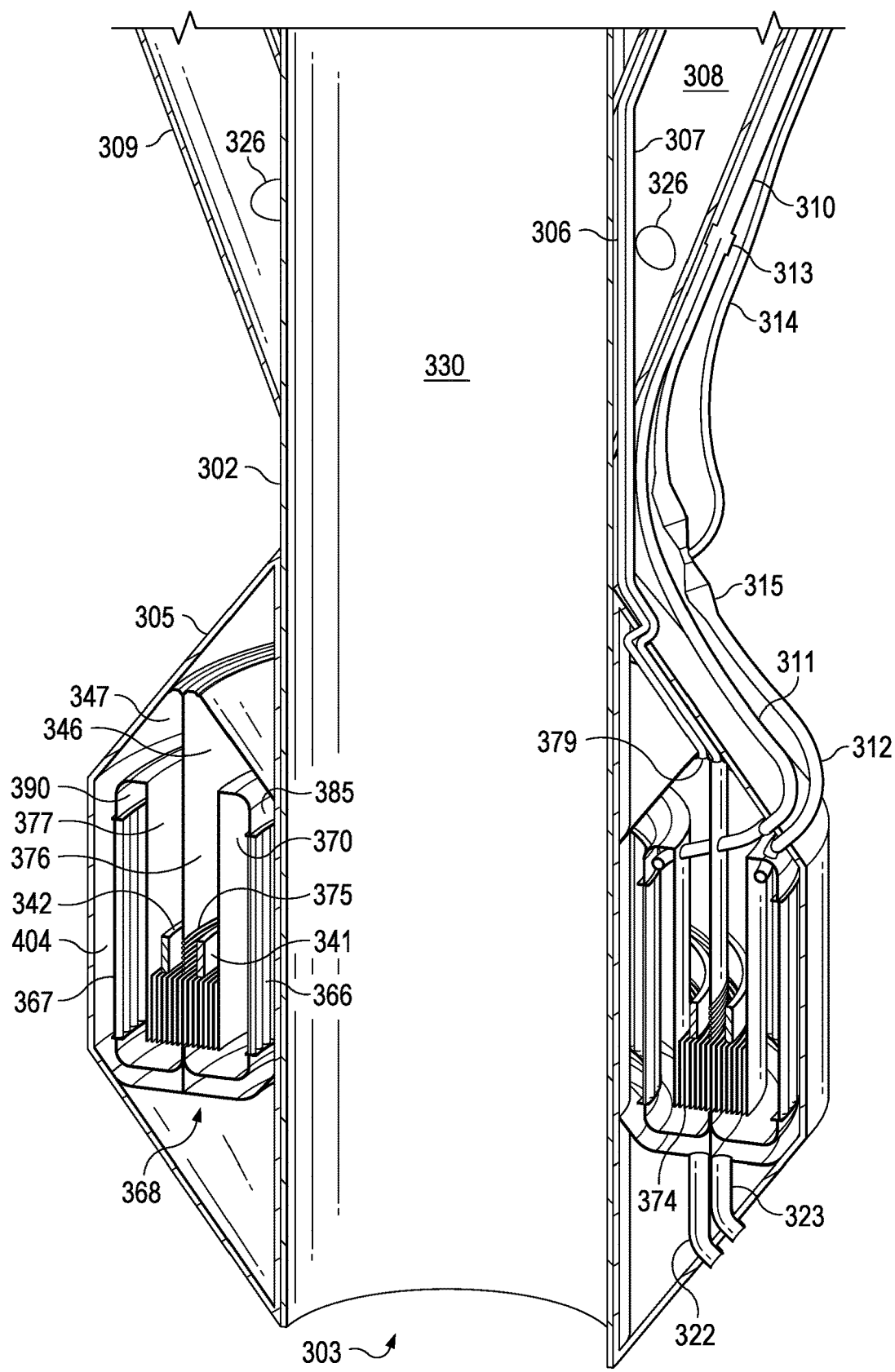
FIG. 17 is a perspective view of the close-up view of FIG. 16.

FIG. 17 is a perspective view of the close-up side sectional view of FIG. 16.

Figure 18:
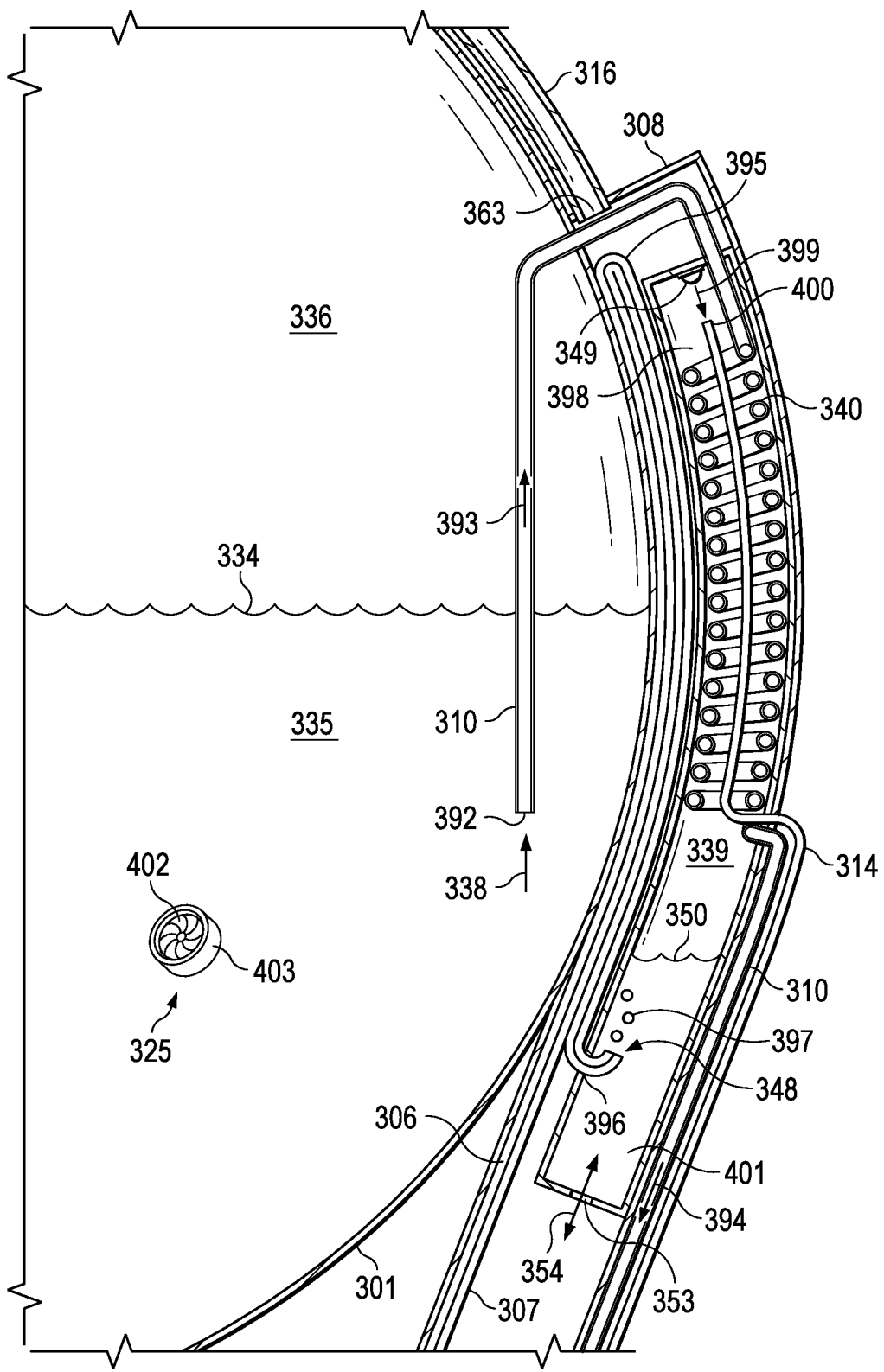
FIG. 18 is a close-up view of a portion of the side sectional view of FIG. 14.

FIG. 18 is a close-up sectional view of the combustion chamber 339 of the same embodiment illustrated in FIGS. 7-17. The section plane is taken along section line 14-14 of FIGS. 12 and 13.

Pressurized water from within the embodiment's reservoir 335 flows 338 into a mouth and/or aperture 392 at an end of feed pipe 310 and thereafter flows 393 through the feed pipe into hydrochloric acid storage tank 308 and then into the combustion chamber 339 positioned therein. In an upper portion of the combustion chamber, the feed pipe assumes and/or adopts a spiral configuration 340, i.e., a heat-exchanging configuration, in order to facilitate a transfer of heat from the combustion of hydrogen and chlorine gases, and a latent heat of dissolution of hydrogen chloride into a hydrochloric acid solution, within the combustion chamber into the water flowing 393 through the feed pipe. After passing through the combustion chamber, the feed pipe passes to the outside of the hydrochloric acid storage tank and continues downward to the fluidic junction (not visible, 313 in FIG. 16). The water flowing 394 within the feed pipe following its passage through and from the spiral configuration 340 is nominally warmer than the water in the reservoir 335.

Hydrogen gas flows from the seawater electrolyzer (not visible, 368 in FIG. 16) to the combustion chamber 339 through hydrogen gas tube 306. Similarly, chlorine gas flows from the seawater electrolyzer to the combustion chamber through chlorine gas tube 307. Both the hydrogen and chlorine gas tubes continue upward until they are adjacent to an uppermost end and/or part of the combustion chamber and the respective hydrochloric acid storage tank 308 at which point they bend 395 so as to continue, and/or thereafter continuing, downward to a position near a lowermost end and/or part of the combustion chamber where, and/or at which position 396 and/or location they pass through the wall of the combustion chamber to an interior of the combustion chamber. The hydrogen and chlorine gas tubes pass through a lateral wall of the combustion chamber at 396. Hydrogen and chlorine gas that has flowed from the seawater electrolyzer to the combustion chamber then tends to bubble, e.g., 397, from the ends 348 of their respective gas tubes, thereby becoming trapped within an upper portion of the combustion chamber and joining other hydrogen and chlorine gases within a pocket 398 (if any) of hydrogen and chlorine gases positioned at an uppermost end of the interior of the combustion chamber.

A relatively small fraction of the hydrogen and chlorine gases trapped within the pocket 398 (if any) of such gases will flow 399 into an upper mouth 400 of, and thereby occupy an uppermost portion of, acidification pipe 314. When ultraviolet lamp 349 is energized, and thereby illuminated so as to emit ultraviolet light, any hydrogen and chlorine gases present within the pocket 398 at the uppermost end of the interior of the combustion chamber 339, as well as any such gases present within an upper part of the acidification pipe, will be ignited and combine exothermically producing a hydrogen chloride gas. While most of the resulting hydrogen chloride gas will dissolve within water 401 present within a lower portion of the combustion chamber thereby dissolving, releasing a latent heat of dissolution, and transforming into hydrochloric acid (thereby acidifying that water), the small portion of the hydrogen chloride gas that forms within the acidification pipe will flow down through that acidification pipe (as either hydrogen chloride gas or, if dissolved into water present within the acidification pipe, as hydrochloric acid) until it is drawn into the stream of reservoir water flowing to the anode of the seawater electrolyzer (not visible, 368 in FIG. 16).

Any increase in the acidity of the water 401 within the combustion chamber 339 tends to equilibrate with the water within the hydrochloric acid storage tanks 308 and 309 as the water 401 diffuses 354 into that water within the hydrochloric acid storage tanks through an aperture 353 in the wall of a lower part of the combustion chamber.

Each of the embodiment's two water turbines, e.g., 325, (only one 325 of which is visible in FIG. 18) is comprised of an inner turbine rotor, e.g., 402, which rotates within an outer turbine housing, e.g., 403, forming a rim-drive generator. With respect to the embodiment illustrated in FIGS. 7-18, the turbine rotor contains, incorporates, and/or includes magnets about a peripheral surface, and the turbine housing contains generator stator coils which are energized by, and/or produce electrical currents and voltages in response to, a rotation of the complementary and/or respective turbine rotor. Wires (not shown) connect the generators to the requisite loads, e.g., the electrolyzer.

Figure 19:
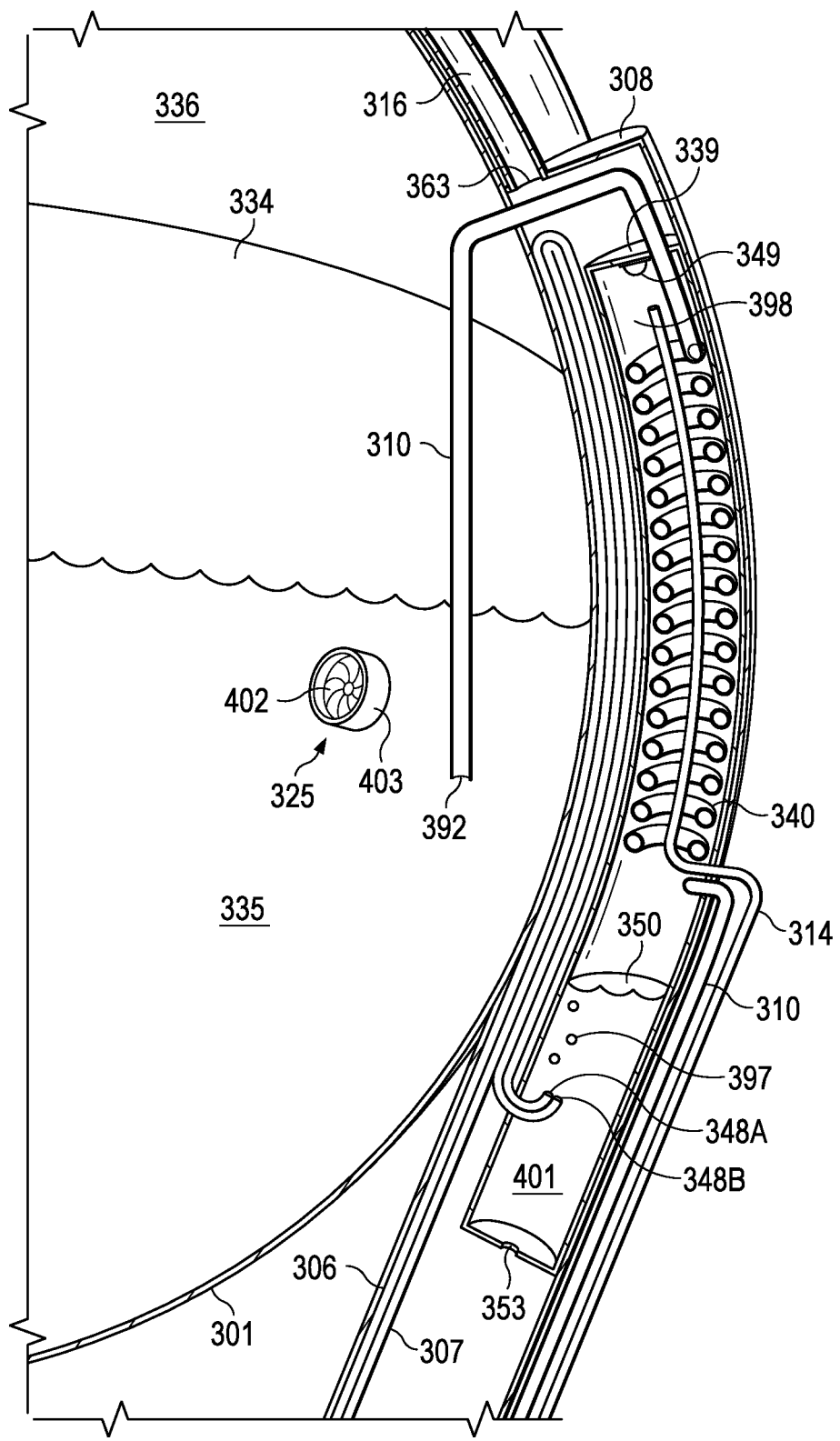
FIG. 19 is a perspective view of the close-up view of FIG. 18.

FIG. 19 is a perspective view of the close-up side sectional view of FIG. 18.

Hydrogen gas produced at the cathode of the seawater electrolyzer (not visible, 368 in FIG. 16) flows up and through hydrogen gas tube 306 and is released, and/or emitted from a mouth 348A at an upper end of the hydrogen gas tube positioned within the combustion chamber 339. Chlorine gas produced at the anode of the seawater electrolyzer flows up and through chlorine gas tube 307 and is released, and/or emitted from a mouth 348B at an upper end of the chlorine gas tube positioned within the combustion chamber.

Figure 20:
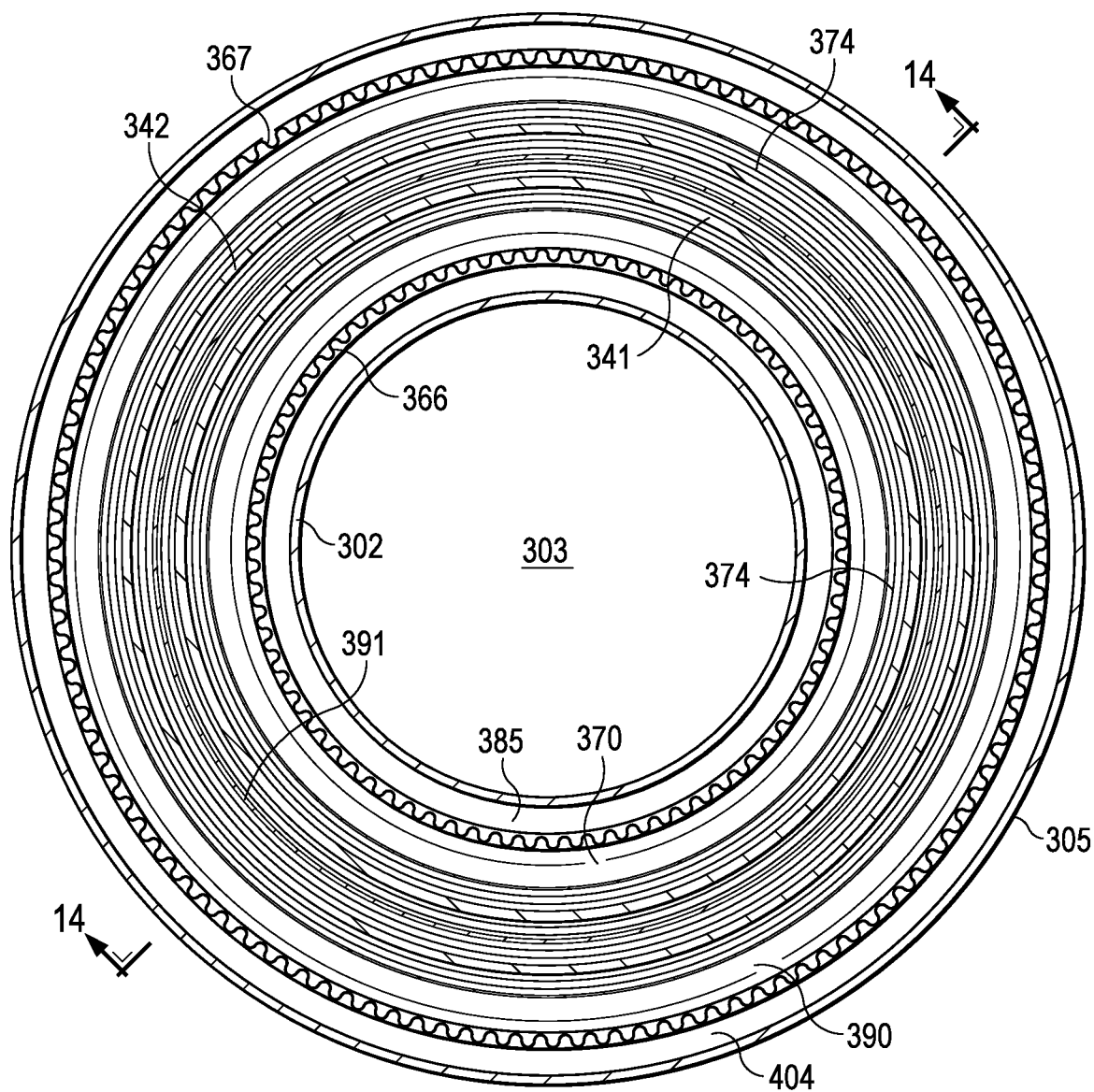
FIG. 20 is a top-down sectional view of the third embodiment.

FIG. 20 shows a top-down sectional view of the same embodiment that is illustrated in FIGS. 7-19. The section plane is taken along section line 20-20 of FIG. 16.

Figure 21:
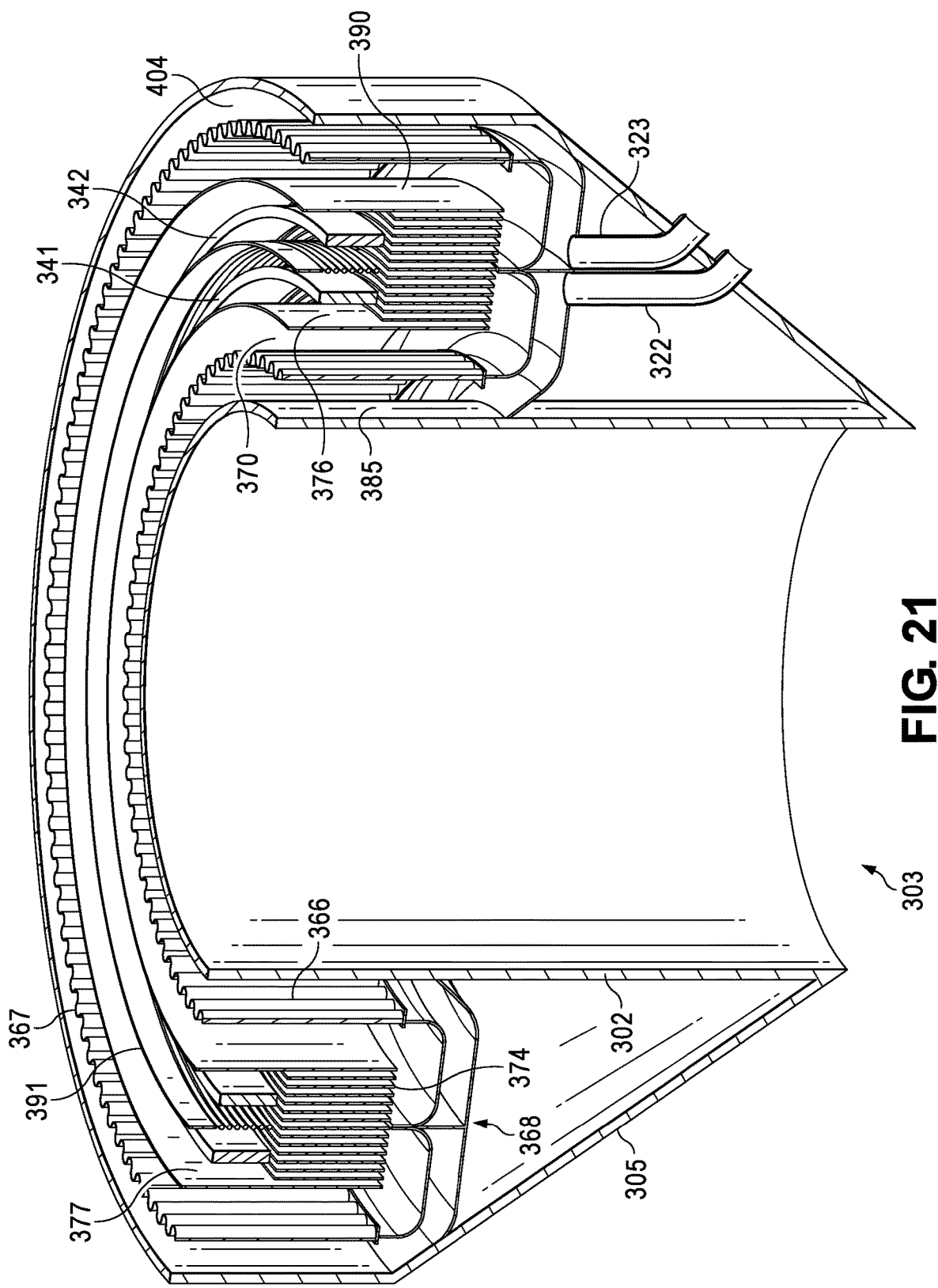
FIG. 21 is a perspective top-down and side sectional view of the third embodiment.

FIG. 21 shows a perspective sectional view of the same embodiment that is illustrated in FIGS. 7-20. The section planes are taken along section line 14-14 of FIGS. 12, 13, and 21, and along section line 20-20 of FIG. 16.

Figure 22:
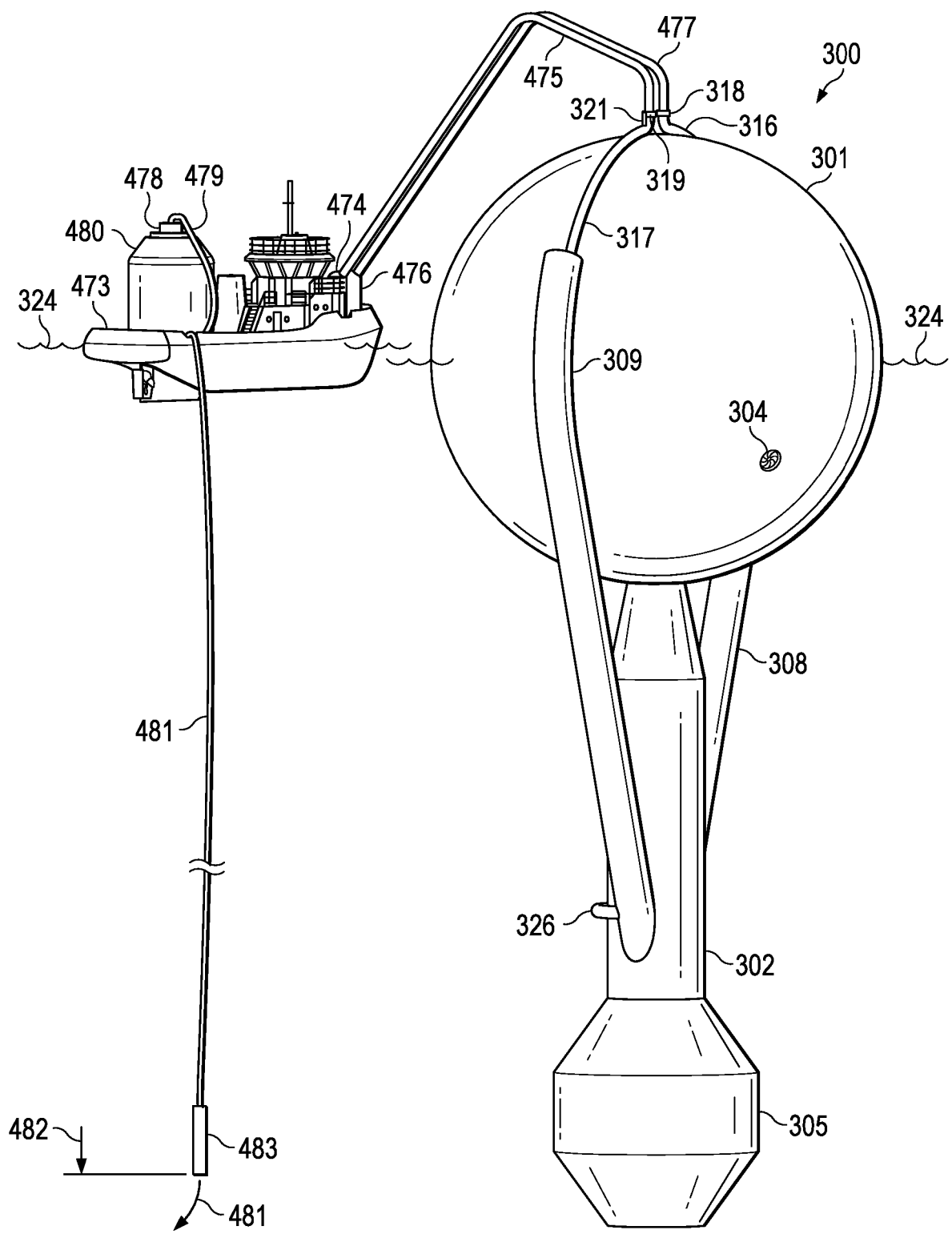
FIG. 22 is a perspective side view of an offtake ship removing hydrochloric acid from the third embodiment.

FIG. 22 is a perspective side view of another embodiment comprising an offtake ship 473 removing hydrochloric acid from the embodiment that is illustrated in FIGS. 7-21.

An offtake ship 473 approaches, and holds a position relative to, an embodiment 300 of the present disclosure. By adjusting the orientation of a rotatable effluent hose-crane base 474, in combination with adjustments of motorized articulating joints (not shown), an operator of the offtake ship positions a crane-supported offtake effluent hose 475 so that, and/or until, the hose's offtake effluent valve (at a distal end of offtake effluent hose 475, and not visible in its connected position within the embodiment's offtaking effluent valve 319) is aligned with, and mates to, its complementary offtaking effluent valve 319), thereby creating a fluid connection between the offtaking ship's offtake effluent hose 475 and an interior of the embodiment's offtaking effluent pipe 317, which, in turn, is fluidly connected to a hollow interior of, and the hydrochloric acid solution contained within, the hydrochloric acid storage tank 309.

Likewise, the operator of the offtake ship 473 adjusts the orientation of a rotatable replacement hose-crane base 476, in combination with adjustments of motorized articulating joints (not shown), in order to position a crane-supported offtake replacement hose 477 so that, and/or until, the hose's offtake replacement valve (at a distal end of offtake replacement hose 477, and not visible in its connected position within the embodiment's offtaking replacement valve 318) is aligned with, and mates to, its complementary offtaking replacement valve 318), thereby creating a fluid connection between the offtaking ship's offtake replacement hose 477 and an interior of the embodiment's offtaking replacement pipe 316, which, in turn, is fluidly connected to a hollow interior of, and the hydrochloric acid solution contained within, the hydrochloric acid storage tank 308.

The offtake ship 473, after fluidly connecting its offtake effluent hose 475 to the embodiment's offtaking effluent pipe 317 (via the fluid connection of the offtake effluent valve (not visible) of the offtake effluent hose 475 and the embodiment's offtaking effluent valve 319), and after fluidly connecting its offtake replacement hose 477 to the embodiment's offtaking replacement pipe 316 (via the fluid connection of the offtake replacement valve (not visible) of the offtake replacement hose 477 and the embodiment's offtaking replacement valve 318), then initiates a pumping of seawater into and through the offtake replacement hose 477, thereby displacing hydrochloric acid solution within the hydrochloric acid storage tank 308, while, at approximately the same time, initiates a hydrochloric acid pump 478 which draws hydrochloric acid solution from a hydrochloric acid feed pipe 479 which is fluidly connected to the ship's offtake effluent hose 475 and deposits that hydrochloric acid solution into a hydrochloric acid storage tank 480. The combination of the ship's pumping of seawater into the embodiment's offtaking replacement pipe 316, and its pumping of hydrochloric acid solution from the embodiment's offtaking effluent pipe 317, results in a transfer of hydrochloric acid solution from an interior of the embodiment's hydrochloric acid storage tanks 308 and 309 (which are fluidly interconnected by tank connecting pipe 326) to an interior of the offtake ship's hydrochloric acid storage tank 480.

Due to the "pushing" of hydrochloric acid solution from the hydrochloric acid storage tanks 308 and 309 of the embodiment through an introduction and/or pumping of seawater into hydrochloric acid storage tank 308, the hydrochloric acid solution removed from the embodiment will experience some dilution (as the hydrochloric acid solution within the hydrochloric acid storage tanks 308 and 309 mixes with the seawater introduced to hydrochloric acid storage tank 308). When a sensor (not shown) onboard the offtake ship 473 determines that the concentration of the hydrochloric acid solution being removed from the embodiment has fallen to or below a threshold minimum concentration, the operator of the offtake ship will end the pumping of seawater into and through offtake replacement hose 477, and will instead pump atmospheric air into that hose, thereby continuing the displacement of hydrochloric acid solution within the hydrochloric acid storage tanks 308 and 309, and facilitating a removal and/or transfer of that hydrochloric acid solution by and/or to the offtake ship.

After the offtake ship has removed a sufficient amount and/or volume of hydrochloric acid solution from the hydrochloric acid storage tanks 308 and 309, an upper surface (350 in FIG. 14) of the hydrochloric acid solution falls to a point that is below the lower mouth (362 in FIG. 14) of the embodiment's offtaking effluent pipe 317 after which the offtake ship can no longer remove hydrochloric acid solution from the hydrochloric acid storage tanks 308 and 309 and continued pumped removal of fluid from those hydrochloric acid storage tanks draws air into the offtake ship's 473 offtake effluent hose 475.

After the desired and/or requisite amount of hydrochloric acid solution has been removed from the hydrochloric acid storage tanks 308 and 309 of the embodiment, the offtake ship 473 disconnects the offtake effluent valve (not visible) of its offtake effluent hose 475 from the offtaking effluent valve 319 of the embodiment (thereby causing that valve to close), and it disconnects the offtake replacement valve (not visible) of its offtake replacement hose 477 from the offtaking replacement valve 318 of the embodiment (thereby causing that valve to close).

The offtake ship is equipped with a discharge hose 481 through which hydrochloric acid solution from an interior of the offtake ship's hydrochloric acid storage tank 480 is passively and continuously discharged 481 at and/or to a significant depth 482, e.g., a depth of approximately 2 kilometers, thereby sequestering the acid in the nominally alkaline depths of the sea. A discharge nozzle 483 at a distal and/or lower end of the discharge hose 481 inhibits degradation of the lower end of the flexible portion of the discharge hose as well as provides weight and a corresponding downward tension in the discharge hose that tends to inhibit excessive lifting and bending of the discharge hose, e.g., as might occur in response to, and/or as a consequence of, strong underwater currents.

An alternate embodiment of the offtake ship lacks a discharge hose, and/or lacks a discharge hose of significant length. This alternate offtake ship, after offloading hydrochloric acid solution from a hydrochloric-acid producing embodiment, e.g., 300, transports and/or delivers the offloaded hydrochloric acid solution stored in its hydrochloric acid storage tank 480 to another vessel, a seafloor-mounted platform, a floating platform, a barge, and/or a seaside port.

Another alternate embodiment of the offtake ship is autonomous. This alternate offtake ship automatically locates, approaches, and maintains its position adjacent to a hydrochloric-acid producing embodiment, e.g., 300, and then automatically offloads hydrochloric acid solution from the embodiment, before automatically disconnecting from that embodiment and processing the offloaded hydrochloric acid, e.g., discharging it to depth, and/or delivering it to a receiving vessel or port.

Embodiments of the present disclosure that are similar to the one illustrated in FIGS. 7-21 trigger an ignition, combustion, and/or reaction, of hydrogen and chlorine gases within their respective combustion chambers, using light sources of wavelengths other than ultraviolet, other electrical phenomena, and other catalysts of the exothermic hydrogen and chlorine chemical reaction. The scope of the present disclosure includes embodiments incorporating, utilizing, and/or including, any and all means, devices, signals, triggers, and/or physical phenomena, which are able to cause hydrogen and chlorine gases to react and thereby form hydrogen chloride gas.

Embodiments of the present disclosure that are similar to the one illustrated in FIGS. 7-21 incorporate, utilize, and/or include, seawater diaphragm-cell electrolyzers. Embodiments of the present disclosure that are similar to the one illustrated in FIGS. 7-21 incorporate, utilize, and/or include, electrolyzers which incorporate, utilize, and/or include, diaphragms comprised of porous mixtures of asbestos and polymers. Embodiments of the present disclosure that are similar to the one illustrated in FIGS. 7-21 do not include any diaphragm or membrane between anode and cathode elements.

Embodiments of the present disclosure that are similar to the one illustrated in FIGS. 7-21 incorporate, utilize, and/or include, an electrolyzer cathode comprised of steel. Embodiments of the present disclosure that are similar to the one illustrated in FIGS. 7-21 incorporate, utilize, and/or include, electrolyzers incorporating, utilizing, and/or including steel cathodes having exterior coatings of nickel. Embodiments of the present disclosure that are similar to the one illustrated in FIGS. 7-21 incorporate, utilize, and/or include, an electrolyzer cathode comprised of a flat hollow steel mesh or perforated steel sheet covered with asbestos fibers and fibrous polytetrafluoro-ethylene (PFTE), wherein the asbestos fibers and fibrous PFTE function as the electrolyzer diaphragm. Embodiments of the present disclosure that are similar to the one illustrated in FIGS. 7-21 incorporate, utilize, and/or include, electrolyzer cathodes coated with a catalyst such as, but not limited to, nickel-sulfur, nickel-aluminum, nickel-nickel-oxide, platinum-group metals, to increase the cathode's surface area and reduce the hydrogen evolution potential.

Embodiments of the present disclosure that are similar to the one illustrated in FIGS. 7-21 incorporate, utilize, and/or include, electrolyzer anodes comprised of titanium plates covered with layers of Group VIII oxides with metal conductivity (e.g., covered with exterior coatings of ruthenium oxide and/or titanium oxide), and sometimes including iridium oxide.

Embodiments of the present disclosure that are similar to the one illustrated in FIGS. 7-21 incorporate, utilize, and/or include, electrolyzers fluidly connected, e.g., by "descaling" valves, to respective hydrochloric acid reservoirs, e.g., 350. Periodically, an embodiment control system opens a respective descaling valve and thereby permits a relatively small amount and/or quantity of hydrochloric acid solution to flow from a respective hydrochloric acid solution reservoir into the respective cathodic portion and/or chamber of the respective seawater electrolyzer thereby dissolving and/or flushing from the cathodic chamber any precipitates of calcium hydroxide and/or magnesium hydroxide. The illustrations and discussions of FIGS. 7-21 omit, for the sake of clarity, such obvious and mundane precipitant-flushing mechanisms, devices, and/or systems.

Embodiments of the present disclosure that are similar to the one illustrated in FIGS. 7-21 incorporate, utilize, and/or include, seawater electrolyzer chambers and/or housings comprised, at least in part, of polyvinyl chlorides, and/or PVCs, as materials of construction and/or fabrication.

Embodiments of the present disclosure that are similar to the one illustrated in FIGS. 7-21 are moored, as well as those that are self-propelled, and such as the one illustrated in FIGS. 7-21, that is free-floating. The illustrations and discussions of FIGS. 7-21 omit, for the sake of clarity, the obvious and mundane features and mechanisms required of moored devices, as well as the obvious and mundane features and mechanisms required of self-propelled devices. Embodiments of the present disclosure that are similar to the one illustrated in FIGS. 7-21 incorporate, utilize, and/or include, propellers rotated by electrical motors that are energized, at least in part, by electrical power produced by respective embodiments; rigid sails rotatably connected to upper parts of respective devices and rotated by electrical motors that are energized, at least in part, by electrical power produced by respective embodiments; and, two or more adjacent effluent channels the effluence flowing from which produces a thrust that propels a respective embodiment, and into which, and/or from which, a rate of effluence may be altered so as to produce a torque that rotates a respective embodiment thereby thus enabling a steering of a respective embodiment.

Embodiments of the present disclosure that are similar to the one illustrated in FIGS. 7-21 discharge their acidic solution into the depths of an ocean upon which they float through the use of an acid discharge hose.

Embodiments of the present disclosure that are similar to the one illustrated in FIGS. 7-21 produce hydrochloric acid, and/or other acids, by means of a chemical process and/or electrolysis acting upon seawater and energized by electrical power produced by the respective embodiments through their extraction and conversion of energies harvested from ambient winds and/or waves. Embodiments of the present disclosure that are similar to the one illustrated in FIGS. 7-21 produce hydrochloric acid, and/or other acids, from seawater, utilizing methods, processes, and/or apparatuses, not specified, enumerated, and/or included within the present disclosure. Embodiments of the present disclosure that are similar to the one illustrated in FIGS. 7-21 transfer, move, and/or transport hydrochloric acid, and/or other acids, to parts and/or portions of an ocean far below the surface utilizing methods, processes, and/or apparatuses, not specified, enumerated, and/or included within the present disclosure.

Figure 23:
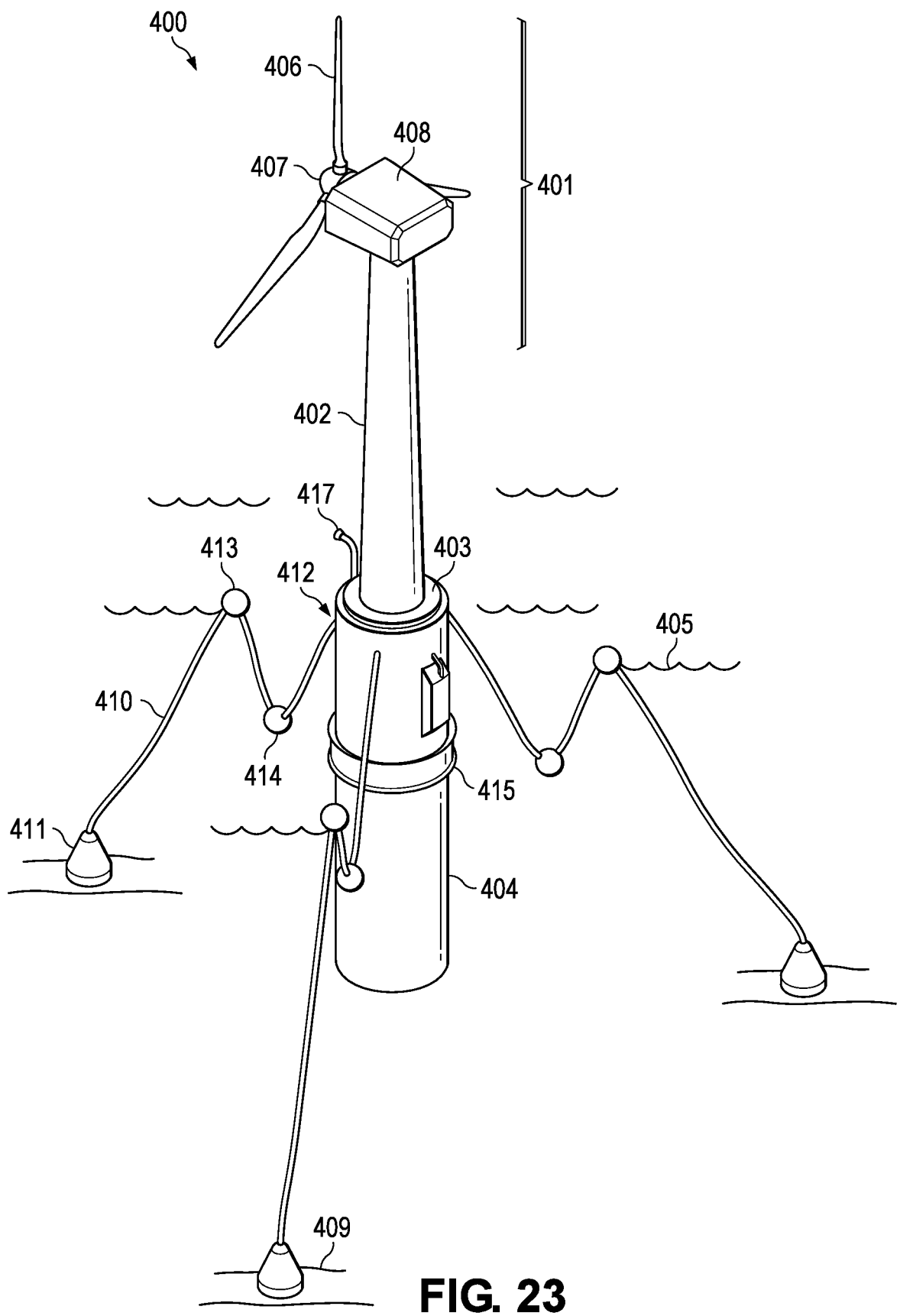
FIG. 23 is a perspective side view of a fourth embodiment of the present invention.

FIG. 23 shows a perspective side view of a fourth embodiment 400 of the present disclosure. The embodiment illustrated in FIG. 23 is a wind-energy-to-hydrochloric-acid conversion device, and it includes, incorporates, utilizes, and/or comprises, a wind turbine 401 rotatably mounted to an upper end of an approximately vertical turbine support strut 402. A turbine-strut mounting plate 403 affixed to a lower end of the turbine support strut, is affixed to an upper end of an approximately and/or nominally vertical and buoyant spar buoy 404 which floats adjacent to an upper surface 405 of a body of seawater and/or brackish water.

The embodiment's wind turbine 401 is a horizontal-axis wind turbine. The wind turbine comprises three turbine blades, e.g., 406, that are rotatably connected to a turbine hub 407. In response to a blowing of wind through the blades of the wind turbine, the turbine hub rotates thereby energizing an electrical generator (not visible) inside the wind turbine's nacelle 408, causing the electrical generator to produce electricity.

Because the wind turbine 401 is rotatably mounted to an upper end of the turbine support strut 402, the wind turbine tends to rotate so as to align the rotational axis of the wind turbine's hub 407 with the wind direction, i.e., the wind turbine tends to rotate so as to position the rotational axis of the wind turbine's hub to be parallel to the wind direction.

The embodiment 400 is moored to a seafloor 409 by three mooring cables, e.g., 410. A distal end of each mooring cable is attached to an anchor, e.g., 411, that rests upon the seafloor. A proximal end, e.g., 412, of each mooring cable is attached to an upper part and/or portion of the spar buoy 404. Intermediate floats, e.g., 413, and weights, e.g., 414, help to position, and/or to flexibly and/or elastically maintain and/or restore the position of, the embodiment 400 at a geospatial position above the seafloor, especially when it is buffeted by ocean waves, currents, and/or winds.

An embodiment similar to the one illustrated in FIG. 23 is free-floating and self-propelled. One such embodiment is self-propelled using propellers. Another such embodiment is self-propelled using water jets.

The embodiment 400 includes, incorporates, utilizes, and/or comprises, a seawater electrolyzer (not visible) positioned within a hollow interior of the buoyant spar buoy 404. An electrolyzer cowling, manifold, and/or shroud 415 surrounds a plurality of coaxial cylindrical flow-straightening baffles (not visible), and passively directs a portion of the surrounding seawater 405 into and through those flow-straightening baffles when the spar buoy moves up and down in response to a passing wave, and/or as in response to a wave heave.

Mounted and/or affixed to an exterior surface of the embodiment's spar buoy 404 is a combustion chamber 416 in which hydrogen and chlorine gases produced by the seawater electrolyzer (not visible) are exothermically reacted so as to produce hydrogen chloride gas, which upon its dissolution into water reservoir becomes, and/or transforms into, hydrochloric acid therein. A portion of the hydrochloric acid produced within the combustion chamber is diluted and stored within a hydrochloric acid storage tank (not visible, positioned within a hollow interior of the spar buoy). A hydrochloric acid removal valve 417 is fluidly connected to a bottom portion of the hydrochloric acid storage tank and a hydrochloric removal vessel (not shown) periodically removes hydrochloric acid from the embodiment's hydrochloric acid storage tank by fluidly connecting a hydrochloric acid removal hose to the embodiment's hydrochloric acid removal valve.

Figure 24:
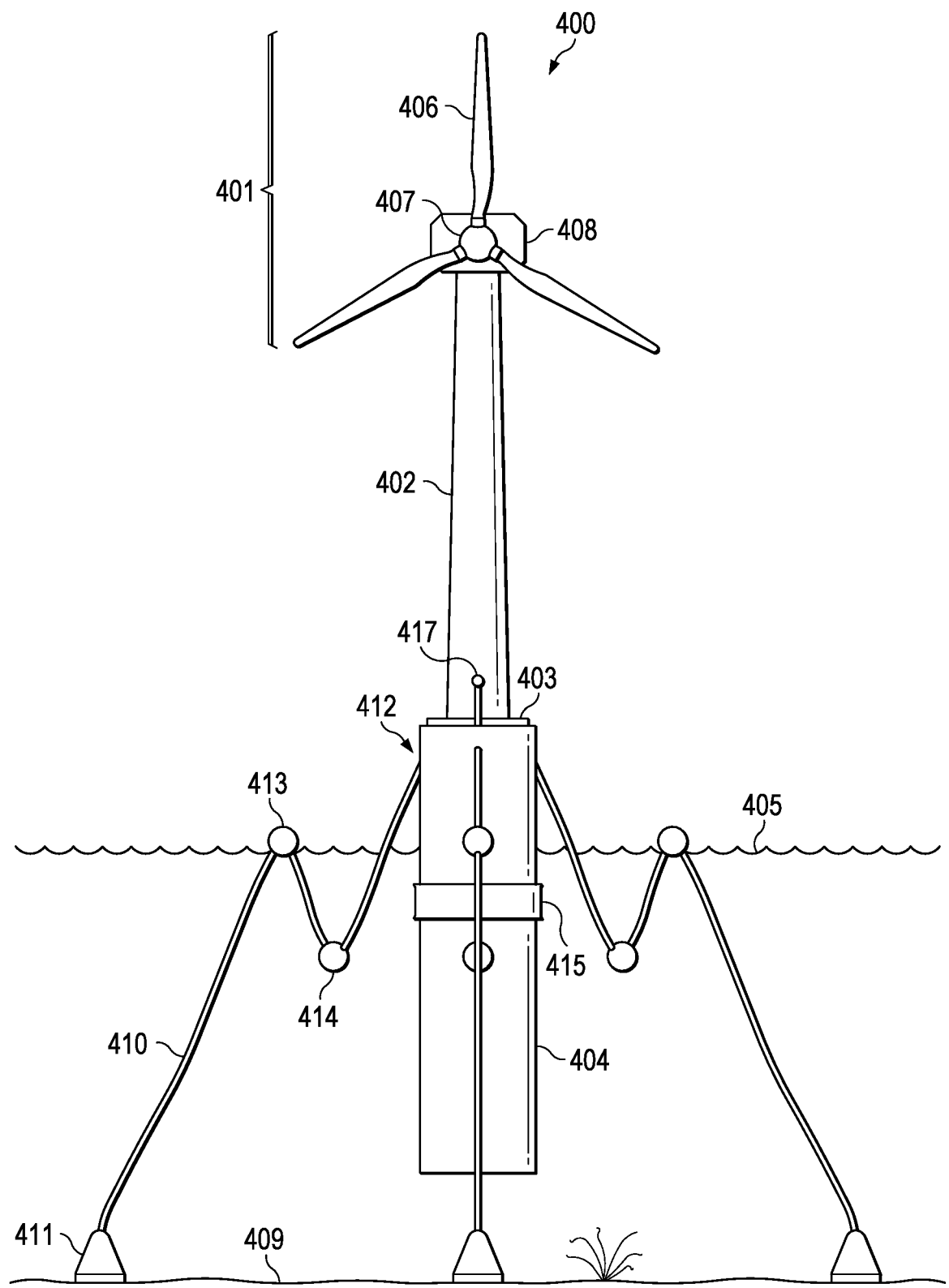
FIG. 24 is a side view of the fourth embodiment.

FIG. 24 shows a side view of the same embodiment 400 that is illustrated in FIG. 23.

Figure 25:
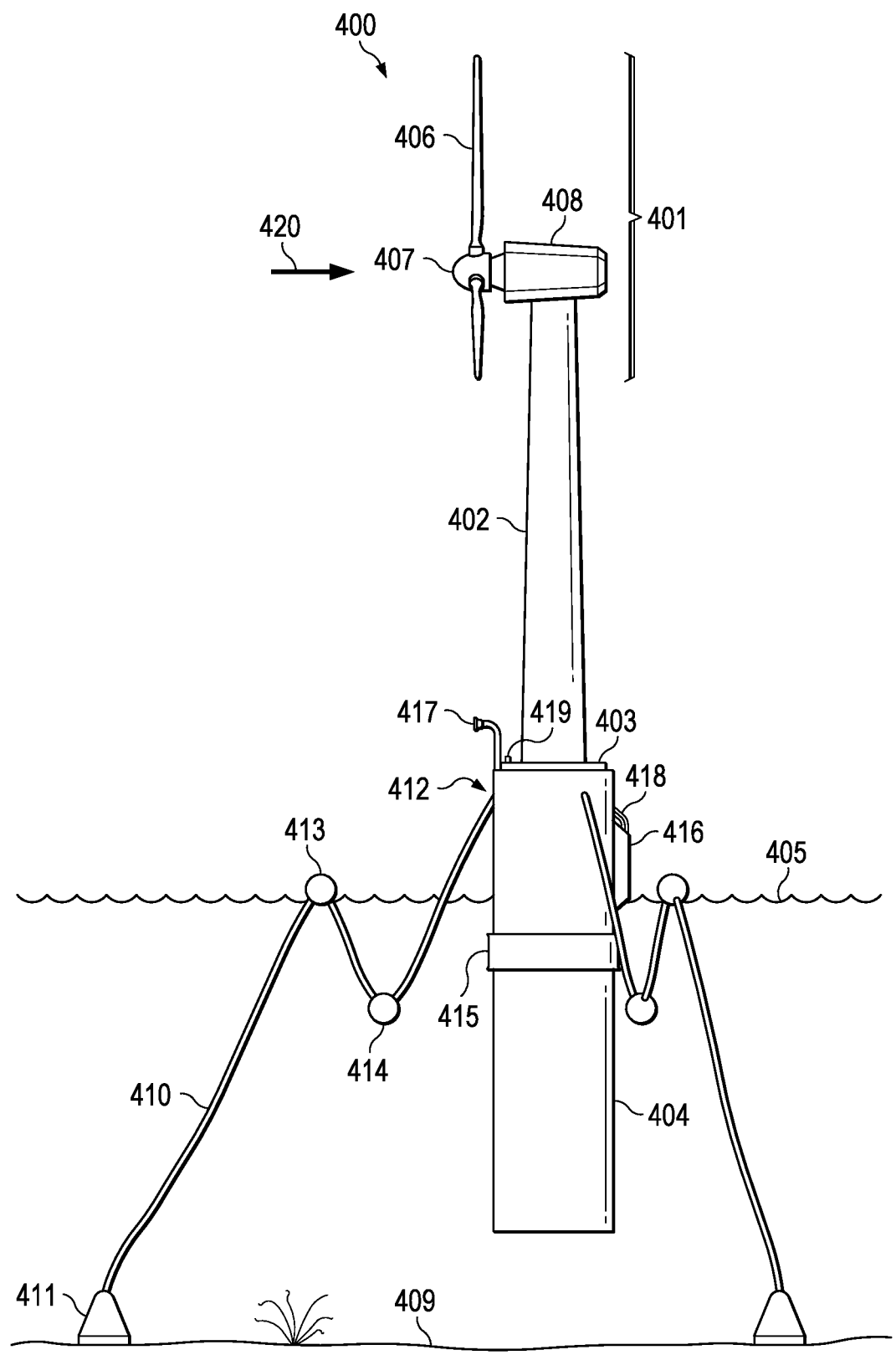
FIG. 25 is a side view of the fourth embodiment.

FIG. 25 shows a side view of the same embodiment 400 that is illustrated in FIGS. 23 and 24.

Hydrogen and chlorine gases produced and/or synthesized in the embodiment's seawater electrolyzer (not visible, and positioned within a hollow interior of the spar buoy 404) flow from the seawater electrolyzer to an interior of the combustion chamber 416 through a pair of electrolyzer gas pipes 418: a hydrogen gas pipe (not distinguishable), and a chlorine gas pipe (not distinguishable).

As hydrochloric acid is produced within the embodiment's combustion chamber 416 and flows into, and is diluted within, the embodiment's hydrochloric acid storage tank (not visible, and positioned within a hollow interior of the spar buoy 404), the volume of hydrochloric-acid solution within the hydrochloric acid storage tank increases. A pressure relief pipe 419 vents air from inside the hydrochloric acid storage tank to the atmosphere outside the embodiment.

When wind 420 flows and/or blows through the blades, e.g., 406, of the embodiment's wind turbine 401, a generator operatively connected to the wind turbine hub 407 and positioned inside the wind turbine's nacelle 408 is energized and produces electrical power that is transmitted via an electrical cable (not visible) to the embodiment's seawater electrolyzer (not visible). And, when so energized, the embodiment's seawater electrolyzer synthesizes hydrogen gas from hydronium ions in the seawater, and it synthesizes chlorine gas from chloride ions in the seawater, which gases flow separately and without mixing to the combustion chamber 416 through a pair of electrolyzer gas pipes 418.

Figure 26:
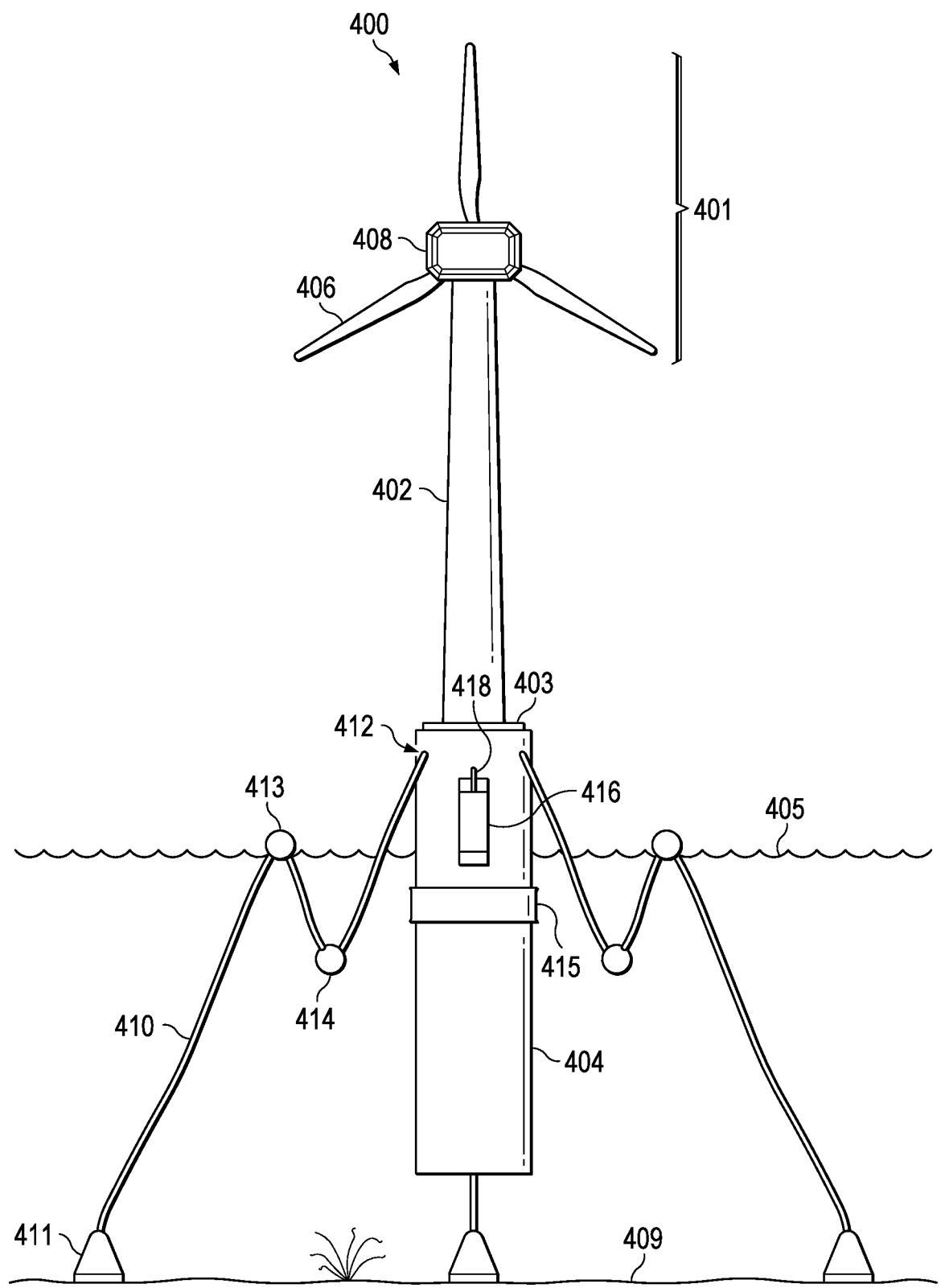
FIG. 26 is a side view of the fourth embodiment.

FIG. 26 shows a side view of the same embodiment 400 that is illustrated in FIGS. 23-25.

Figure 27:
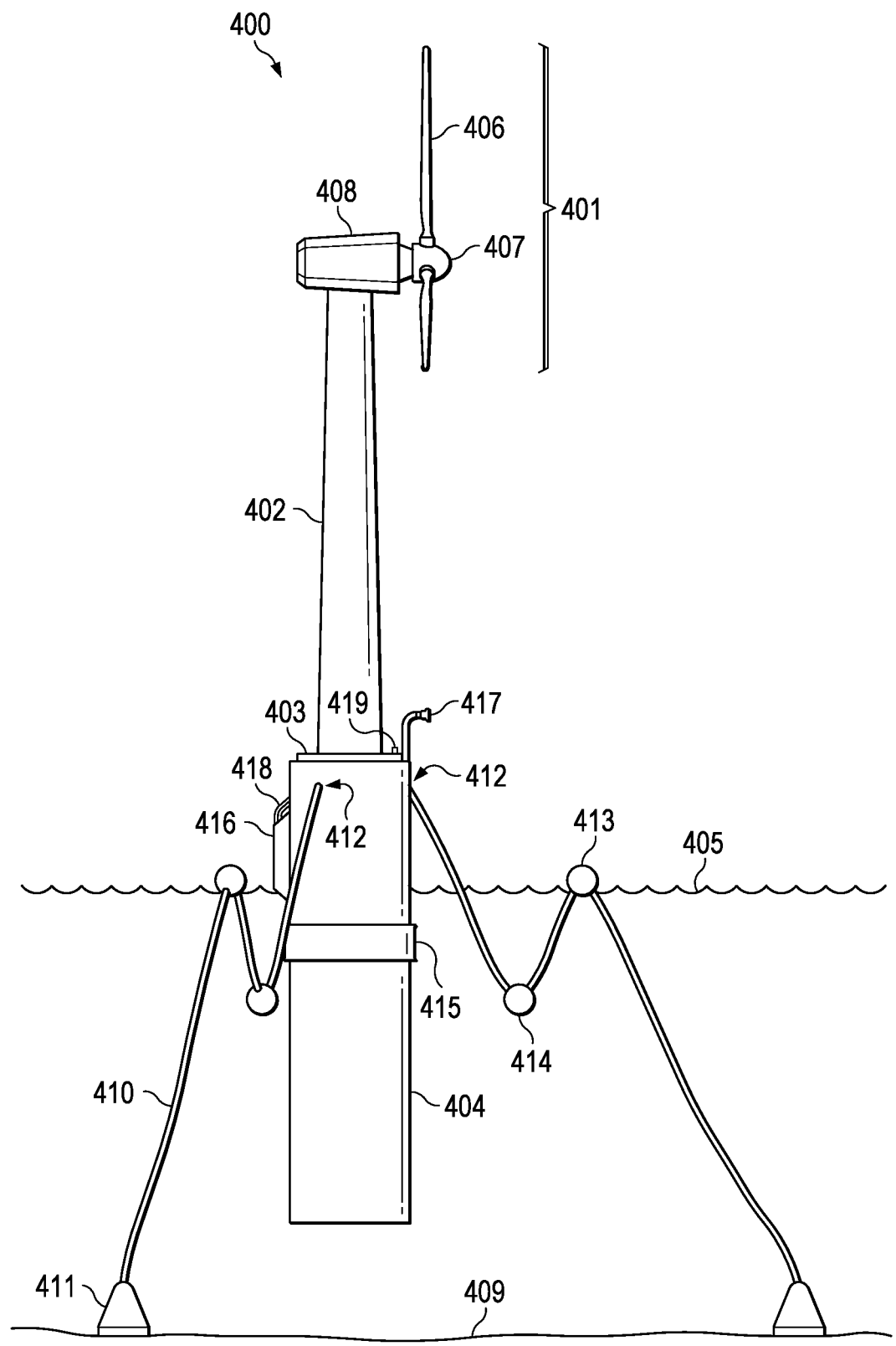
FIG. 27 is a side view of the fourth embodiment.

FIG. 27 shows a side view of the same embodiment 400 that is illustrated in FIGS. 23-26.

Figure 28:
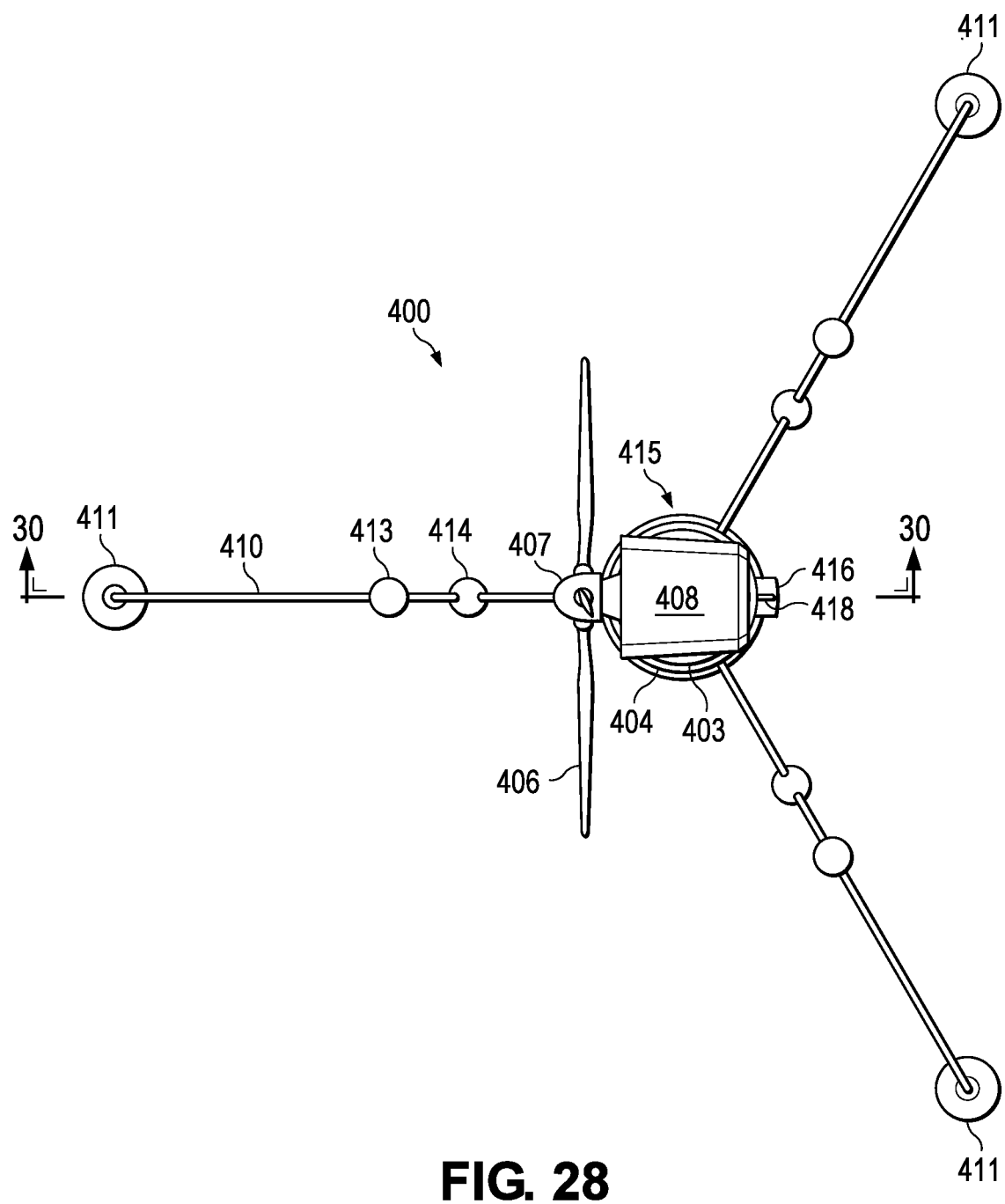
FIG. 28 is a top-down view of the fourth embodiment.

FIG. 28 shows a top-down view of the same embodiment 400 that is illustrated in FIGS. 23-27.

Figure 29:
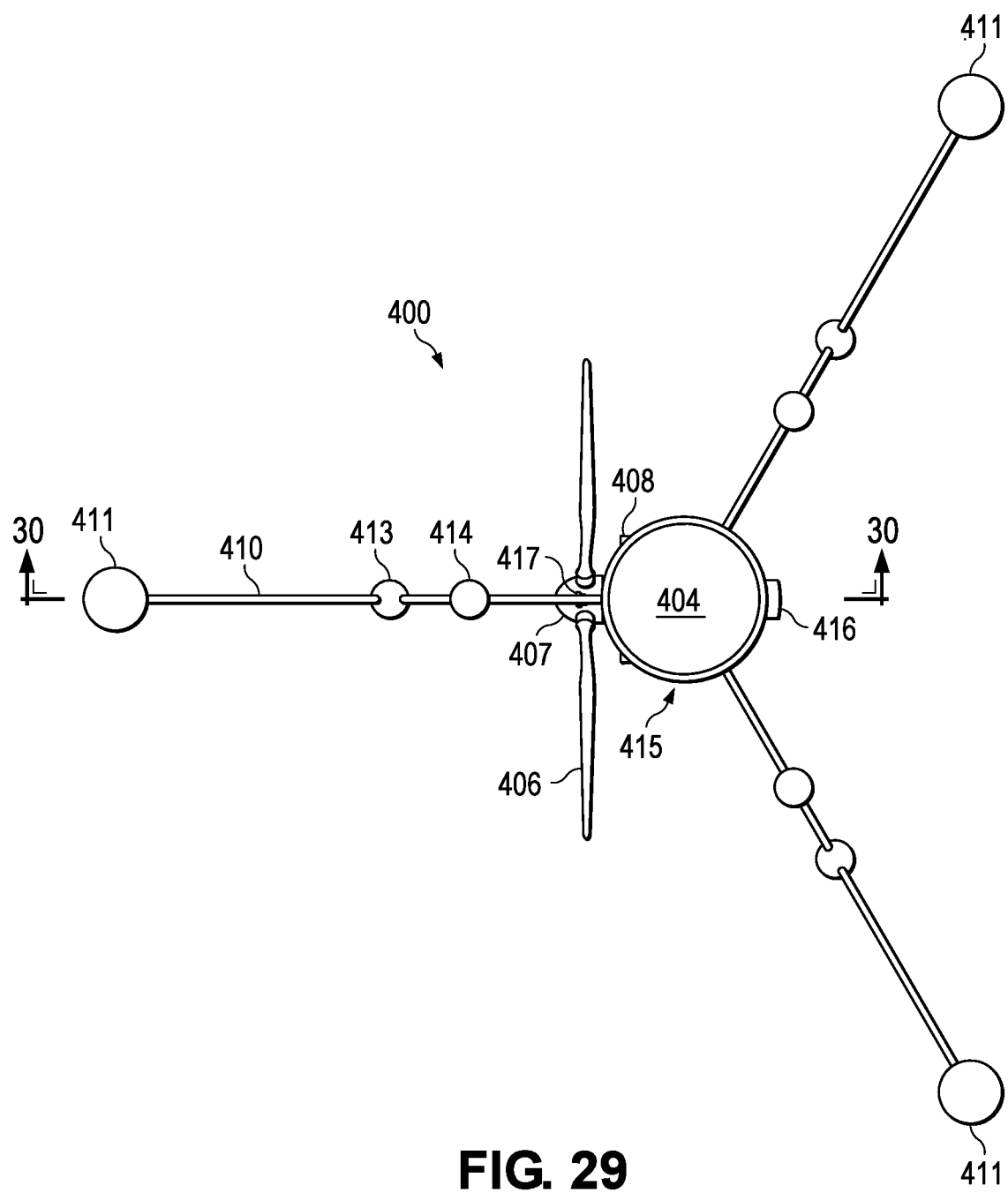
FIG. 29 is a bottom-up view of the fourth embodiment.

FIG. 29 shows a bottom-up view of the same embodiment 400 that is illustrated in FIGS. 23-28.

Figure 30:
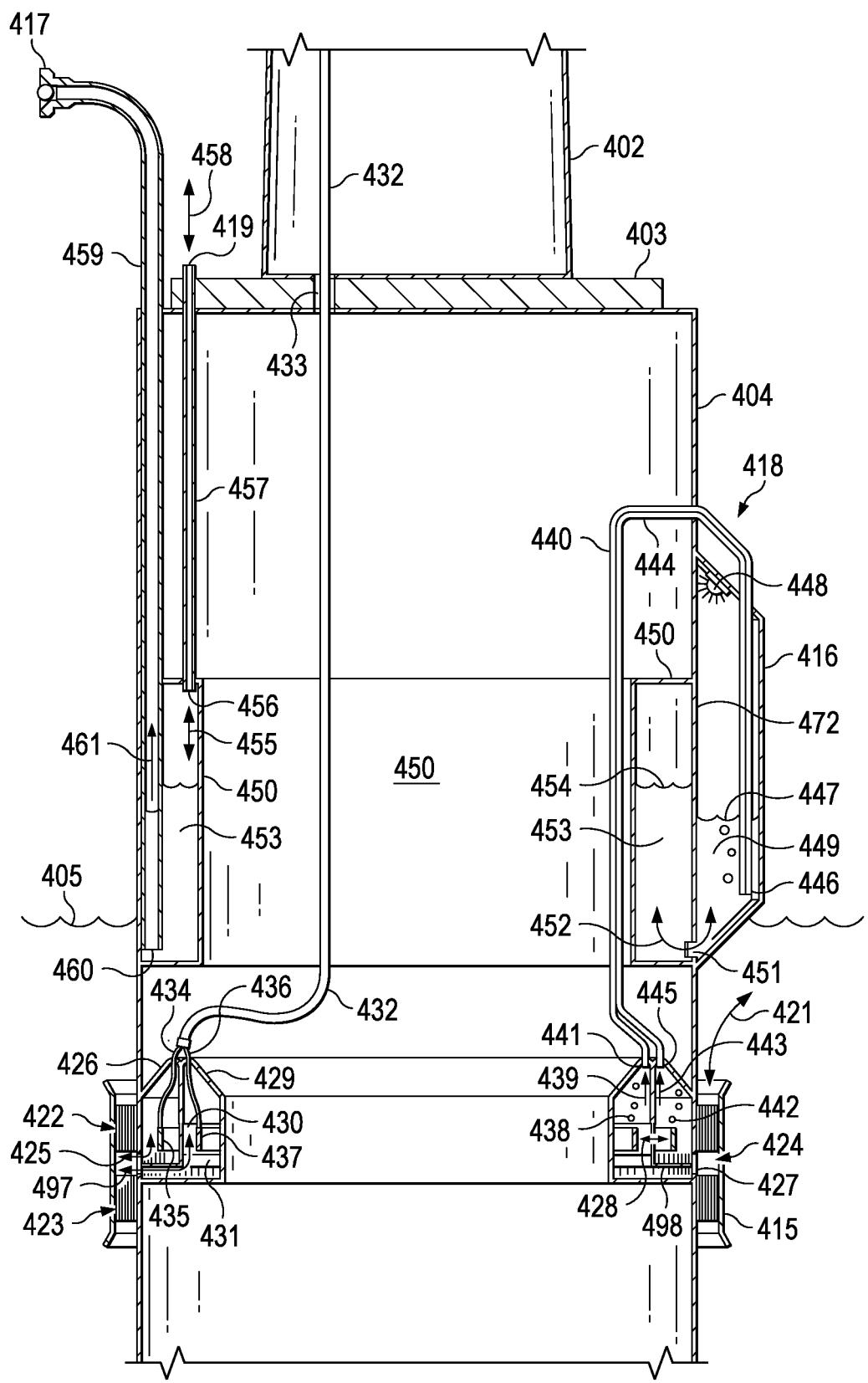
FIG. 30 is a close-up view of a portion of a side sectional view of the fourth embodiment.

FIG. 30 shows a close-up portion of a side sectional view of the same embodiment that is illustrated in FIGS. 23-29. The section plane is taken along section line 30-30 of FIGS. 28 and 29.

As waves heave at the embodiment (400 in FIGS. 23-27), seawater 405 tends to flow 421 in and out of the annular electrolyzer cowling 415, thereby tending to flow through the upper 422 and lower 423 annular vertical flow-straighteners, and therethrough into and out of a flow-straightened electrolyte-refresh pocket 424. Each of the upper and lower annular flow-straighteners is comprised of a plurality of vertically-oriented cylindrical surfaces, plates, and/or sheets, coaxial with a vertical longitudinal axis of the spar buoy 404, and each of the upper and lower annular flow-straighteners reduces turbulence in the water flowing from the body of water 405 into and out of the electrolyte-refresh pocket.

Each of the electrolyzer's two chambers, i.e., the cathodic electrolyzer chamber 429, and the anodic electrolyzer chamber 426, is independently and/or separately fluidly connected to the electrolyte-refresh pocket 424. So, as seawater flows in and out of that electrolyte-refresh pocket, it also flows 425, independently, in and out of the anodic electrolyzer chamber 426, thereby refreshing the chloride ion content of the water around the anode (enabling an oxidation of chloride ion to chlorine gas), and it flows 497, independently, in and out of the cathodic electrolyzer chamber 429, thereby preventing a buildup, and/or accumulation, of hydroxide ions (which if they were to flow to the anodic chamber could interfere with the production of chlorine gas). The independent flows of seawater from the electrolyte-refresh pocket top each of the anodic and cathodic electrolyzer chambers is facilitated by an approximately horizontal plate 498 that separates the two electrolyzer chambers and divides the in and out flow of seawater between those electrolyzer chambers and the electrolyte-refresh pocket.

As seawater 405 flows into and out from the embodiment's electrolyte-refresh pocket 424, it also tends to flow 425 into and out from the anodic electrolyzer chamber 426 through an annular array of seawater refresh apertures, e.g., 427. Some ions within the anodic electrolyzer chamber are able to flow 428 into the embodiment's cathodic electrolyzer chamber 429, and some ions within the cathodic electrolyzer chamber 429 are able to flow 428 into the embodiment's anodic electrolyzer chamber, through an annular semipermeable and/or microporous mesh or diaphragm 430 incorporated within the medial electrolyzer wall 431. The semipermeable microporous mesh allows certain ions to flow freely back and forth between the anodic and cathodic electrolyzer chambers, while inhibiting a more substantial and/or liberal exchange of water or gas therethrough. The relatively rapid rate at which the seawater within the anodic electrolyzer chamber 426 is refreshed, e.g., 425, tends to quickly restore a concentration of chloride (Cl−) ions depleted during the anode's oxidation of chloride ions to chlorine gas, and to quickly remove any hydroxide ions which may have migrated to, and/or into, the anodic electrolyzer chamber from the cathodic electrolyzer chamber. The relatively rapid rate at which the seawater within the cathodic electrolyzer chamber 429 is refreshed, e.g., 497, tends to quickly remove any hydroxide ions (OH−) which may have accumulated during the cathode's reduction of hydronium ions (H3O+) to hydrogen gas.

The embodiment's wind-powered generator (not shown), that is positioned inside the embodiment's nacelle (not visible, 408 in FIGS. 23-28) and operatively connected to the embodiment's wind-turbine hub (407 in FIGS. 23-29) and wind-turbine blades (e.g., 406 in FIGS. 23-29), produces electrical power in response a blowing of a wind through its wind-turbine blades. A portion of the electrical power generated by the embodiment's generator is transmitted to the embodiment's electrolyzer 426 and 429 via and/or through an electrical cable 432 which passes from the generator to the electrolyzer through a via, conduit, and/or aperture 433 in a base of the embodiment's turbine support strut 402 and its turbine-strut mounting plate 403.

At an end of the electrical cable 432 proximate to the electrolyzer 426 and 429, the electrical cable splits with one portion, part, and/or conductor, i.e., the anodic electrical cable 434, being electrically connected to the electrolyzer's anodic electrode 435, and another portion, part, and/or conductor, i.e., the cathodic electrical cable 436, being electrically connected to the electrolyzer's cathodic electrode 437.

When the embodiment's generator (not shown) transmits electrical power to the anodic 435 and cathodic 437 electrodes of the embodiment's electrolyzer, the electrolyzer tends to produce, synthesize, and/or generate, hydrogen and chlorine gases. In response to electrical power from the embodiment's generator, the electrolyzer's cathodic electrode tends to produce, evolve, and/or generate, bubbles, e.g., 438, of hydrogen gas, which tend to rise 439 within the water inside the cathodic electrolyzer chamber 429 and thereby and therethrough flow into a hydrogen effluent pipe 440 through an aperture and/or mouth 441 in the hydrogen effluent pipe, said mouth 441 positioned inside an upper part and/or portion of the cathodic electrolyzer chamber. In response to electrical power from the embodiment's generator, the electrolyzer's anodic electrode tends to produce, evolve, and/or generate, bubbles, e.g., 442, of chlorine gas, which tend to rise 443 within the water inside the anodic electrolyzer chamber 426 and thereby and therethrough flow into a chlorine effluent pipe 444 through an aperture and/or mouth 445 in the chlorine effluent pipe, said mouth 445 positioned inside an upper part and/or portion of the anodic electrolyzer chamber.

The hydrogen and chlorine gases flow upward, and away from the electrolyzer 426 and 429, separately through respective hydrogen effluent 440 and chlorine effluent 444 pipes, with those gases tending to bubble out from respective apertures and/or mouths 446 in those gas effluent pipes, said mouths distal to the electrolyzer and positioned within the embodiment's annular combustion chamber 416. The hydrogen and chlorine gas bubbles released, emitted, and/or ejected, from the respective hydrogen effluent and chlorine effluent pipes bubble up to, and then through, an upper surface 447 of water within a lower part and/or portion of the combustion chamber, thereby combining, and/or mixing, with other hydrogen and chlorine gases produced within the embodiment's electrolyzer. An ultraviolet lamp 448 mounted at an upper end of an interior of the combustion chamber tends to ignite the chlorine and hydrogen gases therein, causing them to react, combust, and/or burn, thereby creating, producing, synthesizing, and/or making, from those chlorine and hydrogen gases, hydrogen chloride gas which quickly, if not immediately, dissolves in and/or into a combustion-chamber water reservoir 449 at a bottom end of the interior of the combustion chamber thereby becoming, producing, and/or creating, hydrochloric acid, the dissolution of which acidifies that combustion-chamber water reservoir.

The acidified combustion-chamber water reservoir is fluidly connected to an annular hydrochloric acid storage tank 450 via a hydrochloric-acid-equilibration aperture 451 at a bottom end of a wall 472 separating the combustion chamber and the hydrochloric acid storage tank. The water 453 (typically acidified) within the hydrochloric acid storage tank is able to, and does, receive hydrochloric acid from the relatively highly-acidified water 449 within the combustion-chamber water reservoir, through a free flow 452 of waters between the combustion-chamber water reservoir and the hydrochloric acid storage tank water.

As hydrogen and chlorine gases are combusted within the combustion chamber 416 thereby adding hydrochloric acid to the combustion-chamber water reservoir 449, and indirectly adding hydrochloric acid to the water 453 within the hydrochloric acid storage tank, the upper free surfaces 447 and 454 of water respectively within both the combustion-chamber water reservoir and the hydrochloric acid storage tank, rise as the respective volumes of acidified water within the combustion-chamber water reservoir and the hydrochloric acid storage tank increase. As the free surface 454 of the aqueous hydrochloric acid solution 453 within the hydrochloric acid storage tank rises, air within the hydrochloric acid storage tank flows 455 into a lower aperture 456 of a hydrochloric-acid-storage-tank vent pipe 457, and therethrough flows 458 into the atmosphere outside the embodiment through an upper aperture 419 of the hydrochloric-acid-storage-tank vent pipe, thereby tending to equilibrate the air pressure within the hydrochloric acid storage tank.

When a hydrochloric acid removal hose (not shown), e.g., deployed from a hydrochloric acid removal vessel (not shown), is fluidly connected to the embodiment's hydrochloric acid removal valve 417, then a pump fluidly connected to an end of the hydrochloric acid removal hose can reduce a pressure within that hydrochloric acid removal hose, and within the fluidly connected hydrochloric acid removal valve, and the fluidly connected hydrochloric acid effluent pipe 459, thereby tending to cause aqueous hydrochloric acid solution 453 to flow from the hydrochloric acid solution 453 within the hydrochloric acid storage tank 450 and into a lower aperture and/or mouth 460 of the hydrochloric acid effluent pipe, and therethrough to flow 461 up and through the hydrochloric acid effluent pipe, through the hydrochloric acid removal valve, through the hydrochloric acid removal hose, and to the hydrochloric removal vessel, e.g., where it is stored in a hydrochloric acid storage tank on and/or aboard the hydrochloric removal vessel.

Note that an interior of the spar buoy 404 of the embodiment illustrated in FIGS. 23-30 is hollow, e.g., and filled with air, in order to provide the embodiment with sufficient buoyancy to float adjacent to an upper surface 405 of the body of water on which it floats. However, a similar embodiment has an interior in which the otherwise empty and hollow spaces, e.g., excluding the electrolyzer and hydrochloric acid storage tank, is filled with a polyurethane foam or other substance, material, and/or filler, capable of excluding water in case a leak develops in an outer hull of the spar buoy.

Figure 31:
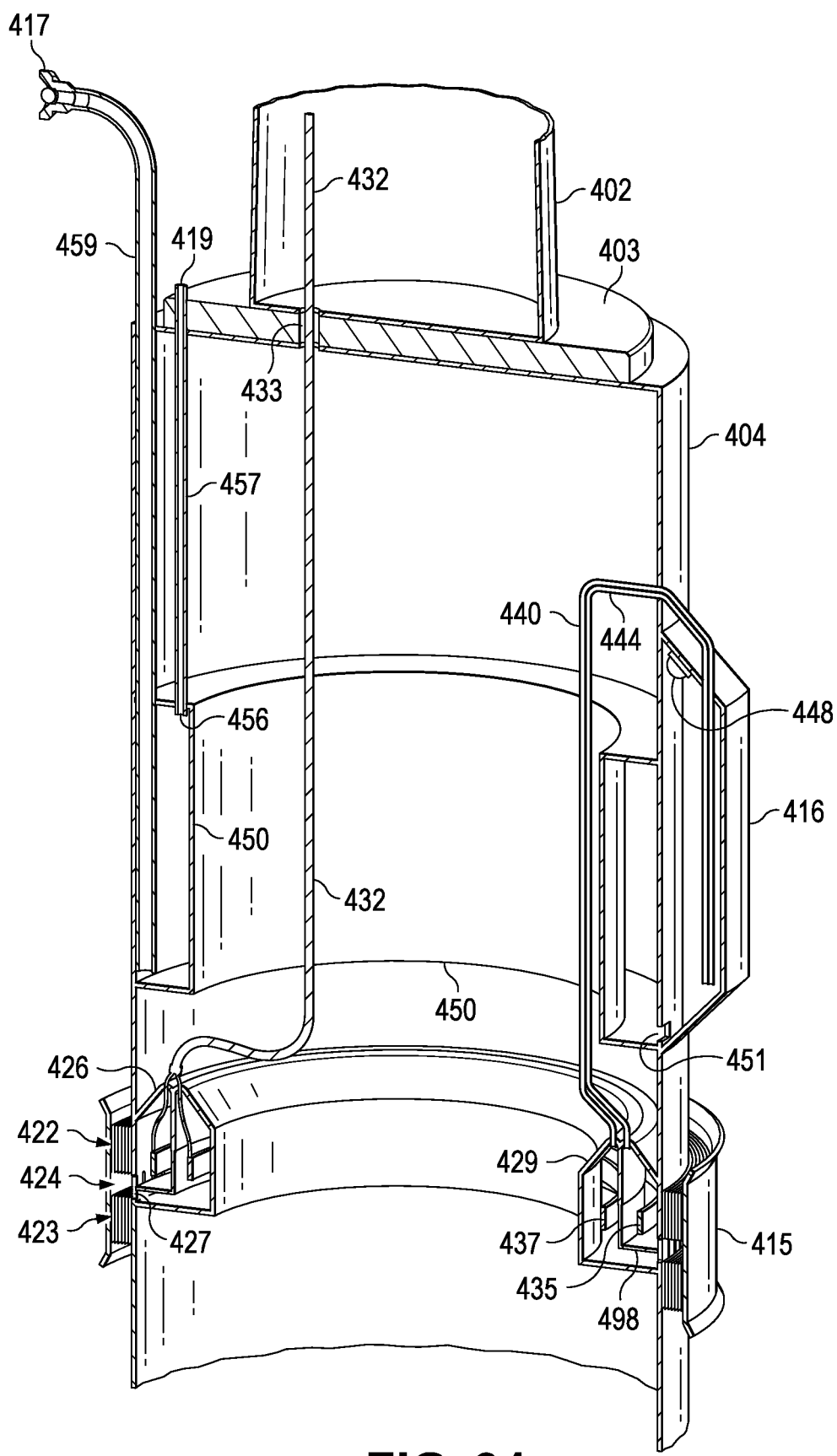
FIG. 31 is a perspective close-up view of a portion of a side sectional view of the fourth embodiment.

FIG. 31 shows a perspective view of a close-up portion of a side sectional view of the same embodiment that is illustrated in FIGS. 23-30. The section plane is taken along section line 30-30 of FIGS. 28 and 29.

Embodiments of the present disclosure that are similar to the one illustrated in FIGS. 23-31 trigger an ignition, combustion, and/or reaction, of hydrogen and chlorine gases within their respective combustion chambers 416, using light sources of wavelengths other than ultraviolet, other electrical phenomena, and other catalysts of the exothermic hydrogen and chlorine chemical reaction. The scope of the present disclosure includes embodiments incorporating, utilizing, and/or including, any and all means, devices, signals, triggers, and/or physical phenomena, which are able to cause hydrogen and chlorine gases to react and thereby form hydrogen chloride gas.

Embodiments of the present disclosure that are similar to the one illustrated in FIGS. 23-31 incorporate, utilize, and/or include, seawater diaphragm-cell electrolyzers. Embodiments of the present disclosure that are similar to the one illustrated in FIGS. 23-31 incorporate, utilize, and/or include, electrolyzers which incorporate, utilize, and/or include, diaphragms comprised of porous mixtures of asbestos and polymers. Embodiments of the present disclosure that are similar to the one illustrated in FIGS. 23-31 that do not include any diaphragm or membrane between anode and cathode elements.

Embodiments of the present disclosure that are similar to the one illustrated in FIGS. 23-31 incorporate, utilize, and/or include, an electrolyzer cathode comprised of steel. Embodiments of the present disclosure that are similar to the one illustrated in FIGS. 23-31 incorporate, utilize, and/or include, electrolyzers incorporating, utilizing, and/or including steel cathodes having exterior coatings of nickel. Embodiments of the present disclosure that are similar to the one illustrated in FIGS. 23-31 incorporate, utilize, and/or include, an electrolyzer cathode comprised of a flat hollow steel mesh or perforated steel sheet covered with asbestos fibers and fibrous polytetrafluoro-ethylene (PFTE), wherein the asbestos fibers and fibrous PFTE function as the electrolyzer diaphragm. Embodiments of the present disclosure that are similar to the one illustrated in FIGS. 23-31 incorporate, utilize, and/or include, electrolyzer cathodes coated with a catalyst such as, but not limited to, nickel-sulfur, nickel-aluminum, nickel-nickel-oxide, platinum-group metals, to increase the cathode's surface area and reduce the hydrogen evolution potential.

Embodiments of the present disclosure that are similar to the one illustrated in FIGS. 23-31 incorporate, utilize, and/or include, electrolyzer anodes comprised of titanium plates covered with layers of Group VIII oxides with metal conductivity (e.g., covered with exterior coatings of ruthenium oxide and/or titanium oxide), and sometimes including iridium oxide.

Embodiments of the present disclosure that are similar to the one illustrated in FIGS. 23-31 incorporate, utilize, and/or include, electrolyzers fluidly connected, e.g., by "descaling" valves, to respective hydrochloric acid reservoirs, e.g., 449. Periodically, an embodiment control system opens a respective descaling valve and thereby permits a relatively small amount and/or quantity of hydrochloric acid solution to flow from a respective hydrochloric acid solution reservoir into the respective cathodic portion and/or chamber of the respective seawater electrolyzer thereby dissolving and/or flushing from the cathodic chamber any precipitates of calcium hydroxide and/or magnesium hydroxide. The illustrations and discussions of FIGS. 23-31 omit, for the sake of clarity, such obvious and mundane precipitant-flushing mechanisms, devices, and/or systems.

Embodiments of the present disclosure that are similar to the one illustrated in FIGS. 23-31 incorporate, utilize, and/or include, seawater electrolyzer chambers and/or housings comprised, at least in part, of polyvinyl chlorides, and/or PVCs, as materials of construction and/or fabrication.

Embodiments of the present disclosure that are similar to the one illustrated in FIGS. 23-31 are fixedly attached to, and/or embedded within, a seafloor. Embodiments of the present disclosure that are similar to the one illustrated in FIGS. 23-31 are free-floating and self-propelled. The illustrations and discussions of FIGS. 23-31 omit, for the sake of clarity, the obvious and mundane features and mechanisms required of embodiments embedded within a seafloor, as well as the obvious and mundane features and mechanisms required of self-propelled embodiments. Embodiments of the present disclosure that are similar to the one illustrated in FIGS. 23-31 incorporate, utilize, and/or include, propellers rotated by electrical motors that are energized, at least in part, by electrical power produced by respective embodiments; and, rigid sails rotatably connected to upper parts of respective devices and rotated by electrical motors that are energized, at least in part, by electrical power produced by respective embodiments.

Embodiments of the present disclosure that are similar to the one illustrated in FIGS. 23-31, and float at the surface of sufficiently deep waters, discharge their acidic solutions into the depths of the ocean upon which they float and produce electrical power and hydrochloric acid solutions.

Embodiments of the present disclosure that are similar to the one illustrated in FIGS. 23-31 produce hydrochloric acid, and/or other acids, from seawater, utilizing methods, processes, and/or apparatuses, not specified, enumerated, and/or included within the present disclosure. The present disclosure includes embodiments that transfer, move, and/or transport hydrochloric acid, and/or other acids, to parts and/or portions of an ocean far below the surface utilizing methods, processes, and/or apparatuses, not specified, enumerated, and/or included within the present disclosure.

Figure 32:
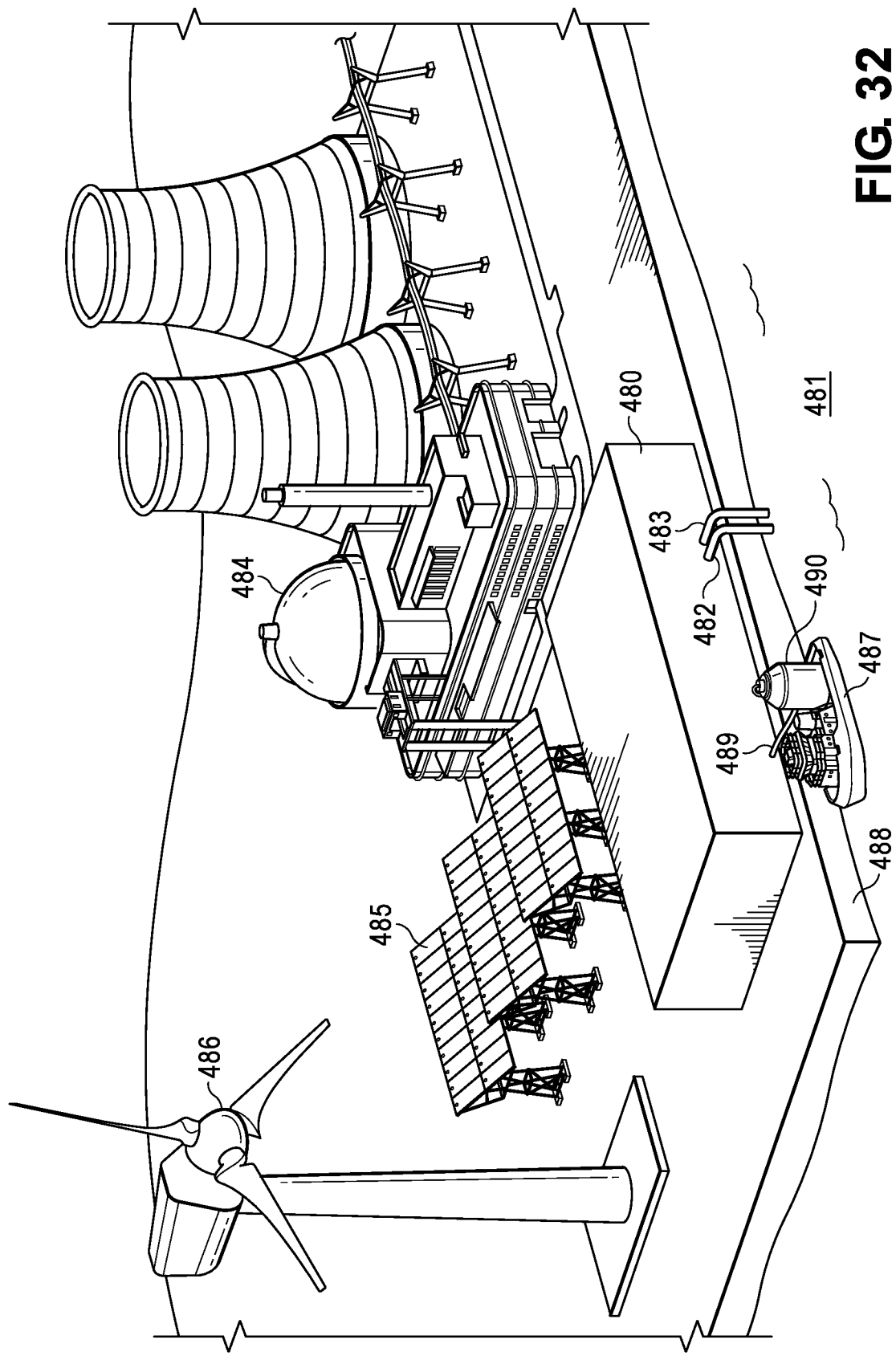
FIG. 32 is a perspective side view of a fifth embodiment of the present invention.

FIG. 32 shows a perspective view of a fifth embodiment of the present invention. A seawater and/or brine electrolysis apparatus, mechanism, and/or facility 480 pumps in, and/or receives, a flow of seawater from a body of seawater 481 through and/or via a fluid intake pipe 482. It returns waste fluid, e.g., seawater with a diminished and/or reduced chloride ion content, and increased alkalinity, to the body of seawater through and/or via a fluid effluent pipe 483.

The seawater electrolysis facility 480 electrolyzes seawater (and/or a brine derived from seawater) so as to produce chlorine gas and hydrogen gas. It then reacts and/or combusts a mixture of those chlorine and hydrogen gases so as to produce hydrogen chloride gas which it dissolves into a reservoir of seawater so as to produce a highly acidified hydrochloric acid solution. The seawater into which the seawater electrolysis facility dissolves the hydrogen chloride gas that it produces is derived, extracted, and/or obtained, from a portion of the seawater that it receives from, through, and/or via, fluid intake pipe 482. Furthermore, a portion of the heat produced and/or generated by the combustion of the hydrogen and chlorine gases, as well as a portion of the heat produced by the dissolution of the resulting hydrogen chloride gas into water, is transferred to, and removed from the seawater electrolysis facility, by the water effluent flowing back to the body of water 481 through and/or via fluid effluent pipe 483.

The seawater electrolysis facility 480 is powered, and/or energized, by electrical power received from a nuclear power facility 484, a solar photovoltaic farm 485, and a wind turbine 486.

The scope of the present invention is not limited to the source of the electrical power which energizes the electrolyzer, the hydrogen-chlorine gas igniter, and/or any pumps involved. The scope of the present invention includes, but is not limited to, embodiments which are energized in full, or in part, by electrical power obtained and/or derived from: other types of solar energy technologies, e.g., concentrating solar power systems; geothermal plants; other types of wind energy technologies, e.g., offshore wind turbines, and high-altitude wind systems; hydropower systems, e.g., hydroelectric dams, and run-of-river electrical/turbine systems; ocean energy technologies, e.g., wave, tidal, and ocean-thermal, energy systems; biomass-powered electrical power generation systems; and fossil-fuel-powered electrical generation plants, e.g., electrical generation powered through the burning of natural gas.

The scope of the present invention is not limited to the location and/or the configuration of electrolyzer. The scope of the present invention includes, but is not limited to, embodiments positioned: adjacent to an upper surface of a body of seawater, e.g., being positioned within a buoy, barge, seafloor-mounted platform, floating platform, or surface water vessel; at a significant depth below an upper surface of a body of seawater, e.g., being positioned on or within the submerged tower of an offshore wind turbine; adjacent to a seafloor, e.g., being operatively connected to a wave energy device affixed to the seafloor; and, on land adjacent to a body of salty water, e.g., operatively connected to a solar farm adjacent to an ocean.

The scope of the present invention is not limited to a particular electrolysis fluidic substrate. The scope of the present invention includes, but is not limited to, embodiments comprising electrolyzers which produce and/or evolve hydrogen and chlorine gases from seawaters; concentrated brine solutions; mixtures of waters and chloride salts, e.g., sodium chloride; and, mixtures of waters and salt residues remaining after lithium salt extractions.

Periodically, an acid discharge vessel 487 travels to, and/or arrives at, the location of the seawater electrolysis facility 480, e.g., it arrives and moors at and/or adjacent to a wharf 488 adjacent to the seawater electrolysis facility. An intake pump (not shown) on the acid discharge vessel is fluidly connected to an acid supply hose 489 of the seawater electrolysis facility 480, and, after connection, hydrochloric acid solution is pumped from the seawater electrolysis facility and into a hydrochloric-acid storage tank 490 on the acid discharge vessel through the acid supply hose. After exhausting the supply of hydrochloric acid solution available from the seawater electrolysis facility, and/or after reaching the capacity of its hydrochloric-acid storage tank, the flow of hydrochloric acid solution into and/or through the acid supply hose is halted, the acid supply hose is disconnected from the acid discharge vessel, and the acid discharge vessel leaves the wharf to which it was moored and travels, and/or heads out, to a location in the body of water 481, and/or in a fluidly connected body of water, where a relatively alkaline fluid environment, e.g., located at or below a depth of 2 km, may be found.

Figure 33:
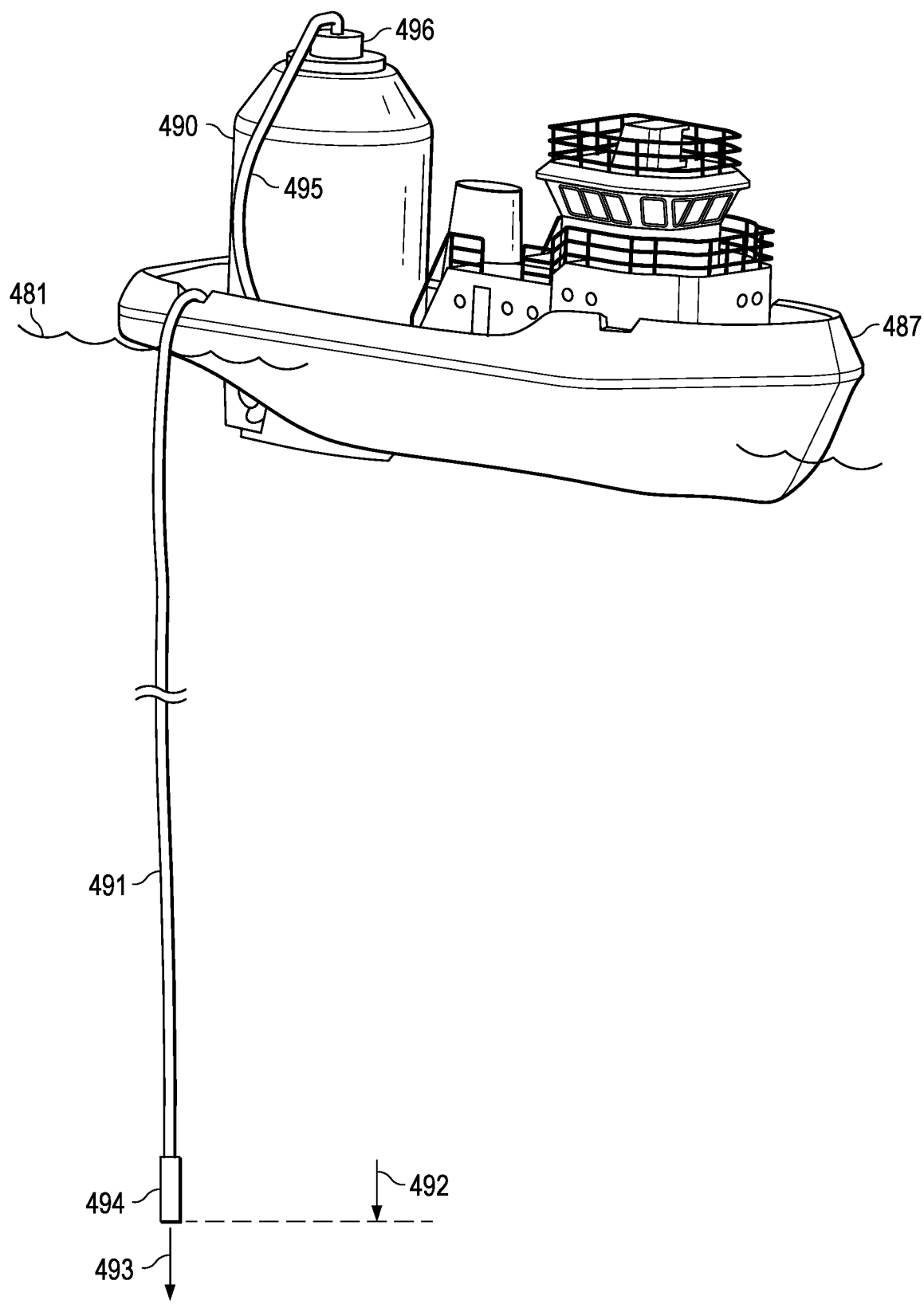
FIG. 33 is a perspective view of the fifth embodiment.

FIG. 33 shows a perspective view of the acid discharge vessel of the fifth embodiment. After adding hydrochloric acid solution to its hydrochloric-acid storage tank 490 at a seawater electrolysis facility (e.g., 480 in FIG. 32), the acid discharge vessel 487 travels to a location in a body of water 481 at which sufficient depth, and/or favorable subsea alkalinity or chemistry, makes possible the acidic neutralization of hydrochloric acid. At that location, the acid discharge vessel deploys an acid discharge hose 491 to a depth 492 below which discharged 493 hydrochloric acid solution will be neutralized and sequestered for a substantial period of time, e.g., thousands of years, if not forever.

A weighted discharge nozzle 494 creates a downward tension within the deployed acid discharge hose 491 and promotes the structural integrity of the submerged end of the acid discharge hose, e.g., by reducing acid damage to the flexible elements of which the acid discharge hose is comprised and which might otherwise be exposed to the discharged hydrochloric acid at a sectioned submerged end of that hose.

The acid discharge hose 491 is fluidly connected to a storage tank pump hose 495 which, in turn, is fluidly connected to a storage tank pump 496, and, therethrough, to the hydrochloric acid solution within the hydrochloric-acid storage tank 490.

After discharging the contents of its hydrochloric-acid storage tank 490, the acid discharge vessel 487 returns, and/or travels back, to the same or another seawater electrolysis facility (e.g., 480 in FIG. 32) where it will refill its hydrochloric-acid storage tank and thereby initiate a repetition of the embodiment's storage-tank-fill and storage-tank-discharge-to-depth cycle.

Figure 34:
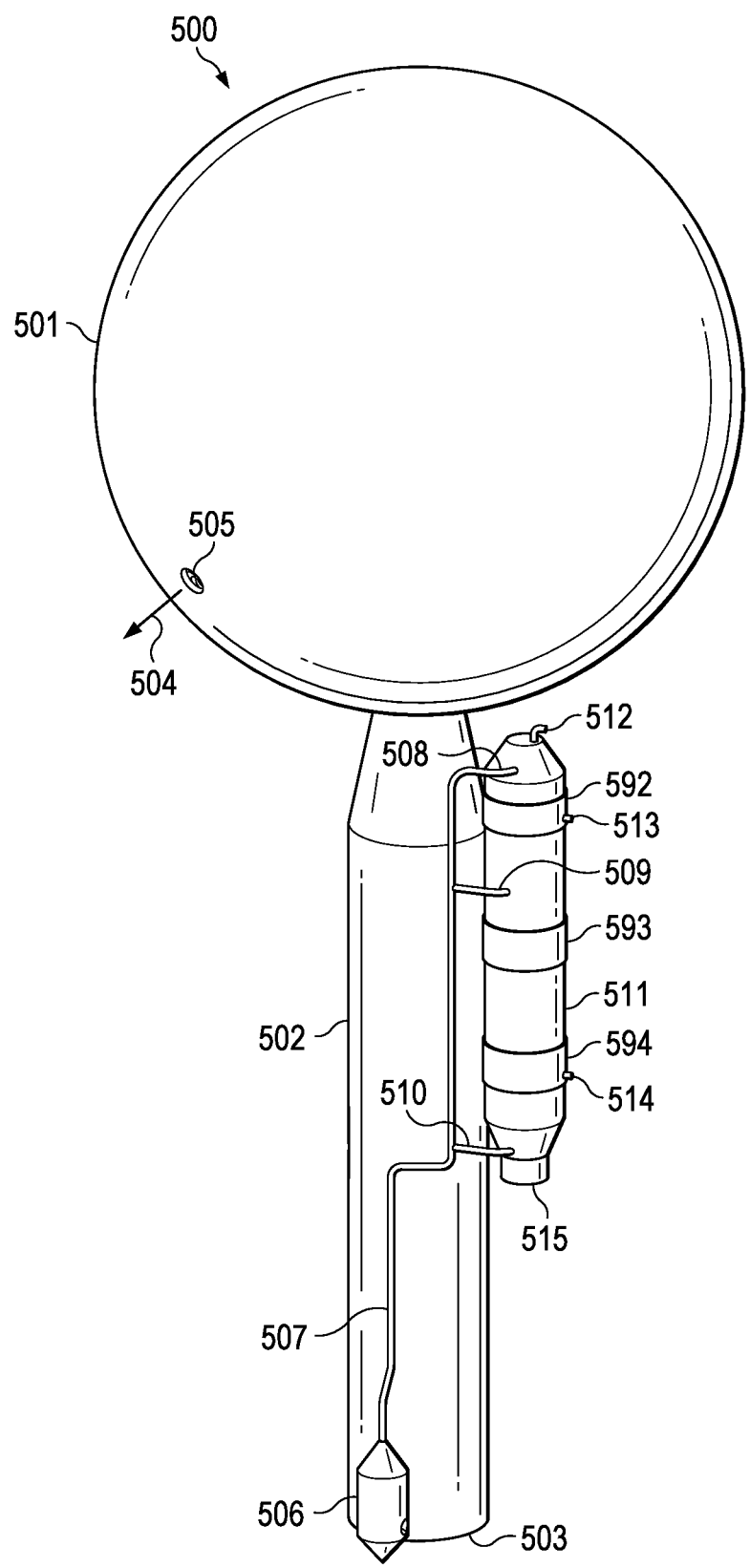
FIG. 34 is a perspective side view of a sixth embodiment of the present invention.

FIG. 34 shows a perspective view of a sixth embodiment 500 of the present invention.

This sixth embodiment of the present invention uses energy harvested from ocean waves to produce electrical power which it then uses to electrolyze seawater and create therefrom hydrogen and chlorine gases. The embodiment then combusts those gases in the presence of a reservoir of seawater so as to convert the combustion product hydrogen chloride gas into a solution of hydrochloric acid.

When the reservoir of hydrochloric-acid acidified seawater reaches, achieves, and/or is characterized by, a sufficiently low pH and/or a sufficiently high level of acidity, the embodiment decants the acidified solution into a tubular chamber wherein it is frozen, thereby forming a rigid rod of frozen aqueous hydrochloric acid solution.

The resulting rod of frozen hydrochloric acid solution is then released into the body of water on which the embodiment floats, whereupon it falls to, below, and/or beyond, a depth, e.g., 2 km, at which a natural alkalinity within the deep water neutralizes the hydrochloric acid, thereby sequestering that hydrochloric acid from a long period of time, e.g., millennia, and, concomitantly, alkalinizing the surface of the body of water on which the embodiment floats and from which it chemically extracted the chlorine ions which it chemically reacted in its formation of the sequestered hydrochloric acid.

A WEC 501/502 similar to the one 301/302 illustrated in FIGS. 7-21, and consistent with the type of inertial hydrodynamic wave engine device disclosed and/or specified in U.S. patent Ser. No. 16/789,205, floats adjacent to an upper surface (not visible) of a body of water over which waves pass. The WEC produces electrical power in response to wave motion as explained in U.S. patent Ser. No. 16/789,205. The extensive explanation of the operation of embodiment 300 in FIGS. 7-21, and especially with respect to FIG. 14, also explains the operation of embodiment 501/502, especially with respect to its response to passing waves, the impulsive flow of pressurized water from its reaction tube 502 into a pressurized reservoir within hollow buoy 501, the outflow of that pressurized water from the pressurized reservoir through its water turbines, and the electrical power produced by the water turbines' respective operatively-connected generators. Since this facet of the operation of embodiment 500 is the same as that of embodiment 300, that portion of the operational explanation will not be repeated here.

As the WEC 501/502 moves up and down in response to wave motion, water within the WEC's reaction tube 502 moves up and down within the reaction tube, and water flows in and out of the reaction tube through a mouth 503 and/or aperture at a lower end of the reaction tube. Occasionally, water moving upward within the reaction tube collides with a constriction in an upper portion of that reaction tube, which tends to cause an increase in the pressure within a portion of the water within the reaction tube's constriction. This periodic increase in water pressure within the constricted portion of the WEC's reaction tube tends to cause an ejection of pressurized water up to and into a pressurized interior of the WEC's upper hollow spherical portion 501 which tends to result in an accumulation of pressurized water therein.

Pressurized water within the interior of the WEC's upper hollow spherical portion 501 tends to flow, e.g., 504, out of the WEC's two water turbines, one 505 of which is visible in the illustration of FIG. 34. Electrical power produced by the embodiment's water turbines, and respective operatively connected generators (not shown), energizes various components, systems, subsystems, modules, and/or mechanisms, within the embodiment, including, but not limited to: a seawater electrolyzer 506, an HCl-process controller (not visible), multiple thermoelectric chillers (and heaters) (not visible), multiple valves (not visible), and multiple temperature and pressure sensors (not visible).

The two water turbines of the embodiment illustrated in FIG. 34 are separated by approximately 180 degrees, and/or are on opposite sides of the upper hollow spherical buoy 301. However, an embodiment similar to the one illustrated in FIG. 34 has a pair of water turbines placed, and/or positioned, at an angular separation of about 90 degrees. That embodiment's control system regulates, through its control of inlet valves to the respective water turbines, the rate of pressurized-water outflow from each water turbine. Through its appropriate regulation and/or control of the rate of effluence from each of its two adjacent water turbines, that embodiment is able to propel itself in a forward direction (opposite the turbine effluence) and to turn and thereby steer a course.

A mixture of hydrogen and chlorine gases produced by the embodiment's seawater electrolyzer 506 flows up, into, and through, primary gas pipe 507. Depending upon which, if any, of three gas valves (not visible) are open and/or closed, the mixture of gases flows from the primary gas pipe and into, and through, any combination, if any, of three respective gas delivery pipes: a combustion chamber gas pipe 508; a frozen HCl ejection gas pipe 509; and, an ejection port gasification pipe 510. The hydrogen and chlorine gases flowing through the various gas pipes 507-510, carry, and/or deliver, those gases from the seawater electrolyzer where they are produced, to and into the hydrochloric acid production and freezing apparatus 511.

The embodiment's hydrochloric acid production and freezing apparatus 511 comprises, utilizes, incorporates, and/or includes, three drain pipes. A first and/or upper combustion chamber drain pipe 512 enables, and/or facilitates, fluid communication between an upper interior of the combustion chamber (not visible) of the embodiment's hydrochloric acid production and freezing apparatus and the body of water outside the embodiment, and upon which the embodiment floats. A second and/or lower combustion chamber drain pipe 513 enables, and/or facilitates, fluid communication between a lower interior of the combustion chamber (not visible) of the embodiment's hydrochloric acid production and freezing apparatus and the body of water outside the embodiment, and upon which the embodiment floats. And, a third and/or ice plug chamber drain pipe 514 enables, and/or facilitates, fluid communication between an interior of the HCl freezing chamber (not visible) of the embodiment's hydrochloric acid production and freezing apparatus and the body of water outside the embodiment, and upon which the embodiment floats.

The embodiment's hydrochloric acid production and freezing apparatus 511 comprises, utilizes, incorporates, and/or includes, three heat sinks 592-594 which transfer heat generated by a plurality of thermoelectric coolers to the body of water (not visible) on which the embodiment floats. During one part of the hydrochloric acid production and freezing process implemented, and/or executed, by the hydrochloric acid production and freezing apparatus, one of the plurality of thermoelectric coolers is energized with a reversed electrical polarity such that it heats a content of the hydrochloric acid production and freezing apparatus, and in this case the respective heat sink serves to draw heat and/or thermal energy from the body of water to the respective thermoelectric "heater."

Frozen rods of an aqueous hydrochloric acid solution, e.g., 38 WT % (percent by weight) hydrochloric acid are released from the embodiment through a lower mouth 515 and/or aperture of the hydrochloric acid production and freezing apparatus 511.

Figure 35:
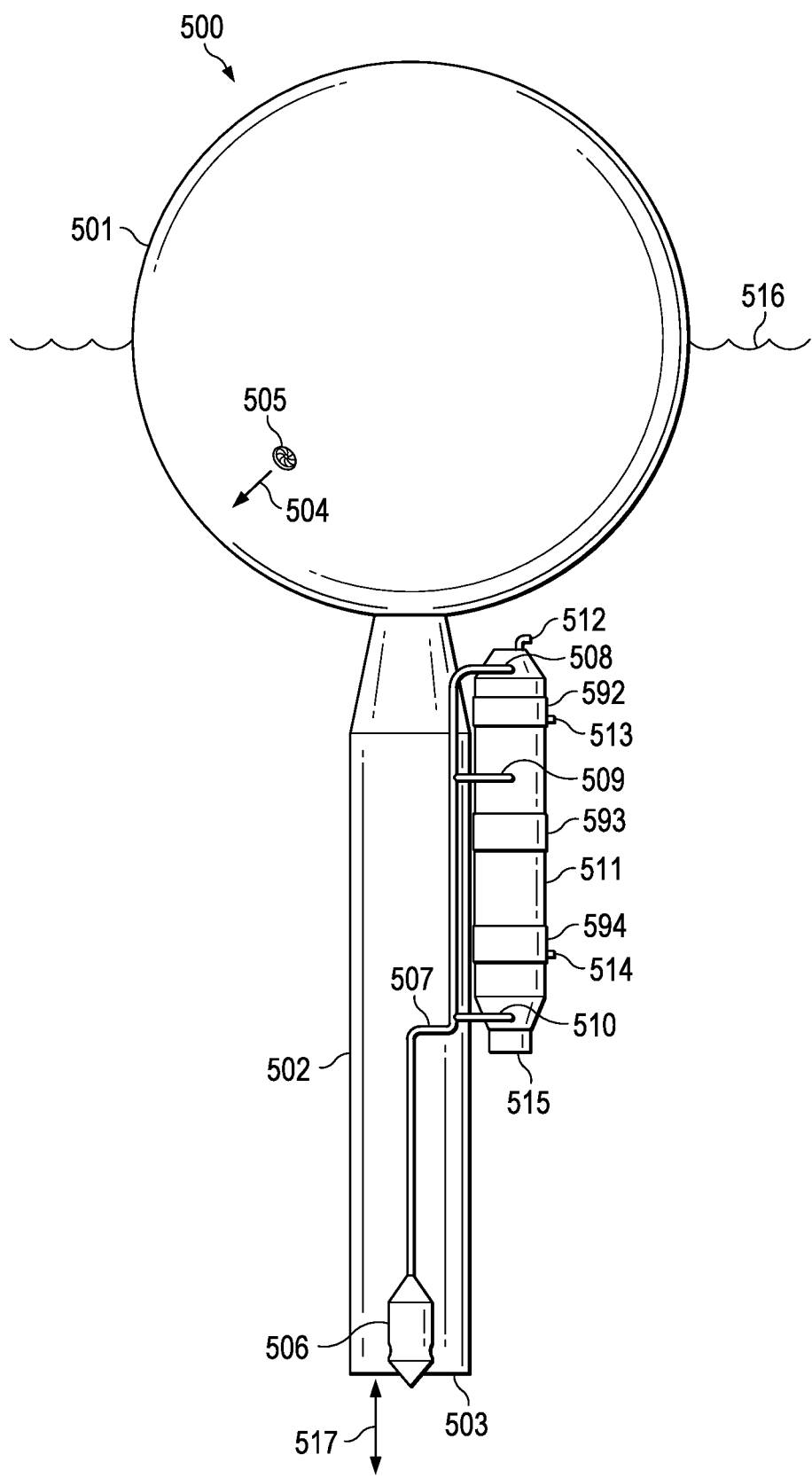
FIG. 35 is a side view of the sixth embodiment.

FIG. 35 shows a side view of the same embodiment 500 that is illustrated in FIG. 34. The embodiment is buoyant and floats adjacent to an upper surface 516 of a body of water over which waves pass. The embodiment's WEC 501/502 operates in the same way as does the embodiment 300 illustrated in FIGS. 7-21. As the embodiment is moved up and down in response to passing and/or impinging waves, water moves up-and-down within the embodiment's reaction tube 502. As water moves up-and-down within the reaction tube, water moves 517 in and out of the lower mouth 503 of the reaction tube.

Figure 36:
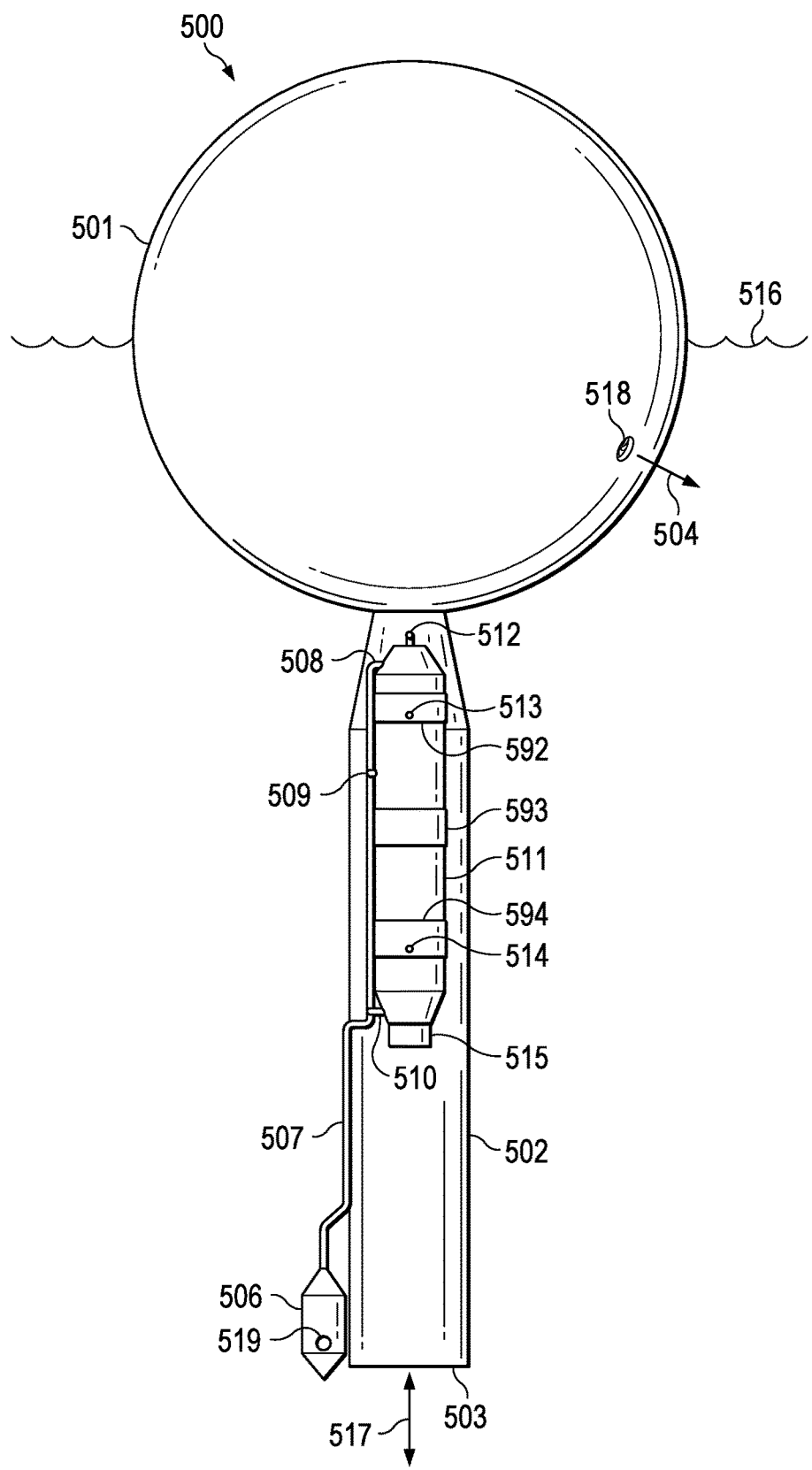
FIG. 36 is a side view of the sixth embodiment.

FIG. 36 shows a side view of the same embodiment 500 that is illustrated in FIGS. 34 and 35. The embodiment comprises, incorporates, includes, and/or utilizes, two water turbines. One 505 of the embodiment's two water turbines is visible in FIGS. 34 and 35. The other 518 is visible in FIG. 36. Each water turbine is operatively connected to a respective generator that produces electrical power when the turbine rotor and/or blades of its respective water turbine rotate in response to an outflow 504 of water from a pressurized water reservoir (see 335 in FIG. 14) within the embodiment's hollow buoy.

Seawater flows into the embodiment's electrolyzer 506 through a first and/or inflow aperture (not visible), and flows out through a second and/or outflow aperture 519. Water flowing into the embodiment's electrolyzer contains a full complement of chloride ions (Cl−) at the concentration characteristic of the body 516 of seawater on which the embodiment floats. However, the water flowing out of the embodiment's electrolyzer contains fewer chloride ions, and/or contains a lesser concentration of them, as some of the chloride ions within the seawater at the electrolyzer's anode are oxidized so as to form, and/or create, chlorine gas therefrom.

Figure 37:
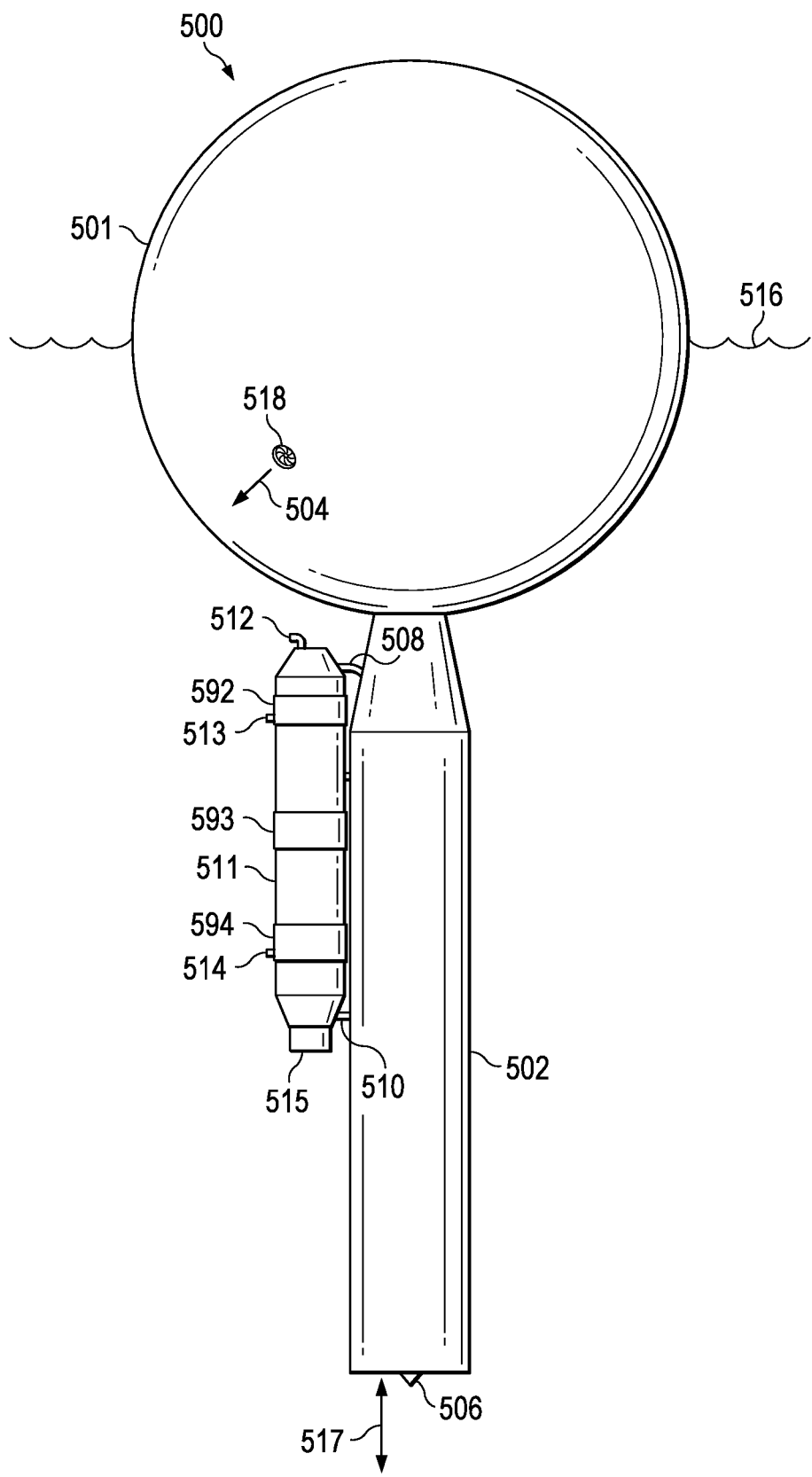
FIG. 37 is a side view of the sixth embodiment.

FIG. 37 shows a side view of the same embodiment 500 that is illustrated in FIGS. 34-36.

Figure 38:
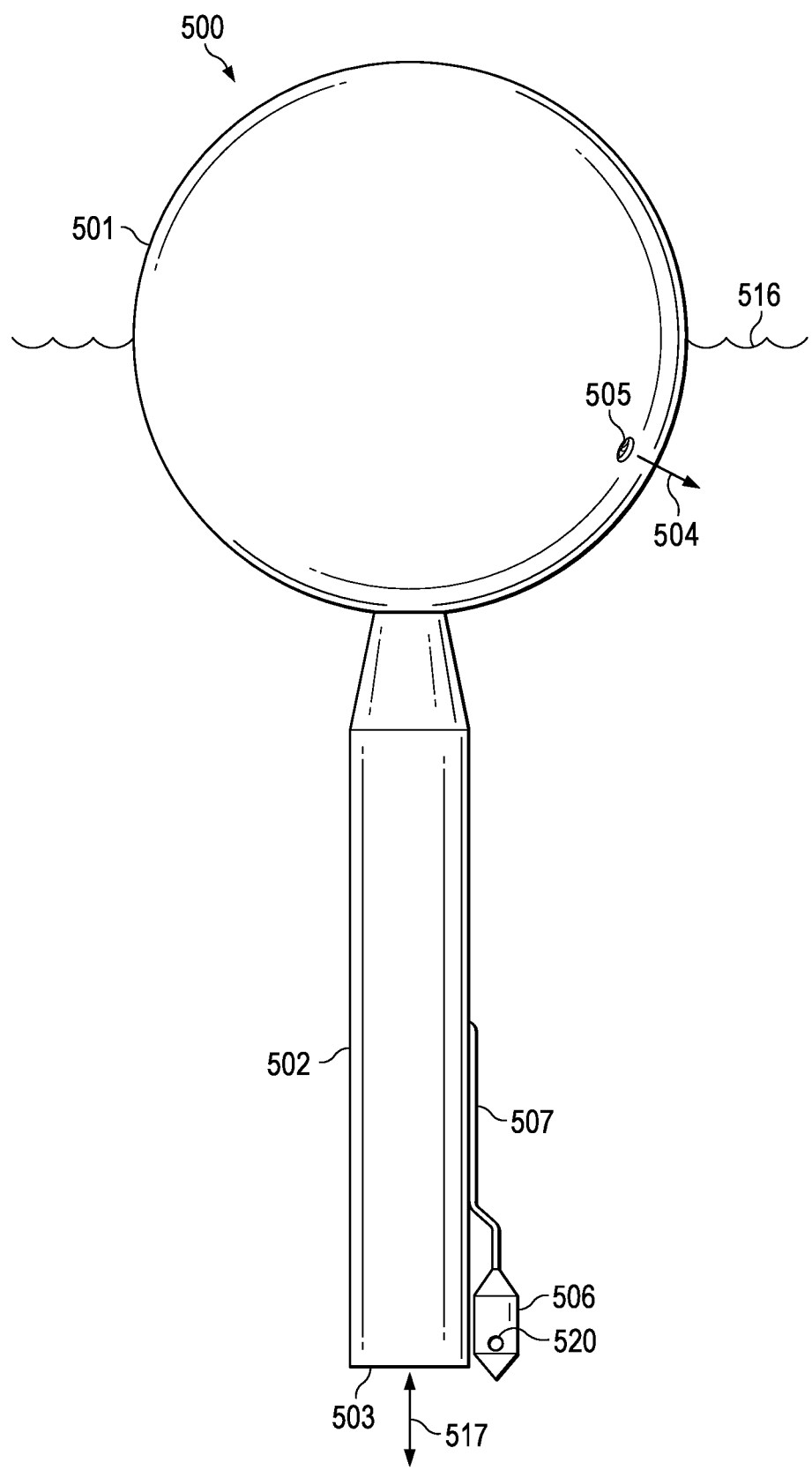
FIG. 38 is a side view of the sixth embodiment.

FIG. 38 shows a side view of the same embodiment 500 that is illustrated in FIGS. 34-37. The embodiment's electrolyzer 506 contains a first and/or inflow aperture 520 through which seawater flows into an interior of the electrolyzer. The electrolyzer contains a second and/or outflow aperture (519 in FIG. 36) through which seawater, depleted of some of its chloride ion (Cl−) content, flows out of the electrolyzer.

Figure 39:
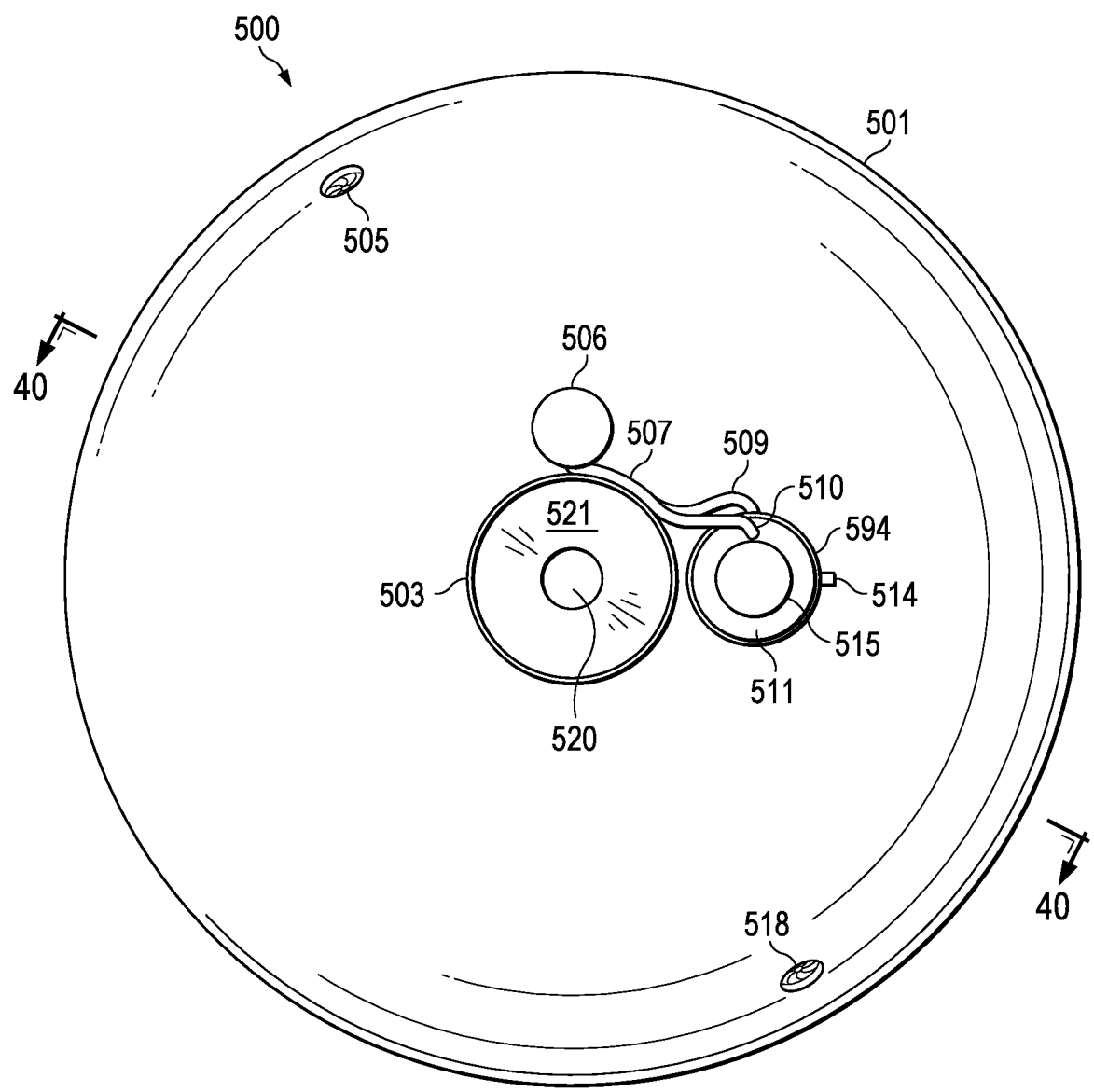
FIG. 39 is a bottom-up view of the sixth embodiment.

FIG. 39 shows a bottom-up view of the same embodiment 500 that is illustrated in FIGS. 34-38. A lower mouth 503 of the reaction tube (502 in FIGS. 34-38) is fluidly connected to the body of water (516 in FIGS. 35-38) on which the embodiment floats. An upper mouth 520 of the reaction tube is fluidly connected to a water reservoir (not visible) within the embodiment's hollow buoy 501.

As the embodiment 500 moves up and down in response to wave action at the buoy 501, water within the embodiment's reaction tube (502 in FIGS. 34-38) moves up and down as well (typically out of phase with up and down oscillations of the embodiment and its reaction tube). When water moves upward within the reaction tube (i.e., relative to the reaction tube), a portion of that upwardly moving water will tend to be pressurized by its flow into and through a constricted portion 521 of the reaction tube.

Periodically, occasionally, and/or intermittently, a portion of the pressurized water moving upward within the embodiment's reaction tube (502 in FIGS. 34-38) will be sufficiently pressurized and/or upwardly accelerated so as to cause that portion of water to be ejected through and/or from the upper mouth 520 of the reaction tube. Water so ejected will tend to be trapped, and/or to accumulate, within the embodiment's pressurized water reservoir (not visible) and therefrom will flow out of the buoy 501 through one of the embodiment's two water turbines 505 and 518, thereby energizing electrical generators operatively connected to each respective water turbine, causing those generators to produce electrical power.

Figure 40:
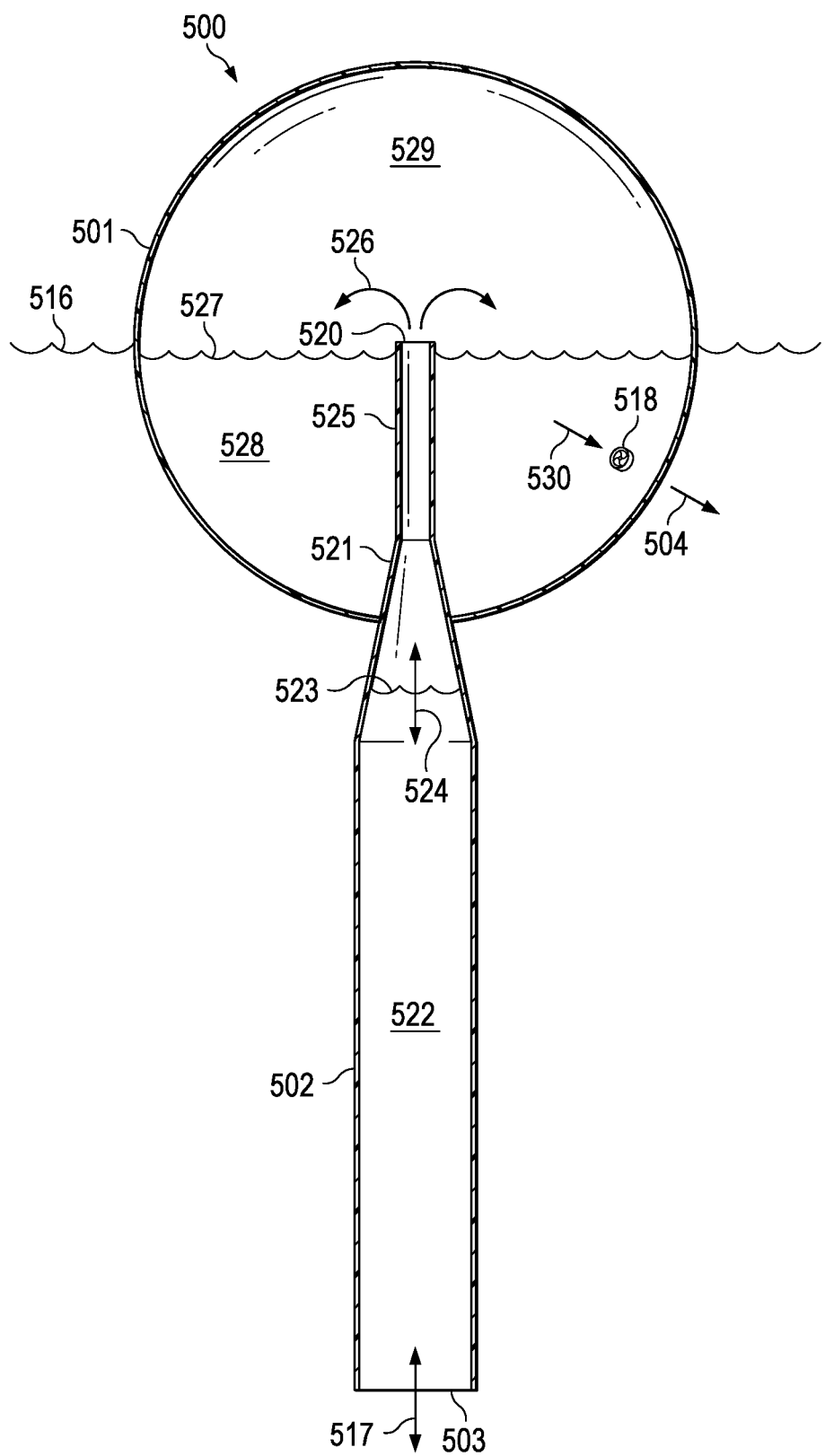
FIG. 40 is a side sectional view of the sixth embodiment.

FIG. 40 shows a side sectional view of the same embodiment 500 that is illustrated in FIGS. 34-39. The section plane is taken along section line 40-40 of FIG. 39.

The embodiment 500 floats adjacent to an upper surface 516 of a body of water over which waves pass. In response to wave action at the embodiment's buoy 501, the embodiment rises and falls, typically out of phase with the heave of the waves impinging upon the buoy. As the embodiment rises and falls, and as a further consequence of the wave-driven alteration of the relative depth of the lower mouth 503 of the embodiment's reaction tube 502, water 522 within the reaction tube moves up and down, typically out of phase with the vertical oscillations of the embodiment, and/or relative to the reaction tube.

As water 522 within the embodiment's reaction tube 502 moves up and down relative to the reaction tube, water moves 517 in and out of the lower mouth 503 of the reaction tube. And, as water within the embodiment's reaction tube moves up and down, so too an upper surface 523 of that water moves 524 up and down within the reaction tube. When the water 522 moves upward and flows into and through a constricted portion 521 of the reaction tube, its upward velocity through the constricted portion of the tube tends to increase thereby propelling the water upward through a relatively narrower upper part 525 of the reaction tube. And, if the upward acceleration of the water flowing out of the constriction 521, and into and through the upper part 525 of the reaction tube, is sufficient, a portion of the upwardly accelerated water will be ejected 526 from an upper mouth 520 of the reaction tube.

Water ejected 526 from the upper mouth 520 of the embodiment's reaction tube 502 will tend to fall onto, and then through, an upper surface 527 of a water reservoir 528 positioned, and/or trapped, within a lower portion of an interior of the hollow buoy 501. A pressurized air pocket 529 within an upper portion of the interior of the hollow buoy is in fluid communication with the water reservoir and increases the pressure, i.e., adds to its native head and/or hydrostatic pressure, of the water therein (which is why the nominal, average, and/or resting upper surface 523 of the water 522 within the reaction tube is at a lower level than the upper surface 516 of the body of water on which the embodiment floats).

When water of the water reservoir 528 flows 530 into and through the embodiment's water turbines, e.g., 518, it flows therethrough with the hydrostatic pressure imbued by the depth of the water turbines within the water reservoir, as well as with the pressure of the air pocket 529 above the water reservoir.

The outflow 530/504 of water from the reservoir and into the body of water 516 rotates the water turbines, which in turn energize respective operatively connected generators, thereby producing electrical power that is subsequently consumed by the embodiment, e.g., through its electrolysis of seawater and its freezing of hydrochloric acid solution.

Figure 41:
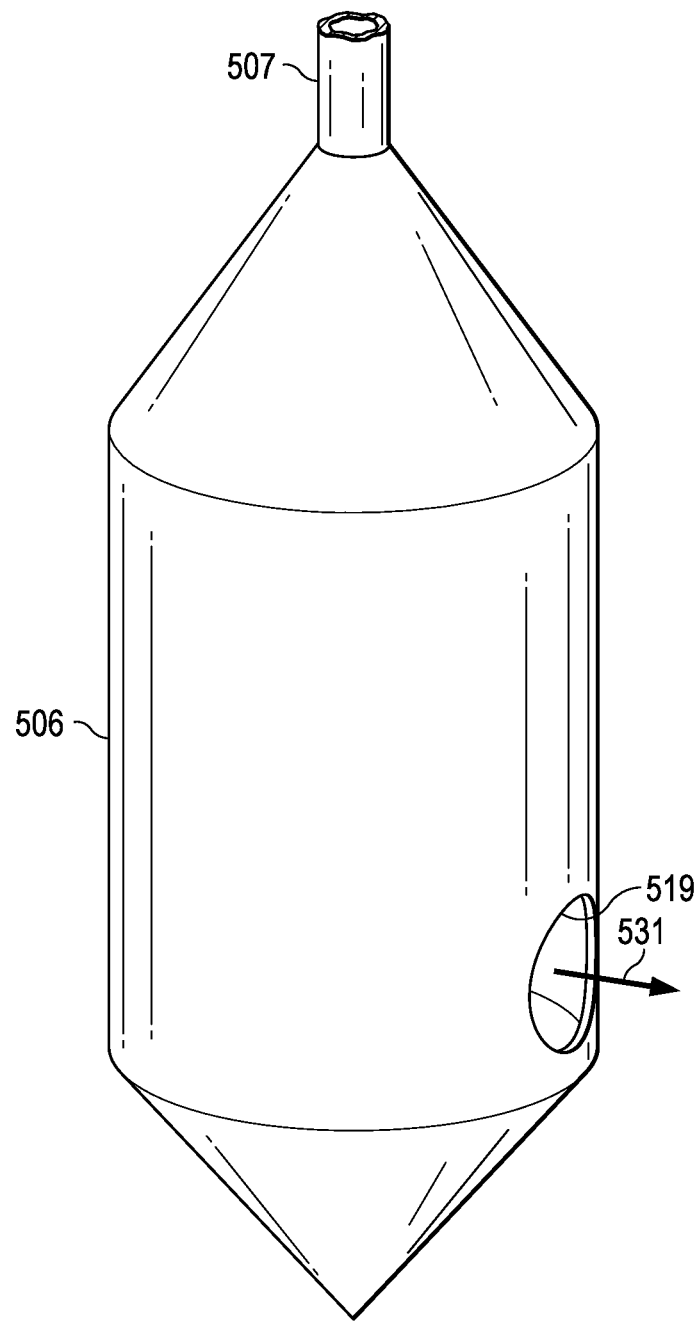
FIG. 41 is a perspective side view of an electrolyzer of the sixth embodiment.

FIG. 41 shows a side perspective view of the electrolyzer 506 of which the embodiment 500 that is illustrated in FIGS. 34-39 is, in part, comprised. The outer electrolyzer chamber wall includes two apertures each of which fluidly connects an interior of the electrolyzer to the body of seawater (516 in FIGS. 35-38) on which the embodiment floats. One aperture (not visible, 520 in FIG. 38) facilitates and/or enables an inflow of water from the body of seawater into the interior of the electrolyzer chamber. The other aperture 519 facilitates and/or enables an outflow 531 of water from the interior of the electrolyzer chamber into the body of seawater.

Figure 42:
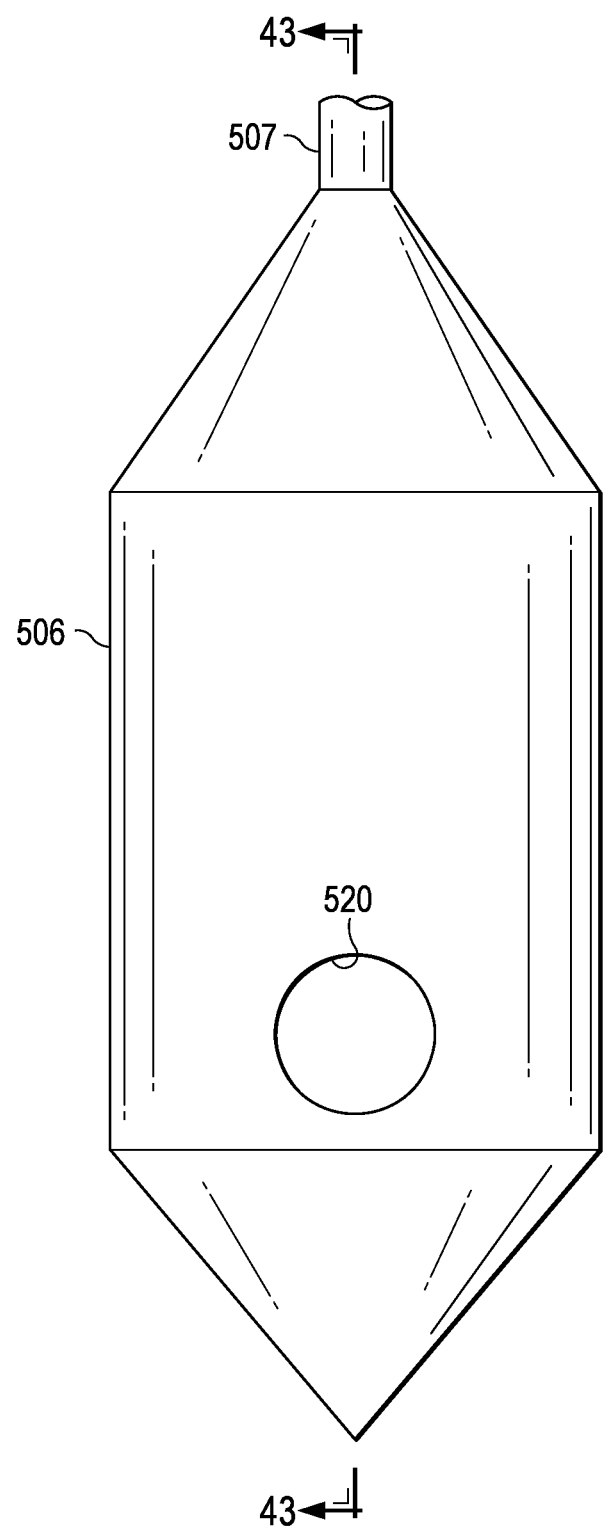
FIG. 42 is a side view of the electrolyzer of the sixth embodiment.

FIG. 42 shows a side view of the same electrolyzer 506 illustrated in FIG. 41.

Figure 43:
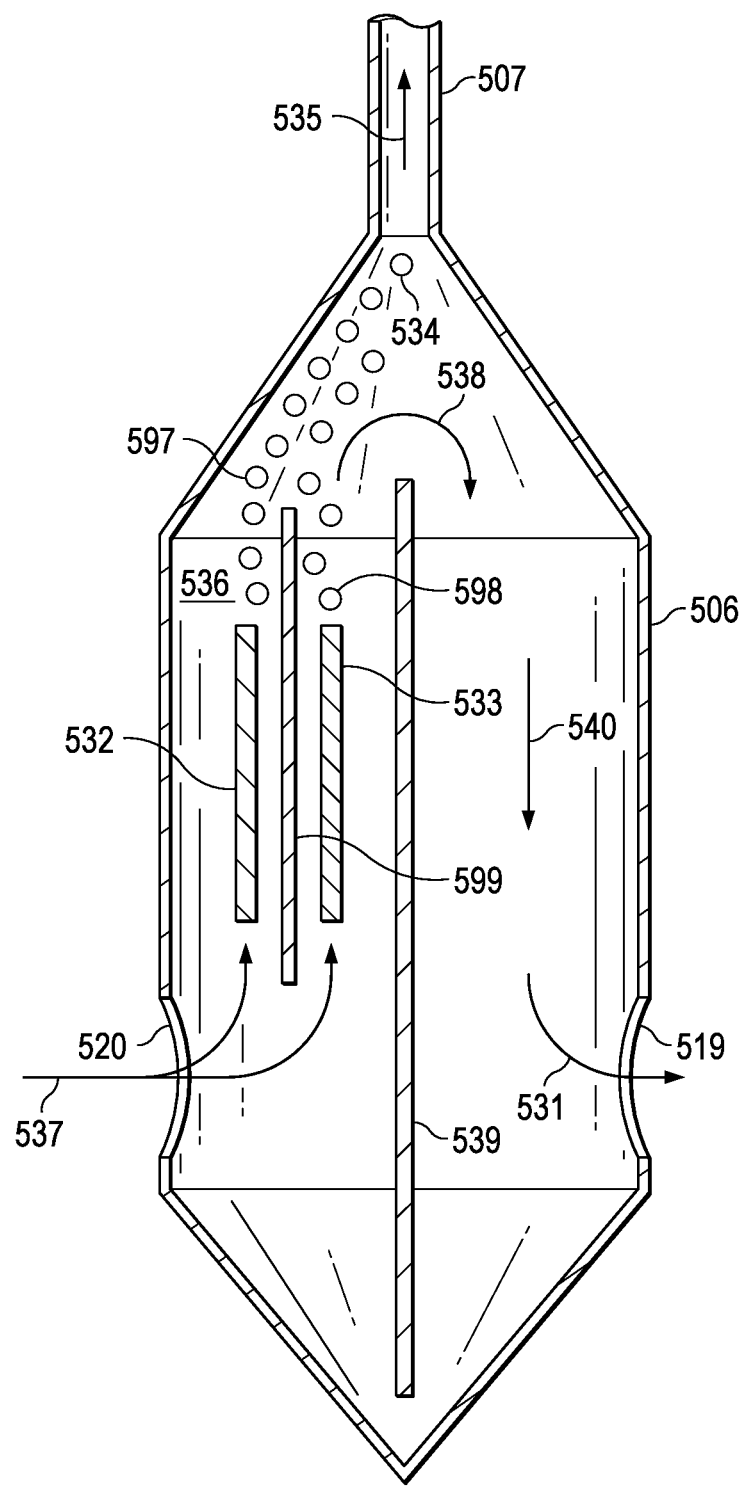
FIG. 43 is a side sectional view of the electrolyzer of the sixth embodiment.

FIG. 43 shows a side sectional view of the same electrolyzer 506 that is illustrated in FIGS. 41 and 42. The section plane is taken along section line 43-43 of FIG. 42.

Within an interior 536 of the electrolyzer chamber 506, a cathodic electrode 532 reduces hydronium ions (H3O+) so as to produce and evolve a hydrogen gas, e.g., 597. Within that same interior of the electrolyzer chamber, an anodic electrode 533 oxidizes chloride ions (Cl−) so as to produce and evolve a chlorine gas, e.g., 598. Bubbles, e.g., 534, of hydrogen gas, chlorine gas, and mixtures of hydrogen and chlorine gases, rise from the electrodes and flow 535 up, into, and through, the embodiment's primary gas pipe 507.

The bubbles, e.g., 534, that rise from the electrodes 532 and 533, create a bubble pump that draws fresh seawater into the interior of the electrolyzer chamber through inflow aperture 520, and expels chloride-ion-depleted and hydroxide-rich seawater from the interior of the electrolyzer chamber and out through outflow aperture 519. As the bubbles of hydrogen and chlorine gases rise from the electrodes 532 and 533, they entrain some of the water 536 around and above those electrodes and create an upwelling current within the electrolyzer chamber. As the bubble-driven current of water flows upward it draws 537 in seawater through inflow aperture 520. And, as the bubble-driven current of water flows upward it flows 538 over and around a central and/or medial vertical wall 539 that divides first and second lateral portions of the interior of the electrolyzer chamber 506. After water flows 538 over the top of the medial vertical wall, it flows 540 downward through the second lateral portion of the interior of the electrolyzer chamber, and then flows 531 out of the electrolyzer chamber through outflow aperture 519. Separating the electrolyzer's cathodic electrode 532 from the electrolyzer's anodic electrode 533 is a microporous semipermeable diaphragm 599 comprised and/or fabricated of asbestos fibers and fibrous polytetrafluoroethylene (PFTE). The diaphragm inhibits a passage of hydroxide ions from around the cathode to the anode during the time that seawater is flowing upward from the bottoms of the electrodes until after the seawater has flowed well beyond the electrodes.

Figure 44:
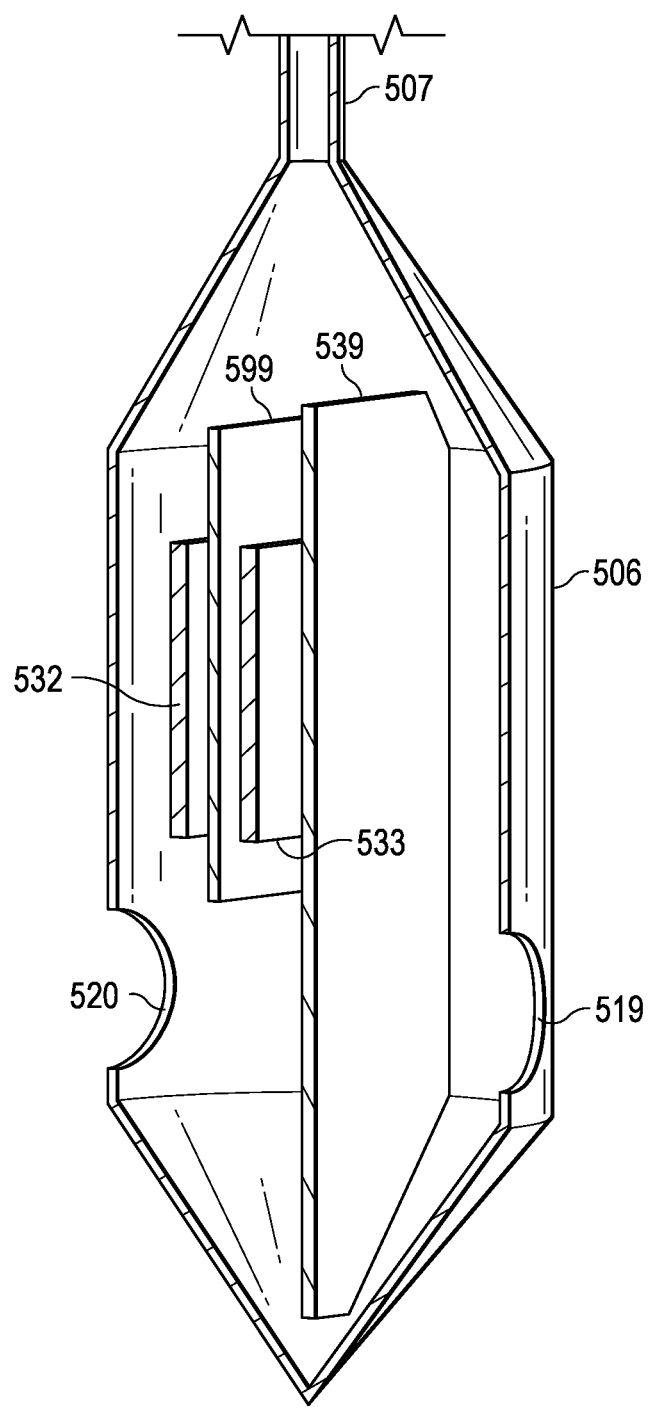
FIG. 44 is a perspective side sectional view of the electrolyzer of the sixth embodiment.

FIG. 44 shows a perspective side sectional view of the same electrolyzer 506 that is illustrated in FIGS. 41-43. The section plane is taken along section line 43-43 of FIG. 42.

Figure 45:
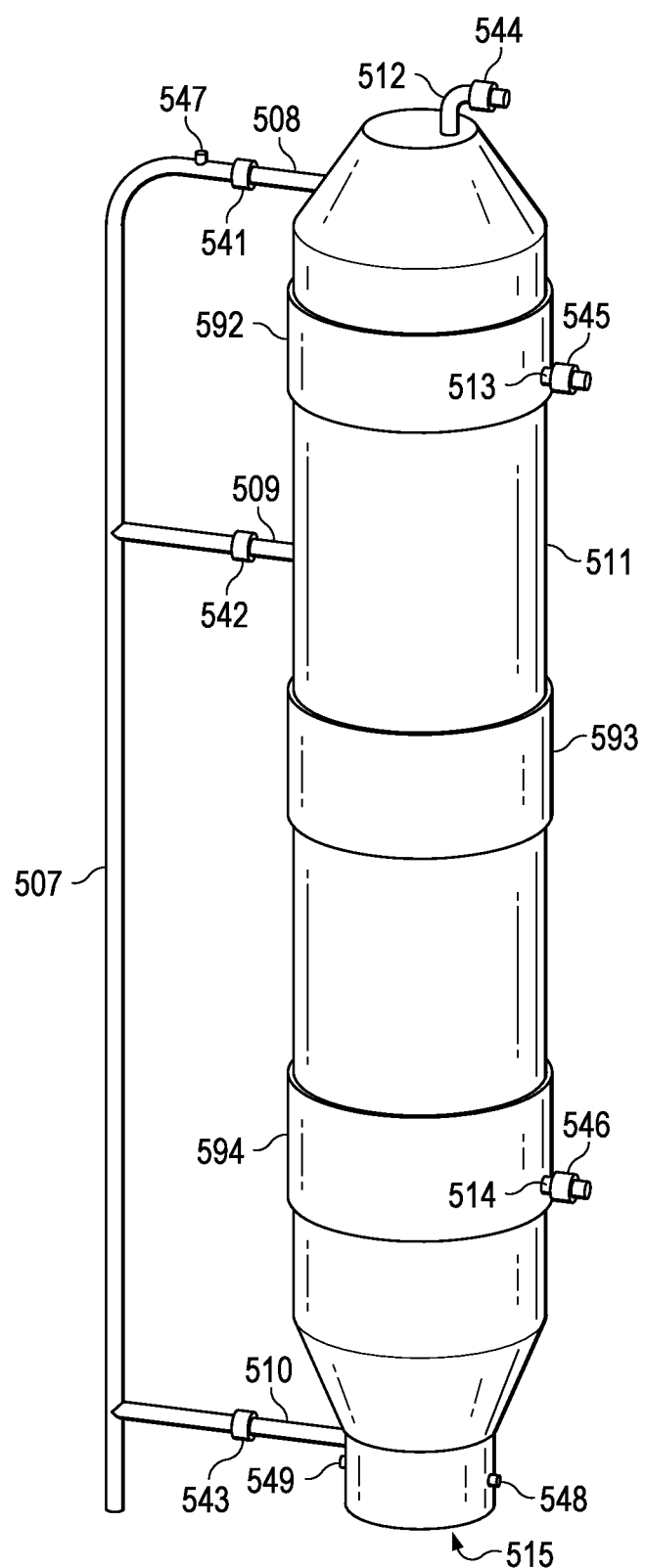
FIG. 45 is a perspective side view of a hydrochloric acid production and freezing apparatus of the sixth embodiment.

FIG. 45 shows a side perspective view of the hydrochloric acid production and freezing apparatus 511 of which the embodiment 500 that is illustrated in FIGS. 34-40 is, in part, comprised. The hydrochloric acid production and freezing apparatus receives a mixture of hydrogen and chlorine gases from the embodiment's electrolyzer (506 in FIG. 34) via and/or through primary gas pipe 507.

When a combustion chamber gas valve 541 is open, a mixture of hydrogen and chlorine gases flows from the primary gas pipe 507 and into and through a combustion chamber gas pipe 508 and therethrough into a combustion chamber (not visible) within the hydrochloric acid production and freezing apparatus 511.

When a frozen HCl ejection gas valve 542 is open, a mixture of hydrogen and chlorine gases flows from the primary gas pipe 507 and into and through a frozen HCl ejection gas pipe 509 and therethrough into an HCl freezer chamber (not visible) within the hydrochloric acid production and freezing apparatus 511.

When an ejection port gasification gas valve 543 is open, a mixture of hydrogen and chlorine gases flows from the primary gas pipe 507 and into and through an ejection port gasification pipe 510 and therethrough into an ejection port (not visible) within the hydrochloric acid production and freezing apparatus 511.

When combustion chamber evacuation valve 544 is open, any gases within the combustion chamber (not visible) of the hydrochloric acid production and freezing apparatus 511 are able to escape the combustion chamber and flow into the body of water (516 in FIG. 35) on which the embodiment floats, thereby ensuring that the combustion chamber is flooded with seawater.

When hydrochloric acid reservoir initialization valve 545 is open, any gases within a lower portion of the combustion chamber (not visible) of the hydrochloric acid production and freezing apparatus 511 are able to escape the lower portion of the combustion chamber and flow into the body of water (516 in FIG. 35) on which the embodiment floats. An opening of hydrochloric acid reservoir initialization valve 545 causes, permits, and/or enable, seawater to flow into and fill that lower portion of the combustion chamber, thereby displacing any gases therein, and thereby forming an initial, seawater-filled, acid reservoir into which hydrochloric acid may and/or will be deposited.

When ice plug chamber initialization valve 546 is open, any gases within the ice plug chamber (not visible) of the hydrochloric acid production and freezing apparatus 511 are able to escape the ice plug chamber and flow into the body of water (516 in FIG. 35) on which the embodiment floats, thereby ensuring that the ice plug chamber is flooded with seawater.

The pressure of the mixture of hydrogen and chlorine gases within the embodiment's primary gas pipe 507 is measured and reported to the embodiment's HCl-process controller (not visible) by a primary gas pipe pressure sensor 547.

The pressure of the fluid (seawater or gas) within the embodiment's ejection port (not visible), having a lower mouth 515, is measured and reported to the embodiment's HCl-process controller (not visible) by an inner ejection port pressure sensor 548. The pressure of the seawater at the same depth as the depth of the ejection port pressure sensor, is measured and reported to the embodiment's HCl-process controller (not visible) by an outer ejection port pressure sensor 549.

Figure 46:
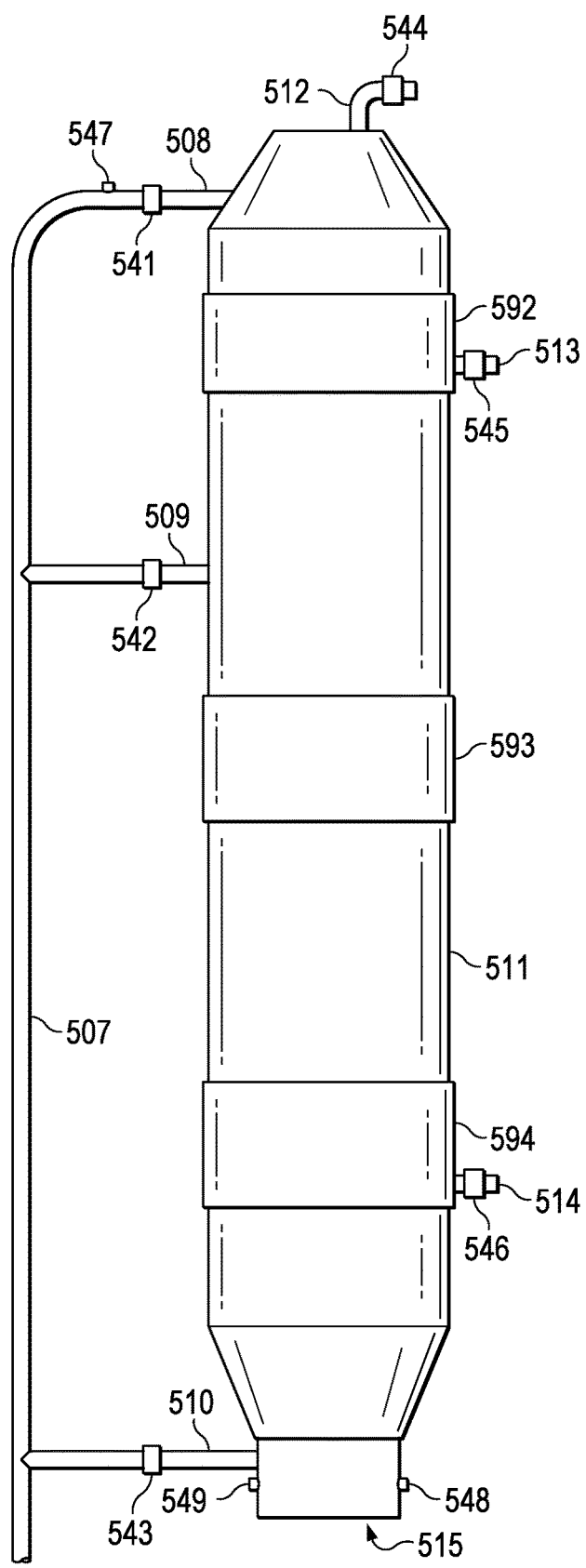
FIG. 46 is a side view of the hydrochloric acid production and freezing apparatus of the sixth embodiment.

FIG. 46 shows a side view of the same hydrochloric acid production and freezing apparatus 511 illustrated in FIG. 45.

Figure 47:
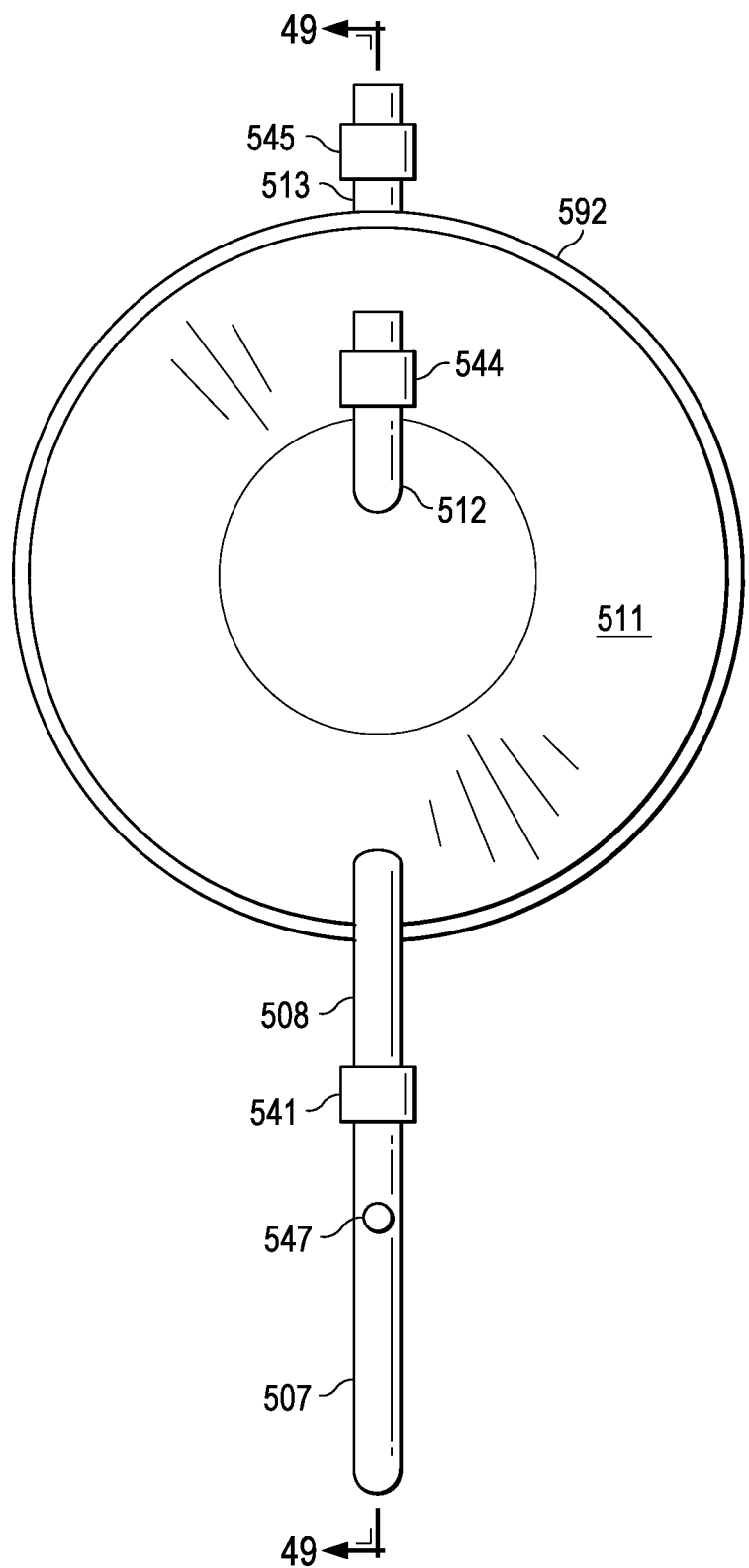
FIG. 47 is a top-down view of the hydrochloric acid production and freezing apparatus of the sixth embodiment.

FIG. 47 shows a top-down view of the same hydrochloric acid production and freezing apparatus 511 illustrated in FIGS. 45 and 46.

Figure 48:
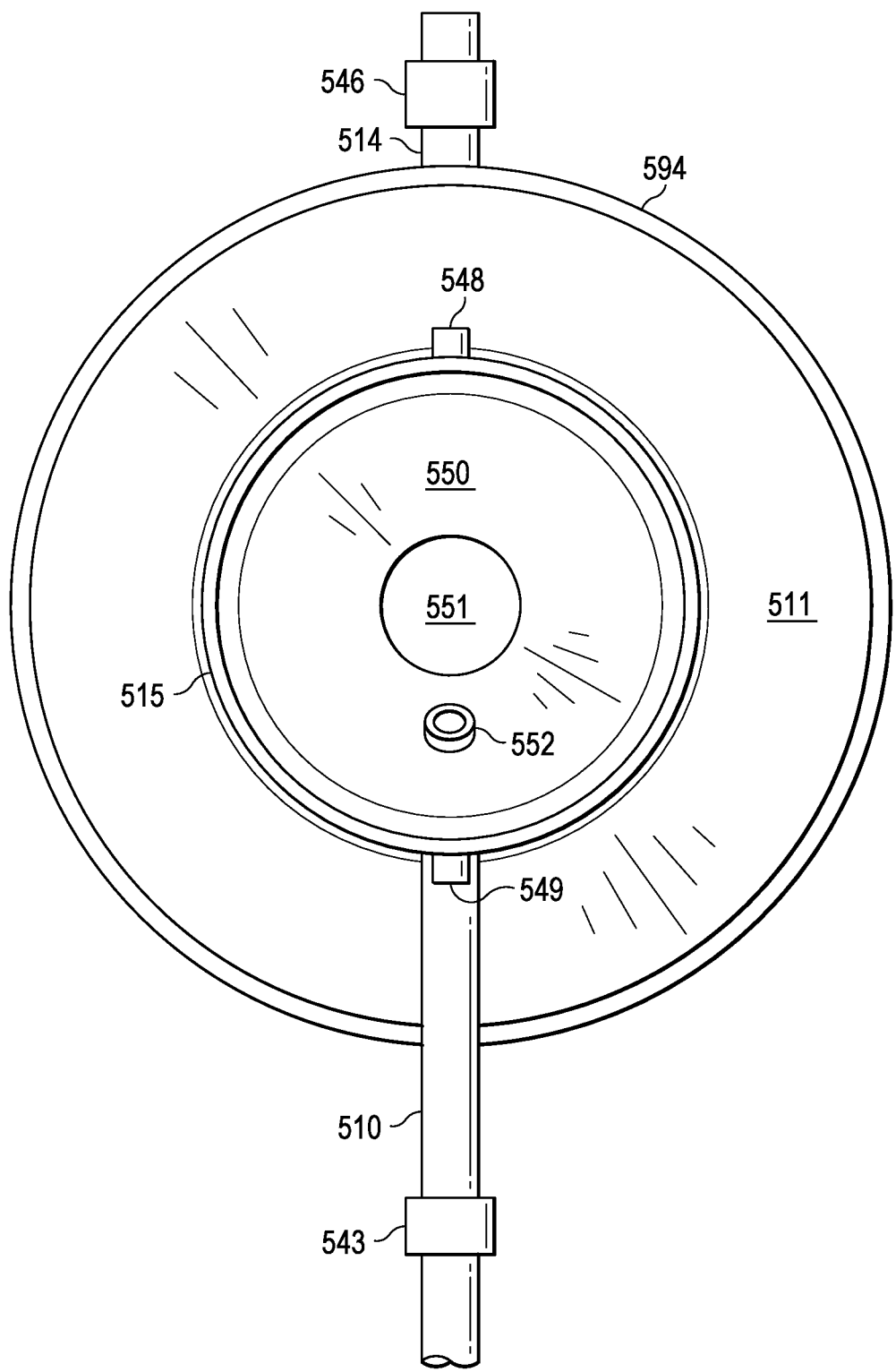
FIG. 48 is a bottom-up view of the hydrochloric acid production and freezing apparatus of the sixth embodiment.

FIG. 48 shows a bottom-up view of the same hydrochloric acid production and freezing apparatus 511 illustrated in FIGS. 45-47. Visible through the lower mouth 515 of the embodiment's ejection port is an upper wall 550 of the embodiment's HCl freezer chamber. And, separating the HCl freezer chamber from the combustion chamber is an HCl drain valve 551.

Visible within the bottom-up view of the hydrochloric acid production and freezing apparatus 511 is the ejection gas effluent aperture 552 of the frozen HCl ejection gas pipe 509 through which pressurized gas is introduced into an upper end of the embodiment's HCl freezer chamber for the purpose of dislodging a rod of frozen hydrochloric acid solution so that the rod falls down and out of the embodiment through the ejection port and the lower mouth 515 thereof.

Figure 49:
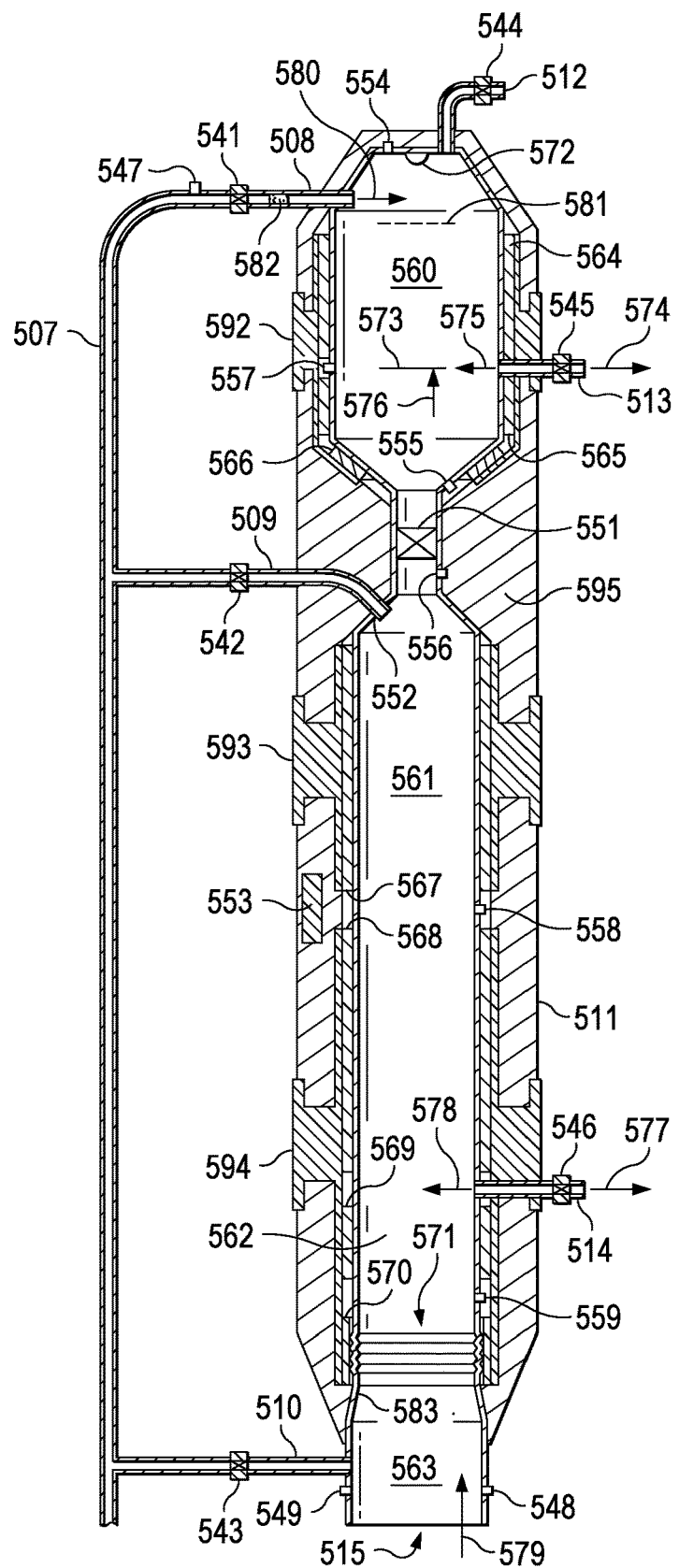
FIG. 49 is a side sectional view of the hydrochloric acid production and freezing apparatus of the sixth embodiment.

FIG. 49 shows a side sectional view of the same hydrochloric acid production and freezing apparatus 511 that is illustrated in FIGS. 45-48. The section plane is taken along section line 49-49 of FIG. 47.

The hydrochloric acid production and freezing apparatus 511, of the embodiment 500 which is illustrated in FIGS. 34-38, operates in a cyclical fashion. After the discharge of a rod of frozen hydrochloric acid solution (not shown in FIG. 49), the hydrochloric acid production and freezing apparatus initiates a new frozen rod formation and discharge cycle. The various operational steps involved in the frozen rod formation and discharge cycle are controlled by an HCl-process controller 553.

The HCl-process controller 553 controls, orchestrates, and/or implements, the frozen rod formation and discharge cycle, through its control of seven valves 541-546 and 551, and four sets of multistage thermoelectric coolers (TECs) 564-570, and through sensor data provided to it by six pressure sensors 547-549 and 554-556, and three temperature sensors 557-559.

Valves 541-543 control the flow of a gas, i.e., a mixture of hydrogen and chlorine gases, into the tubular interior of the hydrochloric acid production and freezing apparatus 511. While valves 544-546 control the flow of gas out of that tubular interior. And, valve 551 controls the flow of hydrochloric acid solution from the combustion chamber 560 into the HCl freezer chamber 561.

The tubular interior of the hydrochloric acid production and freezing apparatus 511 includes, and/or is comprised of, four tubular portions, each fluidly connected to the others (except when HCl discharge valve 551 is closed thereby fluidly isolating the combustion chamber 560 from the other tubular portions). The combustion chamber 560 comprises the uppermost portion of the tubular interior of the hydrochloric acid production and freezing apparatus. Below the combustion chamber, in descending order, are the HCl freezer chamber 561, the ice plug chamber 562, and the ejection port 563.

Each of the multistage thermoelectric coolers (TECs) 564-570 of the hydrochloric acid production and freezing apparatus 511 is thermally connected (on one side) to one of three heat sinks 592-594. Each heat sink permits the heat produced on an outer side of each TEC (i.e., a side distal from the center of the hydrochloric acid production and freezing apparatus), as cold it produced on the other/inner side, to be dissipated, and/or conductively transferred, to the body of water (516 in FIG. 35) on which the embodiment (500 in FIG. 35) floats. When a TEC is energized with a reversed polarity such that it produces cold on its outer side and heat on its inner side, the respective heat sink to which it is thermally connected absorbs heat from the body of water (516 in FIG. 35) on which the embodiment (500 in FIG. 35) floats.

The hydrochloric acid production and freezing apparatus 511 is surrounded on most sides by a layer of thermal insulation 595 which permits a hydrochloric acid solution within the apparatus to be chilled to −50 degrees Celsius, and a cylindrical volume of seawater to be chilled to −10 degrees Celsius, without a significant amount of thermal energy being absorbed from the body of water (516 in FIG. 35) on which the embodiment (500 in FIG. 35) floats while the embodiment expends energy removing thermal energy from the hydrochloric acid solution and cylindrical volume of seawater.

A new frozen rod formation and discharge cycle begins with a first operational step wherein the HCl-process controller 553 fills the tubular interior of the hydrochloric acid production and freezing apparatus 511 with a mixture of hydrogen and chlorine gases. To do this, the HCl-process controller opens valves 541-543 and 551, and closes valves 544-546. At this point in the frozen rod formation and discharge cycle, the HCl-process controller de-energizes the annular multistage thermoelectric coolers (TECs) 564-570 that are arrayed around the respective peripheries of the combustion chamber 560, the HCl freezer chamber 561, the ice plug chamber 562, and the ridge lock 571. The HCl-process controller also de-energizes the ignition lamp (e.g., an emitter of ultraviolet electromagnetic radiation which ignites mixtures of hydrogen and chlorine gases) thereby preventing an ignition of the gases with which the HCl-process controller fills the tubular interior of the hydrochloric acid production and freezing apparatus.

The HCl-process controller 553 continues adding hydrogen and chlorine gases to the tubular interior of the hydrochloric acid production and freezing apparatus 511 until the upper combustion chamber pressure sensor 554 indicates that the pressure of the gas within the combustion chamber has reached, and/or become equal to, the hydrostatic pressure measured by the outer ejection port pressure sensor 549, i.e., thereby indicating that the gas within the tubular interior of the hydrochloric acid production and freezing apparatus has reached a pressure equal to the hydrostatic pressure of a depth equal to the depth of the outer ejection port pressure sensor which indicates that the gas within the interior of the hydrochloric acid production and freezing apparatus has come to extend from the uppermost part of the combustion chamber down to a level and/or depth equal to that of the outer ejection port pressure sensor, and/or adjacent to the to the lower mouth 515 of the ejection port 563.

After the tubular interior 560-563 of the hydrochloric acid production and freezing apparatus 511 has been filled with gas, and any seawater within that tubular interior has been displaced from, and/or pushed out of, that interior, the HCl-process controller 553 initiates and executes a second operational step of the frozen rod formation and discharge cycle.

At this point in the frozen rod formation and discharge cycle, the HCl-process controller 553 closes the gas inlet valves 541-543. It also closes the HCl drain valve 551 thereby separating, isolating, and/or fluidly disconnecting, the combustion chamber 560 from the other portions 561-563 of the tubular interior of the hydrochloric acid production and freezing apparatus.

During this second operational step, the HCl-process controller 553 leaves closed the combustion chamber evacuation valve 544 (thereby preventing gas within the combustion chamber from escaping), the hydrochloric acid reservoir initialization valve 545 (thereby preventing gas within the combustion chamber from escaping), and the ice plug chamber initialization valve 546 (thereby preventing gas within the ice plug chamber 562 and the ejection port 563 from escaping).

During this second operational step, the HCl-process controller leaves off and/or de-energized the ultraviolet lamp 572, as well as the various multistage TECs 564-570.

After the tubular interior 560-563 of the hydrochloric acid production and freezing apparatus 511 has been filled with gas, and the flow of gas into that tubular interior has been halted (and the gas secured within that tubular interior), the HCl-process controller 553 initiates and executes a third operational step of the frozen rod formation and discharge cycle.

At this point in the frozen rod formation and discharge cycle, the HCl-process controller 553 opens the hydrochloric acid reservoir initialization valve 545 thereby allowing that portion of the gas within the combustion chamber 560 which is below the level 573 to escape 574 from the combustion chamber by flowing into and through lower combustion chamber drain pipe 513, and through the opened hydrochloric acid reservoir initialization valve, and therethrough into the body of water (516 of FIG. 35) on which the embodiment (500 in FIG. 35) floats.

As gas escapes 574 the combustion chamber 560, seawater flows 575 into that combustion chamber 560 through the same lower combustion chamber drain pipe 513 and the same opened hydrochloric acid reservoir initialization valve 545, thereby flooding 576 that lower portion of the combustion chamber between the HCl drain valve 551 and the lower combustion chamber drain pipe 513, i.e., up to level 573, with seawater, thereby initializing the water (seawater) reservoir within the combustion chamber. In a later operational step, when hydrogen and chlorine gases produced by, and received from, the embodiment's (500 in FIG. 34) electrolyzer (506 in FIG. 34) flow into the combustion chamber, and are ignited with the ultraviolet lamp therein, the hydrogen chloride gas produced by the combustion, will dissolve into the water reservoir thereby increasing both its volume and its acidity (and thereby transforming it into a hydrochloric acid reservoir).

The position (e.g., elevation and/or depth) of the lower combustion chamber drain pipe 513, with respect to the interior of the combustion chamber 560, is such that when the hydrochloric acid reservoir is full and ready to be discharged into the HCl freezer chamber 561, the reservoir will comprise and/or constitute a 38% by weight solution of hydrochloric acid.

The HCl-process controller 553 leaves open the hydrochloric acid reservoir initialization valve 545, thereby allowing gas to continue to flow 574 out of the combustion chamber 560, and allowing seawater to continue flowing 575 in to the combustion chamber, until the upper combustion chamber pressure sensor 554 indicates to the HCl-process controller that it has achieved, registered, and/or detected a pressure consistent with the hydrostatic pressure outside the hydrochloric acid production and freezing apparatus 511 at the depth and pressure characterizing, and/or associated with, the lower combustion chamber drain pipe 513.

When the upper combustion chamber pressure sensor 554 indicates to the HCl-process controller 553 that it has achieved a pressure consistent with the hydrostatic pressure at the depth and pressure of the lower combustion chamber drain pipe 513, then it closes the hydrochloric acid reservoir initialization valve 545, thereby preventing the further outflow of gas from, and/or the further inflow of seawater into, the combustion chamber 560. And, thereby stabilizing, fixing, trapping, enclosing, the initial reservoir of seawater that will become the basis of the hydrochloric acid solution that the hydrochloric acid production and freezing apparatus 511, and its HCl-process controller 553, will produce.

After the initial reservoir of seawater has been created within the combustion chamber 560, the HCl-process controller 553 initiates and executes a fourth operational step of the frozen rod formation and discharge cycle.

At this point in the frozen rod formation and discharge cycle, the HCl-process controller 553 opens the ice plug chamber initialization valve 546, thereby allowing gas within the ice plug chamber 562 and the ejection port 563 to escape 577 through the ice plug chamber drain pipe 514 into the body of water (516 of FIG. 35) on which the embodiment (500 in FIG. 35) floats. The escaping gas also permits seawater to flood the ice plug chamber 562 and the ejection port 563, i.e., by flowing 578 in through the same ice plug chamber drain pipe 514 and by flowing 579 up and through the ejection port 563.

The HCl-process controller 553 leaves open the ice plug chamber initialization valve 546, thereby allowing gas to continue to flow 577 out of the ice plug chamber 562 and the ejection port 563, and allowing seawater to continue flowing 578 and 579 in to the ice plug chamber and the ejection port, until the HCl drain pipe pressure sensor 556 indicates to the HCl-process controller that it has achieved, registered, and/or detected, a pressure consistent with the hydrostatic pressure outside the hydrochloric acid production and freezing apparatus 511 at the depth and pressure characterizing, and/or associated with, the ice plug chamber drain pipe 514.

When the HCl drain pipe pressure sensor 556 indicates to the HCl-process controller 553 that it has achieved a pressure consistent with the hydrostatic pressure at the depth and pressure of the ice plug chamber drain pipe 514, then it closes the ice plug chamber initialization valve 546, thereby preventing the further outflow of gas from, and/or the further inflow of seawater into, the ice plug chamber 562 and the ejection port 563.

After the ice plug chamber 562 and the ejection port 563 have been flooded with seawater, the HCl-process controller 553 initiates and executes a fifth operational step of the frozen rod formation and discharge cycle.

At this point in the frozen rod formation and discharge cycle, the HCl-process controller 553 energizes, activates, and/or "turns on," the ice plug chamber TEC 569 and the ice plug ridge lock TEC 570 thus causing those multistage thermoelectric coolers to chill and freeze the seawater within the ice plug chamber 562. When the seawater within the ice plug chamber freezes, that frozen seawater constitutes, comprises, and/or serves as, a "plug" preventing fluid within the HCl freezer chamber 561 from escaping through the ejection port 563. The frozen plug resulting from, and/or created during, this operational step includes circumferential grooves 571, ridges, and/or holdfasts, each of which has a maximal diameter exceeding the nominal and/or average diameter of the ice plug chamber, and which thereby prevent the frozen plug from being able to slide out of the ice plug chamber while that portion of the ice plug is and/or remains frozen.

The HCl-process controller 553 continues energizing the ice plug chamber TEC 569 and the ice plug ridge lock TEC 570, thereby continuing to chill the seawater therein, until an ice plug chamber temperature sensor 559 indicates to the HCl-process controller that the seawater/ice within the ice plug chamber has fallen below the freezing point of seawater (at the depth and pressure of the ice plug chamber) which is approximately −1.8 degrees Celsius. So, to ensure the rigidity of the ice plug within the ice plug chamber, the HCl-process controller will continue energizing the ice plug chamber TEC 569 and the ice plug ridge lock TEC 570 until the temperature of the seawater/ice within the ice plug chamber has fallen to at least −10 degrees Celsius before initiating and executing the sixth operational step.

After the seawater within the ice plug chamber 562 has been frozen, thereby fluidly isolating the interior of the HCl freezer chamber 561, the HCl-process controller 553 initiates and executes a sixth operational step of the frozen rod formation and discharge cycle.

At this point in the frozen rod formation and discharge cycle, the HCl-process controller 553 opens the ejection port gasification gas valve 543 thereby permitting gas to flow from the primary gas pipe 507 and into and through the ejection port gasification pipe 510 thus creating a pocket of gas beneath the frozen ice plug within the ice plug chamber 562. This pocket of gas insulates the frozen ice plug from the thermal energy within the body of water (516 in FIG. 35) that might otherwise hasten its melting, and/or require more of the embodiment's electrical power to prevent its melting and thereby to preserve and/or continue the ice plug's frozen state.

The HCl-process controller 553 leaves open the ejection port gasification gas valve 543, thereby allowing gas to continue to flow into the ejection port 563 until the inner ejection port pressure sensor 548 sends data to the HCl-process controller indicating that the pressure of the pocket of gas within the ejection port, and beneath the ice plug, has reached and/or exceeded the hydrostatic pressure measured, and transmitted to the HCl-process controller, by the outer ejection port pressure sensor 549 which measures the head pressure of the seawater outside the hydrochloric acid production and freezing apparatus 511 at the depth and pressure of the outer ejection port pressure sensor. After the pressure data transmitted to the HCl-process controller by and/or from the inner 548 and outer 549 ejection port pressure sensors indicates that the gas pocket has reached its desired volume, the HCl-process controller closes the ejection port gasification gas valve 543 thereby preventing an inflow of any additional gas to the ejection port.

The gas pocket, created beneath the frozen seawater plug within the ice plug chamber 562, will facilitate the eventual release, discharge, separation, and/or ejection, of the rod of frozen hydrochloric acid solution that will be created by, and/or result from, the frozen rod formation and discharge cycle.

After a pocket of gas has been created within the ice plug chamber 563, the HCl-process controller 553 initiates and executes a seventh operational step of the frozen rod formation and discharge cycle.

At this point in the frozen rod formation and discharge cycle, the HCl-process controller 553 opens the combustion chamber gas valve 541 thereby allowing a mixture of hydrogen and chlorine gases to flow from the primary gas pipe 507 and therefrom to flow into the combustion chamber gas pipe 508 and therethrough to flow 580 into the combustion chamber 560. Also, at this point in the frozen rod formation and discharge cycle, the HCl-process controller turns on, energizes, and/or activates, the ultraviolet lamp 572 causing the hydrogen and chlorine gases that flow into the combustion chamber to react with one another (i.e., to combust) thereby creating hydrogen chloride gas. The hydrogen chloride gas created during and/or by the combustion of the hydrogen and chlorine gases dissolves into the seawater within the acid reservoir positioned within a lower part of the combustion chamber thereby becoming hydrochloric acid and thereby acidifying the acid reservoir.

As hydrogen and chlorine gases are combusted and/or reacted, and as hydrochloric acid is added to the acid reservoir, both the acidity and the volume of that reservoir increase.

As the volume of the reservoir of acidified seawater and hydrochloric acid solution increases, the upper surface of that reservoir will reach a threshold level 581 within the combustion chamber 560. At this level, the lower combustion chamber pressure sensor 555 will transmit to the HCl-process controller 553 a pressure value corresponding to the sensor's depth (and/or head pressure) beneath the upper surface (at level 581) of the hydrochloric acid reservoir. However, that pressure value will include the addition of the pressure of any gas within the combustion chamber above the upper surface (at level 581) of the hydrochloric acid reservoir. Therefore, the HCl-process controller subtracts the pressure value it receives from the upper combustion chamber pressure sensor 554, from the pressure value that it receives from the lower combustion chamber pressure sensor, in order to determine the depth of the lower combustion chamber pressure sensor 555 within the reservoir of hydrochloric acid solution, and thereby in order to determine the depth, volume, and mass, of the hydrochloric acid solution within the reservoir.

After the pressure data from the lower 555 and upper 554 combustion chamber pressure sensors informs the HCl-process controller 553 that the hydrochloric acid reservoir within the combustion chamber is full, the HCl-process controller closes the combustion chamber gas valve 541 thereby ending the flow of gas into the combustion chamber.

When the upper surface of the hydrochloric acid reservoir reaches the level 581 through the additional of hydrochloric acid to a reservoir that started at the level 573, then the ratio of seawater to hydrochloric acid will be such that the filled reservoir (with upper surface at level 581) will be approximately 38% by weight hydrochloric acid.

It should be noted that the combustion of the hydrogen and chlorine gases within the combustion chamber 560, e.g., as triggered by the illumination of the ultraviolet lamp 572, does not also ignite and/or combust the hydrogen and chlorine gases within the primary gas pipe 507, because an ignition and/or flashback arrestor 582 within the combustion chamber gas pipe 508 prevents such a spread of the combustion into the primary gas pipe.

Heat produced by the serial and/or continuous combustion of hydrogen and chlorine gases within the combustion chamber 560 creates a thermal gradient across the thermoelectric coolers (and/or Peltier coolers/junctions) resulting in the creation of a voltage across those Peltier coolers. This voltage imparts electrical power to the embodiment, in addition to the electrical power produced by its two water-turbine/generator assemblies.

After the reservoir of hydrochloric acid solution within the combustion chamber 560 has reached its maximum desired volume and/or level, the HCl-process controller 553 initiates and executes an eighth operational step of the frozen rod formation and discharge cycle.

At this point in the frozen rod formation and discharge cycle, the HCl-process controller 553 turns on, energizes, and/or activates, the combustion chamber multistage thermoelectric coolers (TECs) 564-566, thereby chilling the hydrochloric acid solution within the hydrochloric acid reservoir. These TECs remain energized, and continue chilling the hydrochloric acid reservoir, until the combustion chamber temperature sensor 557 indicates to the HCl-process controller that the temperature of the hydrochloric acid solution within the hydrochloric acid reservoir has fallen below a temperature of −1.8 degrees Celsius, thereby ensuring that the hydrochloric acid solution will not melt the ice plug within the ice plug chamber 562. Likewise, when, and/or while, the combustion chamber temperature sensor indicates to the HCl-process controller that the temperature of the hydrochloric acid solution within the hydrochloric acid reservoir has reached the target temperature, then it will turn off, de-energize, and/or de-activate, the combustion chamber multistage thermoelectric coolers (TECs)—turning them on whenever the temperature rises above the target temperature, and turning them back off whenever the temperature again reaches the target temperature.

The temperature of the hydrochloric acid solution within the hydrochloric acid reservoir is lowered to a temperature below the freezing point of seawater ice in order to ensure that when added to the HCl freezer chamber 561, the hydrochloric acid solution will not melt the ice plug, within the ice plug chamber, thereby releasing the liquid hydrochloric acid solution into the body of water (561 in FIG. 35) outside the embodiment.

The HCl-process controller will continue energizing the combustion chamber TECs until the temperature of the hydrochloric acid solution within the combustion chamber has fallen to at least −10 degrees Celsius before initiating and executing the ninth operational step.

After the reservoir of hydrochloric acid solution within the combustion chamber 560 has reached a sufficiently low temperature, e.g., below −10 degrees Celsius, the HCl-process controller 553 initiates and executes a ninth operational step of the frozen rod formation and discharge cycle.

At this point in the frozen rod formation and discharge cycle, the HCl-process controller 553 opens the HCl drain valve 551 thereby permitting the reservoir of hydrochloric acid solution contained within the combustion chamber 560 to drain downward through open HCl drain valve and into the gas-filled HCl freezer chamber 561. And, as the chilled hydrochloric acid solution within the combustion chamber flows downward and into the HCl freezer chamber, the gas originally within the HCl freezer chamber flows upward into the combustion chamber.

Because of the plug of frozen seawater blocking and/or obstructing the ice plug chamber, the chilled hydrochloric acid solution that flows into the HCl freezer chamber 561 is trapped there. When the lower combustion chamber pressure sensor 555 indicates and/or signals to the HCl-process controller 553 a pressure reading that is approximately equal to a pressure reading indicated and/or signaled to the HCl-process controller by the upper combustion chamber pressure sensor 554, then the HCl-process controller closes the HCl drain valve 551, thereby confining the hydrochloric acid solution within the HCl freezer chamber.

After the chilled hydrochloric acid solution has drained into, and been confined within, the HCl freezer chamber 561, the HCl-process controller 553 turns on, energizes, and/or activates, the HCl freezer chamber TECs 567-568, and turns off, and/or de-energizes, the combustion chamber TECs 564-566.

The HCl-process controller 553 continues energizing the HCl freezer chamber TECs 567-568, thereby continuing to chill the hydrochloric acid solution within the HCl freezer chamber 561, until HCl freezer chamber temperature sensor 558 indicates to the HCl-process controller that the hydrochloric acid solution within the HCl freezer chamber has fallen below the freezing point of a 38 wt % hydrochloric acid solution (at the depth and pressure of the HCl freezer chamber) which is approximately −26 degrees Celsius. So, to ensure the rigidity of the frozen hydrochloric acid solution within the HCl freezer chamber, the HCl-process controller will continue energizing the HCl freezer chamber TECs 567-568 until the temperature of the hydrochloric acid solution within the HCl freezer chamber has fallen to at least −50 degrees Celsius before initiating and executing the tenth operational step. The HCl-process controller will turn off the HCl freezer chamber TECs when the temperature of the hydrochloric acid solution is sufficiently low (e.g., at least or below −50 degrees Celsius), and turn them back on when it rises above the target temperature (e.g., rises above-50 degrees Celsius).

After the hydrochloric acid solution within the HCl freezer chamber 561 has reached a sufficiently low temperature, e.g., below −50 degrees Celsius, the HCl-process controller 553 initiates and executes a tenth operational step of the frozen rod formation and discharge cycle.

At this point in the frozen rod formation and discharge cycle, the HCl-process controller 553 turns on, energizes, and/or activates, the ice plug ridge lock TEC 570. However, the HCl-process controller energizes the ice plug ridge lock TEC with a reversed electrical polarity, thereby causing the ice plug ridge lock TEC to produce heat instead of cold. Thus, after its activation, the ice plug ridge lock TEC begins to melt that portion of the seawater ice plug within the ice plug chamber 562, and adjacent to the ejection port 563. The cooling provided by the still energized HCl freezer chamber TECs 567-568 and ice plug chamber TEC 569 maintain the low temperatures, and frozen state, of the hydrochloric acid solution within the HCl freezer chamber 561 and of the seawater ice within the ice plug chamber 562, even as the distal and/or lowermost end of the ice plug at the ridge lock 571 is melted.

When the portion of the ice plug within the ice plug chamber 562 has melted to a sufficient degree, the ice ridges (at 571) anchoring the ice plug within the interior of the ice plug chamber lose their ability to fix the position of, and/or to hold up, the ice plug within the ice plug chamber. When the ice ridges have been sufficiently degraded and/or melted, the frozen rod comprising an upper portion of frozen hydrochloric acid, and a lower portion of frozen seawater, falls from, and/or out of, the bottom of the hydrochloric acid production and freezing apparatus 511, falling through the gas-filled ejection port 563. The ejection port offers minimal resistance to the downward gravitational separation of the frozen rod from the hydrochloric acid production and freezing apparatus due to the relatively greater diameter of the ejection port (due to the frustoconical flare in the wall of the ejection port at 583), and due to the pocket of gas within the ejection port.

The separation and/or passage of the frozen rod (not shown) from the hydrochloric acid production and freezing apparatus 511 is signaled to the HCl-process controller 553 when the temperature data from HCl freezer chamber temperature sensor 558 indicates an increase in the ambient temperature from that of the frozen hydrochloric acid solution, e.g., below approximately −50 degrees Celsius, to a nominal temperature of the seawater which will flow into the evacuated HCl freezer chamber 561 and ice plug chamber 562, e.g., approximately 4 degrees Celsius or greater, after the evacuation of the frozen rod.

If the HCl-process controller 553 determines that an expected interval of time expected to achieve a release of a frozen rod has exceeded a nominal, threshold, and/or expected amount of time, then the HCl-process controller will open frozen HCl ejection gas valve 542 after a pressure reading from the primary gas pipe pressure sensor 547 indicates that enough hydrogen and chlorine gas has been produced by the embodiment's (500 in FIG. 35) electrolyzer (506 in FIG. 35), and been trapped within the primary gas pipe 507, so that the pressure of that accumulated gas has come to exceed the has reached, and/or become equal to, a hydrostatic pressure of a depth equal to the depth of the frozen HCl ejection gas pipe 509. After the HCl-process controller opens frozen HCl ejection gas valve 542, gas will flow from the primary gas pipe, into and through the frozen HCl ejection gas pipe 509, and into an upper portion and/or part of the HCl freezer chamber 561, flowing into that HCl freezer chamber through the ejection gas effluent aperture 552.

If the HCl-process controller 553 determines that an expected interval of time expected to achieve a gas-pressure-assisted ejection of a frozen rod has exceeded a nominal, threshold, and/or expected amount of time, then the HCl-process controller will energize, in reverse polarity, the HCl freezer chamber TECs 567-568, and the ice plug chamber TEC 569 (while maintaining a reversed energization of the ice plug ridge lock TEC 570). And, because these thermoelectric coolers (TECs) will be energized in reversed polarities, they will emit heat and, with sufficient time, will melt the contents of the HCl freezer chamber 561 and the ice plug chamber 562. With sufficient time, the frozen rod will either become separated from the hydrochloric acid production and freezing apparatus 511, and fall through the ejection port 563, or it will be completely melted (although one would not expect this outcome to ever be necessary).

After the frozen rod has separated from the hydrochloric acid production and freezing apparatus 511 (or been melted), the HCl-process controller 553 initiates and executes the first operational step of the frozen rod formation and discharge cycle-thereby beginning (again) yet another hydrochloric-acid formation and sequestration cycle.

A primary gas pipe pressure sensor 547 measures the pressure of the gas within the primary gas pipe 507. When the pressure data it sends to the HCl-process controller 553 indicate that the free surface of the gas/seawater interface within the primary gas pipe has reached a threshold depth, and has moved to a depth proximate to an upper end of the electrolyzer (506 in FIG. 35), the HCl-process controller turns off, de-energizes, and/or deactivates, the electrolyzer, so as to prevent the mixture of hydrogen and chlorine gases that it produces from entering the electrolyzer chamber and potentially displacing the seawater pool in which the electrolyzer's electrodes are nominally bathed.

Another embodiment, similar to the embodiment 500 illustrated in FIGS. 34-49, utilizes, incorporates, and/or includes, a hydrophobic material in the fabrication of its HCl freezer chamber 561 and ice plug chamber 562 which tends to promote the clean, speedy, complete, and relatively quick and efficient, separation of the frozen rod from the interiors of those chambers-thereby facilitating the tenth operational step of the frozen rod formation and discharge cycle. The scope of the present disclosure includes embodiments that are constructed of, and/or which include, any and all types, varieties, and/or combinations, of materials.

Another embodiment, similar to the embodiment 500 illustrated in FIGS. 34-49, utilizes a combustion chamber configured to create a hydrochloric acid solution of a different acidity, strength, and/or relative hydrochloric acid content. For example, another embodiment creates, freezes, and discharges frozen rods, comprised of a hydrochloric acid solution of 10 wt %, which is characterized by a higher freezing point (of approximately −18 degrees Celsius) than the freezing point (of approximately −26 wt %) characteristic of the 38 wt % of hydrochloric acid solution produced and frozen by the embodiment illustrated in FIGS. 34-49. The scope of the present disclosure includes embodiments that produce, freeze, and sequester, hydrochloric acid solutions of any and all extant concentrations and/or acidities.

Another embodiment, similar to the embodiment 500 illustrated in FIGS. 34-49, is configured to chill the hydrochloric acid solutions that it produces and freezes to a different temperature, e.g., to −90 degrees Celsius, than does the embodiment illustrated in FIGS. 34-49. The scope of the present disclosure includes embodiments that freeze the solutions of hydrochloric acid that they produce to any temperature that is at least sufficient to achieve the freezing of the respective hydrochloric acid solutions, i.e., given the concentration and/or pressure (depth of HCl freezing chamber) characteristic of their respective hydrochloric acid solutions.

Another embodiment, similar to the embodiment 500 illustrated in FIGS. 34-49, is configured to chill the seawater that it freezes into ice plugs to a different temperature, e.g., to −90 degrees Celsius, than does the embodiment illustrated in FIGS. 34-49. The scope of the present disclosure includes embodiments that freeze seawater to any temperature that is at least sufficient to achieve the freezing of the seawater, i.e., given the pressure (depth of ice plug chamber) characteristic of their respective embodiments.

Another embodiment, similar to the embodiment 500 illustrated in FIGS. 34-49, uses an alternate refrigeration technology, e.g., gas compression and expansion, to chill its hydrochloric acid solution and seawater. And, another embodiment, similar to the embodiment 500 illustrated in FIGS. 34-49, uses an alternate heating technology, e.g., resistive electrical heaters, to warm the ridge lock portions of its frozen seawater ice plugs. The scope of the present disclosure includes embodiments that utilize any technology to chill and freeze hydrochloric acid solutions and/or seawater, as well as embodiments that utilize any technology to heat their frozen seawater ice plugs (and/or portions thereof).

Figure 50:
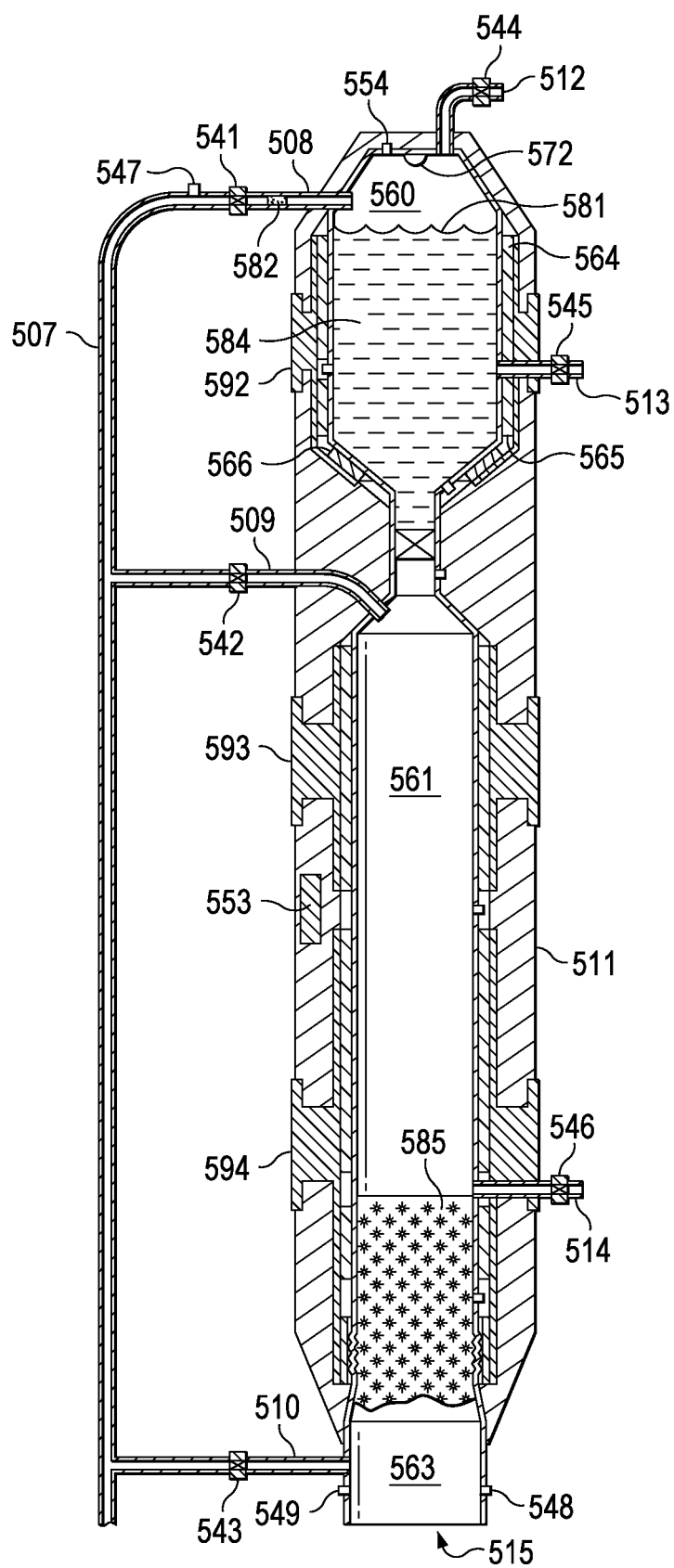
FIG. 50 is a side sectional view of the hydrochloric acid production and freezing apparatus of the sixth embodiment.

FIG. 50 shows a side sectional view of the same hydrochloric acid production and freezing apparatus 511 that is illustrated in FIGS. 45-49. The section plane is taken along section line 49-49 of FIG. 47.

FIG. 50 illustrates the configuration and/or state of the hydrochloric acid production and freezing apparatus 511 after its completion of the seventh operational step of the frozen rod formation and discharge cycle.

The combustion chamber has completed the generation, creation, and/or formulation, of a sufficient quantity and/or volume of hydrochloric acid so as to increase the volume of the seawater/hydrochloric acid reservoir 584 to the point that its upper surface has reached the threshold level 581 at which the HCl-process controller 553 will initiate and execute the eighth operational step of the frozen rod formation and discharge cycle, which is to cool the hydrochloric acid solution 584 down a temperature of no more than −10 degrees Celsius.

Visible in FIG. 50 is the ice plug 585 that was completed in, and/or as a consequence of, fifth operational step of the frozen rod formation and discharge cycle.

Figure 51:
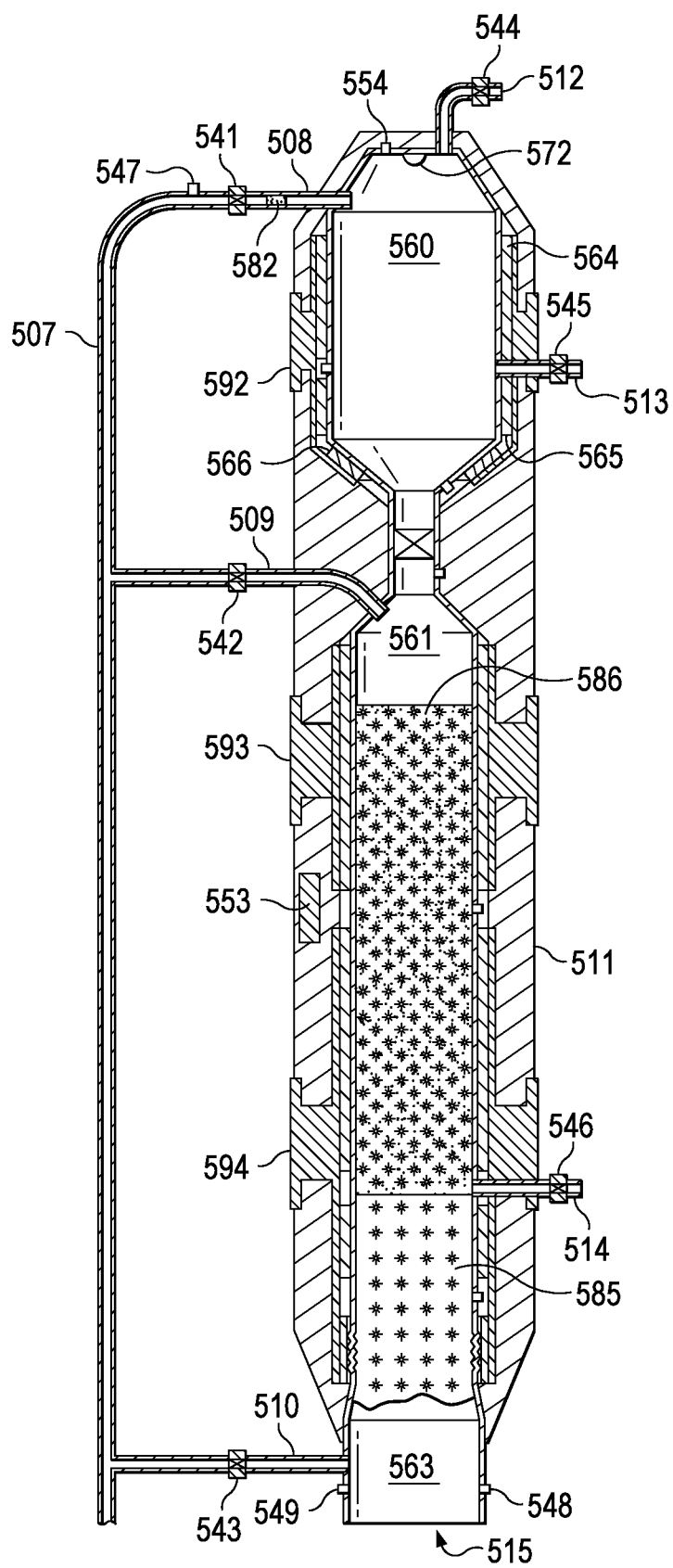
FIG. 51 is a side sectional view of the hydrochloric acid production and freezing apparatus of the sixth embodiment.

FIG. 51 shows a side sectional view of the same hydrochloric acid production and freezing apparatus 511 that is illustrated in FIGS. 45-50. The section plane is taken along section line 49-49 of FIG. 47.

FIG. 51 illustrates the configuration and/or state of the hydrochloric acid production and freezing apparatus 511 after its completion of the ninth operational step of the frozen rod formation and discharge cycle.

The hydrochloric acid solution decanted into the HCl freezer chamber 561 has been frozen into a cylindrical block 586 of hydrochloric ice. And that block of frozen hydrochloric acid rests atop the frozen seawater ice plug 585.

Figure 52:
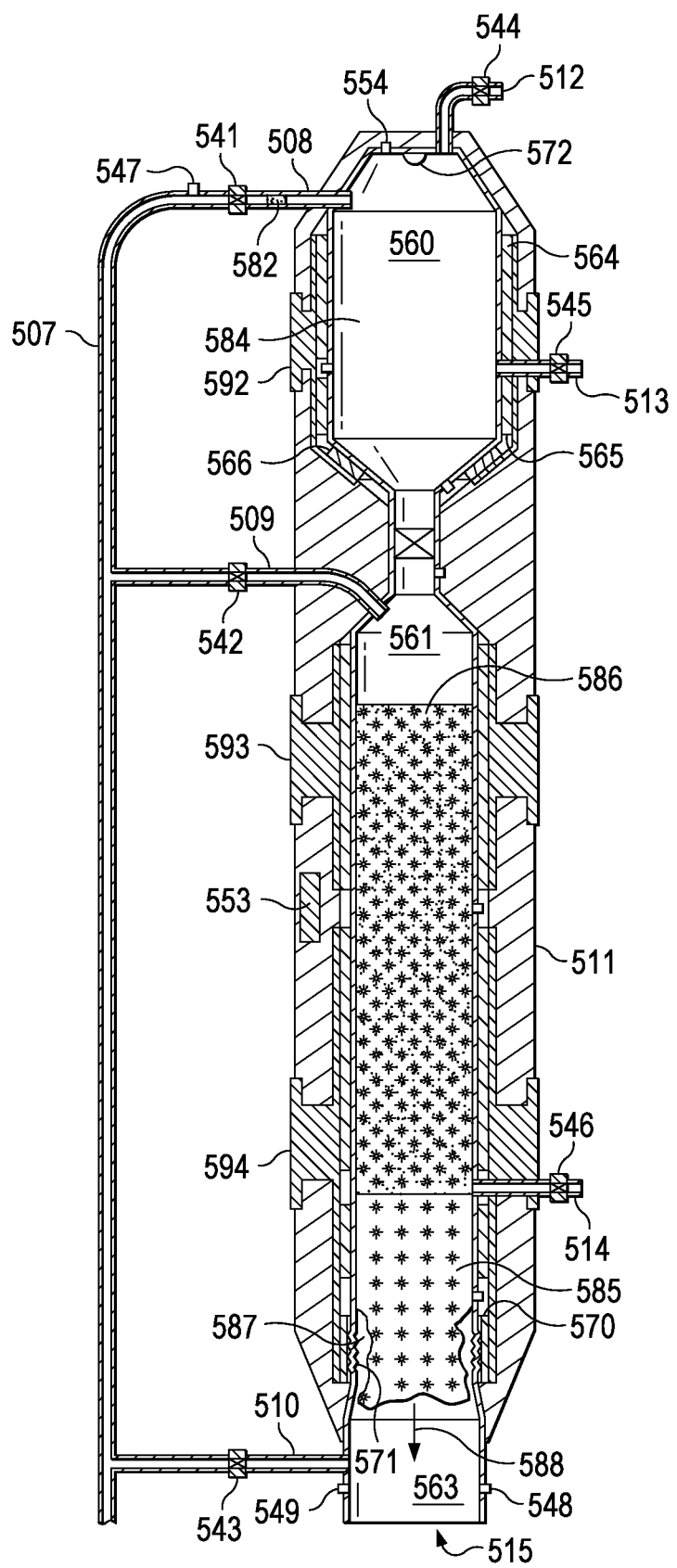
FIG. 52 is a side sectional view of the hydrochloric acid production and freezing apparatus of the sixth embodiment.

FIG. 52 shows a side sectional view of the same hydrochloric acid production and freezing apparatus 511 that is illustrated in FIGS. 45-51. The section plane is taken along section line 49-49 of FIG. 47.

FIG. 52 illustrates the configuration and/or state of the hydrochloric acid production and freezing apparatus 511 after its completion of the tenth operational step of the frozen rod formation and discharge cycle. Following the reversed-polarity energization of the ice plug ridge lock TEC 570, portions, e.g., 587, of the seawater ice comprising the ice plug 585 have melted, separating those melted portions of the ice plug from the ridge locks 571 that preventing the ice plug, and the cylindrical block 586 of hydrochloric ice above it, from detaching from, and/or sliding out of, the hydrochloric acid production and freezing apparatus 511. Thus, when a sufficient volume of the ice plug adjacent to the ridge locks has melted, the frozen rod, comprising the upper cylindrical block of hydrochloric ice and the lower ice plug, will fall 588 down and out through the ejection port 563 of the hydrochloric acid production and freezing apparatus. Thereafter falling through the body of water (516 in FIG. 35) until reaches and/or exceeds a depth, e.g., 2 km, at which the hydrochloric acid will be sequestered for a long time, e.g., for millennia.

For the sake of clarity and understanding, the operational steps characteristic of the operation of the embodiment's (500 in FIG. 35) hydrochloric acid production and freezing apparatus 511 have been presented, and/or discussed, as though those operations were executed in a serial and/or linear fashion. However, it will be obvious to those skilled in the art that some of those steps may be started and/or executed in parallel, while other operational steps are in progress.

For example, an alternate embodiment similar to the one illustrated and discussed in FIGS. 34-52 executes the needed operational steps in the following and altered order of: 1) filling the combustion chamber 560, the HCl freezer chamber 561, the ice plug chamber 562, and the ejection port 563 with gas; 2) sealing the gas by closing the respective combustion chamber gas valve 541, the frozen HCl ejection gas valve 542, and the ejection port gasification gas valve 543; 3) fluidly isolating the combustion chamber from the HCl freezer chamber, the ice plug chamber, and the ejection port. These initial steps 1-3 are conducted in a serial fashion with respect to this alternate embodiment, just as they were for the original embodiment. However, after these first three operational steps are completed, the creation of the hydrochloric acid reservoir can occur at the same time that the ice plug is created.

In other words, after the completion of the third initial step, the combustion chamber 560 can be initialized (through the creation of an initial reservoir of seawater), the reservoir of hydrochloric acid solution (584 in FIG. 50) can then be created through a period during, and/or over which, hydrogen, and chlorine gases are combusted within the combustion chamber, and the filled reservoir of hydrochloric acid solution can be chilled. And, after the completion of the third initial step, and at the same time that the reservoir of hydrochloric acid is being created and cooled, seawater can be admitted to the ice plug chamber 562, and the ejection port 563, the ice plug (585 in FIG. 50) can then be created through the freezing of a portion of that seawater, and the ice plug can then be thermally isolated from the body of water (516 in FIG. 35) through the creation of a gas pocket below the ice plug and within the ejection port.

After the reservoir of hydrochloric acid solution (584 in FIG. 50) has been created and chilled, and after the seawater ice plug (585 in FIG. 50) has been created and insulated with a gas pocket between it and the seawater outside the embodiment, then . . . after both of these independently executed series of operational tasks have been completed . . . the chilled hydrochloric acid solution can be moved from the combustion chamber 560 to the HCl freezer chamber 561 and frozen. And then, after the hydrochloric acid solution has been frozen (586 in FIG. 50), the portion (e.g., 587 in FIG. 52) of the ice plug held fast within the ridge locks can be melted and the frozen rod of HCl and seawater can be discharged (e.g., 589 in FIG. 53) from the embodiment (500 in FIG. 35).

Figure 53:
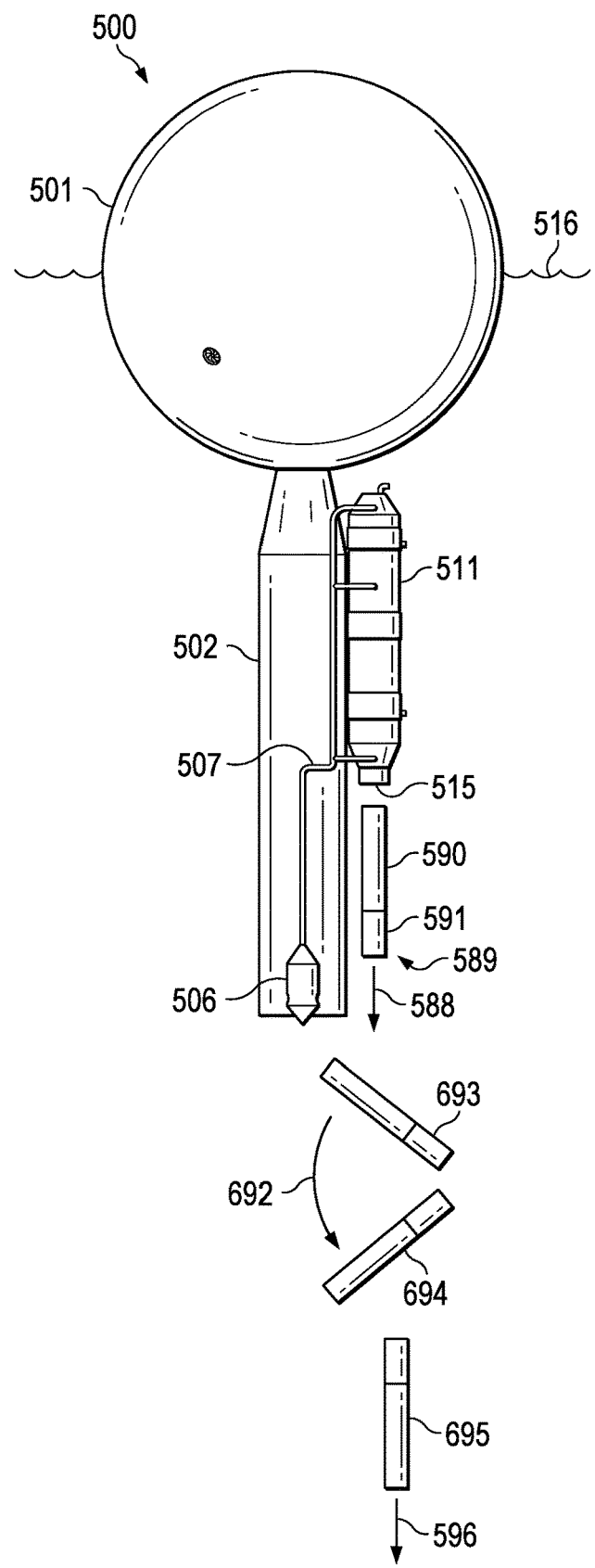
FIG. 53 is a side view of an embodiment of the sixth embodiment discharging a rod of frozen hydrochloric acid solution.

FIG. 53 shows a side view illustrating the discharge, release, and/or ejection, of a frozen rod from the same hydrochloric acid production and freezing apparatus 511 that is illustrated in FIGS. 45-52.

At the completion of the tenth operational step of the frozen rod formation and discharge cycle, a frozen cylindrical block, e.g., 589, composed of an upper cylindrical block, e.g., 590, of frozen hydrochloric acid solution and a lower cylindrical block, e.g., 591, of frozen seawater, falls out of the bottom of the hydrochloric acid production and freezing apparatus 511, passing through the lower mouth 515 of the ejection port (563 of FIG. 49) of the hydrochloric acid production and freezing apparatus. The density of the frozen hydrochloric acid solution (at a concentration of 38 wt % is approximately 1200 kg/m3, while the density of ice is approximately 917 kg/m3, therefore as the frozen rod falls down through the body of water 516, the heavier end of that frozen rod, i.e., the end with the frozen hydrochloric acid, will tend to cause the frozen rod, e.g., 593, to rotate to an orientation, e.g., 594, in which the heavier end is pointing downward. This rotation will tend to continue until the frozen rod has inverted the vertical orientation with which it fell out of the hydrochloric acid production and freezing apparatus, i.e., the orientation of frozen rod 589. Once fully inverted, the frozen rod 595 will tend to fall 596 downward and its downward velocity will tend to accelerate until it reaches a terminal velocity.

After an interval of time during which the frozen rod falls, it will achieve a depth at which its payload of hydrochloric acid will be effectively sequestered for a very long time, e.g., for millennia, and where the natural alkalinity found at significant depths within the sea is sufficient to neutralize the acidity of the payload of hydrochloric acid.

An alternate version of the embodiment 500 illustrated in FIGS. 34-53 incorporates, includes, utilizes, and/or comprises, and additional chamber and an altered configuration of its hydrochloric acid production and freezing apparatus 511.

The alternate embodiment has a combustion chamber 560 that is not insulated (595 in FIG. 49). However, the alternate embodiment's combustion chamber is encircled, wrapped, and/or surrounded, at least in part, by a fluid intake pipe through which seawater flows from the body of water on which the embodiment floats to, and/or into, the electrolyzer. Thus, instead of the heat produced by the combustion of hydrogen and chlorine gases within the combustion chamber being cooled by thermoelectric coolers which produce power as they cool the heated combustion chamber, in the alternate embodiment, the heat produced by the combustion of the hydrogen and chlorine gases within the combustion chamber is conductively transmitted and/or transferred to the seawater inflow pipe, and to the seawater flowing therethrough, by which fresh seawater is directed into the electrolyzer. By warming the seawater flowing into the electrolyzer, the alternate embodiment tends to enhance the efficiency of that electrolyzer and to produce more hydrogen and chlorine gases from a given expenditure of electrical energy.

Thus, when combusting hydrogen and chlorine gases within, the combustion chamber conductively transmits much, if not all, of its combustion-generated heat to the water flowing to the electrolyzer, thereby tending to enhance the efficiency of its electrolyzer, and, by contrast, thereby also precluding the possibility of gaining electrical power from the heat-driven thermoelectric (Peltier) coolers.

The alternate embodiment has an insulated HCl-chilling chamber fluidly connected, by way of a valve, to the uninsulated combustion chamber. And, after filling the hydrochloric acid solution reservoir within its combustion chamber, the alternate embodiment decants, moves, and/or transfers, that reservoir of hydrochloric acid solution from the combustion chamber to its HCl-chilling chamber by opening the valve that fluidly connects them. The HCl-chilling chamber of the alternate embodiment is similar in design to the combustion chamber 560 of the original embodiment (500 in FIG. 35) that is illustrated in FIGS. 34-53 in that it is insulated and equipped with thermoelectric coolers in a fashion, manner, design, and/or configuration, similar to that which characterizes the respective elements of the fashion, manner, design, and/or configuration, of the original embodiment's insulation (595 in FIG. 49) and thermoelectric coolers (564-566 in FIG. 49).

In the alternate embodiment, the HCl-chilling chamber is fluidly connected, by way of a valve, to an HCl freezer chamber comparable to that (561 of FIG. 49) of the original embodiment. And, the alternate embodiment, like the original embodiment, has an ice plug chamber, and an ejection port, which function in analogous manners to those of the original embodiment.

Figure 54:
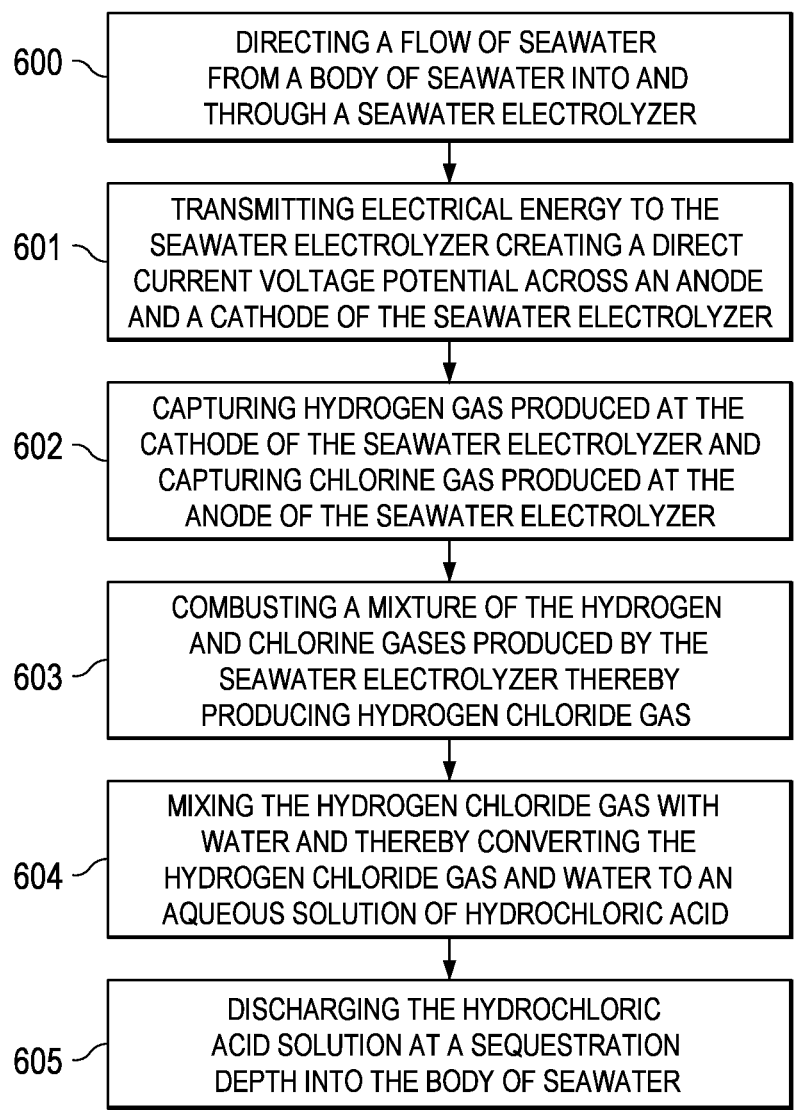
FIG. 54 enumerates the steps of a method of the present disclosure.

FIG. 54 illustrates a method of the present disclosure in which: 600: seawater from a body of seawater is made to flow into and through a seawater electrolyzer; 601: electrical energy, e.g., a direct current voltage and current, is used to create a voltage between the cathode and anode of the seawater electrolyzer; 602: the hydrogen and chlorine gases produced by the electrolyzer is captured; 603: the mixture of captured hydrogen and chlorine gases is combusted, and/or chemically reacted, thereby combining the gases into hydrogen chloride gas; 604: fluidly connecting the hydrogen chloride gas to a reservoir of water (and/or to a reservoir of an aqueous solution of hydrochloric acid) thereby dissolving the hydrogen chloride gas and converting the gas into hydrochloric acid that is thereby added to the reservoir; and, 605: discharge the reservoir, and the hydrochloric acid therein, into the body of seawater at a depth sufficient to achieve its long-term sequestration, i.e., at a "sequestration depth."

Figure 55:
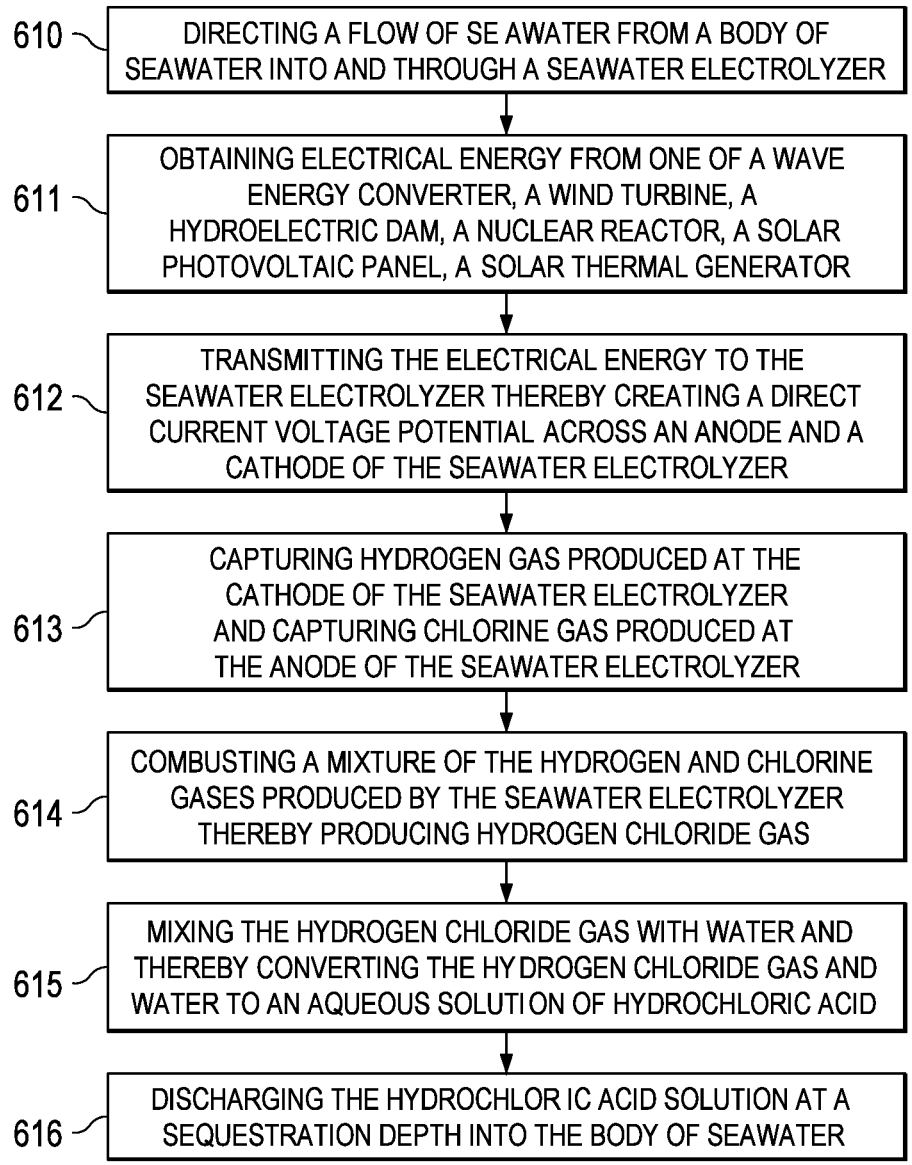
FIG. 55 enumerates the steps of a method of the present disclosure.

FIG. 55 illustrates a method of the present disclosure in which: 610: seawater from a body of seawater is made to flow into and through a seawater electrolyzer; 611: electrical energy is obtained from one of: a wave energy converter (such as the one disclosed in U.S. patent Ser. No. 16/789, 205); a wind turbine (e.g., a wind turbine affixed to a land mass, a wind turbine embedded in a seafloor, and a wind turbine floating in the sea); a hydroelectric dam, e.g., such as one might find along the course of a river; a nuclear power generator; a solar photovoltaic panel; and a solar thermal generator (such as one that uses an array of mirrors to concentrate solar radiation on a steam-powered generator) (the method includes any source of electrical power, electrical energy, and/or any source of non-electrical energy that may be converted into an electrical energy); 612: applying the obtained electrical energy to the anode and cathode of the seawater electrolyzer thereby manifesting an electrolysis of seawater within the electrolyzer; 613: capturing the hydrogen and chlorine gases produced by the seawater electrolyzer; 614: combusting and/or otherwise causing to react the hydrogen and chlorine gases to convert them to hydrogen chloride gas; 615: mixing the hydrogen chloride gas with water in a reservoir so as to dissolve the hydrogen chloride gas into the water and thereby convert the gas into hydrochloric acid; and, 616: discharge the reservoir, and the hydrochloric acid therein, into the body of seawater at a depth sufficient to achieve its long-term sequestration, i.e., at a "sequestration depth."

Figure 56:
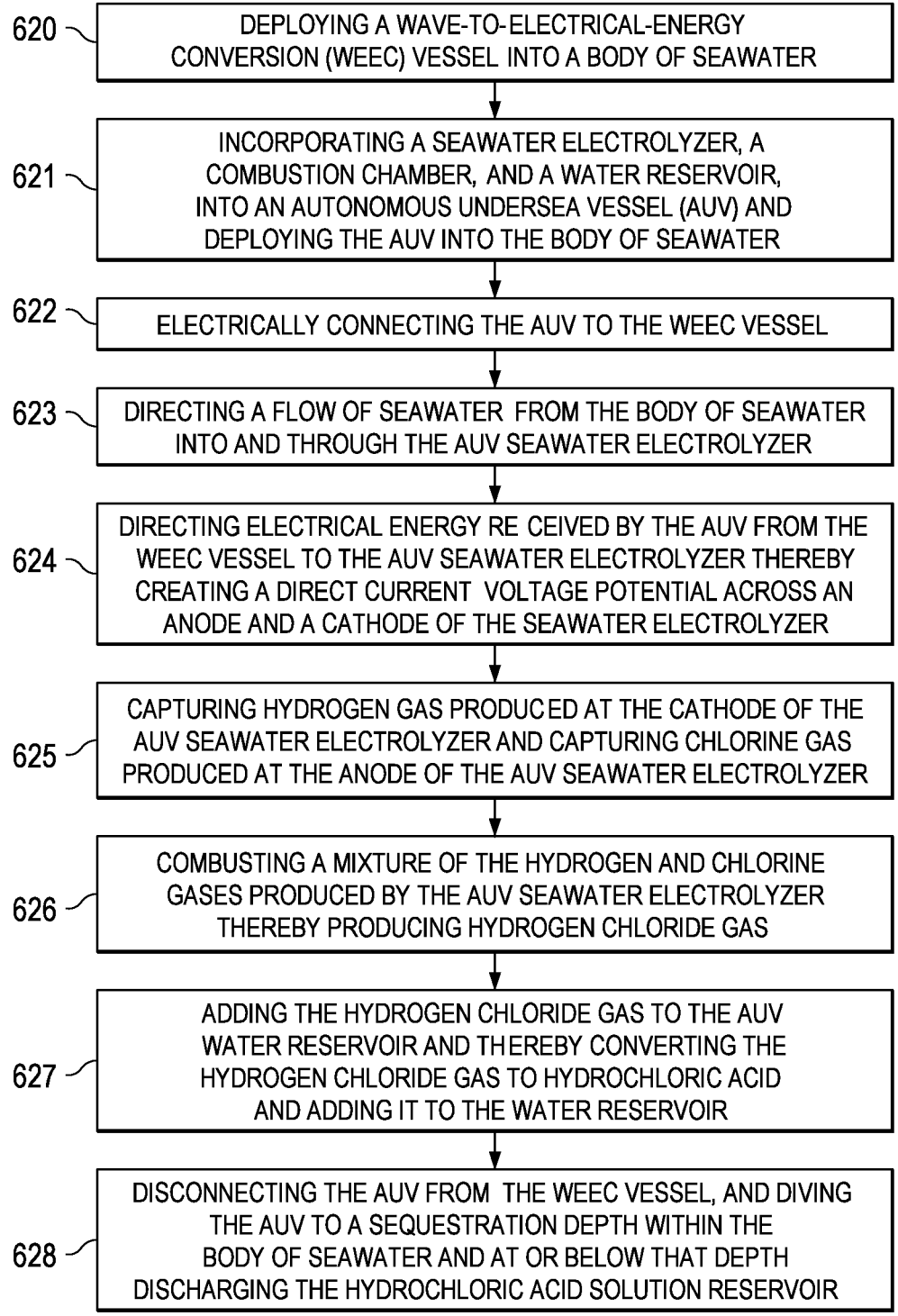
FIG. 56 enumerates the steps of a method of the present disclosure.
Figure 57:
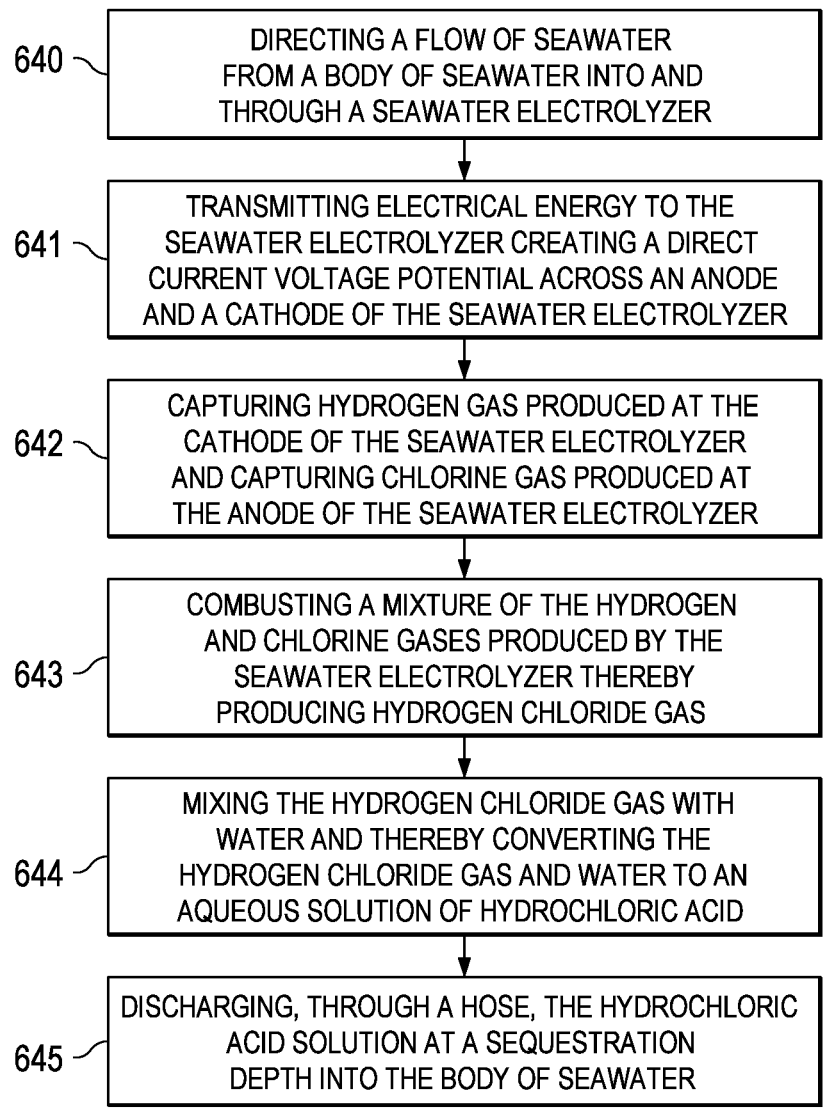
FIG. 57 enumerates the steps of a method of the present disclosure.

FIG. 56 illustrates a method of the present disclosure in which: 620: a wave energy conversion (WEC) device is deployed into a body of seawater in which the waves thereof will enable and/or cause the WEC device to produce electrical power; 621: create, and deploy into the body of seawater, an autonomous undersea vessel (AUV) that is able to electrically connect to the WEC device and obtain electrical power from it, and which AUV incorporates and/or comprises a seawater electrolyzer, a combustion chamber, and a hydrochloric acid reservoir; 622: electrically connect the AUV to the WEC device; 623: causing seawater from the body of seawater to flow into and through the seawater electrolyzer of the AUV; 624: apply electrical energy received from the WEC device to the anode and cathode of the AUV's seawater electrolyzer; 625: capture the hydrogen and chlorine gases produced by the AUV's seawater electrolyzer; 626: combust a mixture of the hydrogen and chlorine gases thereby chemically converting them into hydrogen chloride gas; 627: dissolve the hydrogen chloride gas into the water of the hydrochloric acid reservoir thereby converting the hydrogen chloride gas to hydrochloric acid and augmenting the volume of the hydrochloric acid reservoir; 628: detaching and/or disconnecting the AUV from the WEC device and then diving and/or submerging the AUV to a sequestration depth within the body of seawater and at that depth discharging the fluid contents of the hydrochloric acid reservoir.

FIG. 56 illustrates a method of the present disclosure in which: 640: seawater from a body of seawater is made to flow into and through a seawater electrolyzer; 641: utilize a source of direct-current electrical energy (the method includes any source of electrical power, electrical energy, and/or any source of non-electrical energy that may be converted into an electrical energy) so as to create an appropriate voltage and current across a cathode and an anode of the seawater electrolyzer; 642: capturing the hydrogen and chlorine gases produced by the seawater electrolyzer; 643: combusting and/or otherwise causing to react the hydrogen and chlorine gases to convert them to hydrogen chloride gas; 644: mixing the hydrogen chloride gas with water in a reservoir so as to dissolve the hydrogen chloride gas into the water and thereby convert the gas into hydrochloric acid (and to thereby reduce the pH of the water reservoir); and, 645: discharge the water reservoir, and the hydrochloric acid dissolved therein, into a hose a distal end of which is positioned within the body of seawater at a depth sufficient to achieve a long-term sequestration of the discharged hydrochloric acid, i.e., at a "sequestration depth."

Figure 58:
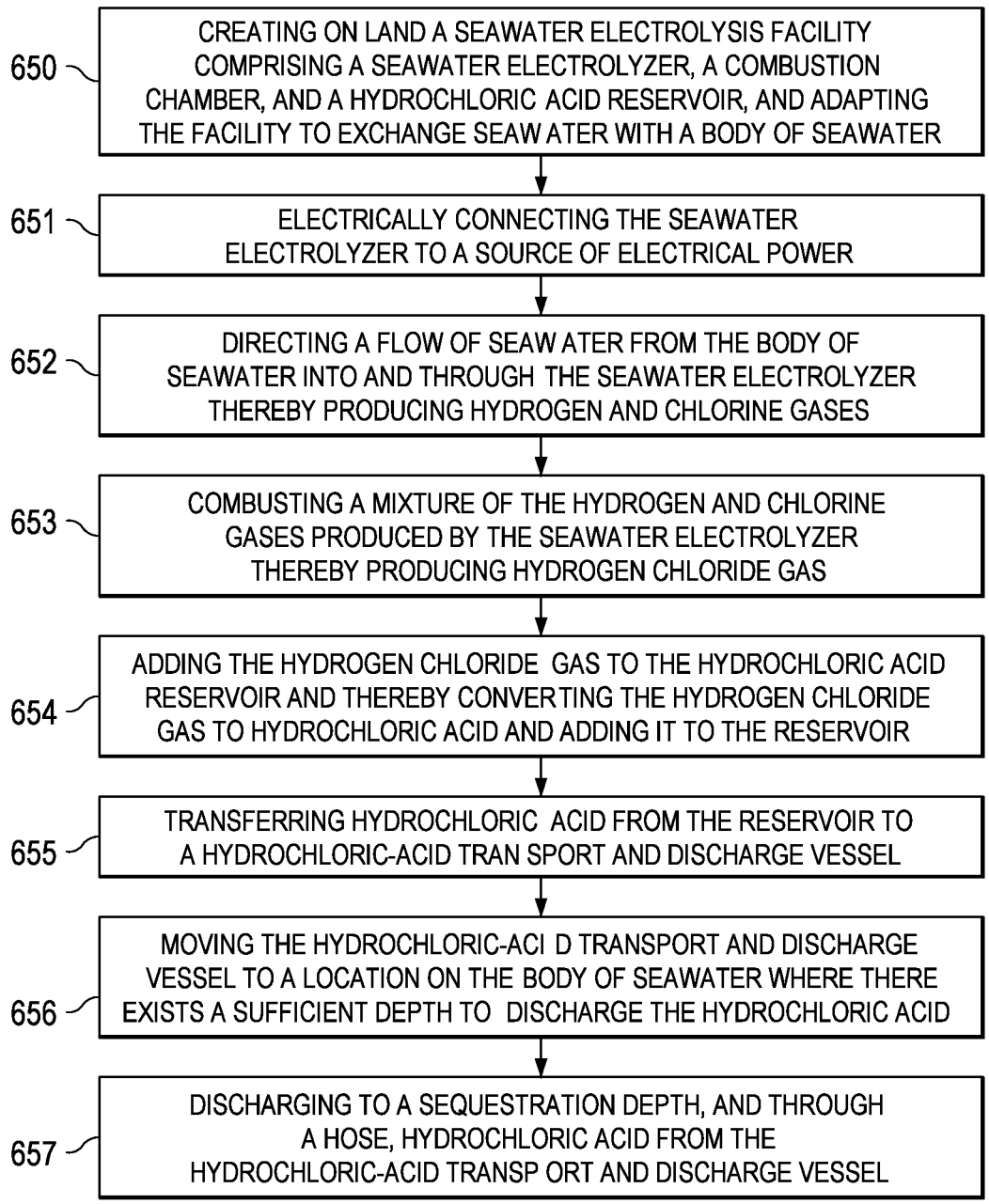
FIG. 58 enumerates the steps of a method of the present disclosure.

FIG. 58 illustrates a method of the present disclosure in which: 650: a facility capable of electrolyzing seawater is created on land, preferably adjacent to a body of seawater, the facility comprising a seawater electrolyzer, a combustion chamber, and a hydrochloric acid reservoir; 651: the facility and the seawater electrolyzer therein are connected to a source of electrical power (e.g., a nuclear power station, a solar panel, a wind turbine, a natural gas electricity generation utility, and/or an electrical grid) through which the seawater electrolyzer may be energized and seawater therein may be electrolyzed; 652: causing seawater from the body of seawater to flow (e.g., be pumped) into and through the seawater electrolyzer and thereby causing the seawater electrolyzer to produce hydrogen and chlorine gases from the seawater (and causing an effluent of the seawater electrolyzer to flow back to the body of seawater); 653: combust a mixture of the hydrogen and chlorine gases thereby chemically converting them into hydrogen chloride gas; 654: dissolve the hydrogen chloride gas into the water of the hydrochloric acid reservoir thereby converting the hydrogen chloride gas to hydrochloric acid and augmenting the volume of the hydrochloric acid reservoir; 655: transfer hydrochloric acid from the facility's hydrochloric acid reservoir to a hydrochloric-acid transport and discharge vessel; 656: moving, navigating, and/or transiting, the hydrochloric-acid transport and discharge vessel to a location at an upper surface of the body of seawater at which the seawater is sufficiently deep to sequester the hydrochloric acid solution stored on and/or within the hydrochloric-acid transport and discharge vessel; 657: causing the hydrochloric-acid transport and discharge vessel to discharge its store of hydrochloric acid solution into a hose wherein a distal end of the hose (and end from which the hydrochloric acid will flow out) is positioned at or below a sequestration depth.

Figure 59:
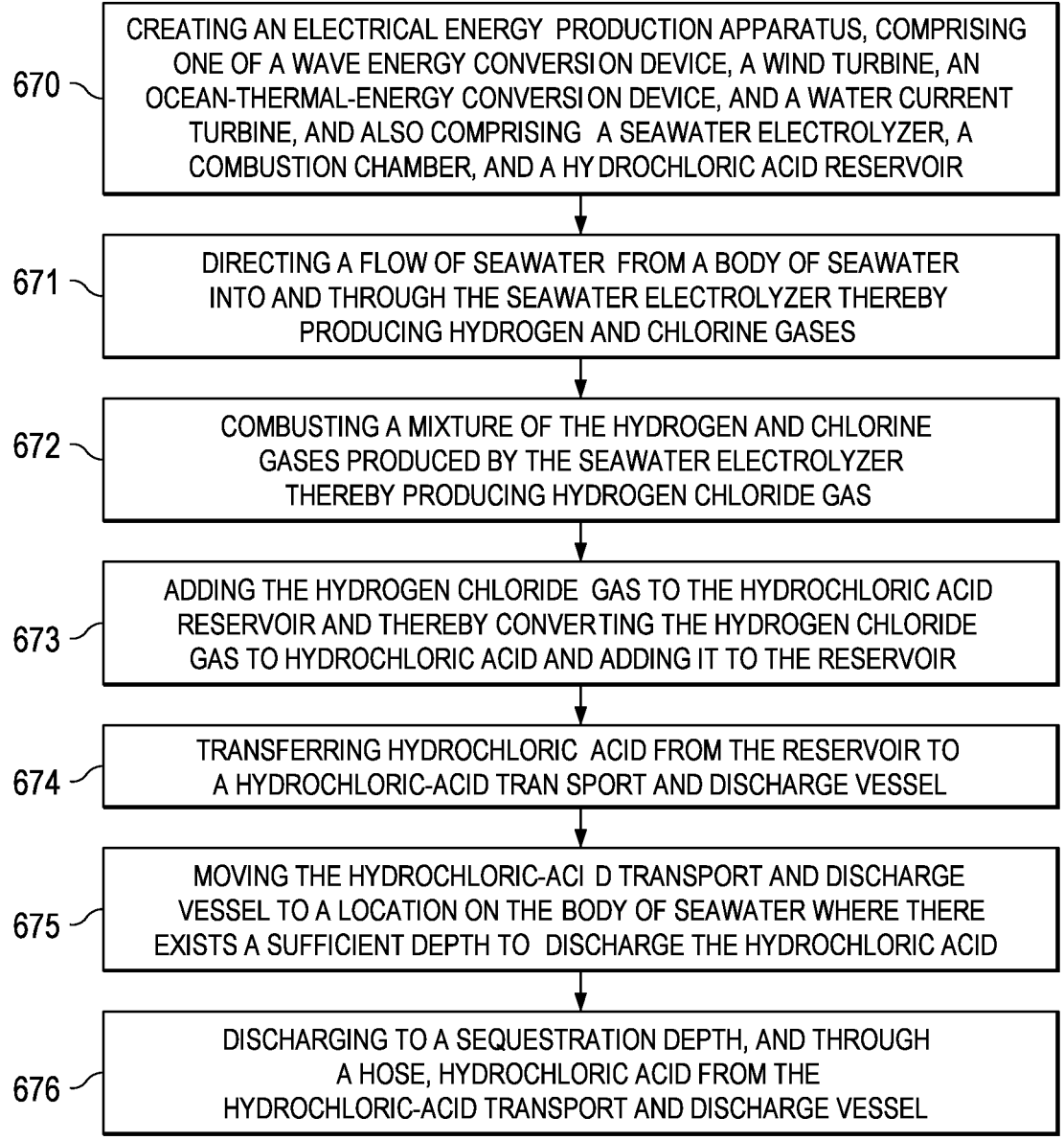
FIG. 59 enumerates the steps of a method of the present disclosure.

FIG. 59 illustrates a method of the present disclosure in which: 670: create a hydrochloric acid production apparatus that produces electrical energy from a natural, environmental, and/or renewable, source of energy (such as from an ocean wave, a wind, an ocean thermal gradient, and/or an ocean current), and which also comprises a seawater electrolyzer, a combustion chamber, and a hydrochloric acid reservoir; 671: causing seawater from the body of seawater to flow into and through the seawater electrolyzer thereby causing the seawater electrolyzer to produce hydrogen and chlorine gases from the seawater; 672: combust a mixture of the hydrogen and chlorine gases thereby chemically converting them into hydrogen chloride gas; 673: dissolve the hydrogen chloride gas into the water of the hydrochloric acid reservoir thereby converting the hydrogen chloride gas to hydrochloric acid and augmenting the volume of the hydrochloric acid reservoir; 674: transfer hydrochloric acid from the hydrochloric acid reservoir of the hydrochloric acid production apparatus to a hydrochloric-acid transport and discharge vessel; 675: moving, navigating, and/or transiting, the hydrochloric-acid transport and discharge vessel to a location at an upper surface of the body of seawater at which the seawater is sufficiently deep to sequester the hydrochloric acid solution stored on and/or within the hydrochloric-acid transport and discharge vessel; 676: causing the hydrochloric-acid transport and discharge vessel to discharge its store of hydrochloric acid solution into a hose wherein a distal end of the hose (and end from which the hydrochloric acid will flow out) is positioned at or below a sequestration depth.

It is to be appreciated that increasing an alkalinity of a first depth of a body of water by delivering an acid (generated from the water in the first depth of the body of water) to a second depth of the body of water allows for the body of water to absorb more carbon dioxide from the atmosphere. However, embodiments are not limited to such environmental benefits. For example, green energy products can also be generated by the WEC. As used herein, energy products may include, but are not limited to, fuels (e.g., hydrogen and/or carbon containing fuels), chemicals (e.g., HCl), biological species, digital goods and/or services, and the like. In some instances, "chemicals" may be used to refer to energy products that are fuels (e.g., hydrogen gas) and/or non-fuel chemistries (e.g., HCl). Since the WEC may be located at sea, the energy products may be transported back to land for consumption, use, storage, or the like. A green energy product may refer to an energy product that is generated through the use of energy that emits low amounts (or no amounts) of carbon dioxide or other greenhouse gasses. Examples of energy product generation at the WEC and transport schemes or processes are described with respect to FIGS. 60-73.

Figure 60:
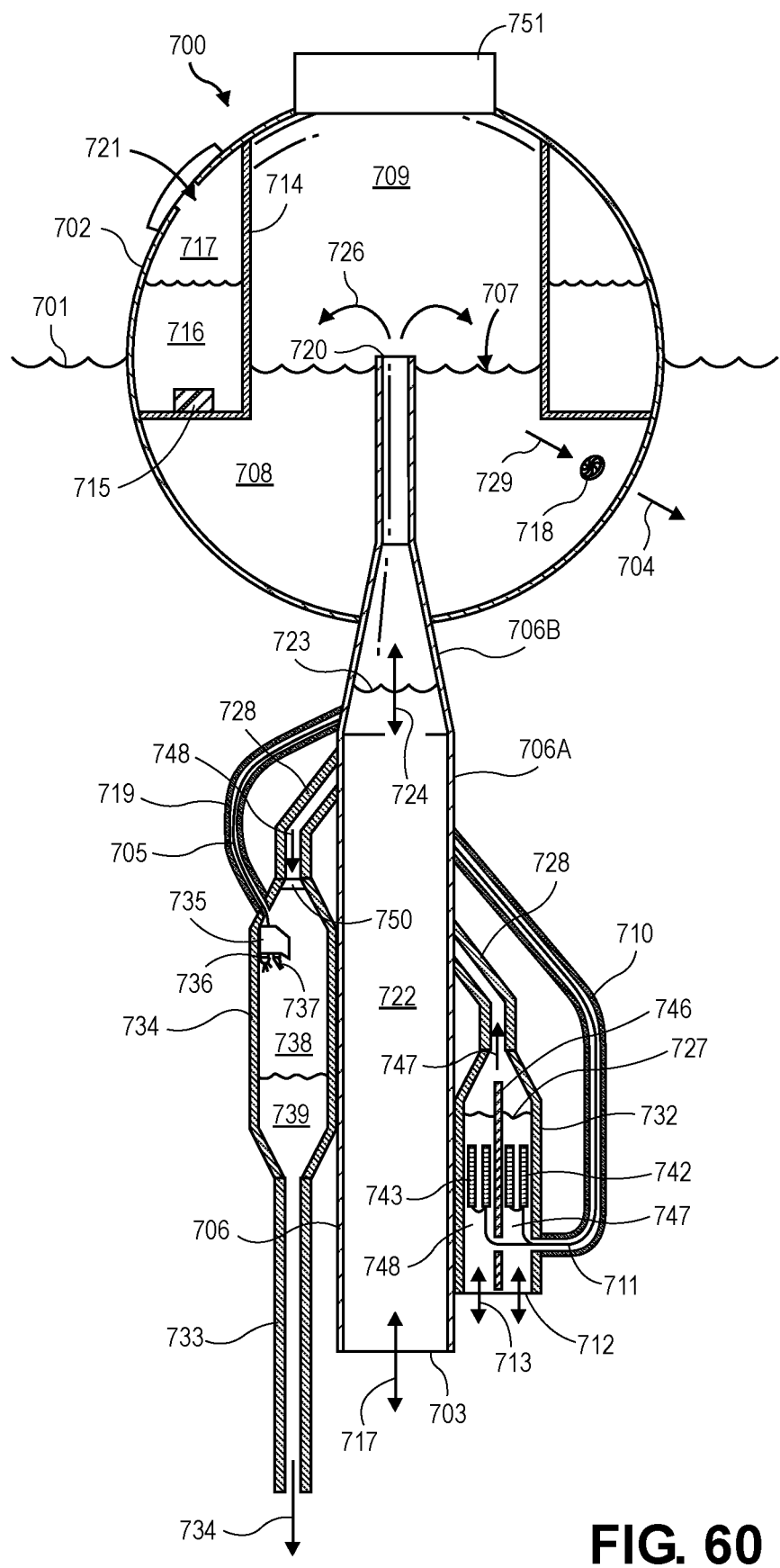
FIG. 60 is a side sectional view of a seventh embodiment of the present disclosure.

FIG. 60 illustrates a cross-sectional view of a WEC 700 with an acid generation and distribution system, in accordance with an embodiment. The WEC 700 floats adjacent to an upper surface 701 of a body of water over which waves pass. The WEC 700 may include a buoyant chamber 702 with an interior volume 709. The interior volume 709 may be partially filled with water 708. Gasses (e.g., oxygen, hydrogen, air, or the like) may fill additional portions of the interior volume 709. Internal structures may also be provided within the buoyant chamber 702. For example, baffles, walls, sub-chambers, doors, or the like may be provided within the chamber 702. The internal structures may be used to control flow or movement of water 708 within the chamber 702, provide housing for different gas species, or the like.

The chamber 702 may be axially symmetric in some instances. For example, in FIG. 60, the chamber 702 is substantially spherical. In other instances, the chamber 702 may be a spherical cap, or any other type of axially symmetric shape. Though, the chamber 702 may be non-axially symmetric in other instances. For example, the chamber 702 may have a keel or hull shape similar to that of a floating vessel (e.g., a boat or ship). Openings, ports, or the like may also be provided through the walls of the chamber 702 in order to access materials and/or substances within the chamber 702, to provide control of pressure within the chamber 702, and/or the like.

A tube 706 may be coupled to the chamber 702. The tube 706 may have an open bottom 703 that is in fluid communication (as indicated by arrow 717) with the water surrounding the WEC 700. The tube 706 may pass through a wall of the chamber 702 and pass into the interior volume 709. An opening 720 at the top of the tube 706 is fluidically coupled to the interior of the chamber 702. The tube 706 may have a constant diameter through its length. In other instances, the tube 706 may have a non-uniform diameter through its length. For example, the tube 706 may have a first portion 706A with a constant diameter and a second constricted portion 706B where the diameter is reduced. The tube 706 may be cylindrical or have any other shaped cross-section.

As shown, water 722 may reside in the tube 706 with a free surface 723. As indicated by the double arrow 724 across the free surface 723, the level of the free surface 723 oscillates up and down in response to oscillation of the WEC 700. Oscillation is driven by interaction with waves that pass along the surface 701 of the body of water. The confined water 722 within the tube 706 may acquire momentum during oscillation of the WEC 700. At some points in time, the free surface 723 rises above the top opening of the tube 706 and is expelled (as indicated by arrows 726) into the interior volume 709 of the chamber 702. The water 722 from the tube 706 maintains a level 707 of water 708 within the chamber 702.

In order to generate energy, water 708 from the interior of the chamber 702 is expelled out an energy generation device 718. As water 708 passes 729 through the energy generation device 718, electrical power is generated. The energy generation device 718 may comprise a hydropower turbine, such as a reaction turbine (e.g., a propeller turbine, a bulb turbine, a straflo turbine, a tube turbine, a Kaplan turbine, a Francis turbine, or a kinetic turbine) or an impulse turbine (e.g., a Pelton turbine, or a cross-flow turbine). In some instances, a single turbine is used for the energy generation device 718, and in other instances, multiple turbines arranged in series are used for the energy generation device 718. While a single energy generation device 718 is shown in the WEC 700, embodiments may include a plurality of energy generation devices 718. Water 704 expelled from the energy generation device 718 may also provide a propulsive force to the WEC 700.

The energy generation device 718 may be coupled to an electrical generator (not shown). The energy generation device provides rotational energy which is converted into electrical energy by the electrical generator. The electrical energy may be stored (e.g., in a battery) or consumed for one or more purposes, which will be described in greater detail herein. While an electrical generator is one option, other generator types may also be used. For example, generators described herein may include any generator, alternator, other mechanism, device, and/or component that converts energy from one form into another. In some instances, one or more of the energy generation systems may be replaced with a magnetohydrodynamic (MHD) generator, which generates electricity directly from a flow of liquid without the need for connection with a turbine and associated rotating shaft. That is, a combination of a turbine connected to a generator by a shaft can be replaced, in some instances and with an appropriate choice of working fluid, with a MHD generator.

As noted above, WEC 700 may generate significant amounts of energy that needs to be stored or used in a constructive manner. In some instances, energy generated from WEC 700 may be stored in a battery. The battery may provide an accessible energy source in order to run one or more electrical components integrated into the WEC 700. Alternatively (or in addition), WEC 700 may provide a material conversion process in order to "store" energy in a more transportable form. For example, energy generated by WEC 700 can be stored in the form of an energy product, such as those described in greater detail herein.

In the case of the energy product being hydrogen gas, an electrolyzer 715 may be provided on the WEC 700. The electrolyzer 715 may be fluidly coupled to a water source, such as water 716 within a chamber 714. Water 716 may be deionized, filtered, distilled, and/or otherwise purified. Water 716 may be provided to the WEC 700 as a precursor material. At least some of the energy generated by the WEC 700 may be consumed by the electrolyzer 715 to convert water into oxygen and hydrogen. The hydrogen gas may be stored in the internal volume 717 of the chamber 714, or any other confined space associated with the WEC 700. The oxygen gas may be vented to atmosphere. After hydrogen gas is produced, the gas may be collected (i.e., removed or offloaded from the WEC 700 through opening 721) periodically be an external vessel, ship, air-ship, submersible, drone, or any other vehicle.

In an embodiment, the WEC 700 may also comprise a hydrogen chloride generation and distribution system similar to any of those described in greater detail herein. For example, the WEC 700 may comprise an electrolysis chamber 732. Electrical cable 710 brings and/or transmits electricity from the embodiment's generator (not shown) to the electrolysis chamber 732. The electrical cable passes through a wall of the electrolysis chamber 732 through a bulkhead connector (not shown). One wire 711 of the electrical cable 710, exhibiting a positive charge, is connected to a pair of anodic electrodes, e.g., 742. In this and some other embodiments, anodes are "dimensionally stable" anodes coated with a mixed metal oxide surface layer. Another wire 711 of the electrical cable, exhibiting a negative charge, is connected to a pair of cathodic electrodes, e.g., 743.

The pair of cathodic electrodes, e.g., 743, and the cathodic side 748 and/or chamber 732 of the electrolyzer, is separated from the pair of anodic electrodes, e.g., 742, and the anodic side 747 and/or chamber 732 of the electrolyzer, by a semi-permeable, microporous diaphragm 746, through which ions may pass, e.g., so as to enable, facilitate, and/or manifest, an electrical current through the seawater and between the cathodic and anodic electrodes, thereby facilitating electrolysis of the seawater within the electrolysis chamber. However, the diaphragm inhibits the movement of hydroxide ions (OH–) from the cathodic chamber to the anodic chamber thereby inhibiting the conversion of oxidized chlorine into hypochlorite before it can form a gas and bubble out of the seawater on the anodic side 747 if the chamber 732. The electrical cable 710 and/or wire 711 conducting a negative DC voltage to the cathodic electrodes, e.g., 743, passes through the diaphragm 746 via a bulkhead connector (not shown). That, is, seawater may not pass directly through an opening through the diaphragm 746 adjacent to the wire 711.

When energized with electrical power produced by the embodiment's generator (not shown) and altered by the embodiment's power electronics (not shown), the pair of cathodic electrodes, e.g., 743, reduce hydronium ions (and/ or protons) and produce hydrogen gas, which bubbles upward within the electrolyzer's cathodic chamber 748. Similarly, when energized with electrical power produced by the embodiment's generator (not shown) and altered by the embodiment's power electronics (not shown), the complementary pair of anodic electrodes 742 oxidize chloride ions and produce chlorine gas, which bubbles upward within the electrolyzer's anodic chamber 747.

When the electrolyzer's cathodic, e.g., 743, and anodic, e.g., 742, electrodes are sufficiently and properly energized, they give rise to bubbles of hydrogen gas and chlorine gas, respectively, which bubbles tend to move in an upward direction eventually passing out of the seawater surrounding the electrolyzer electrodes 742 and 743 and through a surface 727 of that water within the electrolyzer chamber 732, thereafter tending to mix and accumulate as and/or within a pocket of gas within an upper portion of the electrolyzer chamber 732.

The mixture of hydrogen and chlorine gases within the pocket of gas and/or bubbles of those gases, tends to flow 749 up, into, and through the gas tube 728, a proximal end of which is fluidly connected to an interior of the electrolysis chamber 732 by a hose coupling (not shown). The hydrogen and chlorine gases that flow into the gas tube 728 flow through that gas tube to the combustion chamber 734.

As noted herein, the conversion of hydronium and chlorine ions into corresponding hydrogen and chlorine gases tends to deplete the concentration of chloride ions within the seawater surrounding the anodic electrodes, e.g., 742, and tends to increase the concentration of hydroxide ions within the seawater surrounding the cathodic electrodes, e.g., 743, and/or tends to increase the ratio of conservative positive ions (e.g. $Ca^{2+}$) to conservative negative ions (e.g. Cl–) within said seawater, increasing the total alkalinity of said seawater. However, as a result of the up and down motions induced in the WEC 700 by passing waves at the surface 701 of the body of seawater on which the WEC 700 floats, seawater tends to flow 713 in and out of both sides 748 and 747 of the electrolysis chamber 732 through a shared mouth 712 and/or aperture at a lower end of the electrolysis chamber 732, thereby tending to the refresh the seawater on each side of the electrolysis chamber 732, and to maintain relatively stable concentrations of chloride ions adjacent to the respective anodic electrodes 742, and to maintain relatively stable concentrations of hydroxide ions adjacent to the respective cathodic electrodes 743.

In an embodiment, the WEC 700 also comprises a combustion chamber 734. Electrical cable 719 brings and/or transmits electricity from the embodiment's generator (not shown). The electrical cable passes through a wall of the combustion chamber 734 through a bulkhead connector (not shown).

Electrical power-carrying wires 705 provide energy to an ignition control circuit 735. After receiving a signal from the embodiment's power electronics (not shown) through electrical wires 705 indicating that the amount of energy produced by the generator, and therefore consumed by the electrolyzer electrodes during their production of hydrogen and chlorine gases, has reached and/or exceeded a threshold amount, the ignition control circuit illuminates a light source 736, e.g., a source of ultraviolet light, and/or creates an electrical spark across the electrodes of an electrical spark generator 737, thereby tending to ignite the mixture of hydrogen and chlorine gases contained within an upper interior 738 of an interior of the combustion chamber 734. The ignition of the mixture of hydrogen and chlorine gases within the combustion chamber 734 tends to result in a production of hydrogen chloride gas therein. And the hydrogen chloride so produced tends to combine with, and/or dissolve into, water within a reservoir 739 in a lower part of the interior of the combustion chamber to form an acidified pool and/or solution of hydrochloric acid.

Hydrochloric acid accumulated and trapped within acidified reservoir 739 tends to flow 734 downward into and through the acid discharge hose 733 a proximal end of which is fluidly connected to a lower end of the combustion chamber 734 by a discharge hose connector (not shown).

A flashback arrestor 750, which is attached and/or connected to a proximal end of the gas tube 728 by an arrestor connector (not shown), tends to prevent a combustion of hydrogen and chlorine gases within an upper interior 738 of the combustion chamber 734 from extending into, and thereafter throughout, the gas tube 728, and from similarly combusting hydrogen and chlorine gases still within the gas tube 728, with such an unwanted combustion potentially propagating all the way back to an interior of the electrolysis chamber 732. The gas tube 728 is attached and/or connected to the combustion chamber 734 by a gas hose connector (not shown), with gasses flowing 748 into the upper interior 738 of the combustion chamber 734 through the flashback arrestor 750.

Embodiments of the present disclosure that are similar to the one illustrated FIG. 60 incorporate, utilize, and/or include, seawater diaphragm-cell electrolyzers. Embodiments of the present disclosure that are similar to the one illustrated in FIG. 60, incorporate, utilize, and/or include, electrolyzers which incorporate, utilize, and/or include, diaphragms comprised of porous mixtures of asbestos and polymers. Embodiments of the present disclosure that are similar to the one illustrated in FIG. 60, do not include any diaphragm or membrane between anode and cathode elements.

Embodiments of the present disclosure that are similar to the one illustrated in FIG. 60, incorporate, utilize, and/or include, an electrolyzer cathode comprised of steel. Embodiments of the present disclosure that are similar to the one illustrated in FIG. 60, incorporate, utilize, and/or include, electrolyzers incorporating, utilizing, and/or including steel cathodes having exterior coatings of nickel. Embodiments of the present disclosure that are similar to the one illustrated in FIG. 60, incorporate, utilize, and/or include, an electrolyzer cathode comprised of a flat hollow steel mesh or perforated steel sheet covered with asbestos fibers and fibrous polytetrafluoro-ethylene (PFTE), wherein the asbestos fibers and fibrous PFTE function as the electrolyzer diaphragm. Embodiments of the present disclosure that are similar to the one illustrated in FIG. 60, incorporate, utilize, and/or include, electrolyzer cathodes coated with a catalyst such as, but not limited to, nickel-sulfur, nickel-aluminum, nickel-nickel-oxide, platinum-group metals, to increase the cathode's surface area and reduce the hydrogen evolution potential.

Embodiments of the present disclosure that are similar to the one illustrated in FIG. 60, incorporate, utilize, and/or include, electrolyzer anodes comprised of titanium plates covered with layers of Group VIII oxides with metal conductivity (e.g., covered with exterior coatings of ruthenium oxide and/or titanium oxide), and sometimes including iridium oxide.

Embodiments of the present disclosure that are similar to the one illustrated in FIG. 60, incorporate, utilize, and/or include, electrolyzers in which respective diaphragms prevent mixing of the electrolytic, and/or cathodic and anodic, products of hydrogen and chlorine thereby promoting the separate and/or separated evolution of those respective gases. Embodiments of the present disclosure that are similar to the one illustrated FIG. 60, incorporate, utilize, and/or include, electrolyzers in which respective diaphragms limit the back-diffusion of hydroxide ions formed at respective cathodes to respective anodes, which thereby promotes the evolution of anode-reduced chlorine as a gas rather than as a hypochlorite solution.

Embodiments of the present disclosure that are similar to the one illustrated in FIG. 60, incorporate, utilize, and/or include, electrolyzers fluidly connected, e.g., by "descaling" valves, to their respective hydrochloric acid reservoirs, e.g., within respective combustion chambers. Periodically, the control systems of these embodiments open a respective descaling valve and thereby permits a relatively small amount and/or quantity of hydrochloric acid solution to flow from a respective hydrochloric acid solution reservoir into the respective cathodic portion 748 and/or chamber of the respective seawater electrolyzer thereby dissolving and/or flushing from the cathodic chamber any precipitates of calcium hydroxide and/or magnesium hydroxide, e.g., such as those that might form on the cathodic electrodes 743. The illustration and discussion of FIG. 60 omits, for the sake of clarity, such obvious and mundane precipitant-flushing mechanisms, devices, and/or systems.

Embodiments of the present disclosure that are similar to the one illustrated in FIG. 60, incorporate, utilize, and/or include, seawater electrolyzer chambers and/or housings comprised, at least in part, of polyvinyl chlorides, and/or PVCs, as materials of construction and/or fabrication.

Embodiments of the present disclosure that are similar to the one illustrated in FIG. 60 are moored, and other embodiments of the present disclosure that are similar to the one illustrated in FIG. 60 are free-floating and self-propelled. The scope of the present disclosure is not limited to the positions, and/or movements, characteristic of an embodiment, and/or of which an embodiment is capable. The illustration and discussion of FIG. 60 omits, for the sake of clarity, the obvious and mundane features and mechanisms required of moored embodiments, e.g., cables, anchors, tethers, etc., as well as the obvious and mundane features and mechanisms required of self-propelled embodiments, e.g., propellers, rigid sails, ducted fans, etc. Embodiments of the present disclosure that are similar to the one illustrated in FIG. 60, incorporate, utilize, and/or include, propellers rotated by electrical motors that are energized, at least in part, by electrical power produced by generators of those respective embodiments; rigid sails rotatably connected to upper parts of those respective embodiments and rotated by electrical motors that are energized, at least in part, by electrical power produced by the generators of those respective embodiments; and, the incorporation and control of two or more adjacent effluent channels within a respective embodiment, the effluence flowing from which produces a thrust that propels the respective embodiment, and into which, and/or from which, a rate of effluence may be altered so as to produce a torque that rotates the respective embodiment thereby enabling a means of a respective embodiment's control system to steer the respective embodiment.

Embodiments of the present disclosure that are similar to the one illustrated in FIG. 60, store hydrochloric acid solutions within storage tanks and/or chambers within, on, affixed to, and/or connected to, the respective embodiments, wherein those storage tanks are adapted to facilitate a removal of hydrochloric acid solution from those storage tanks by other vessels and/or facilities, as will be described in greater detail herein.

Embodiments of the present disclosure that are similar to the one illustrated in FIG. 60, produce hydrochloric acid, and/or other acids, from seawater, utilizing methods, processes, and/or apparatuses, not specified, enumerated, and/or included within the present disclosure. Embodiments of the present disclosure that are similar to the one illustrated in FIG. 60, transfer, move, and/or transport hydrochloric acid, and/or other acids, to parts and/or portions of an ocean far below the surface utilizing methods, processes, and/or apparatuses, not specified, enumerated, and/or included within the present disclosure. Embodiments of the present disclosure that are similar to the one illustrated in FIG. 60, transfer, move, and/or transport hydrochloric acid, and/or other acids, to any location of a body of water (at any depth or at the surface of the body of water) utilizing methods, processes, and/or apparatuses, some of which may be described in greater detail herein.

WEC 700 may be an autonomous device with the ability to move and/or navigate in a controlled manner about the body of water. Propulsion of the WEC 700 may be driven through one or more different mechanisms. In one instance, the expelled water 704 out of the energy generation device 718 provides a propulsive force that can move the WEC 700. The WEC 700 can be steered through control of the force of the expelled water 704 and/or the direction of the expelled water 704. In some instances, one or more rudders (not shown) can be coupled to the WEC 700 in order to provide directional control, rotational control, and/or the like.

In some embodiments, propulsion of the WEC 700 may be provided through one or more active propulsion devices. For example, propellers or the like may be used in some instances. Energy to drive the active propulsion devices may be obtained through the energy generation of the WEC 700, or from batteries that were charged through the wave-energy generation of the WEC 700. In other instances, hydrogen or other gasses generated on the WEC 700 can be consumed (e.g., through the use of a fuel cell) in order to power active propulsion devices.

The WEC 700 may include an enclosure 751 that is provided on the chamber 702. The enclosure 751 may be a water proof chamber for securing one or more electrical components. For example, a computing system, a positioning system, and/or a communications system may be provided in the enclosure 751. The computing system may provide one or more processors and associated hardware and/or software that enables control of the WEC 700. For example, the computing system may control power generation, such as by controlling flow rates of water to the energy generation device 718. The positioning system may include a GPS, a compass, an accelerometer, a gyroscope, or any other suitable navigational system. The positioning system may control propulsion and steering systems in order to navigate the WEC 700. The communications system may include an antenna, a receiver, and associated circuitry, hardware, and/or software. The communications system may provide a communication link to external systems, other waver-energy generation systems, or the like. The systems described in the enclosure 751 on the WEC 700 are exemplary in nature, and it is to be appreciated that many different systems, control apparatuses, and/or the like may be provided in the enclosure 751.

As will be described in greater detail below, the energy products produced by the WEC 700 may be subsequently delivered to shore (or near shore) for use, storage, or the like. The energy product may be transported to shore through one or more vessels. In some instances, the energy product is transported to shore without further modification. For example, a hydrogen gas may be generated by the WEC 700, and the hydrogen gas is transported to shore. In other instances, the energy product may be used to generate a different energy product. For example, the energy product may be a precursor that is used in the generation of an alternative energy product (e.g., an energy product that has a higher energy density). In one example, a hydrogen energy product may be converted into methanol or ammonia through a chemical reaction with one or more other precursor gasses. This additional conversion may occur at the WEC 700 or during transport of the energy product to shore.

Figure 61:
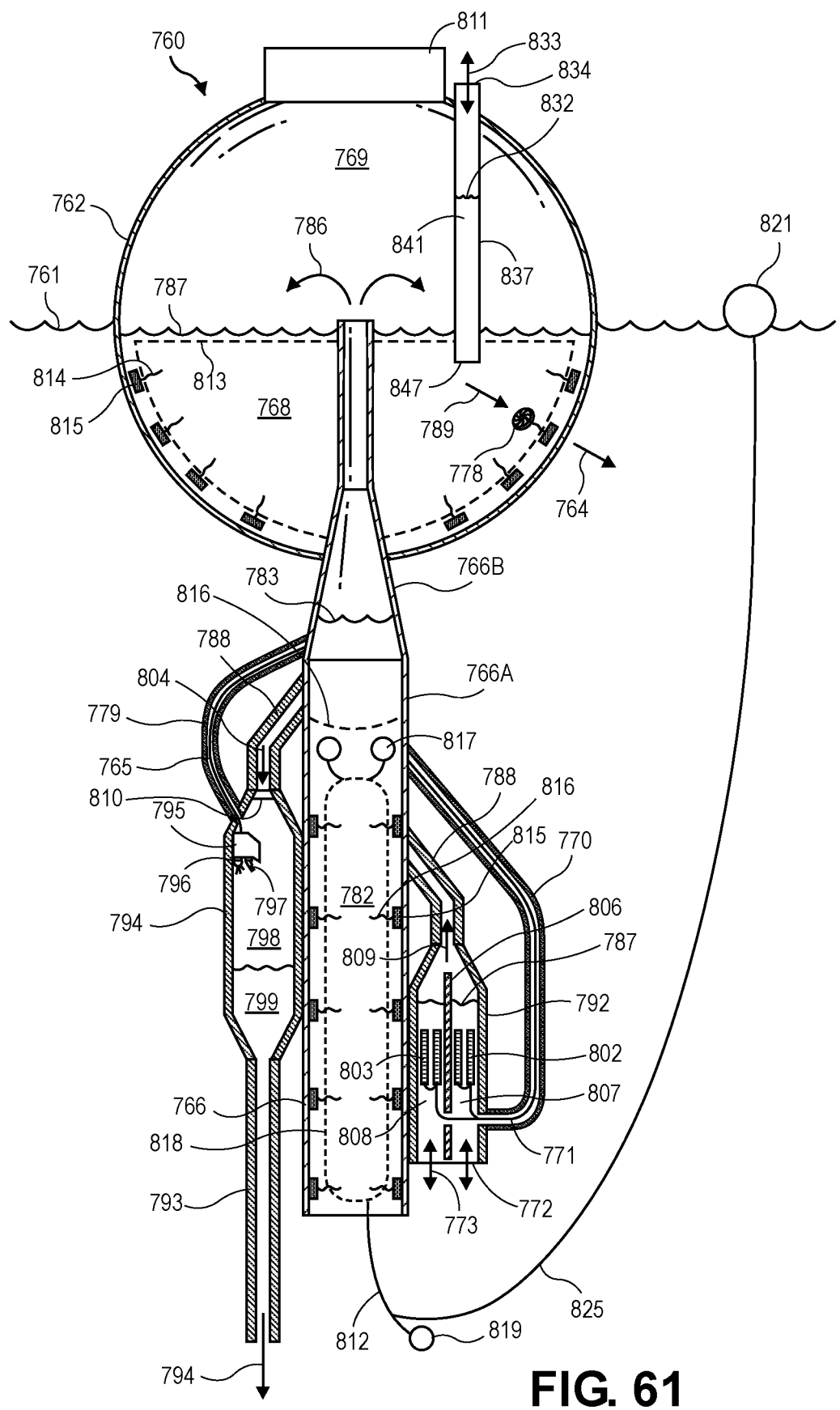
FIG. 61 is a side sectional view of an eighth embodiment of the present disclosure.

FIG. 61 illustrates a cross-sectional view of the WEC 760 with an acid generation and distribution system, in accordance with an embodiment. The WEC 760 may be similar to the WEC 700 described above, with the exception of the energy product that is being generated or produced by the WEC 760. For example, WEC 760 may include a buoyant chamber 762 coupled to an injection tube 766A/7664B. Water 782 within the tube 766 oscillates so that the surface 783 raises and lowers within the tube 766. In some instances water 782 may flow out 786 of the tube 766 into the interior 769 of the chamber 762 in order to fill water 768 in the chamber 762. Water 768 in the chamber 762 can be expelled 789 through energy generation device 778 and exit 764 the WEC 760 in order to generate energy.

However, instead of producing a gas as an energy product (or only gas), the WEC 760 may produce a biological product. The biological product may comprise one or more of marine algae (e.g., micro-alae and/or macro-algae), seaweed, other marine plants, fish, krill, or other marine organisms. More specifically, electrical power generated through the operation of an energy generation device 778 can be used to power lights 815, lamps, thermal devices (e.g., heaters), and/or the like. For example, lights 815 may be light emitting diode (LED) lights or any other suitable source for generating electromagnetic radiation 814. The electromagnetic radiation 814 can be consumed by the biological product within the WEC 760 in order to induce growth of the biological product.

As shown in FIG. 61, the lights 815 may be arranged, attached, or otherwise coupled to interior surfaces of the chamber 762. Additionally, lights 815 may be provided along sidewalls of the injection tube 766. While shown as being coupled directly to interior wall surfaces, other embodiments may comprise suspending lights 815 within an interior volume of the chamber 762. The lights 815 in FIG. 61 are all shown as being submerged in water 768 or 782. Though, in other embodiments, lights 815 may be provided above the surface of the water 768 within the chamber 762.

In one instance, designed to promote the growth of biological products (e.g., algae and/or other marine based plant life), an approximately circular net 813 spans, and/or is adjacent to, an approximately flow-normal and/or horizontal cross-section of the water reservoir, adjacent to the surface 787 of the water 768. Net 813 entrains the biological product within the lower portion of the water 768 thereby tending to reduce, if not prevent, the outflow and/or loss of that macroalgae through the energy generation device 778. In other embodiments, other structures (e.g. a sieve, catchment, mesh, or grating) are positioned in the path of water flow to the energy generation device 778 in order to prevent outflow or loss of biological products.

Periodically, biological products may be removed from the water 768 by a ship, platform, or other vessel. A ship may insert a suction tube into and through an access tube 837. Once inserted into and through access tube 837, an inserted suction tube can be positioned near the bottom of the embodiment's reservoir of water 768 and suck out a portion of the biological product therein. A complementary access tube (not shown), and/or a complementary channel within a single access suction tube 837, can return water to the reservoir while biological products, are being removed from the reservoir of water 768, thereby maintaining and/or preserving the original level of the water 768 in the reservoir.

The access tube 837 allows algae, water, nutrients, and/or other materials, to be added to, and/or withdrawn from, the reservoir of water 768 when that reservoir is otherwise sealed inside the chamber 762. Because the access tube is open to the atmosphere (as indicated by arrow 833) at its upper mouth 834, and open to the water and biological product in the water 768 at its lower mouth 847, water 841 from the reservoir is free to rise up within the algae access tube 837. Because of the pressure of the air trapped within the air pocket 769 of the interior of the chamber 762, and the corresponding pressure of the water 768, the surface 832 of the water 841 within the access tube 837 tends to rise to a height above the surface 787 of the water 768 within the reservoir whose head pressure approximately corresponds to the pressure of the air within hollow chamber 762.

In addition to growing biological products, especially macroalgae, within the water 768 reservoir inside the hollow chamber 762, biological products, especially macroalgae, may be grown inside the embodiment's injection tube 766. An upper barrier net 816 spanning an upper portion, and/or at an upper position, of the injection tube 766 prevents at least a portion of the algae within the injection tube 766 from too closely approaching the upper constricted portion of the injection tube 766 which, if not prevented, could potentially clog the injection tube 766 at that location.

Macroalgae or other biological products are grown within a net enclosure and/or containment bag 818 that forms a porous bag entraining most, if not all, of the biological products. An upper end of the algae containment bag 818 is pulled upward by a float 817, tending to position the upper end of the bag proximate to the lower side of the barrier net 816. The biological product within the containment bag 818 are encouraged to grow through the embodiment's provision of light, e.g. 814, emitted by lamps, e.g. 815, positioned along the interior wall and/or surface of the injection tube 766.

A lower end of the containment bag 818 is pulled downward by a weight 819 connected to the bag by a tether, chain, rope, linkage, and/or cable 812. Also connected to the weight 819, and therethrough to the containment bag 818, is a tether, chain, rope, linkage, and/or cable 825 an upper end of which is connected to a float 821 that tends to float at the surface 761 of the body of water on which the WEC 760 floats.

Periodically, biological products may be removed from the WEC's 400 injection tube 766 by a ship or other vessel. A ship may attach a secondary cable to cable 825 and then lower a secondary weight to increase the total weight tending to pull the algae containment bag 818 down and out of the injection tube 766. After the containment bag 818 has been pulled down and become free of the injection tube 766, the containment bag 818 may be pulled up by the secondary cable and therewith lifted onto and/or into the ship where its biological products may be harvested. The same containment bag 818 that was removed may be reinserted into the injection tube 766 using the same second cable, using an underwater autonomous vehicle, and/or using another method, mechanism, and/or system. If the same containment bag 818 is reinserted into the embodiment's inertial water tube 766, it will tend to be so reinserted after most, but not all, of its entrained biological product has been harvested and/or removed. By leaving a portion of the biological product in the containment bag 818, the residual biological product can grow and give rise to another harvest. If a "new" second containment bag 818 is inserted into the embodiment's injection tube 766 to replace the removed containment bag 818, then it is advantageous to first "seed" that containment bag 818 with biologic stock so that a new crop of a preferred species of algae can be grown.

The scope of the present disclosure includes a complementary ship to periodically harvest the biological products grown within the embodiment, as well as the facilities on a shore, floating platform, and/or other ship where the harvested algae are processed and/or stored, as well as a method for harvesting biological products wherein: a wave energy converter of a type herein disclosed is deployed on a body of water; electrical energy produced by said wave energy converter operating in waves is used to power LEDs, or other lamps, or other sources of light emissions, that are mounted on, within, inside, or outside, of said wave energy converter, and/or LEDs, or other lamps, or other sources of light emissions, that are suspended from walls, surfaces, and/or structural members, within, inside, or outside, of said wave energy converted; biological products are permitted to grow in an enclosure, cavity, or vicinity of said wave energy converter using light from said lamps as a source of metabolic energy; said biological products (or products or byproducts produced therefrom, e.g. algal oil, fish oil, etc.) is transferred to a ship or other floating vessel; said ship or floating vessel transfers said biological products (or products or byproducts produced therefrom, e.g. algal oil, fish oil, etc.) to a shore facility for processing and/or storage.

The aquaculture configuration embodiment illustrated in FIG. 60 may also include fish within either or both of the water 768 reservoir and/or the algal containment bag 818. If one or more species of fish that are able to eat and/or consume the type(s) of algae being grown within the embodiment are selected and included within the respective growth areas prior to each growth cycle, then a portion of those fish may be harvested along with whatever algae remains uneaten. The scope of the present disclosure includes a method for harvesting fish wherein: a wave energy converter of a type herein disclosed is deployed on a body of water; electrical energy produced by said wave energy converter is used to power LEDs, or other lamps, or other sources of light emissions, that are mounted on, within, inside, or outside, of said wave energy converter, as well as LEDs, or other lamps, or other sources of light emissions, that are suspended from walls, surfaces, and/or structural members, within, inside, or outside, of said wave energy converter; algae are permitted to grow in an enclosure, cavity, or vicinity of said wave energy converter using light from said lamps as a source of metabolic energy; fish or other marine organisms are permitted to grow in an enclosure, cavity, or vicinity of said wave energy converter, feeding, at least in part, on said algae as a source of metabolic energy; said fish or other marine organisms are transferred to a ship or other floating vessel; said ship or floating vessel transfers said fish and/or other marine organisms (or products or byproducts produced therefrom, e.g. fish meal or fish oil) to a shore facility for processing and/or storage.

The scope of the present disclosure includes, but is not limited to, the growth and/or harvesting of any and every kind of microalgae, macroalgae, fish, or crustacean. Fish that do not eat the varieties of algae grown may nonetheless receive nutrition, e.g. plankton and phytoplankton, from the water that is regularly introduced to the reservoir of water 768 and injection tube 766 as a result of wave action. In addition to introducing potentially nutrient-rich water from outside the embodiment into the water 768 reservoir and injection tube 766 as a result of wave action, the embodiment also tends to remove waste-containing and/or nutrient-depleted, water from the water 768 reservoir and injection tube 766 as a result of the same water cycle (i.e. water enters tube 766, and therefrom enters the water 768 reservoir, and thereafter flows out of the water reservoir through the energy generation device 778.

The scope of the present disclosure includes embodiments utilizing water reservoir lamps and/or inertial water tube lamps emitting light of any single wavelength, any range of wavelengths, and/or any combinations of wavelengths or ranges of wavelengths.

The scope of the present disclosure includes embodiments in which lamps are attached to the inner surface of the upper portion of the hollow chamber 762, i.e. within the air pocket 769. The scope of the present disclosure includes embodiments in which lamps are attached to the outer surfaces of the hollow chamber 762 and/or injection tube 766 thereby encouraging biological product growth, and the establishment of communities of fish or other marine life, outside the WEC 760, but in the vicinity of the WEC 760.

In an embodiment, the WEC 760 may also comprise a hydrogen chloride generation and distribution system similar to any of those described in greater detail herein. For example, the WEC 760 may comprise an electrolysis chamber 792. Electrical cable 770 brings and/or transmits electricity from the embodiment's generator (not shown) to the electrolysis chamber 792. The electrical cable passes through a wall of the electrolysis chamber 792 through a bulkhead connector (not shown). One wire 771 of the electrical cable 770, exhibiting a positive charge, is connected to a pair of anodic electrodes, e.g., 802. In this and some other embodiments, anodes are "dimensionally stable" anodes coated with a mixed metal oxide surface layer. Another wire 771 of the electrical cable, exhibiting a negative charge, is connected to a pair of cathodic electrodes, e.g., 803.

The pair of cathodic electrodes, e.g., 803, and the cathodic side 808 and/or chamber 792 of the electrolyzer, is separated from the pair of anodic electrodes, e.g., 802, and the anodic side 807 and/or chamber 792 of the electrolyzer, by a semi-permeable, microporous diaphragm 806, through which ions may pass, e.g., so as to enable, facilitate, and/or manifest, an electrical current through the seawater and between the cathodic and anodic electrodes, thereby facilitating electrolysis of the seawater within the electrolysis chamber. However, the diaphragm inhibits the movement of hydroxide ions (OH−) from the cathodic chamber to the anodic chamber thereby inhibiting the conversion of oxidized chlorine into hypochlorite before it can form a gas and bubble out of the seawater on the anodic side 807 if the chamber 792. The electrical cable 770 and/or wire 771 conducting a negative DC voltage to the cathodic electrodes, e.g., 803, passes through the diaphragm 806 via a bulkhead connector (not shown). That, is, seawater may not pass directly through an opening through the diaphragm 806 adjacent to the wire 771.

When energized with electrical power produced by the embodiment's generator (not shown) and altered by the embodiment's power electronics (not shown), the pair of cathodic electrodes, e.g., 803, reduce hydronium ions (and/or protons) and produce hydrogen gas, which bubbles upward within the electrolyzer's cathodic chamber 808. Similarly, when energized with electrical power produced by the embodiment's generator (not shown) and altered by the embodiment's power electronics (not shown), the complementary pair of anodic electrodes 802 oxidize chloride ions and produce chlorine gas, which bubbles upward within the electrolyzer's anodic chamber 807.

When the electrolyzer's cathodic, e.g., 803, and anodic, e.g., 802, electrodes are sufficiently and properly energized, they give rise to bubbles of hydrogen gas and chlorine gas, respectively, which bubbles tend to move in an upward direction eventually passing out of the seawater surrounding the electrolyzer electrodes 802 and 803 and through a surface 787 of that water within the electrolyzer chamber 792, thereafter tending to mix and accumulate as and/or within a pocket of gas within an upper portion of the electrolyzer chamber 792.

The mixture of hydrogen and chlorine gases within the pocket of gas and/or bubbles of those gases, tends to flow 809 up, into, and through the gas tube 788, a proximal end of which is fluidly connected to an interior of the electrolysis chamber 792 by a hose coupling (not shown). The hydrogen and chlorine gases that flow into the gas tube 788 flow through that gas tube to the combustion chamber 794.

As noted herein, the conversion of hydronium and chlorine ions into corresponding hydrogen and chlorine gases tends to deplete the concentration of chloride ions within the seawater surrounding the anodic electrodes, e.g., 802, and tends to increase the concentration of hydroxide ions within the seawater surrounding the cathodic electrodes, e.g., 803, and/or tends to increase the ratio of conservative positive ions (e.g. $Ca^{2+}$) to conservative negative ions (e.g. Cl−) within said seawater, increasing the total alkalinity of said seawater. However, as a result of the up and down motions induced in the WEC 760 by passing waves at the surface 761 of the body of seawater on which the WEC 760 floats, seawater tends to flow 773 in and out of both sides 808 and 807 of the electrolysis chamber 792 through a shared mouth 772 and/or aperture at a lower end of the electrolysis chamber 792, thereby tending to the refresh the seawater on each side of the electrolysis chamber 792, and to maintain relatively stable concentrations of chloride ions adjacent to the respective anodic electrodes 802, and to maintain relatively stable concentrations of hydroxide ions adjacent to the respective cathodic electrodes 803.

In an embodiment, the WEC 760 also comprises a combustion chamber 794. Electrical cable 779 brings and/or transmits electricity from the embodiment's generator (not shown). The electrical cable passes through a wall of the combustion chamber 794 through a bulkhead connector (not shown).

Electrical power-carrying wires 765 provide energy to an ignition control circuit 795. After receiving a signal from the embodiment's power electronics (not shown) through electrical wires 765 indicating that the amount of energy produced by the generator, and therefore consumed by the electrolyzer electrodes during their production of hydrogen and chlorine gases, has reached and/or exceeded a threshold amount, the ignition control circuit illuminates a light source 796, e.g., a source of ultraviolet light, and/or creates an electrical spark across the electrodes of an electrical spark generator 797, thereby tending to ignite the mixture of hydrogen and chlorine gases contained within an upper interior 798 of an interior of the combustion chamber 794. The ignition of the mixture of hydrogen and chlorine gases within the combustion chamber 794 tends to result in a production of hydrogen chloride gas therein. And the hydrogen chloride so produced tends to combine with, and/or dissolve into, water within a reservoir 799 in a lower part of the interior of the combustion chamber to form an acidified pool and/or solution of hydrochloric acid.

Hydrochloric acid accumulated and trapped within acidified reservoir 799 tends to flow 794 downward into and through the acid discharge hose 793 a proximal end of which is fluidly connected to a lower end of the combustion chamber 794 by a discharge hose connector (not shown).

A flashback arrestor 810, which is attached and/or connected to a proximal end of the gas tube 788 by an arrestor connector (not shown), tends to prevent a combustion of hydrogen and chlorine gases within an upper interior 798 of the combustion chamber 794 from extending into, and thereafter throughout, the gas tube 788, and from similarly combusting hydrogen and chlorine gases still within the gas tube 788, with such an unwanted combustion potentially propagating all the way back to an interior of the electrolysis chamber 792. The gas tube 788 is attached and/or connected to the combustion chamber 794 by a gas hose connector (not shown), with gasses flowing 804 into the upper interior 798 of the combustion chamber 794 through the flashback arrestor 810.

The WEC 760 may include an enclosure 811 that is provided on the chamber 762. The enclosure 811 may be a water proof chamber for securing one or more electrical components. For example, a computing system, a positioning system, and/or a communications system may be provided in the enclosure 811. The computing system may provide one or more processors and associated hardware and/or software that enables control of the WEC 760. For example, the computing system may control power generation, such as by controlling flow rates of water to the energy generation device 778. The positioning system may include a GPS, a compass, an accelerometer, a gyroscope, or any other suitable navigational system. The positioning system may control propulsion and steering systems in order to navigate the WEC 760. The communications system may include an antenna, a receiver, and associated circuitry, hardware, and/or software. The communications system may provide a communication link to external systems, other waver-energy generation systems, or the like. The systems described in the enclosure 811 on the WEC 760 are exemplary in nature, and it is to be appreciated that many different systems, control apparatuses, and/or the like may be provided in the enclosure 811.

As will be described in greater detail below, the energy products produced by the WEC 760 may be subsequently delivered to shore (or near shore) for use, storage, or the like. The energy product may be transported to shore through one or more vessels. In some instances, the energy product is transported to shore without further modification. For example, a hydrogen gas may be generated by the WEC 760, and the hydrogen gas is transported to shore. In other instances, the energy product may be used to generate a different energy product. For example, the energy product may be a precursor that is used in the generation of an alternative energy product (e.g., an energy product that has a higher energy density). In one example, a hydrogen energy product may be converted into methanol or ammonia through a chemical reaction with one or more other precursor gasses. This additional conversion may occur at the WEC 760 or during transport of the energy product to shore.

Figure 62:
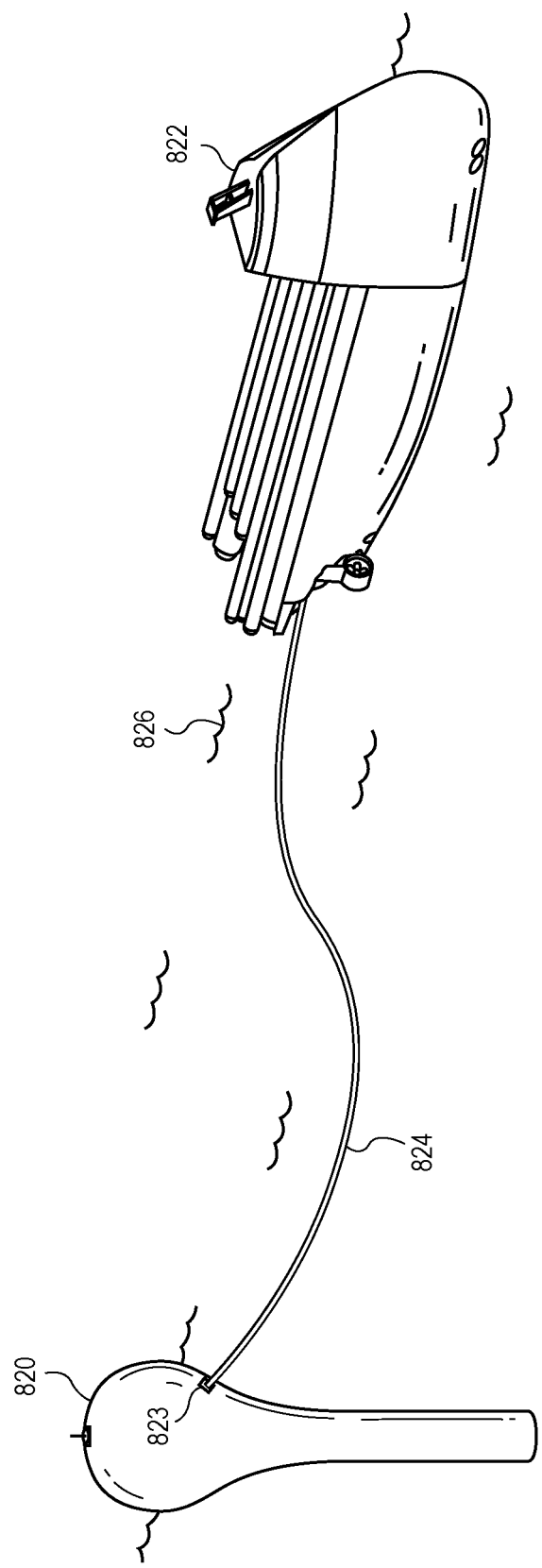
FIG. 62 is a perspective view of a ninth embodiment of the present disclosure.

Referring now to FIG. 62 a perspective side view of a system including a WEC 820 that is fluidically coupled to a vessel 822 is shown, in accordance with an embodiment. A WEC 820 obtains, extracts, harvests, receives, and/or collects, energy from waves moving across the surface 826 of a body of water on which the WEC 820 floats. A portion of the energy that the WEC 820 extracts from the passing waves is converted into electrical power by a water turbine (not visible) and generator (not visible). A portion of the generated electrical power is used to generate an energy product (e.g., a liquid fuel, a gas fuel, a chemical, a biological product, or the like). For example, a water electrolysis apparatus (not visible) inside the WEC 820 may be used for the conversion of a portion of water contained in a reservoir within the WEC 820 (not visible) into hydrogen gas. A portion of the synthesized hydrogen gas is captured within a hydrogen reservoir (not visible) within the WEC 820. Embodiments may also include a WEC 820 that converts seawater into hydrochloric acid that can be transferred to the vessel 822.

Periodically, a vessel 822 approaches the WEC 820 and positions itself near to the WEC device 400. When sufficiently proximate to the WEC 820, the vessel 822 deploys a hose connection remotely-operated vehicle (hose connection ROV) 823 that is attached to a first end of a transfer hose 824. The hose connection ROV 823 pulls the transfer hose 824 to the WEC 820. The hose connection ROV 823 attaches itself translatably to the hull of the WEC 820 and moves itself across the WEC hull until it is positioned above and/or over a port (not visible) of the WEC 820. The hose connection ROV 823 then connects itself, and the attached hydrogen transfer hose, to the hydrogen port of the WEC 820 thereby permitting the energy product to be removed, and/or to flow, from the WEC 820 to the vessel 822 where it is then stored within one of more of the storage containers (not shown) of and/or on the vessel 822. In other embodiments, a passive retractable offtake system is used to couple the hose 824 to the port on the WEC 820. In some instances, the transfer of energy product from the WEC 820 to the vessel 822 is passive (e.g., if a pressure differential drives product from the WEC 820 to the vessel 822). In other instances, a pump, winch, or other mechanical force can be used to actively transport energy product from the WEC 820 to the vessel 822.

The vessel 822 in FIG. 62 is shown as a boat, but it is to be appreciated that any suitable transport vehicle may be used to offload energy product from the WEC 820. For example, a submersible vehicle, an aerial vehicle (e.g., helicopter, plane, dirigible airship, drone, etc.), or the like may also be used to offload energy product from the WEC 820. In an embodiment, the vessel 822 may transport the energy product directly to the shore, or the vessel 822 may be an intermediate transport that delivers the energy product to a second vessel, or a platform within the body of water on which the WEC 820 floats.

Figure 63:
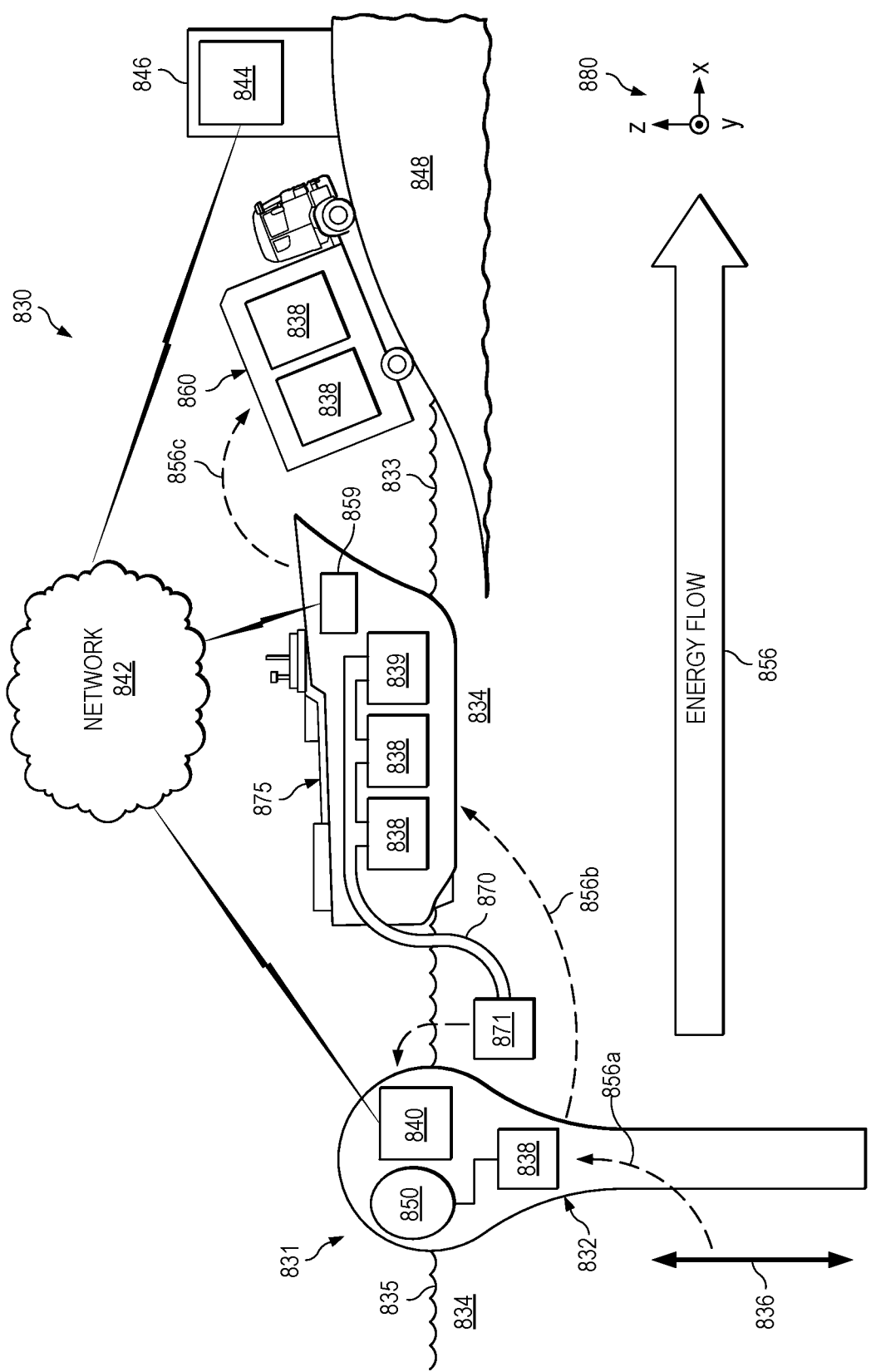
FIG. 63 is a cross-sectional schematic view of a tenth embodiment of the present disclosure.

Referring now to FIG. 63, a schematic diagram of a wave energy harvesting system 500 is shown. The wave energy harvesting system 830 may include a first free-floating body 831 and a second free-floating body 875 which may transiently couple to one another while floating on a surface 835 of a body of water 845. In an example embodiment, the first free-floating body 831 may be configured as a wave engine 831 (e.g., a WEC or hydrodynamic pump, such as those described herein) and the second free-floating body 875 may be a storage vessel 875, such as a tanker ship 875. In some embodiments, the wave engine 831 may include a receiving port 850 operable to receive a conduit assembly 871 in fluidic communication with a conduit 870 from the storage vessel 875 and thereby fluidly couple the wave engine 831 to the storage vessel 875 via the conduit 870 for transfer of one or more fluids therebetween. While fluidic communication and coupling between the wave engine 831 and the storage vessel 875 is described in greater detail with respect to FIG. 63, it is to be appreciated that non-fluid products may also be transmitted between the wave engine 831 and the storage vessel 875.

In an embodiment, the fluidic communication (or fluidic coupling) between the wave engine 831 and the storage vessel 875 may be enabled through the use of automated, autonomous, and/or passive systems. In some embodiments, for instance, the conduit assembly 871 may include one or more fluid nozzles (not shown at FIG. 63) operable to emit one or more fluid streams to direct the conduit assembly 871 to the receiving port 850.

A set of Cartesian coordinate axes 880 is shown in FIG. 63 for contextualizing positions of the various components of the wave energy harvesting system 830. Specifically, x-, y-, and z-axes are provided which are mutually perpendicular to one another, where the x- and z-axes define a plane of the schematic diagram shown in FIG. 63 and the y-axis is perpendicular thereto. In some embodiments, a direction of gravity may be parallel to and coincident with a negative direction of the z-axis.

Though exemplified herein in the context of wave engines, the first free-floating body 831 may be configured as any free-floating body capable of self-propulsion, e.g., by extracting energy from stored fuel, inducing a flow of pressurized water, and/or harnessing one or more ambient environmental forces, so as to translate along the surface 835 of the body of water 845. For example, the first free-floating body 831 may be a ship (such as a deployment ship, a tanker ship or other storage vessel, or another transport vessel), a buoy, a wind turbine, an offshore platform, such as a data center, etc.

In embodiments where the first free-floating body 831 is configured as the wave engine, water may pass into and through the wave engine with upward and downward motion 836 (e.g., in a positive direction of the z-axis and the negative direction of the z-axis, respectively) of water waves. As described in greater detail herein, the upward and downward motion 836 may induce the water passing into and through the wave engine 831, energy from which may be captured and converted to an energy product 838 (as indicated by a dashed arrow 856a). The energy product 838, for example, may include one or more of an electrolysis product or other fuel/chemical, such as $H_2$ gas, HCl, etc., removed carbon, minerals, a biological product, digital goods, or an executed computational algorithm, such as, but not limited to a proof-of-work mechanism for a cryptocurrency, a trained machine learning algorithm, or the like.

In some embodiments, the first free-floating body 831 may include a first onboard controller or other computing device 840 and/or the second free-floating body 875 may include a second onboard controller or other computing device 859, the first and second onboard controllers 840, 859 each including non-transitory memory on which executable instructions may be stored. The executable instructions may be executed by one or more processors of the first and second onboard controllers 840, 859 to respectively perform various functionalities of the first and second free-floating bodies 831, 875. Accordingly, the executable instructions may include various routines for operation, propulsion, maintenance, tracking, and testing of the first and second free-floating bodies 831, 875. The first and second onboard controllers 840, 859 may be communicably coupled to various components (e.g., valves, power supplies, etc.) of the first and second free-floating bodies 831, 875 to command actuation and use thereof (wired and/or wireless communication paths between the first and second onboard controllers 840, 859 and the various components are omitted from FIG. 63 for clarity). For instance, the first onboard controller 840 may command actuation of one or more first coupling elements annularly distributed on the receiving port 850 and the second onboard controller 859 may command actuation of one or more second coupling elements annularly distributed on the conduit assembly 87 so as to selectively engage and disengage the one or more first coupling elements with one or more second coupling elements (first and second coupling elements not shown at FIG. 63). Though, it is to be appreciated that passive self-alignment may be enabled through the use of a retractable offtake system.

In certain embodiments, the first and second onboard controllers 840, 859 may be communicably coupled to a remote controller or computing device 844 via a wireless network 842. The various controllers 840, 844, 859 may be configured in a substantially similar manner to one another, excepting, in some examples, one or more modifications or differences for a given use case. For example, the remote controller 844 may be positioned so as to be accessible to an operator of the wave energy harvesting system 830, e.g., on a ship or in a physical structure 846 on land 848 (as illustrated in FIG. 63). As such, even when one or both of the first and second free-floating bodies 831, 875 are not geographically located within a national or subnational jurisdiction, the one or both of the first and second free-floating bodies 831, 875 may nevertheless be in continuous (e.g., substantially uninterrupted) or periodic communication with the remote controller 844 which may be geographically located within a national or subnational jurisdiction (e.g., on the land 848).

In some embodiments, because the remote controller 844 may be configured for use by the operator, the remote controller 844 may include a user interface at which the operator may enter commands or otherwise modify operation of the wave energy harvesting system 830. The user interface may include various components for facilitating operator use of the wave energy harvesting system 830 and for receiving operator inputs (e.g., requests to direct the conduit assembly 871 to the receiving port 850), such as one or more displays, input devices (e.g., keyboards, touchscreens, computer mice, depressible buttons, mechanical switches, other mechanical actuators, etc.), lights, etc. In additional or alternative embodiments, one or both of the first and second onboard controllers 840, 859 may be configured with the user interface as described hereinabove.

An overall energy flow 856 of the wave energy harvesting system 830 is schematically depicted in FIG. 63, in which energy captured at the first free-floating body 831 from water induced therethrough by the upward and downward motion 836 of the water waves (as indicated by the dashed arrow 856a) may be converted to the energy product 838 and transferred to the second free-floating body 875 (as indicated by a dashed arrow 856b) and then transferred from the second free-floating body 875 to a land-based vehicle 860 (as indicated by a dashed arrow 856c) to be transported to a storage facility and/or an end user for consumption. For example, in some embodiments, the wave energy harvesting system 830 may include a plurality of nodes including a plurality of first free-floating bodies 831, one or more second free-floating bodies 875 to transport a plurality of energy products 838 from the plurality of first free-floating bodies 831 to the land 848, and one or more land-based vehicles 860 to transport the plurality of energy products 83om the one or more second free-floating bodies 875 to the storage facility and/or the end user. In other instances, the energy products 838 may be directly transported from the second free-floating body 875 to a storage facility and/or end user on the land 848 or within a certain distance of the land 848 (e.g., up to 100 kilometers from land, up to 40 kilometers from land, up to 1 kilometer from land, up to 500 meters from land, or up to 50 meters from land). Though storage facilities or consumption locations may be further from land in other embodiments.

In an example embodiment, the energy product 838 may be a fluid (e.g., a liquid or a gas) which is transferred from the first free-floating body 831 to the second free-floating body 875 via the conduit 870, the conduit 870 being configured to transiently fluidly couple an internal reservoir of the second free-floating body 875 to an internal reservoir of the first free-floating body 831 via one or more internal passages extending at least a length of the conduit 870 (internal reservoirs and internal passage(s) not shown at FIG. 63). In certain embodiments, the conduit 870 may include a plurality of internal passages, each of which may convey a different fluid between the first and second free-floating bodies 831, 875. As an example, the conduit 870 may include a first internal passage configured to supply an energy product precursor 839 (e.g., an electrolysis reactant, such as deionized water) from the second free-floating body 875 to the first free-floating body 831 so as to replace the energy product 838 being transferred to the second free-floating body 875. Accordingly, in such an example, the conduit 870 may further include a second internal passage configured to siphon the energy product 838 (e.g., an electrolysis product, such as hydrogen gas) from the first free-floating body 831 to the second free-floating body 875. As such, the overall energy flow 856 may be maintained by periodically (e.g., once per week) replenishing a capacity of the first free-floating body 831 to convert captured energy into a chemical energy product.

In some embodiments, the adjustments to the position of the conduit assembly 871 may be executed based on a manual operator input, e.g., at the user interface of the remote controller 844. In additional or alternative embodiments, the adjustments to the position of the conduit assembly 871 may be automatically adjusted, e.g., based on feedback from one or more sensors and/or data received via the wireless network 842. As an example, one or both of the first and second free-floating bodies 831, 875 may include an accelerometer (e.g., an inertial measurement unit; not shown) configured to gather changes in local positional data, e.g., resulting from water wave motions. As an additional or alternative example, one or both of the first and second free-floating bodies 831, 875 may include a global positioning system (not shown) configured to gather geographic positional data. As an additional or alternative example, one or both of the first and second free-floating bodies 831, 875 may include a wind speed sensor (not shown) configured to measure wind speed. As an additional or alternative example, such data (e.g., the positional data and/or the wind speed) may be received via the wireless network 842, in addition to other data such as meteorological data (e.g., water wave height, direction of water wave propagation, water wave period, weather, etc.). In some embodiments, directions and magnitudes of applied forces may be inferred based on the feedback from the one or more sensors and/or the data received via the wireless network 842, such that specific operational parameters (e.g., the one or more continuously adjustable parameters) may be adjusted responsive such that changes in individual applied forces may be accounted for with specificity.

Figure 65:
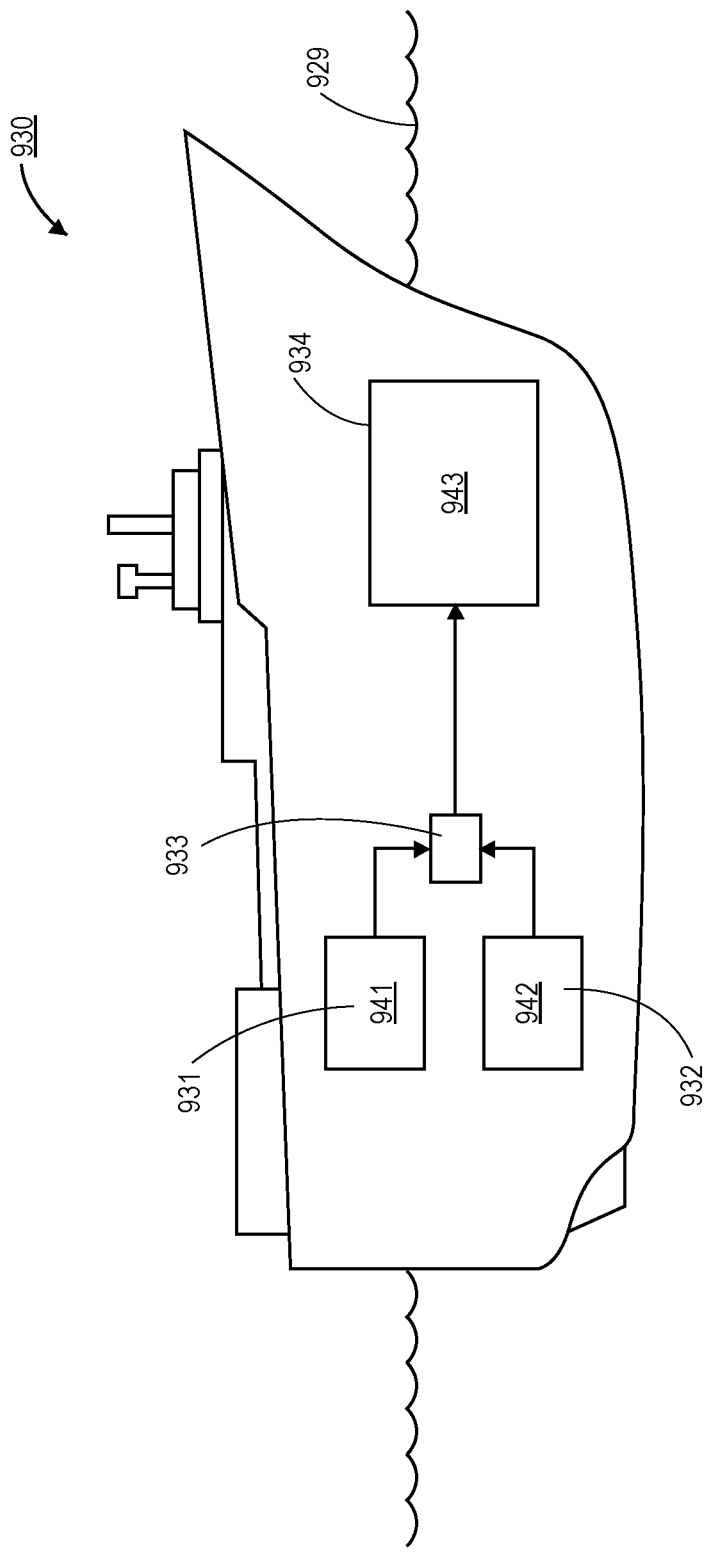
FIG. 65 is a cross-sectional schematic view of a twelfth embodiment of the present disclosure.
Figure 66:
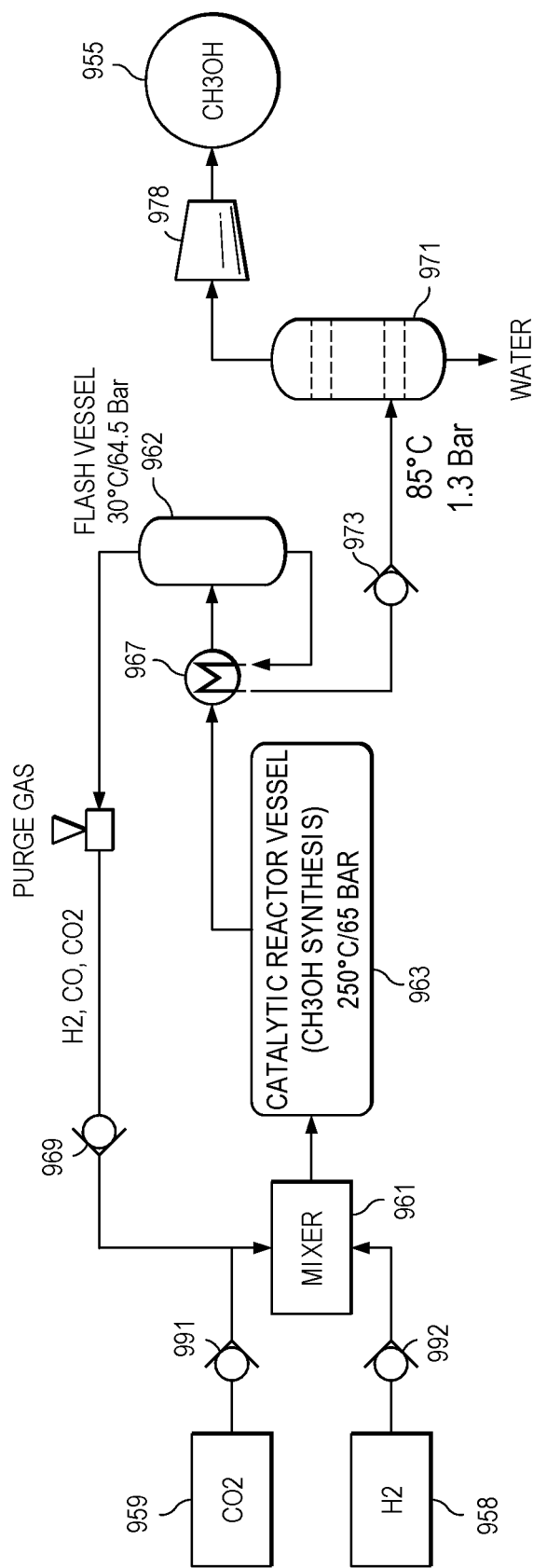
FIG. 66 is a schematic illustration of a thirteenth embodiment of the present disclosure.

In the embodiment shown in FIG. 63, the energy product 838 is generated at the first free-floating body 831 and subsequently transported to land 848. That is, the energy product 838 may not undergo any subsequent processing after it has been produced. However, in other embodiments, the energy product 838 may be further processed in order to generate an alternative product before reaching land 848 (or near land). For example, the initial energy product 838 may be filtered, compressed (e.g., from gas to liquid), used in a reaction as a precursor, or otherwise processed before reaching land 848 or near land. For example, hydrogen gas may be used as a precursor in order to generate a more energy dense substance or fuel, such as methanol, or algae can be processed into algae oil. These processing operations may be implemented on the first free-floating body 831, on the second free-floating body 875, or on a combination of both the first free-floating body 831 and the second free-floating body 875. Examples of such processing are shown in FIGS. 64-66.

Figure 64:
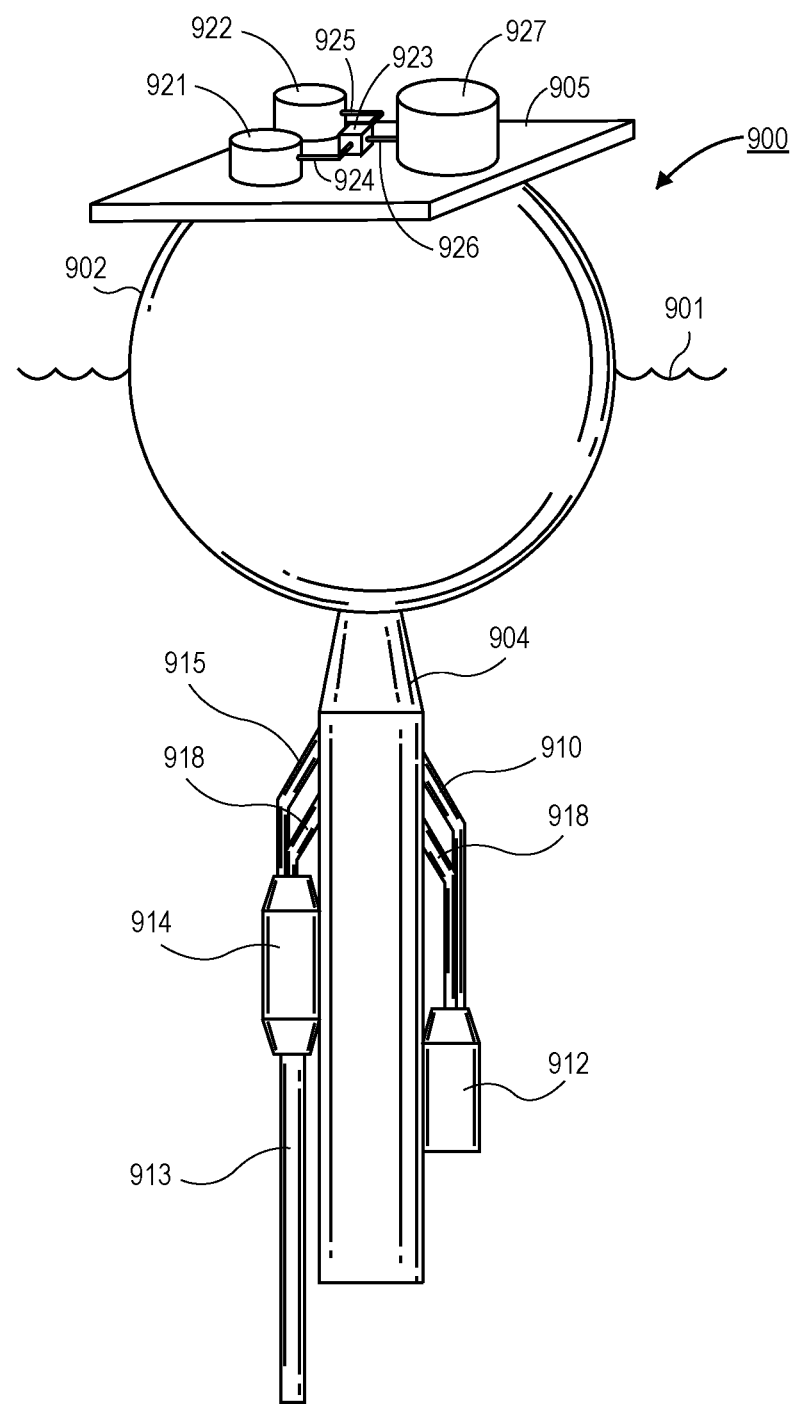
FIG. 64 is a perspective view of an eleventh embodiment of the present disclosure.

Referring now to FIG. 64 a side perspective view of a WEC 900 with an acid generation and distribution system with an integrated processing plant on a platform 905 is shown, in accordance with an embodiment. The WEC 900 floats adjacent to an upper surface 901 of a body of water over which waves tend to pass. The WEC 900 comprises a hollow buoyant chamber 902, and/or buoy. In an embodiment a tube 904 is coupled to the buoyant chamber 902. In an embodiment, an acid generation and distribution system may be coupled to the WEC 900. The acid generation and distribution system may be substantially similar to any acid generation and distribution systems described in greater detail herein. For example, the electrolysis chamber 912 may be fluidically coupled to a combustion chamber 914 through a tube 918. A first power cable 910 may provide power (which may be generated by the WEC 900) to the electrolysis chamber 912, and a second power cable 915 may provide power (which may be generated by the WEC 900) to the combustion chamber 914.

In an embodiment, electrolysis of seawater in the electrolysis chamber 912 results in the formation of hydrogen gas and chlorine gas. The hydrogen and chlorine gas flows to the combustion chamber 914, where an ignition source (not visible) initiates a reaction that produces a hydrochloric acid that diffuses into seawater in the combustion chamber 914 to produce an acidic solution. An acid discharge hose 913 that is coupled to the combustion chamber 914 allows for the acidic solution to be diverted to a depth within the body of water for sequestration. Accordingly, an alkalinity of the upper surface 901 of the body of water is increased so more carbon dioxide from the atmosphere can be absorbed.

As described in other embodiments, an energy product may be generated by way of conversion of wave energy into electrical power. In some embodiments, the energy product may be a gas or other fluid, such as hydrogen gas. The energy product may be stored in a first storage container 921. WEC 900 depicts the first storage container 921 for the energy product being on the platform 905. Though other implementations may include the first storage container 921 being integrated into the hollow chamber 902, being external to the WEC 900 (e.g., being attached or otherwise coupled to an external surface of the WEC 900), or positioned in the approximate area of the WEC 900 (e.g., on a second floating platform that is at least temporarily coupled to the WEC 900).

In an embodiment, the energy product in the first storage container 921 may be used as a precursor for a chemical reaction. In an additional embodiment, a second precursor may be stored in a second storage container 922. In the instance of a chemical reaction to convert hydrogen gas into methanol, the second precursor may comprise $CO_2$ or another carbon containing source. The second precursor may also be generated as an energy product on the WEC 900, or the second precursor may be periodically replenished by a vessel, or the like. The energy product may flow from the first storage container 921 into a reaction apparatus 923 through pipe 924, and the second precursor may flow from the second storage container 922 into the reaction apparatus 923 through pipe 925. The reacted product (e.g., a second energy product) may flow through pipe 926 into a third storage container 927. The reacted product may be periodically removed from the third storage container 927 for transport to an alternative location (e.g., another storage location or use facility, either on the body of water 901 or on land). While a simple reaction process is shown in FIG. 64, it is to be appreciated that any suitable conversion, filtering, compression, reaction, treatment, or the like may be implemented on the WEC 900.

Referring now to FIG. 65 a side view schematic of a vessel 930 that may be used to transport an energy product from a WEC (not shown) to land (not show) is shown. For example, vessel 930 may be similar to the second free-floating body 875 in FIG. 63. The vessel 930 may include a first storage container 931 for storing an energy product 941. The energy product 941 may be transported into the first storage container 931 from a WEC, or from another vessel (not shown) that obtained the energy product 941 from a WEC. For example, the energy product 941 may comprise hydrogen or any other energy product described in greater detail herein. The vessel 930 may also comprise a second storage container 932 for storing an additional precursor 942. In the case of hydrogen to methanol conversion, the additional precursor 942 may comprise carbon (e.g., $CO_2$). In an embodiment, the energy product 941 and the precursor 942 are flown into a reaction apparatus 933. The combined energy product 941 and precursor 942 may react in the reaction apparatus 933 to form a reacted product 943 that is transported to a third storage container 934. The reacted product 943 may be transported by the vessel 930 to an alternative storage or use facility (either on land or on the water 929). While a simple reaction process is shown in FIG. 65, it is to be appreciated that any suitable conversion, filtering, compression, reaction, treatment, or the like may be implemented on the vessel 930.

Referring now to FIG. 66 a diagram providing a more detailed explanation of a reaction process that may be used to convert a first energy product into a second energy product is shown, in accordance with an embodiment. The conversion depicted in FIG. 66 can be implemented on a WEC (e.g., similar to FIG. 64), on a transport vessel (e.g., similar to FIG. 65), partially on the WEC and partially on the transport vessel, or partially on a first transport vessel and partially on a second transport vessel. In the embodiment shown in FIG. 66, a detailed process by which methanol ($CH_3OH$) is synthesized from, by, and/or through, $CO_2$ hydrogenation is shown. In an embodiment, $CO_2$ is stored in $CO_2$ tank 959 and $H_2$ is stored in $H_2$ tank 958. One or both of the $CO_2$ and the $H_2$ may be energy products generated by a WEC. The $CO_2$ and $H_2$ are pumped with pump 991 and pump 992 and combined in a mixer 961 with a recirculated stream from flash vessel 662. The mixed stream (of $CO_2$ and $H_2$ gases) is pumped to a catalytic reactor vessel 963 where an exothermic reaction takes place, and the temperature and pressure can reach 250° C. and 65 bar, respectively, or higher. The post-reaction stream exits the catalytic reactor vessel 963 and passes through heat exchanger 967 and then enters flash vessel 962 where the temperature and pressure will be approximately 30.0° C. and 64.5 bar, respectively.

A stream of $H_2$, CO and $CO_2$ from flash vessel 962 is recirculated back to mixer 961 by pump 969 after being purged of a small amount of gas to further purify the stream. The liquid stream from flash vessel 962 enters heat exchanger 967 which is then pumped to distillation tower 971 by pump 973. The crude $CH_3OH$ stream entering distillation tower 971 can be at a temperature and pressure of 85° C. and 1.3 bar, respectively. A final separation of $CH_3OH$ and water takes place within distillation tower 971. Gaseous $CH_3OH$ is pumped to methanol ballast sphere 955 via a compressor pump 978 where the $CH_3OH$ is cooled to liquefaction. Water extracted from the crude aqueous $CH_3OH$ is released from a bottom of the distillation tower 971. Other processes for synthesizing methanol from $CO_2$ and $H_2$ are known in the prior art and can be used in place of the one shown. Embodiments utilizing, incorporating, and/or including, such other methanol synthesis processes and/or associated mechanism and equipment are included within the scope of the present disclosure. Further, while methanol synthesis is provided as one example, conversion or reaction of any energy products using any suitable chemical reactions, processes, treatments, filtering, or the like may be used.

In the several of the previous embodiments, while energy products are defined as being physical items (e.g., fuels, chemicals, biological goods, etc.), embodiments are not limited to such configurations. For example, electrical power derived by a WEC described herein may be used to power one or more computational systems. These systems may be used in order to provide computational work that has a monetary or social value. For example, computational work can be used to host a data center, implement block-chain mining, training machine learning (ML) or artificial intelligence (AI) algorithms, or the like. An example of such a system is provided in FIG. 67.

Figure 67:
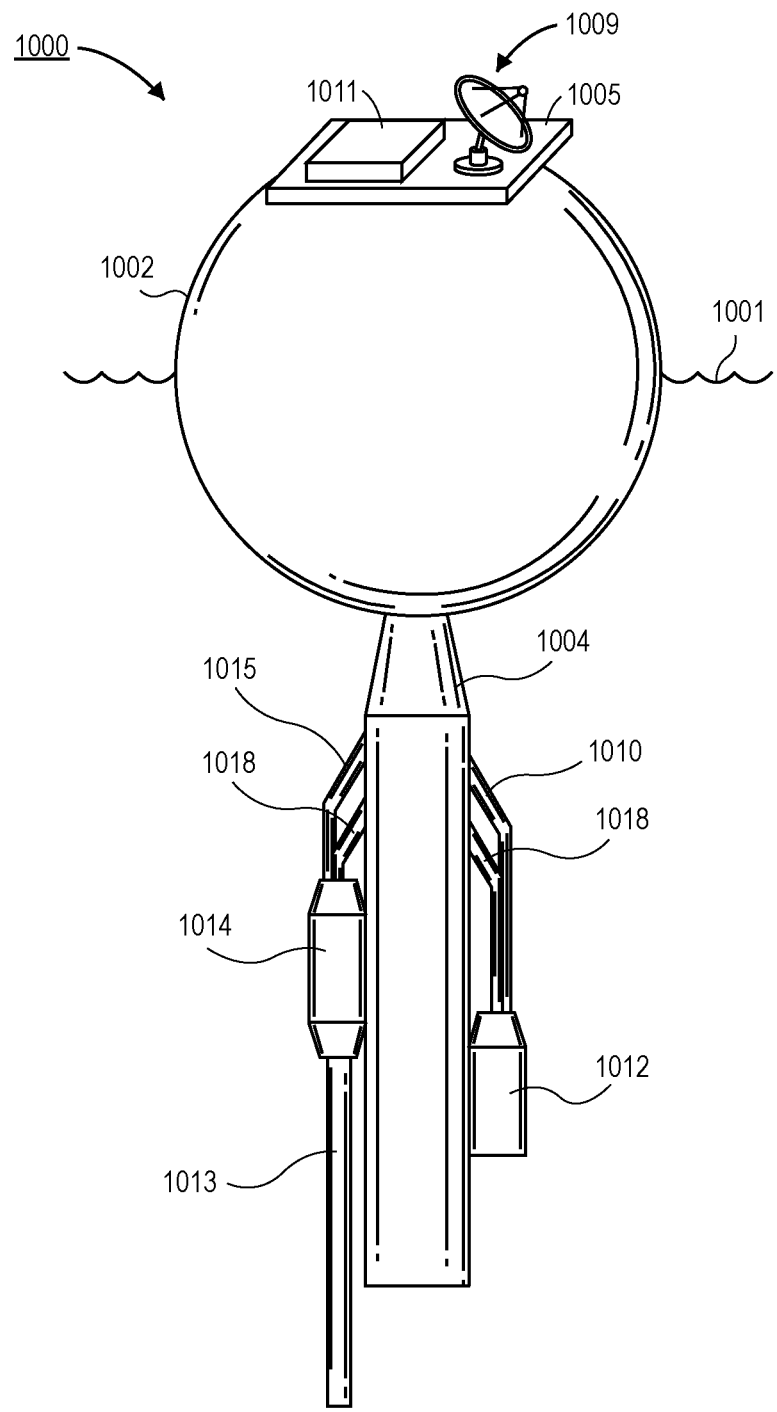
FIG. 67 is a perspective view of a fourteenth embodiment of the present disclosure.

Referring now to FIG. 67 a side perspective view of a WEC 1000 that includes an acid generation and distribution system with an integrated computing system 1011 on a platform 1005 at the top of the WEC 1000 is shown, in accordance with an embodiment. The WEC 1000 floats adjacent to an upper surface 1001 of a body of water over which waves tend to pass. The WEC 1000 comprises a hollow buoyant chamber 1002, and/or buoy. In an embodiment a tube 1004 is coupled to the buoyant chamber 1002. In an embodiment, an acid generation and distribution system may be coupled to the WEC 1000. The acid generation and distribution system may be substantially similar to any acid generation and distribution systems described in greater detail herein. For example, the electrolysis chamber 1012 may be fluidically coupled to a combustion chamber 1014 through a tube 1018. A first power cable 1010 may provide power (which may be generated by the WEC 1000) to the electrolysis chamber 1012, and a second power cable 1015 may provide power (which may be generated by the WEC 1000) to the combustion chamber 1014.

In an embodiment, electrolysis of seawater in the electrolysis chamber 1012 results in the formation of hydrogen gas and chlorine gas. The hydrogen and chlorine gas flows to the combustion chamber 1014, where an ignition source (not visible) initiates a reaction that produces a hydrochloric acid that diffuses into seawater in the combustion chamber 1014 to produce an acidic solution. An acid discharge hose 1013 that is coupled to the combustion chamber 1014 allows for the acidic solution to be diverted to a depth within the body of water for sequestration. Accordingly, an alkalinity of the upper surface 1001 of the body of water is increased so more carbon dioxide from the atmosphere can be absorbed.

As described in other embodiments, an energy product may be generated by way of conversion of wave energy into electrical power. In some embodiments, the energy product may be a gas or other fluid, such as hydrogen gas. In some instances, the energy product may be stored within the buoyant chamber 1002 or within a chamber (not shown) coupled to the WEC 1000. In an embodiment, a platform 1005 may be provided over a top of the buoyant chamber 1002. A computing system 1011 may be provided on the platform and include an enclosure to protect components from water and the elements. Any number of computational systems (e.g., processors, graphics processors, etc.), memories, and/or the like may be housed within the enclosure. The computing system 1011 may be configured with a plurality of processing systems integrated with each other in order to perform complex computer processing operations. As noted above, the computing system 1011 may be optimized and/or configured to implement one or more of data center hosting, implementing block-chain mining, training ML or AI algorithms, or the like. The outcome of the computational work (e.g., block-chain coins or tokens, trained algorithms, data center capacity, etc.) can be transmitted to external devices over a wireless network through one or more antennas 1009, or other wireless systems. As noted above, the computing system may be powered by energy generated by the WEC 1000 through conversion of wave energy into electrical power, or through conversion of the energy product stored in a chamber back into electrical power (e.g., through the use of a hydrogen fuel cell or the like).

Figure 68:
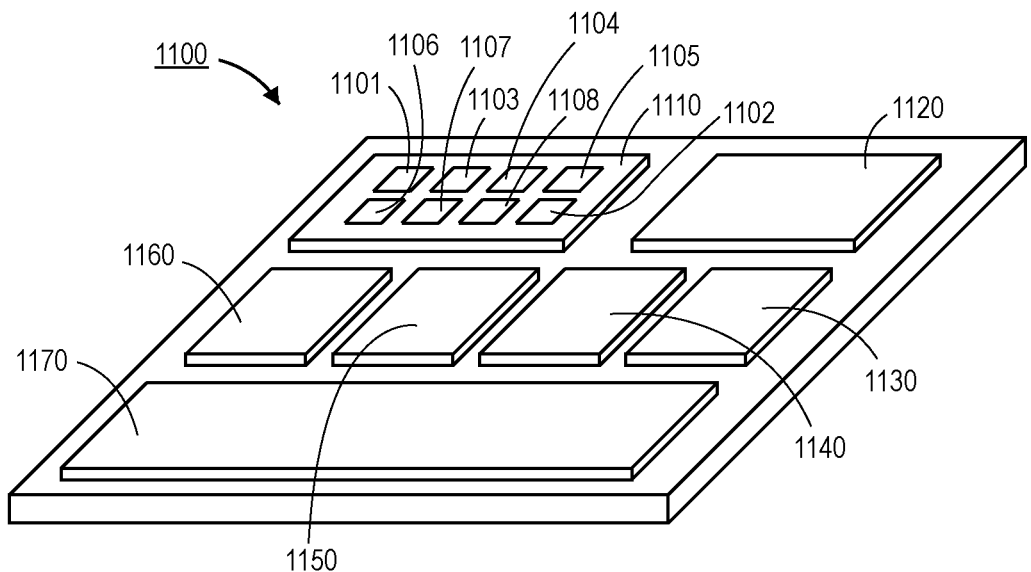
FIG. 68 is a perspective view of a portion of the fourteenth embodiment of the present disclosure.

Referring now to FIG. 68 a perspective view of a computing system 1100 that may be integrated with a WEC, such as those described in greater detail herein, is shown, in accordance with an embodiment. The computing system 1100 may comprise an array of electronics, hardware, and/or software that are configured to control one or more aspects of the wave-energy generation device. While the components illustrated in FIG. 68 are shown on a single board, it is to be appreciated that components may be on separate boards, structures, or the like. The computing system 1100 may be housed within a water tight chamber or enclosure provided on the WEC.

Computing system 1100 may comprise a computing device 1110. The computing device 1110 houses a board. The board may include a number of components, including but not limited to a processor 1101. The processor 1101 may include, but is not limited to, a central processing unit (CPU), a graphics processing unit (GPU), an application-specific integrated circuit (ASIC), a field programmable gate array (FPGA), and/or the like. The processor 1101 is physically and electrically coupled to the board. Other components of computing device 1110 include, but are not limited to, memory 1103, such as volatile memory (e.g., DRAM), non-volatile memory (e.g., ROM), flash memory, a mass storage device 1102 (such as hard disk drive, compact disk (CD), digital versatile disk (DVD), and so forth). The computing device may comprise a communications chipset 1104, a digital signal processor 1105, a chipset 1106, an antenna 1107, and/or an input/out device 1108.

Computing system 1100 may comprise a communications device 1120. The communications device 1120 enables wireless communications for the transfer of data to and from the computing system 1100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communications device 1120 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing system 1100 may include a plurality of communications devices 1120. For instance, a first communications device 1120 may be dedicated to shorter range wireless communications such as Wi-Fi and Bluetooth and a second communications device 1120 may be dedicated to longer range wireless communications such as GPS, EDGE, GPRS, CDMA, WiMAX, LTE, Ev-DO, and others. The communications device 1120 may be communicatively coupled to one or more antennas, satellite dishes, or other device to broadcast and/or receive wireless communications. The antennas or the like may be external to the enclosure, or the antennas may be within the enclosure.

Computing system 1100 may also comprise a server rack 1130. The server rack 1130 may comprise a plurality of processors with associated hardware and software. The server rack 1130 may execute computational work in order to provide a revenue generating service. The server rack 1130 may be powered through energy generated by the WEC, such as those described in greater detail herein. While a constant power supply may be desired, computing system 1100 may still function with an intermittent or non-constant power supply provided by wave-energy generation. To deal with the variable power supply, server rack 1130 may include controllers that adjust clock speed for the processors. This allows for power consumption to be directly controlled to coincide with available power. In some instances, the server rack 1130 may perform data center operations or tasks. The server rack 1130 may host and/or deliver content, or otherwise provide a link between consumers and centralized data storage. In some instances, the server rack 1130 may perform services in conjunction with block-chain technologies, such as cryptocurrency mining. The server rack 1130 may perform services such as ML or AI training as well.

Computing system 1100 may include a positioning system 1140. The positioning system 1140 may include one or more modules, components, and/or apparatuses for determining a geolocation of the wave-energy generation device. In some instances, the positioning system 1140 may comprise a GPS, a compass, an accelerometer, a gyroscope, and/or the like. The positioning system 1140 may include a processor and/or controller to enable navigation for the wave-energy generation device. For example, actuators may be controlled in order to steer or direct the wave-energy generation device in a particular direction. Propulsion devices (e.g., propellers, water jet flows, etc.) on the WEC may also be powered and/or directed by components of the positioning system 1140.

Computing system 1100 may include a sensor module 1150. The sensor module 1150 may include processors, memory, and associated hardware and software to control and/or record data from one or more sensors that monitor various aspects of the WEC. Sensors may comprise, but are not limited to, a pressure sensor, a gas composition sensor, a water level sensor, a temperature sensor, a fluid flow rate sensor, an electrical current sensor, a power sensor, a camera, an optical sensor, or the like. The physical sensors may be distributed throughout the WEC, and the controlling circuitry/software may be provided in the sensor module 1150 within the computing system 1100.

Computing system 1100 may include an interface module 1160. The interface module 1160 may comprise one or more components used to interface with the wave-energy generation device. The interface module 1160 may include one or more input devices. For example, a keyboard, a mouse, a touchscreen display, or the like may be provided in the interface module 1160. Output devices, such as a display screen, a speaker, or the like may also be provided in the interface module 1160. The interface module 1160 may further comprise a camera, a video camera, a biometric screening device, or the like.

Computing system 1100 may include a battery module 1170. The battery module 1170 may include any type of battery. The battery may include a rechargeable battery, such as a lithium based battery (e.g., a lithium-ion battery). The battery of the battery module 1170 may be charged by electricity generated by the WEC. The battery module 1170 may be used as a store of power in order to power one or more electrical components of the computing system 1100, or any other powered device of the wave-energy generation device. The battery module 1170 may be used in order to normalize power delivery to electrical components. For example, the battery module may supply power in order to equalize total power delivery when the wave-energy generation device provides variable power over time.

Figure 69:
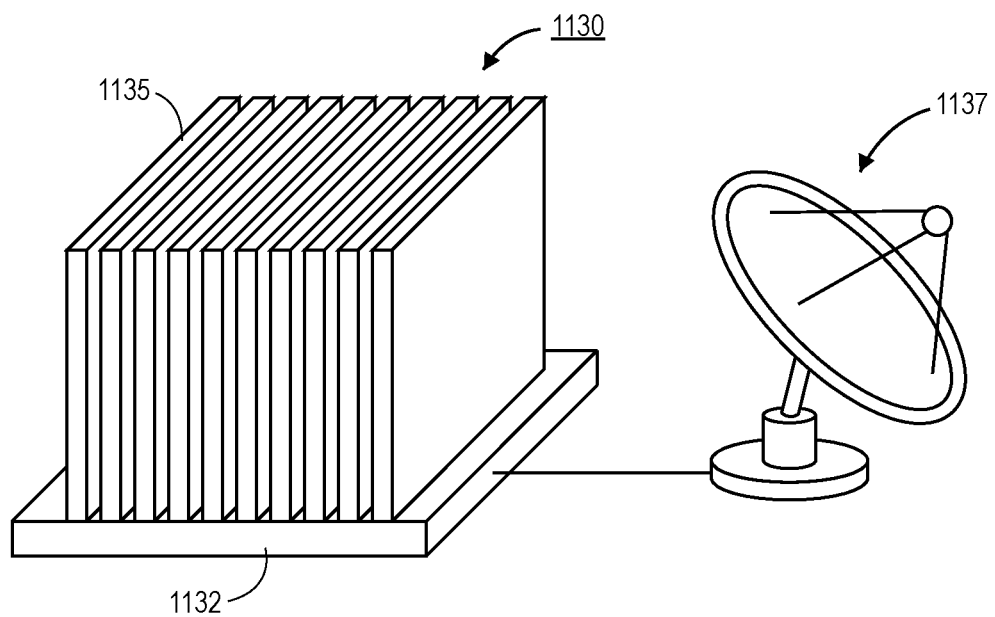
FIG. 69 is a perspective view of a portion of the fourteenth embodiment of the present disclosure.

Referring now to FIG. 69 a perspective view of a server rack 1130 that may be integrated into a WEC, such as those described in greater detail herein. As shown, the server rack 1130 may include a plurality of server blades 1135 that are provided on a rack 1132. The server blades 1135 may be communicatively coupled to each other through the rack 1132 and/or associated cabling, in order to provide enhanced processing power. The server blades 1135 may include processors, such as, but not limited to, central processing units (CPUs), graphics processing units (GPUs), application-specific integrated circuits (ASICs), field programmable gate arrays (FPGAs), and/or the like.

In some instances the server rack 1130 is communicatively coupled to an antenna 1137 to enable wireless communication. The antenna 1137 may include a parabolic dish antenna or any other antenna configuration. The ability to wirelessly transmit data from the server rack 1130 allows for data to be processed remotely at the source of power generation (e.g., in the ocean) while still being useful to the end consumer. The data delivery, hosting, computation, and the like can be executed at lower energy costs using such wave-energy generation devices. Further, the server rack 1130 can be passively cooled by the body of water surrounding the wave-energy generation device (e.g., the server rack 1130 can be in a water tight enclosure that is submersed in water). In some instances, the server rack 1130 functions as a cryptocurrency mining rig that is powered through the energy produced by the WEC.

Figure 70:
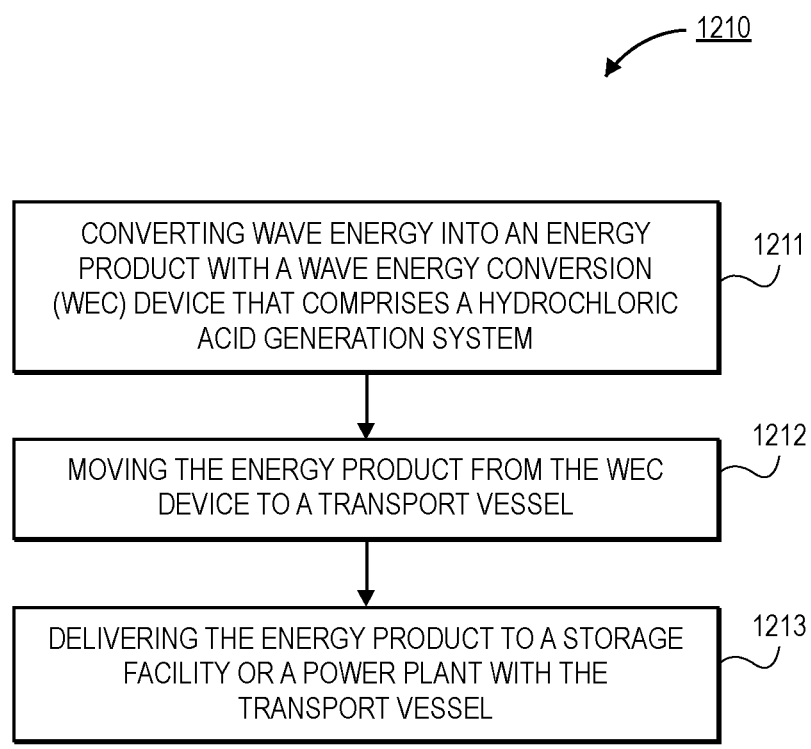
FIG. 70 is a process flow diagram of a fifteenth embodiment of the present disclosure.

FIG. 70 is a process flow diagram of a process 1210 for generating an energy product with a WEC and transporting the energy product to an alternative location in accordance with an embodiment. In an embodiment, the process 1210 may begin with operation 1211, which comprises converting wave energy into an energy product with a WEC that comprises an acid generation and distribution system. The WEC may be similar to any of the WECs described in greater detail herein. The energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the energy product may be made using any process described herein. For example, electrical power generated by the WEC can be used in order to produce the energy product.

In an embodiment, the process 1210 may continue with operation 1212, which comprises moving the energy product from the WEC to a transport vessel. The transport vessel may be similar to any vessel described herein. For example, the transport vessel may comprise a boat, a submersible, an aerial vehicle, or any other vessel that is capable of controlled motion on, through, and/or over the body of water on which the WEC floats. The energy product may be delivered or moved (actively or passively) to the transport vessel through any mechanism, such as a hose, a pipe, a cable, or the like.

In an embodiment, the process 1210 may continue with operation 1213, which comprises moving the energy product to a storage facility or a power plant with the transport vessel. The storage facility or a power plant may be provided at a location that is different than an approximate location of the WEC. In one embodiment, the location is at land. Though, in other embodiments, the location is near land (e.g., up to 100 kilometers from land, up to 40 kilometers from land, up to 1 kilometer from land, up to 500 meters from land, or up to 50 meters from land). In other embodiments, the storage facility may be a second vessel. For example, the first vessel may take the energy product from the WEC and deliver it to the second vessel. The second vessel may then take the energy product towards shore.

Figure 71:
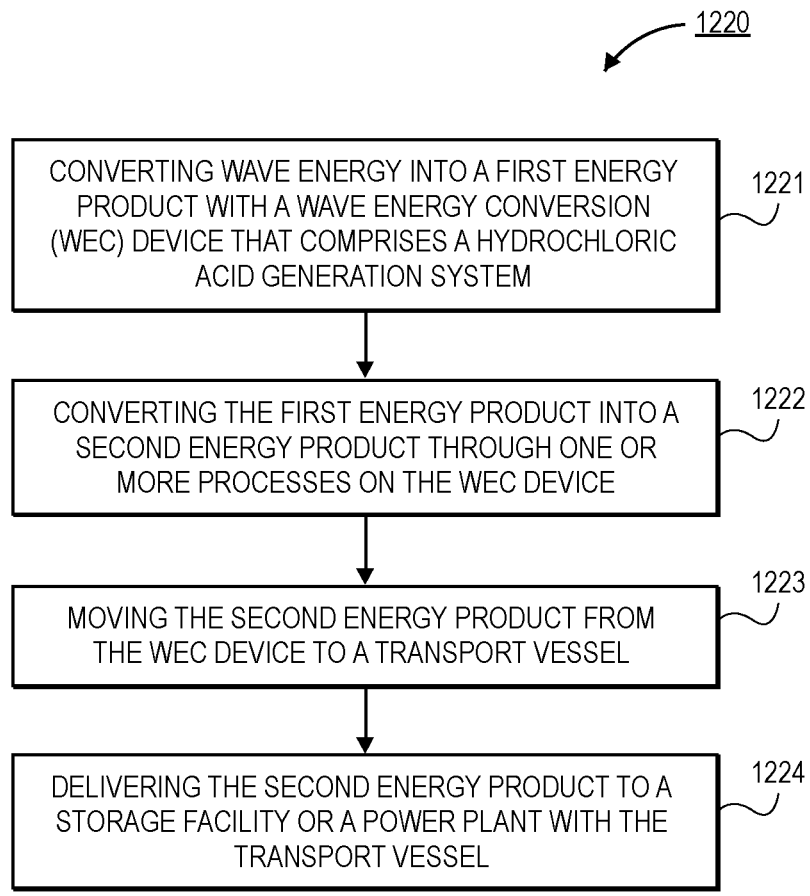
FIG. 71 is a process flow diagram of a sixteenth embodiment of the present disclosure.

FIG. 71 is a process flow diagram of a process 1220 for converting a first energy product into a second energy product and transporting the second energy product to a storage facility or power plant. In an embodiment, the process 1220 may begin with operation 1221, which comprises converting wave energy into a first energy product with a WEC that comprises an acid generation and distribution system. The WEC may be similar to any of the WECs described in greater detail herein. The first energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the first energy product may be made using any process described herein. For example, electrical power generated by the WEC can be used in order to produce the energy product.

In an embodiment, the process 1220 may continue with operation 1222, which comprises converting the first energy product into a second energy product through one or more processes on the WEC. The conversion of the first energy product to the second energy product may include converting one type of fuel or chemical into another fuel or chemical. In one embodiment, the first energy product may comprise hydrogen, and the second energy product may comprise methanol. Additional precursors (e.g., $CO_2$) may be reacted with the first energy product in order to generate the second energy product. For example, a process similar to the process described with respect to FIG. 66 may be used in some embodiments. Other conversion processes may also be used, such as, but not limited to, filtering, compression (e.g., from a gas to a liquid), purification, or the like may be used. Conversions may also include processing biological products. For example, algae may be processed into algae oil, or fish may be processed into fish oil. The conversion process may be implemented on or within the vicinity of the WEC. For example, a processing plant may be provided on the WEC, similar to what is shown in FIG. 64.

In an embodiment, the process 1220 may continue with operation 1223, which comprises moving the second energy product from the WEC to a transport vessel. The transport vessel may be similar to any vessel described herein. For example, the transport vessel may comprise a boat, a submersible, an aerial vehicle, or any other vessel that is capable of controlled motion on, through, and/or over the body of water on which the WEC floats. The second energy product may be delivered or moved (actively or passively) to the transport vessel through any mechanism, such as a hose, a pipe, a cable, or the like.

In an embodiment, the process 1220 may continue with operation 1224, which comprises delivering the second energy product to a storage facility or a power plant with the transport vessel. The storage facility or a power plant may be provided at a location that is different than an approximate location of the WEC. In one embodiment, the location is at land. Though, in other embodiments, the location is near land (e.g., up to 100 kilometers from land, up to 40 kilometers from land, up to 1 kilometer from land, up to 500 meters from land, or up to 50 meters from land). In other embodiments, the storage facility may be a second vessel. For example, the first vessel may take the second energy product from the WEC and deliver it to the second vessel. The second vessel may then take the second energy product towards shore.

Figure 72:
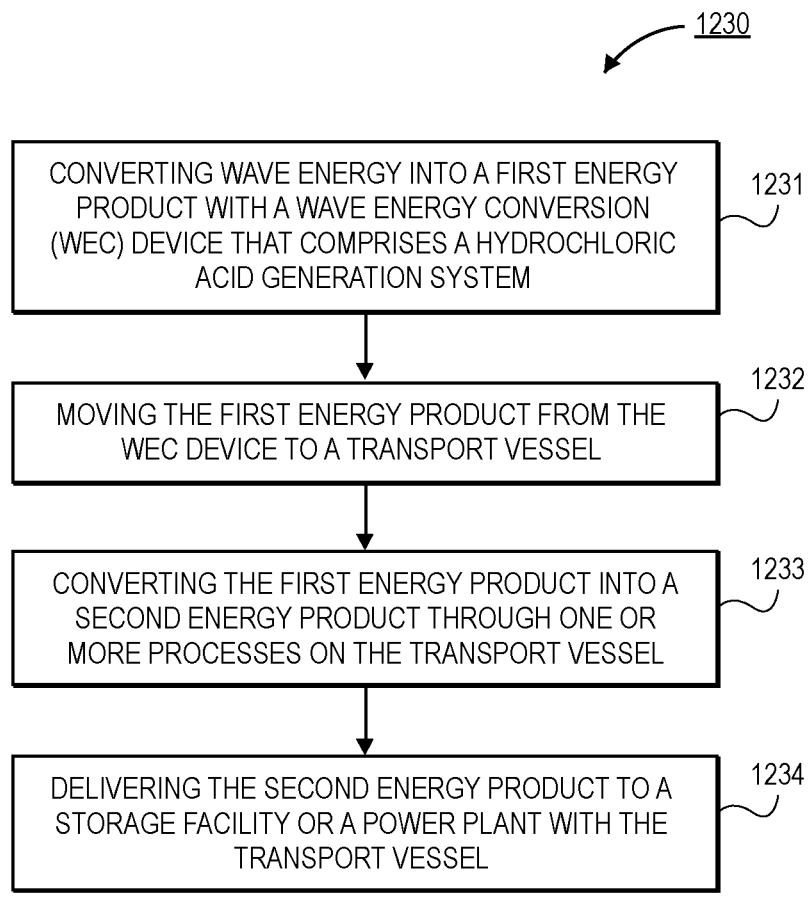
FIG. 72 is a process flow diagram of a seventeenth embodiment of the present disclosure.

FIG. 72 is a process flow diagram of a process 1230 for converting a first energy product into a second energy product and transporting the second energy product to storage facility or power plant. In an embodiment, the process 1230 may begin with operation 1231, which comprises converting wave energy into a first energy product with a WEC that comprises an acid generation and distribution system. The WEC may be similar to any of the WECs described in greater detail herein. The first energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the first energy product may be made using any process described herein. For example, electrical power generated by the WEC can be used in order to produce the energy product.

In an embodiment, the process 1230 may continue with operation 1232, which comprises moving the first energy product from the WEC to a transport vessel. The transport vessel may be similar to any vessel described herein. For example, the transport vessel may comprise a boat, a submersible, an aerial vehicle, or any other vessel that is capable of controlled motion on, through, or over the body of water on which the WEC floats. The first energy product may be delivered or moved (actively or passively) to the transport vessel through any mechanism, such as a hose, a pipe, a cable, or the like.

In an embodiment, the process 1230 may continue with operation 1233, which comprises converting the first energy product into a second energy product through one or more processes on the transport vessel. The conversion of the first energy product to the second energy product may include converting one type of fuel or chemical into another fuel or chemical. In one embodiment, the first energy product may comprise hydrogen, and the second energy product may comprise methanol. Additional precursors (e.g., $CO_2$) may be reacted with the first energy product in order to generate the second energy product. For example, a process similar to the process described with respect to FIG. 66 may be used in some embodiments. Other conversion processes may also be used, such as, but not limited to, filtering, compression (e.g., from a gas to a liquid), purification, or the like may be used. Conversions may also include processing biological products. For example, algae may be processed into algae oil, or fish may be processed into fish oil. The conversion process may be implemented on or within the vicinity of the transport vessel. For example, a processing plant may be provided on the transport vessel, similar to what is shown in FIG. 65.

In an embodiment, the process 1230 may continue with operation 1234, which comprises delivering the second energy product to a storage facility or a power plant with the transport vessel. The storage facility or a power plant may be provided at a location that is different than an approximate location of the WEC. In one embodiment, the location is at land. Though, in other embodiments, the location is near land (e.g., up to 100 kilometers from land, up to 40 kilometers from land, up to 1 kilometer from land, up to 500 meters from land, or up to 50 meters from land). In other embodiments, the storage facility may be a second vessel. For example, the first vessel may take the energy product from the WEC and deliver it to the second vessel. The second vessel may then take the energy product towards shore.

Figure 73:
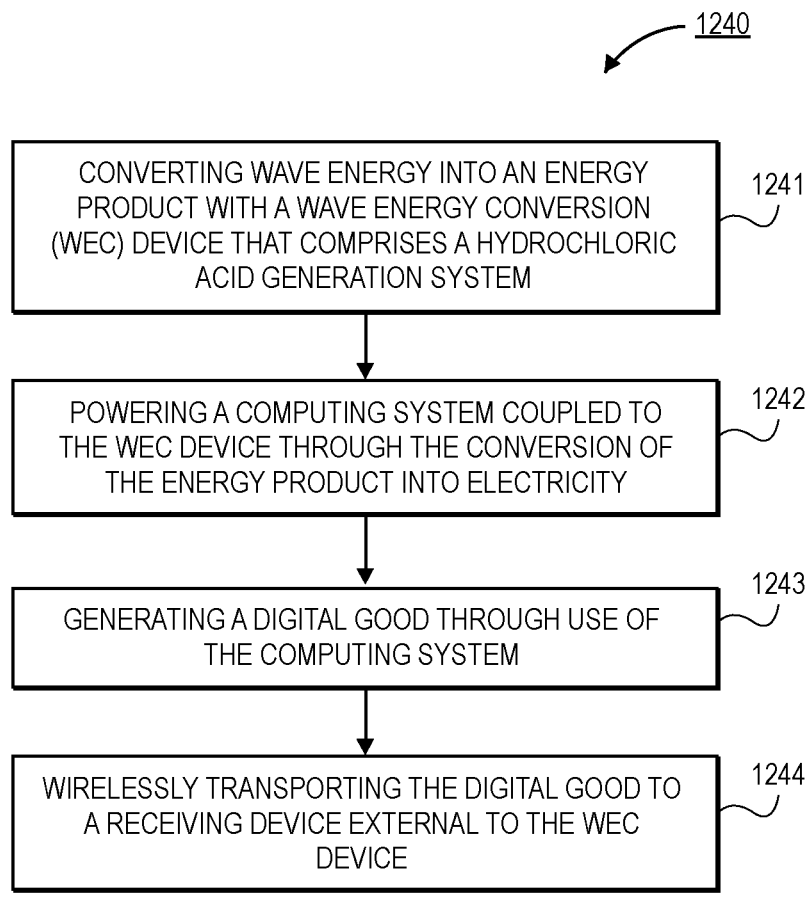
FIG. 73 is a process flow diagram of an eighteenth embodiment of the present disclosure.

FIG. 73 is a process flow diagram of a process 1240 for using a WEC to power a computing system (either directly or through use of an energy product) in order to generate digital goods. In an embodiment, the process 1240 may begin with operation 1241, which comprises converting wave energy into an energy product with a WEC that comprises an acid generation and distribution system. The WEC may be similar to any of the WECs described in greater detail herein. The first energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the first energy product may be made using any process described herein. For example, electrical power generated by the WEC can be used in order to produce the energy product.

In an embodiment, the process 1240 may continue with operation 1242, which comprises powering a computer system coupled to the WEC through the conversion of the energy product into electricity. For example, the energy product may be a fuel (e.g., hydrogen) that can be consumed to generate electricity. This may provide a more stable and consistent power supply than relying on the direct conversion of wave energy to electricity to power the computer system. Though, in some embodiments, the WEC may directly power the computer system without the need to generate an intervening energy product to store energy for future use.

In an embodiment, the process 1240 may continue with operation 1243, which may comprise generating a digital good through use of the computing system. In an embodiment, the digital good may include a block-chain based coin, a trained ML algorithm, a trained AI algorithm, a software product, a digital token, server capacity, or the like. The digital good may be stored on a non-transitory computer readable medium (e.g., a memory, a disk drive, a CD, a DVD, or other storage medium) in some embodiments.

In an embodiment, the process 1240 may continue with operation 1244, which comprises wirelessly transporting the digital good to a receiving device external to the WEC. The receiving device may be a second non-transitory computer readable medium provided at a location remote from the WEC. For example, the receiving device may be located on land or near land (e.g., up to 100 kilometers from land, up to 40 kilometers from land, up to 1 kilometer from land, up to 500 meters from land, or up to 50 meters from land). In an embodiment, the wireless transfer of the digital good may be transmitted through an antenna or other device for connecting to a wireless network. While wireless transport of the digital good may be faster, physical transport of the digital good stored on a non-transitory computer readable medium may also be provided by way of a vessel, a wired connection, or the like.

While the foregoing disclosure has described various embodiments, it is understood that the invention is not limited to any specific embodiment or depiction herein. A person of ordinary skill in the art would readily appreciate modifications and substitutions herein, and the scope of the invention includes all such modifications and substitutions. Accordingly, the scope of the invention should not be construed to be limiting by the foreign description except where expressly so stated, but rather the invention's scope is properly determined by the appended claims, using the common and ordinary meanings of the words therein consistent with, but not limited by, the descriptions and figures of this disclosure.

EXAMPLES

Example 1: a wave energy converter, comprising: an upper hollow portion which rises and falls in response to wave action of a body of water; a hollow tube coupled to the upper hollow portion and having a fluid inlet at a lower end and a fluid outlet at an upper end; a fluid collection reservoir at least partially within the upper hollow portion, the fluid collection reservoir fluidly coupled to the upper end of the hollow tube, the hollow tube configured to eject a fluid through the fluid outlet and into the fluid collection reservoir in response to an increasing pressure within the hollow tube; an electrical energy generator for converting an energy of a portion of the fluid in the fluid collection reservoir into electrical energy; an electrolyzer electrically coupled to the electrical energy generator, the electrolyzer to electrolyze a mixture of water and a chloride salt with the electrical energy to evolve hydrogen gas and chlorine gas; a first chamber for accumulating the hydrogen gas and the chlorine gas; and a second chamber for reacting the accumulated hydrogen gas and chlorine gas to form hydrogen chloride gas.

Example 2: the wave energy converter of Example 1, further comprising: a reservoir for combining the accumulated hydrogen chloride gas with water to form a hydrochloric acid solution.

Example 3: the wave energy converter of Example 2, further comprising: a tube fluidly coupled with the reservoir, the tube to transfer at least a portion of the hydrochloric acid solution to a depth in the body of water deeper than a draft of the wave energy converter.

Example 4: the wave energy converter of Example 2, further comprising: an ice plug chamber for freezing at least a portion of the hydrochloric acid solution.

Example 5: the wave energy converter of Examples 1-4, wherein the hollow tube comprises a constricted portion.

Example 6: the wave energy converter of Examples 1-5, wherein the mixture of water and the chloride salt comprises seawater.

Example 7: the wave energy converter of Examples 1-6, wherein the fluid inlet of the hollow tube is fluidly coupled with the body of water.

Example 8: the wave energy converter of Examples 1-7, wherein the fluid comprises water.

Example 9: the wave energy converter of Examples 1-8, further comprising: a hydrogen-chlorine gas igniter within the second chamber, the hydrogen-chlorine gas igniter to initiate a reaction of the accumulated hydrogen gas and chlorine gas.

Example 10: the wave energy converter of Examples 1-9, wherein the electrical energy generator comprises one or more fluid turbines.

Example 11: the wave energy converter of Example 10, wherein the electrical energy generator is fluidly coupled to the body of water through the one or more fluid turbines.

Example 12: the wave energy converter of Example 10 or Example 11, further comprising: a control system to provide a differential rate at which fluid effluent flows through each of the one or more turbines to produce a directional thrust to propel the wave energy converter.

Example 13: a method for manufacturing hydrochloric acid, the method comprising: generating electrical energy from a wave energy converter in a body of water, the wave energy converter comprising an upper hollow portion which rises and falls in response to wave action of a body of water, a hollow tube coupled to the upper hollow portion and having a fluid inlet at a lower end and a fluid outlet at an upper end, a fluid collection reservoir at least partially within the upper hollow portion, the fluid collection reservoir fluidly coupled to the upper end of the hollow tube, the hollow tube configured to eject a fluid through the fluid outlet and into the fluid collection reservoir in response to an increasing pressure within the hollow tube, an electrical energy generator for converting an energy of a portion of the fluid in the fluid collection reservoir into electrical energy, and an electrolyzer electrically coupled to the electrical energy generator; electrolyzing a mixture of water and a chloride salt with the electrolyzer and the electrical energy to evolve chlorine gas and hydrogen gas in a first chamber of the wave energy converter; reacting the chlorine gas and the hydrogen gas to form hydrogen chloride gas in a second chamber of the wave energy converter; and combining the hydrogen chloride gas with water to form a hydrochloric acid solution in a reservoir of the wave energy converter.

Example 14: the method of Example 13, wherein the wave energy converter further comprises a tube fluidly coupled with the reservoir, the method further comprising: transferring at least a portion of the hydrochloric acid solution to a depth in the body of water deeper than a draft of the wave energy converter.

Example 15: the method of Example 13 or Example 14, further comprising: storing the hydrochloric acid solution in the wave energy converter.

Example 16: the method of Example 15, further comprising: removing the stored hydrochloric acid solution from the wave energy converter with an offtake ship.

Example 17: the method of Example 15 or Example 16, further comprising: delivering the stored hydrochloric acid solution to a receiving vessel or port.

Example 18: the method of Examples 13-17, further comprising: freezing at least a portion of the hydrochloric acid solution in an ice plug chamber of the wave energy converter to form a frozen hydrochloric acid ice plug.

Example 19: the method of Example 18, further comprising: storing the frozen hydrochloric acid ice plug in the wave energy converter.

Example 20: the method of Example 19, further comprising: removing the stored frozen hydrochloric acid ice plug from the wave energy converter with an offtake ship.

Example 21: the method of Example 19, further comprising: delivering the stored frozen hydrochloric acid ice plug to a receiving vessel or port.

Example 22: the method of Examples 13-21, wherein electrolyzing the mixture of water and the chloride salt comprises electrolyzing seawater.

Example 23: the method of Examples 13-22, further comprising: initiating a reaction of the accumulated hydrogen gas and chlorine gas with a hydrogen-chlorine gas igniter within the second chamber.

Example 24: a self-propelled, free-floating carbon-sequestration accelerator, comprising: a metal hull, a power-take-off system configured to generate electrical energy from ocean waves, an electrolyzer electrically connected to the power-take-off system and adapted to evolve hydrogen gas and chlorine gas from seawater when energized by the power-take-off system, an inlet port configured to convey neutral seawater from the sea to the electrolyzer, an outlet port configured to convey alkalinized water from the electrolyzer to the sea, a first reaction compartment adapted for combining hydrogen and chlorine gases to form hydrogen chloride, an igniter disposed within the first reaction compartment to initiate a reaction of hydrogen and chlorine gases, a second reaction compartment adapted for combining hydrogen chloride and seawater to form hydrochloric acid solution, a hydrochloric acid storage tank fluidly connected to the section reaction compartment and adapted to store hydrochloric acid solution for subsequent offload.

Example 25: a self-propelled, free-floating carbon-sequestration accelerator, comprising: a metal hull, a power-take-off system configured to generate electrical energy from ocean waves, an electrolyzer electrically connected to the power-take-off system and adapted to evolve hydrogen gas and chlorine gas from seawater when energized by the power-take-off system, an inlet port configured to convey neutral seawater from the sea to the electrolyzer, an outlet port configured to convey alkalinized water from the electrolyzer to the sea, a first reaction compartment adapted for combining hydrogen and chlorine gases to form hydrogen chloride, an igniter disposed within the first reaction compartment to initiate a reaction of hydrogen and chlorine gases, a second reaction compartment adapted for combining hydrogen chloride and seawater to form hydrochloric acid solution, an acidity sequestration hose depending from the hull and adapted to convey hydrochloric acid solution from the second reaction compartment to a region of the ocean having a depth exceeding 500 meters.

We claim:

1. A wave energy converter, comprising:
   an upper hollow portion;
   a first fluid collection reservoir at least partially disposed within the upper hollow portion;
   a hollow tube extending below the upper hollow portion and in fluid communication with the first fluid collection reservoir, said hollow tube configured to eject water rising through said hollow tube in response to wave-induced motion of the wave energy converter into the first fluid collection reservoir;
   an electrical energy generator for converting an energy of a portion of the fluid in the first fluid collection reservoir into electrical energy;
   an electrolyzer electrically coupled to the electrical energy generator, the electrolyzer configured to utilize said electrical energy to electrolyze a mixture of water and a chloride salt to evolve hydrogen gas and chlorine gas;
   a first chamber for accumulating the hydrogen gas and the chlorine gas; and
   a second chamber for reacting the accumulated hydrogen gas and chlorine gas to form hydrogen chloride gas.

2. The wave energy converter of claim 1, further comprising a second fluid collection reservoir configured to combine the accumulated hydrogen chloride gas with water to form a hydrochloric acid solution.

3. The wave energy converter of claim 2, further comprising a pipe fluidly coupled with the second fluid collection reservoir, said pipe adapted to transfer at least a portion of the hydrochloric acid solution below said hollow tube.

4. The wave energy converter of claim 2, further comprising an ice plug chamber configured to freeze at least a portion of the hydrochloric acid solution.

5. The wave energy converter of claim 1, wherein the electrical energy generator comprises one or more fluid turbines.

6. The wave energy converter of claim 5, wherein the electrical energy generator is fluidly coupled to a body of water through the one or more fluid turbines.

7. The wave energy converter of claim 5, further comprising a control system configured to provide a differential rate at which fluid effluent flows through each of the one or more turbines to produce a directional thrust to propel the wave energy converter.

8. The wave energy converter of claim 1, wherein the hollow tube comprises a constricted portion.

9. The wave energy converter of claim 1, wherein the mixture of water and the chloride salt comprises seawater.

10. The wave energy converter of claim 1, wherein the hollow tube is fluidly coupled with a body of water.

11. The wave energy converter of claim 1, wherein the fluid comprises water.

12. The wave energy converter of claim 1, further comprising a hydrogen-chlorine gas igniter within the second chamber, the hydrogen-chlorine gas igniter configured to initiate a reaction of the accumulated hydrogen gas and chlorine gas.

13. A method for manufacturing hydrochloric acid, the method comprising:
   generating electrical energy from a wave energy converter in a body of water, the wave energy converter comprising an upper hollow portion, a fluid collection reservoir at least partially within the upper hollow portion, a hollow tube below the upper hollow portion and in fluid communication with the fluid collection reservoir, an electrical energy generator, and an electrolyzer electrically coupled to the electrical energy generator;
   electrolyzing a mixture of water and a chloride salt with the electrolyzer using electrical energy from the electrical energy generator to evolve chlorine gas and hydrogen gas in a first chamber of the wave energy converter;
   reacting the chlorine gas and the hydrogen gas to form hydrogen chloride gas in a second chamber of the wave energy converter; and
   combining the hydrogen chloride gas with water to form a hydrochloric acid solution in a reservoir of the wave energy converter.

14. The method for manufacturing hydrochloric acid of claim 13, further comprising freezing at least a portion of the hydrochloric acid solution in an ice plug chamber to form a frozen hydrochloric acid ice plug.

15. The method for manufacturing hydrochloric acid of claim 14, further comprising storing the frozen hydrochloric acid ice plug in the wave energy converter.

16. The method for manufacturing hydrochloric acid of claim 15, further comprising removing the stored frozen hydrochloric acid ice plug from the wave energy converter with an offtake ship.

17. The method for manufacturing hydrochloric acid of claim 15, further comprising delivering the stored frozen hydrochloric acid ice plug to a receiving vessel or port.

18. The method for manufacturing hydrochloric acid of claim 13, further comprising storing the hydrochloric acid solution in the wave energy converter.

19. The method for manufacturing hydrochloric acid of claim 18, further comprising removing the stored hydrochloric acid solution from the wave energy converter with an offtake ship.

20. The method for manufacturing hydrochloric acid of claim 18, further comprising delivering the stored hydrochloric acid solution to a receiving vessel or port.

21. The method for manufacturing hydrochloric acid of claim 13, further comprising transferring at least a portion of the hydrochloric acid solution to a depth below the hollow tube.

22. The method for manufacturing hydrochloric acid of claim 13, wherein electrolyzing the mixture of water and the chloride salt comprises electrolyzing seawater.

23. The method for manufacturing hydrochloric acid of claim 13, further comprising initiating a reaction of the accumulated hydrogen gas and chlorine gas with a hydrogen-chlorine gas igniter within the second chamber.

* * * * *